United States Patent
Regev et al.

(10) Patent No.: US 12,529,092 B2
(45) Date of Patent: Jan. 20, 2026

(54) IN-SITU SPATIAL TRANSCRIPTOMICS

(71) Applicants: The Broad Institute, Inc., Cambridge, MA (US); Massachusetts Institute of Technology, Cambridge, MA (US)

(72) Inventors: Aviv Regev, Cambridge, MA (US); Sanja Vickovic, Cambridge, MA (US)

(73) Assignees: The Broad Institute, Inc., Cambridge, MA (US); Massachusetts Institute of Technology, Cambridge, MA (US)

( * ) Notice: Subject to any disclaimer, the term of this patent is extended or adjusted under 35 U.S.C. 154(b) by 1182 days.

(21) Appl. No.: 17/426,453

(22) PCT Filed: Jan. 28, 2020

(86) PCT No.: PCT/US2020/015481
§ 371 (c)(1),
(2) Date: Jul. 28, 2021

(87) PCT Pub. No.: WO2020/160044
PCT Pub. Date: Aug. 6, 2020

(65) Prior Publication Data
US 2022/0119871 A1    Apr. 21, 2022

Related U.S. Application Data

(60) Provisional application No. 62/811,528, filed on Feb. 27, 2019, provisional application No. 62/797,831, filed on Jan. 28, 2019.

(51) Int. Cl.
| | | |
|---|---|---|
| *C12Q 1/6841* | (2018.01) | |
| *C12N 9/22* | (2006.01) | |
| *C12N 15/10* | (2006.01) | |
| *C12N 15/11* | (2006.01) | |

(52) U.S. Cl.
CPC ............ *C12Q 1/6841* (2013.01); *C12N 9/22* (2013.01); *C12N 15/1096* (2013.01); *C12N 15/11* (2013.01); *C12N 2310/20* (2017.05); *C12N 2800/80* (2013.01)

(58) Field of Classification Search
None
See application file for complete search history.

(56) References Cited

U.S. PATENT DOCUMENTS

| | | | |
|---|---|---|---|
| 10,053,731 B2 | 8/2018 | Blainey | |
| 2005/0172476 A1 | 8/2005 | Stone et al. | |
| 2010/0002241 A1 | 1/2010 | Hirose | |
| 2012/0122714 A1 | 5/2012 | Samuels et al. | |
| 2012/0219947 A1 | 8/2012 | Yurkovetsky et al. | |
| 2013/0190196 A1 | 7/2013 | Onderdonk et al. | |
| 2016/0060691 A1 | 3/2016 | Giresi et al. | |
| 2016/0208323 A1 | 7/2016 | Bernstein et al. | |
| 2017/0016063 A1* | 1/2017 | McGall | C12N 15/1065 |
| 2017/0029872 A1 | 2/2017 | Bhattacharyya et al. | |
| 2018/0105638 A1* | 4/2018 | Lau | C12Q 1/6806 |
| 2018/0179590 A1* | 6/2018 | Belgrader | C12Q 1/683 |
| 2020/0123618 A1 | 4/2020 | Batenchuk et al. | |
| 2020/0152289 A1 | 5/2020 | Cleary et al. | |
| 2021/0317524 A1* | 10/2021 | Lucero | C12Q 1/6841 |

FOREIGN PATENT DOCUMENTS

| | | | | |
|---|---|---|---|---|
| WO | 2004/002627 A2 | 1/2004 | | |
| WO | 2004/015075 A2 | 2/2004 | | |
| WO | 2011/008730 A2 | 1/2011 | | |
| WO | 2012/140224 A1 | 10/2012 | | |
| WO | 2014/047556 A1 | 3/2014 | | |
| WO | 2014/047561 A1 | 3/2014 | | |
| WO | 2014/060483 A1 | 4/2014 | | |
| WO | 2014/093622 A2 | 6/2014 | | |
| WO | 2014/093712 A1 | 6/2014 | | |
| WO | 2014/143158 A1 | 9/2014 | | |
| WO | 2014/210353 A2 | 12/2014 | | |
| WO | 2016/040476 A1 | 3/2016 | | |
| WO | 2016/168584 A1 | 10/2016 | | |
| WO | 2016/186745 A1 | 11/2016 | | |
| WO | WO-2017019456 A2 * | 2/2017 | ........... | C12Q 1/6816 |
| WO | 2017/156336 A1 | 9/2017 | | |
| WO | WO-2017164936 A1 * | 9/2017 | ......... | C07K 16/1036 |
| WO | 2019/084058 A2 | 5/2019 | | |
| WO | 2020/160044 A1 | 8/2020 | | |

OTHER PUBLICATIONS

Decoding Randomly Ordered DNA Arrays, Genome Research, 14, 870-877 (Year: 2004).*
Barcoded solid-phase RNA capture for spatial transcriptomics profiling in mammalian tissue section, Nature Protocols, 13, 2501-2534 (Year: 2018).*
An optically decoded bead array for linking imaging and sequencing with single-cell resolution, BioRxiv, 355677; doi: https://doi.org/10.1101/355677 (Year: 2018).*
The Broad Institute, Inc., "Notification Concerning Transmittal of International Preliminary Report on Patentability for PCT/US2020/015481", Aug. 12, 2021, 8 pages.
Achim, et al., "High-Throughput Spatial Mapping of Single-Cell RNA-Seq Data to Tissue of Origin", Nature Biotechnolgy, vol. 33, No. 5, May 2015, 503-509.
Asp, et al., "Spatial Detection of Fetal Marker Genes Expressed at Low Level in Adult Human Heart Tissue", Scientific Reports, vol. 7, Article No. 12941, 2017, 10 pages.
Berglund, et al., "Spatial Maps of Prostate Cancer Transcriptomes Reveal an Unexplored Landscape of Heterogeneity", Nature Communications, vol. 9, No. 2419, 2018, 14 pages.

(Continued)

*Primary Examiner* — Juliet C Switzer
*Assistant Examiner* — Brian Ellis Young
(74) *Attorney, Agent, or Firm* — Foley & Lardner LLP; Sunit Talapatra

(57) ABSTRACT

The present disclosure relates to systems and method of in-situ tissue profiling. Methods for spatiotemporal processing of a sample, capturing molecules of interest, and correlating cells in the sample to the capture molecules are provided.

40 Claims, 34 Drawing Sheets
Specification includes a Sequence Listing.

(56) References Cited

OTHER PUBLICATIONS

Cao, et al., "Comprehensive Single Cell Transcriptional Profiling of a Multicellular Organism by Combinatorial Indexing", Available at: BioRxiv https://doi.org/10.1101/104844, Feb. 2, 2017, 35 pages.
Cao, et al., "Comprehensive Single-cell Transcriptional Profiling of a Multicellular Organism", Science, vol. 357, No. 6352, Aug. 18, 2017, 7 pages.
Codeluppi, et al., "Spatial Organization of the Somatosensory Cortex Revealed by osmFISH", bioRxiv, https://doi.org/10.1101/276097, Mar. 4, 2018, 8 pages.
Eng, et al., "Transcriptome-Scale Super-Resolved Imaging in Tissues by RNA seqFISH+", Nature, vol. 568, No. 7751, Apr. 2019, 235-239.
Gierahn, et al., "Seq-Well: Portable, Low-Cost RNA Sequencing of Single Cells at High Throughput", Nature Methods, vol. 14, No. 4, Apr. 2017, 8 pages.
Jemt, et al., "An Automated Approach to Prepare Tissue-Derived Spatially Barcoded RNA-Sequencing Libraries", Scientific Reports, vol. 6, No. 37137, Nov. 16, 2016, 9 pages.
Klein, et al., "Droplet Barcoding for Single-Cell Transcriptomics Applied to Embryonic Stem Cells", Cell, vol. 161, No. 5, May 21, 2015, 24 pages.
Lein, et al., "The Promise of Spatial Transcriptomics for Neuroscience in the Era of Molecular Cell Typing", Science, vol. 358, Oct. 6, 2017, 64-69.
Macosko, et al., "Highly Parallel Genome-Wide Expression Profiling of Individual Cells Using Nanoliter Droplets", Cell, vol. 161, No. 5, May 21, 2015, 25 pages.
Maniatis, et al., "Spatiotemporal Dynamics of Molecular Pathology in Amyotrophic Lateral Sclerosis", Science, vol. 364, Apr. 5, 2019, 89-93.
Merritt, et al., "High Multiplex, Digital Spatial Profiling of Proteins and RNA in Fixed Tissue Using Genomic Detection Methods", bioRxiv—doi: https://doi.org/10.1101/559021, Feb. 26, 2019, 50 pages.
Moffitt, et al., "High-Throughput Single-Cell Gene-Expression Profiling with Multiplexed Error-Robust Fluorescence in Situ Hybridization", Proceedings of the National Academy of Sciences, vol. 113, No. 39, Sep. 27, 2016, 11046-11051.
Redin, et al., "Efficient Whole Genome Haplotyping and High-Throughput Single Molecule Phasing with Barcode-Linked Reads", bioRxiv, doi:10.1101/356121, 2018, 13 pages.
Rodriques, et al., "Slide-Seq: A Scalable Technology for Measuring Genome-wide Expression at High Spatial Resolution", Science, vol. 363, Issue 6434, Mar. 29, 2019, 6 pages.
Rosenberg, et al., "Scaling Single Cell Transcriptomics Through Split Pool Barcoding", Available at:Bio Rxiv http://dx.doi.org/10.1101/105163, Feb. 2, 2017, 13 pages.
Salmen, et al., "Barcoded Solid-Phase RNA Capture for Spatial Transcriptomics Profiling in Mammalian Tissue Sections", Nature Protocols, vol. 13, 2018, 34 pages.
Thrane, et al., "Spatially Resolved Transcriptomics Enables Dissection of Genetic Heterogeneity in Stage III Cutaneous Malignant Melanoma", Cancer Research, vol. 78, No. 20, Oct. 15, 2018, 5970-5979.
Vickovic, et al., "High-Definition Spatial Transcriptomics for in Situ Tissue Profiling", Nature Methods, vol. 16, No. 10, Oct. 2019, 987-990.
Vickovic, et al., "High-Density Spatial Transcriptomics Arrays for in Situ Tissue Profiling", bioRxiv—https://doi.org/10.1101/563338, Mar. 13, 2019, 30 pages.
Vitak, et al., "Sequencing Thousands of Single-Cell Genomes with Combinatorial Indexing", Nature Methods, vol. 14, No. 3, Mar. 2017, 19 pages.
Wang, et al., "Three-dimensional Intact-tissue Sequencing of Single-cell Transcriptional States", Science, vol. 361, Issue 6400, Jul. 27, 2018, 11 pages.
Zheng, et al., "Haplotyping Germline and Cancer Genomes with High-Throughput Linked-Read Sequencing", Nature Biotechnology, vol. 34, No. 3, Mar. 2016, 303-311.
Zheng, et al., "Massively Parallel Digital Transcriptional Profiling of Single Cells", Nature Communications, vol. 8, No. 14049, Jan. 16, 2017, 12 pages.
Zilionis, et al., "Single-cell Barcoding and Sequencing Using Droplet Microfluidics", Nature Protocols, vol. 12, No. 1, Jan. 2017, 44-73.
Redin, et al., "Droplet Barcode Sequencing for targeted linked-read haplotyping of single DNA molecules", Nucl. Acid Res. 45:13, 2017, 8 pages.
Ståhl et al., Visualization and analysis of gene expression in tissue sections by spatial transcriptomics. Science. 353, 78-82 (2016).
Stahl et al., Visualization and Analysis of Gene Expression in Tissue Sections by Spatial Transciptomics, Science, vol. 353, No. 6294, pp. 78-82, Jul. 2016.
The Broad Institute, Inc., "Notification of Transmittal of the International Search Report and the Written Opinion of the International Searching Authority, or the Declaration for PCT/US2020/015481", May 26, 2020, 13 pages.
Du et al., "Qualifying antibodies for image-based immune profiling and multiplexed tissue imaging," Nature Protocols, 2019, vol. 14 (pp. 2900-2930).
Abudayyeh et al., "C2c2 is a single-component programmable RNA-guided RNA targeting CRISPR effector," Science, Aug. 5, 2016, vol. 353, No. 6299 (pp. 1-23).
Aljo et al., "Splotch: Robust estimation of aligned spatial temporal gene expression data," BioRxiv, URL: https://www.biorxiv.org/content/10.1101/757096v1,Sep. 5, 2019 (39 pages).
Allerson et al., "Fully 2'-Modified Oligonucleotide Duplexes with Improved in Vitro Potency and Stability Compared to Unmodified Small Interfering RNA," American Chemical Society, Journal of Medicinal Chemistry, Feb. 2005, vol. 48 (pp. 901-904).
Anders et al., "HTSeq—a Python framework to work with high-throughput sequencing data," Bioinformatics, 2015, vol. 31, No. 2 (pp. 166-169).
Angelo et al., "Multiplexed ion beam imaging of human breast tumors," Nature Medicine, Apr. 2014, vol. 20, No. 4 (pp. 436-442).
Appleby et al. "New technologies for ultra-high throughput genotyping in plants," Methods in Molecular Biology, Plant Genomics, vol. 513 (pp. 19-39).
Ausubel, "A botanical macroscope" Proceedings of the National Academy of Sciences, Aug. 4, 2009, vol. 106, No. 31 (pp. 12569-12570).
Behlke et al., "Chemical Modification of siRNAs for In Vivo Use", Oligonucleotides, 2008 vol. 18 (pp. 305-320).
Bigby et al., "The Usefulness of Induced Sputum in the Diagnosis of Pneumocystis carinii Pneumonia in Patients with the acquired immunodeficiency syndrome," American Review of Respiratory Disease, Apr. 1986, vol. 133, No. 4 (pp. 515-518).
Birrell et al., "A genome-wide screen in Saccharomyces cerevisiae for genes affecting UV radiation sensitivity," Proceedings of the National Academy of Sciences, USA, Oct. 23, 2001, vol. 98, No. 22 (pp. 12608-12613).
Bramsen et al., "Development of Therapeutic-Grade Small Interfering RNAs by Chemical Engineering," Frontiers in Genetics, Aug. 20, 2012, vol. 3, Article 154 (pp. 1-22).
Buenrostro et al. "Transposition of native chromatin for fast and sensitive epigenomic profiling of open chromatin, DNA-binding proteins and nucleosome position," Nature Methods, Dec. 2013, vol. 10, No. 12 (pp. 1213-1218).
Cao et al., "Comprehensive single-cell transcriptional profiling of a multicellular organism," Science, Aug. 18, 2017, vol. 357, No. 6352 (pp. 661-667).
Carr et al., "Genome Engineering," Nature Biotechnology, Dec. 2009, vol. 27, No. 12 (pp. 1151-1162).
CBOL Plant Working Group, "A DNA barcode for land plants," Proceedings of the National Academy of Sciences, Aug. 4, 2009, vol. 106, No. 31 (pp. 12794-12797).
Chen et al., "RNA Imaging. Spatially Resolved, Highly Multiplexed RNA Profiling in Single Cells," Science, Apr. 24, 2015, vol. 348, No. 6233 (pp. 1-14).
Chen et al., "Nanoscale Imaging of RNA with Expansion Microscopy," Nature Methods, 2016 vol. 13 (pp. 679-684).

(56) References Cited

OTHER PUBLICATIONS

Costea et al., "TagGD: fast and accurate software for DNA Tag generation and demultiplexing," PLoS One, 2013, vol. 8, No. 3 (5 pages).

Curado et al., "Nitroreductase-mediated cell/tissue ablation in zebrafish: a spatially and temporally controlled ablation method with applications in developmental and regeneration studies," Nature Protocols, 2008, vol. 3, No. 6 (pp. 948-954).

Cusanovich et al., "Multiplex single-cell profiling of chromatin accessibility by combinatorial cellular indexing" Science, May 22, 2015, vol. 348, No. 6237 (pp. 910-914).

Davison et al., "Transactivation from Gal4-VP16 transgenic insertions for tissue-specific cell labeling and ablation in zebrafish," Developmental Biology, 2007, vol. 304 (pp. 811-823).

Dellinger et al., "Streamlined process for the chemical synthesis of RNA using 2'-O-thionocarbamate-protected nucleoside phosphoramidites in the solid phase," Journal of the American Chemical Society, Aug. 3, 2011, vol. 133, No. 30 (pp. 11540-11556).

Deng et al., "CASFISH: CRISPR/Cas9-mediated in situ labeling of genomic loci in fixed cells," Proceedings of the National Academy of Sciences, USA, Sep. 22, 2015, vol. 112, No. 38 (pp. 11870-11875).

Dobin, et al., "STAR: ultrafast universal RNA-seq aligner," Bioinformatics, Oct. 25, 2012, vol. 29, No. 1 (pp. 15-21).

Edd et al., "Controlled encapsulation of single-cells into monodisperse picolitre drops," Lab Chip, 2008, vol. 8, No. 8 (pp. 1262-1264).

Ellis et al., "rSPACE: Spatially based power analysis for conservation and ecology," Methods in Ecology and Evolution, 2015, vol. 6 (pp. 621-625).

Empedocles et al., "Three-dimensional orientation measurements of symmetric single chromophores using polarization microscopy," Nature, 1999, vol. 399 (pp. 126-130).

Finn et al., "A Single Administration of CRISPR/Cas9 Lipid Nanoparticles Achieves Robust and Persistent In Vivo Genome Editing," Cell Reports, Cell Press, 2018, vol. 22 (pp. 2227-2235).

Fisher et al., "A scalable, fully automated process for construction of sequence- ready human exome targeted capture libraries," Genome biology, 2011, vol. 12-R1 (pp. 1-15).

Fox et al., "Applications of ultra-high-throughput sequencing," Methods in Molecular Biology, 2009, vol. 553 (pp. 79-108).

Gahtan et al., "Of lasers, mutants, and see-through brains: Functional neuroanatomy in zebrafish," Journal of Neurobiology, Apr. 2004, vol. 59, No. 1 (pp. 147-161).

Giaever et al., "Functional profiling of the Saccharomyces cerevisiae genome," Nature, Jul. 25, 2002, vol. 418 (pp. 387-391).

Giesen et al., "Highly multiplexed imaging of tumor tissues with subcellular resolution by mass cytometry," Nature Methods, 2014, vol. 11, No. 4 (9 pages).

Goltsev et al., "Deep Profiling of Mouse Splenic Architecture with CODEX Multiplexed Imaging," Cell, 2018, vol. 174 (29 pages).

Gruber et al., "The Vienna RNA Websuite," Nucleic Acids Research, Apr. 19, 2008, vol. 36 (pp. W70-W74).

Gunderson et al., "Decoding randomly ordered DNA arrays," Genome Research, 2004, vol. 14 (pp. 870-877).

Guo et al., "Droplet microfluidics for high-throughput biological assays" Lab Chip, 2012, vol. 12 (pp. 2146-2155).

Habib et al., "Div-Seq: Single-nucleus RNA-Seq reveals dynamics of rare adult newborn neurons," Science, Aug. 26, 2016, vol. 353, No. 6302 (pp. 925-928).

Habib et al., "Massively parallel single-nucleus RNA-seq with DroNc-seq," Nature Methods, Oct. 2017, vol. 14, No. 10 (pp. 955-958).

Hawrylycz et al., "An anatomically comprehensive atlas of the adult human brain transcriptome," Nature, 2012, vol. 489 (27 pages).

He et al., "Conjugation and Evaluation of Triazole-Linked Single Guide RNA for CRISPR-Cas9 Gene Editing," Chembiochem, Oct. 4, 2016, vol. 17, No. 19 (pp. 1809-1812).

Hendel et al., "Chemically modified guide RNAs enhance CRISPR-Cas genome editing in human primary cells," Nature Biotechnology, Sep. 2015, vol. 33, No. 9 (pp. 985-989).

Hughes et al., "Expression Profiling Using Microarrays Fabricated by an Ink-Jet Oligonucleotide Synthesizer," Nature Biotechnology, Apr. 2001, vol. 19 (pp. 342-347).

Imelfort et al., "De novo sequencing of plant genomes using second-generation technologies," Briefings in Bioinformatics, 2009, vol. 10, No. 6 (pp. 609-618).

Islam et al., "Quantitative single-cell RNA-seq with unique molecular identifiers," Nature Methods, Feb. 2014, vol. 11, No. 2 (6 pages).

Jones et al., "SciPy: Open Source Scientific Tools for Python," URL: https://scipy.org/, retrieved from internet Mar. 26, 2025 (2 pages).

Kelley et al., "Versatility of chemically synthesized guide RNAs for CRISPR-Cas9 genome editing," Journal of Biotechnology, Sep. 2016, vol. 233, 10 (pp. 74-83).

Keren et al., "A Structured Tumor-Immune Microenvironment in Triple Negative Breast Cancer Revealed by Multiplexed Ion Beam Imaging," Cell, 2018, vol. 174 (pp. 1373-1387).

Keren et al., "MIBI-TOF: A multiplexed imaging platform relates cellular phenotypes and tissue structure," Science Advances, 2019, vol. 5 (pp. 1-16).

Koch, H., "Combining morphology and DNA barcoding resolves the taxonomy of Western Malagasy Liotrigona Moure, 1961," African Invertebrates, Dec. 2010, vol. 51, No. 2 (pp. 413-421).

Konermann et al., "Genome-scale transcriptional activation by an engineered CRISPR-Cas9 complex," Nature, Jan. 29, 2015, vol. 517, pp. 583-588 (18 pages).

Kovacs et al., "Diagnosis of Pneumocystis carinii pneumonia: improved detection in sputum with use of monoclonal antibodies," New England Journal of Medicine, Mar. 10, 1988, vol. 318, No. 10 (pp. 589-593).

Kress et al., "DNA barcodes: Genes, genomics, and bioinformatics," Proceedings of the National Academy of Sciences, Feb. 26, 2008, vol. 105, No. 8 (pp. 2761-2762).

Kress et al., "Use of DNA barcodes to identify flowering plants" Proceedings of the National Academy of Sciences, USA, vol. 102, No. 23 (pp. 8369-8374).

Kuhnemund et al., "Targeted DNA sequencing and in situ mutation analysis using mobile phone microscopy," Nature Communications, 2017, vol. 8, No. 13913 (8 pages).

Lacoste et al. "Ultrahigh-resolution multicolor colocalization of single fluorescent probes," Proceedings of the National Academy of Sciences, USA, Aug. 15, 2000, vol. 97, No. 17 (pp. 9461-9466).

Lahave et al., "DNA barcoding the floras of biodiversity hotspots," PNAS, Feb. 26, 2008, vol. 105, No. 8 (pp. 2923-2928).

Lake et al., "Neuronal Subtypes and Diversity Revealed by Single-Nucleus RNA Sequencing of the Human Brain," Science, Jun. 24, 2016, vol. 352, No. 6293 (pp. 1586-1590).

Lee et al., "Highly multiplexed subcellular RNA sequencing in situ," Science, Mar. 21, 2014, vol. 343, No. 6177 (pp. 1360-1363).

Lee et al., "Synthetically modified guide RNA and donor DNA are a versatile platform for CRISPR-Cas9 engineering," Elife, May 2, 2017, vol. 6 e25312 (17 pages).

Lein et al., "Genome-wide Atlas of Gene Expression in the Adult Mouse Brain," Nature, Jan. 11, 2007, vol. 445, No. 7124 (pp. 168-176).

Lennon et al., "A scalable, fully automated process for construction of sequence-ready barcoded libraries for 454," Genome Biology, 2010, vol. 11 (9 pages).

Li et al., "Engineering CRISPR-Cpf1 crRNAs and mRNAs to maximize genome editing efficiency," Nature Biomedical Engineering, May 2017, vol. 1, No. 5 (21 pages).

Livet et al., "Transgenic strategies for combinatorial expression of fluorescent proteins in the nervous system," Nature, 2007, vol. 450 (8 pages).

Lovatt et al., "Transcriptome in vivo analysis (TIVA) of spatially defined single cells in live tissue," Nature Methods, Feb. 2014, vol. 11, No. 2, (pp. 190-196).

Lubeck et al., "Single-cell in-situ RNA profiling by sequential hybridization," Nature Methods, 2014, vol. 11 (3 pages).

(56) References Cited

OTHER PUBLICATIONS

Lundin et al., "Increased throughput by parallelization of library preparation for massive sequencing," PLoS One, Apr. 2010, vol. 5, No. 4 (7 pages).
Manoharan, M., "RNA interference and chemically modified small interfering RNAs," Current Opinion in Chemical Biology, Dec. 2004, vol. 8, No. 6 (pp. 570-579).
Margulies et al. "Genome sequencing in microfabricated high-density picolitre reactors," Nature, Jul. 31, 2005, vol. 437 (pp. 376-380).
Michael et al., "Randomly ordered addressable high-density optical sensor arrays," Analytical Chemistry, Apr. 1, 1998, vol. 70, No. 7 (pp. 1242-1248).
Miller et al., "Cancer cells ablation with irreversible electroporation," Technology in Cancer Research & Treatment, Dec. 2005, vol. 4, No. 6 (pp. 699-705).
Montgomery et al., "A novel model of retinal ablation demonstrates that the extent of rod cell death regulates the origin of the regenerated zebrafish rod photoreceptors," Journal of Comparative Neurology, Mar. 15, 2010, vol. 518, No. 6 (pp. 800-814).
Morozova et al., "Applications of next-generation sequencing technologies in functional genomics," Genomics, 2008. vol. 92 (pp. 255-264).
Nagayama et al., "Neuronal organization of olfactory bulb circuits," Frontiers in Neural Circuits, 2014, vol. 8, No. 98 (19 pages).
Navarro et al., "ST Pipeline: an automated pipeline for spatial mapping of unique transcripts," Bioinformatics, 2017, vol. 33, No. 16 (pp. 2591-2593).
Ognibene et al., "The Diagnosis of Pneumocystis carinii Pneumonia in Patients with the Acquired Immunodeficiency Syndrome Using Subsegmental Bronchoalveolar Lavage," American Review of Respiratory Diseases, Jun. 1984, vol. 129, No. 6 (pp. 929-932).
Ogunniyi et al., "Profiling Human Antibody Responses by Integrated Single-Cell Analysis," Vaccine, May 19, 2014, vol. 32, No. 24 (17 pages).
Oh et al., "A mesoscale connectome of the mouse brain," Nature, 2014, vol. 508 (41 pages).
Pan et al., "Shrinkage-mediated imaging of entire organs and organisms using uDISCO," Nature Methods, Aug. 2016, vol. 13, No. 10 (14 pages).
Picelli et al. "Full-length RNA-seq from single cells using Smart-seq2," Nature Protocols, Jan. 2014, vol. 9, No. 1 (pp. 171-181).
Pisharath et al., "Targeted ablation of beta cells in the embryonic zebrafish pancreas using E. coli nitroreductase," Mechanisms of Development, 2007, vol. 124 (pp. 218-229).
Rahdar et al., "Synthetic CRISPR RNA-Cas9-guided genome editing in human cells," Proceedings of the American Academy of Sciences, U.S.A. Nov. 16, 2015 (pp. E7110-E7117).
Reichert et al., "Chip-Based Optical Detection of DNA Hybridization by Means of Nanobead Labeling," Analytical Chemistry, Dec. 15, 2000, vol. 72, No. 24 (pp. 6025-6029).
Rohland et al., "Cost-effective, high-throughput DNA sequencing libraries for multiplexed target capture," Genome Research, 2012, vol. 22 (8 pages).
Ronaghi et al., "Real-time DNA sequencing using detection of pyrophosphate release," Analytical Biochemistry, 1996, vol. 242, Article 0432 (pp. 84-89).
Ryan et al., "Improving CRISPR-Cas specificity with chemical modifications in single-guide RNAs," Nucleic Acids Research, Jan. 25, 2018, vol. 46, No. 2 (pp. 792-803).
Satija et a al., "Spatial reconstruction of single-cell gene expression data," Nature Biotechnology, May 2015, vol. 33, No. 5 (pp. 495-502).
Scaringe et al., "Advanced 5'-silyl-2'-orthoester approach to RNA oligonucleotide synthesis," Methods in Enzymology, 2000, vol. 317 (pp. 3-18).
Scaringe et al., "Novel RNA Synthesis Method Using 5'-O-Silyl-2'-O-orthoester Protecting Groups," Journal of the American Chemical Society, 1998, vol. 120, No. 45 (pp. 11820-11821).
Schindelin et al., "Fiji: An Open-Source Platform for Biological-Image Analysis," Nature Methods, Jul. 2012, vol. 9, No. 7 (pp. 676-682).
Schluger et al., "Application of DNA amplification to pneumocystosis: presence of serum Pneumocystis carinii DNA during human and experimentally induced Pneumocystis carinii pneumonia," Journal of Experimental Medicine, Nov. 1992, vol. 176 (pp. 1327-1333).
Seberg et al., "How Many Loci Does it Take to DNA Barcode a Crocus?" PLoS One, Feb. 2009, vol. 4, No. 2 (6 pages).
Sharma et al., "Antisense oligonucleotides: modifications and clinical trials," Medical Chemistry Journal, 2014, vol. 5 (pp. 1454-1471).
Shendure et al., "Accurate Multiplex Polony Sequencing of an Evolved Bacterial Genome," Science, Sep. 9, 2005, vol. 309 (pp. 1728-1732).
Shmakov et al., "Discovery and Functional Characterization of Diverse Class 2 CRISPR-Cas Systems," Molecular Cell, Nov. 1, 2015, vol. 60, No. 3 (pp. 385-397).
Shukla et al., "Exploring chemical modifications for siRNA therapeutics: a structural and functional outlook," ChemMedChem, Mar. 1, 2010, vol. 5, No. 3 (pp. 328-349).
Sletten et al., "Bioorthogonal Chemistry: Fishing for selectivity in a sea of functionality," Angewandte Chemie International Edition, 2009, vol. 48, (pp. 6974-6998).
Soininen et al., "Analysing diet of small herbivores: the efficiency of DNA barcoding coupled with high-throughput pyrosequencing for deciphering the composition of complex plant mixtures," Frontiers in Zoology, Aug. 20, 2009, vol. 6, No. 16 (9 pages).
Stoeckius et al., "Simultaneous Epitope and Transcriptome Measurement in Single Cells", Nature Methods, Jul. 31, 2017, vol. 14, No. 9 (10 pages).
Svensson et al., "SpatialDE: identification of spatially variable genes," Nature Methods, May 2018, vol. 15, No. 5 (15 pages).
Swiech et al., "In vivo interrogation of gene function in the mammalian brain using CRISPR-Cas9," Nature Biotechnology, 2014, vol. 33 (pp. 102-106) [Including Supplemental information, 4 pages].
Tasic et al., "Adult Mouse Cortical Cell Taxonomy Revealed by Single Cell Transcriptomics," Nature Neuroscience, Feb. 2016, vol. 19, No. 2 (41 pages).
Tepe et al., "Single-Cell RNA-Seq of Mouse Olfactory Bulb Reveals Cellular Heterogeneity and Activity-Dependent Molecular Census of Adult-Born Neurons," Cell Reports, Dec. 4, 2018, vol. 25 (18 pages).
Tirosh et al., "Dissecting the Multicellular Ecosystem of Metastatic Melanoma By Single-Cell RNA-Seq," Science, Apr. 8, 2016, vol. 352, No. 6282 (pp. 189-196).
Turakhia et al., "Rationale and design of a large-scale, app-based study to identify cardiac arrhythmias using a smartwatch: The Apple Heart Study," American Heart Journal, 2018, vol. 207 (pp. 66-75).
Van Den Brink et al., "Single-cell sequencing reveals dissociation-induced gene expression in tissue subpopulations," Nature Methods, Oct. 2017, vol. 14, No. 10 (pp. 935-936).
Vickovic et al., "Massive and parallel expression profiling using microarrayed single-cell sequencing," Nature Communications, 2016, vol. 7 (9 pages).
Watts et al., "Chemically modified siRNA: tools and applications," Drug Discovery Today, Oct. 2008, vol. 13, Nos. 19-20 (pp. 842-855).
Weinstein et al., "DNA Microscopy: Optics-free Spatio-genetic Imaging by a Stand-Alone Chemical Reaction," Cell, 2019, vol. 178, No. 1 (38 pages).
Winzeler et al., "Functional characterization of the S. cerevisiae genome by gene deletion and parallel analysis," Science, Aug. 6, 1999, vol. 285, No. 5429 (pp. 901-906).
Wong et al., "ST Spot Detector: a web-based application for automatic spot and tissue detection for spatial Transcriptomics image datasets," Bioinformatics, 2018, vol. 34, No. 11 (pp. 1966-1968).
Wu et al., "driven ecological studies of bacteria and archaea and their major subgroups," from https://arxiv.org/pdf/1307.0869; procured from the internet Apr. 8, 2025 (pp. 1-24).

(56) References Cited

OTHER PUBLICATIONS

Wu et al., "Systematic Identification of Gene Families for Use as "Markers" for Phylogenetic and Phylogenydriven Ecological Studies of Bacteria and Archaea and Their Major Subgroups," PLoS One, vol. 8, No. 10 (11 pages).
Xu et al., "Design of 240,000 orthogonal 25mer DNA barcode probes," Proceedings of the National Academy of Sciences, USA, Feb. 17, 2009, vol. 106, No. 7 (pp. 2289-2294).
Yang et al., "Larval melanocyte regeneration following laser ablation in zebrafish," Journal of Investigative Dermatology, 2004, vol. 123 (pp. 924-929).
Yin et al., "Structure-guided chemical modification of guide RNA enables potent non-viral in vivo genome editing," Nature Biotechnology, Dec. 2017, vol. 35 (pp. 1-22).
Yin et al., "Partial DNA-guided Cas9 enables genome editing with reduced off-target activity," Nature Chemical Biology, 2018 vol. 14, No. 3 (pp. 311-316).
Zhao et al., "Labelling and targeted ablation of specific bipolar cell types in the zebrafish retina," BioMedCenter Neuroscience, 2009, vol. 19, No. 107 (pp. 1-14).
Zhu et al. "Reverse transcriptase template switching: a SMART approach for full-length cDNA library construction" Biotechniques, 2001, vol. 30, No. 4 (pp. 892-897).
Zuker et al., "Optimal computer folding of large RNA sequences using thermodynamics and auxiliary information," Nucleic Acids Research, Jan. 10, 1981, vol. 9, No. 1 (pp. 133-148).

\* cited by examiner

- Rostral migratory system (RMS)
- Ependymal cell zone (E)
- Granule cell layer, internal (GCL–I)
- Granule cell layer, external (GCL–E)
- Internal plexiform layer (IPL)
- Mitral layer (M/T)
- External plexiform layer (EPL)
- Glomerular layer (GL)
- Olfactory nerve layer (ONL)

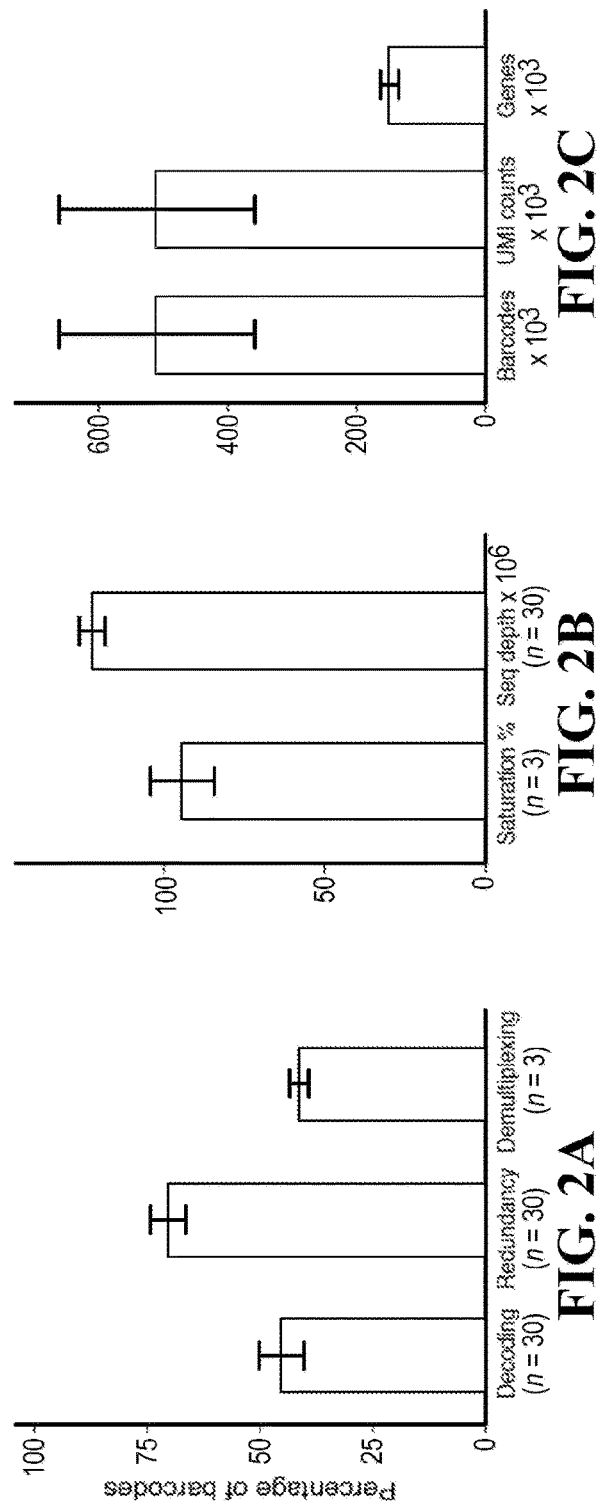
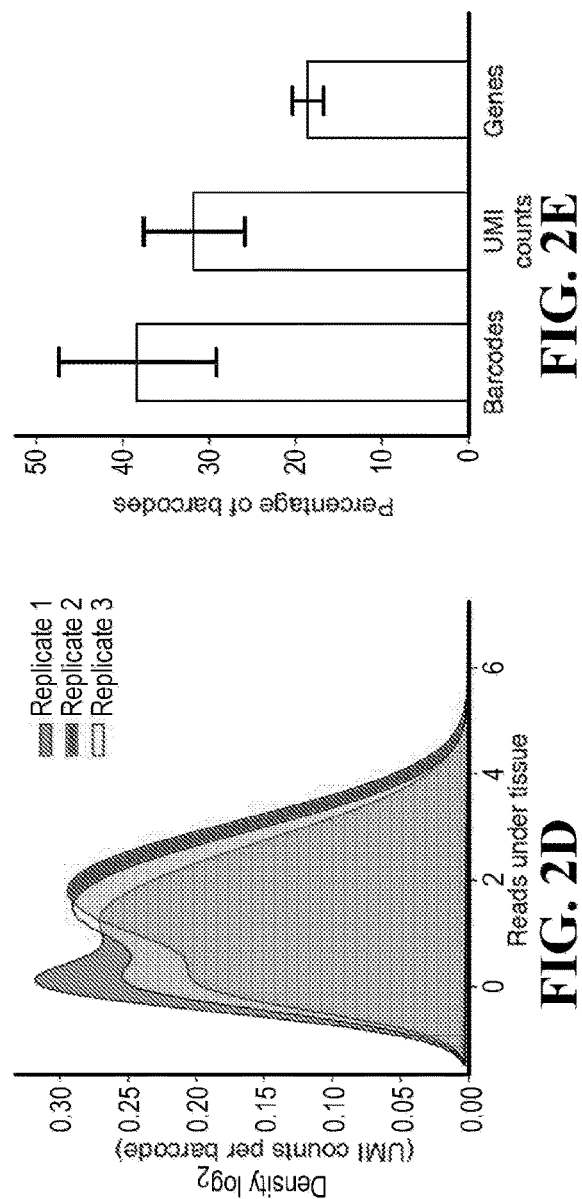

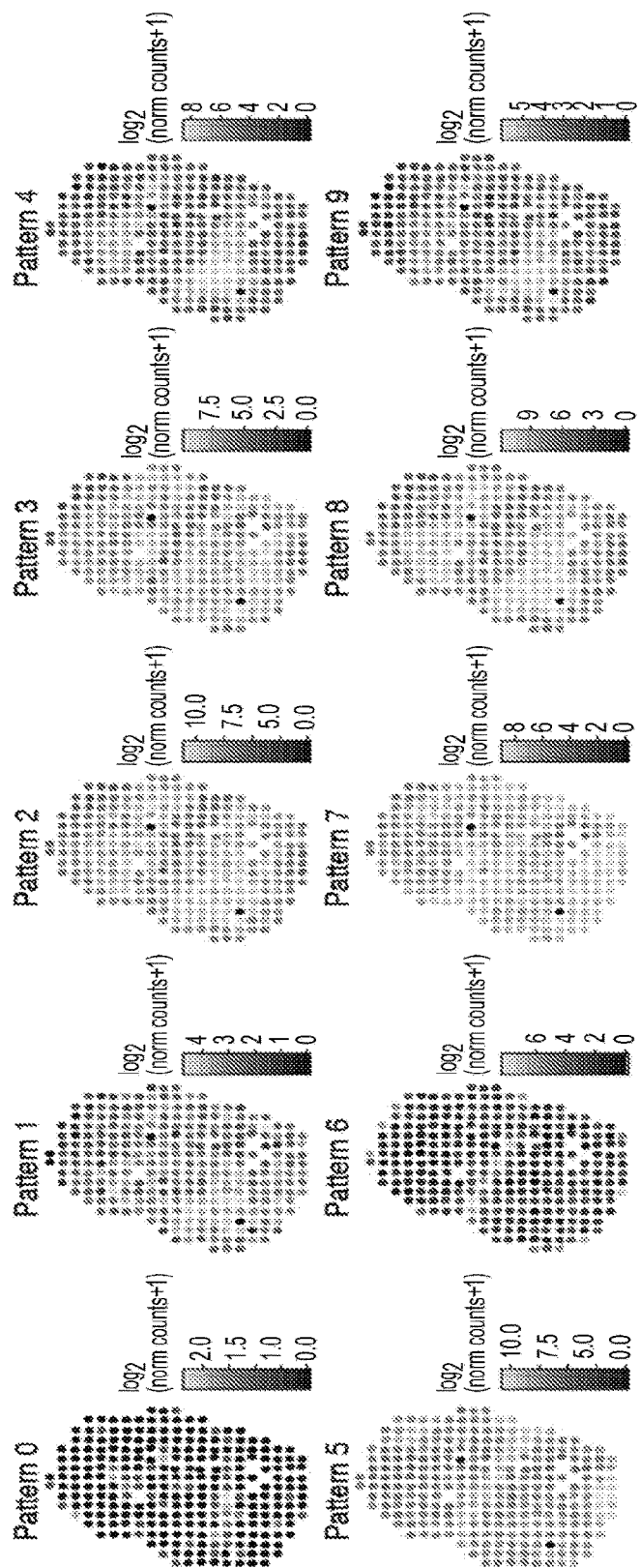
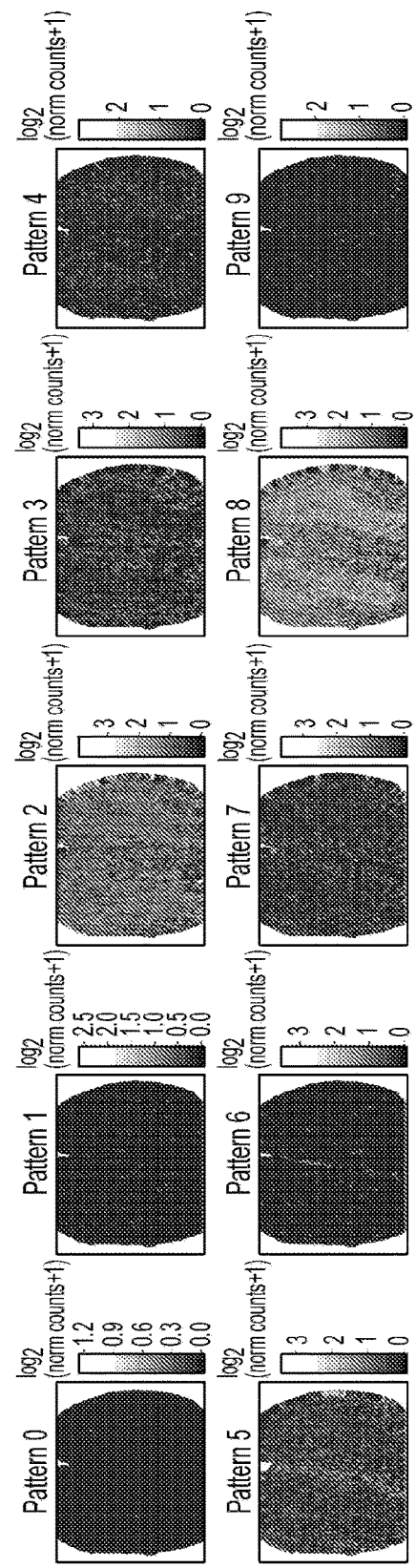
FIG. 6B
FIG. 6C

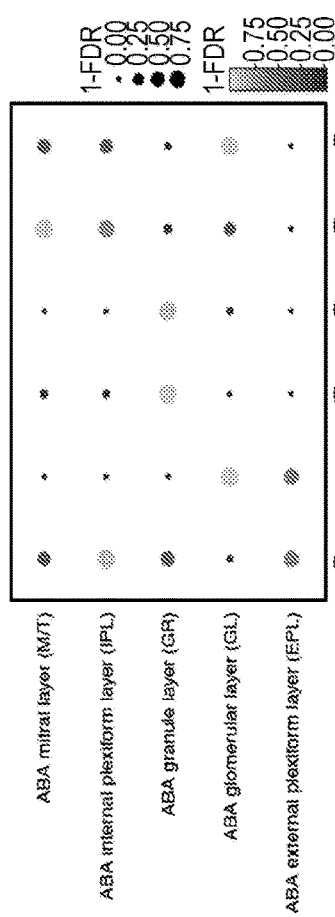
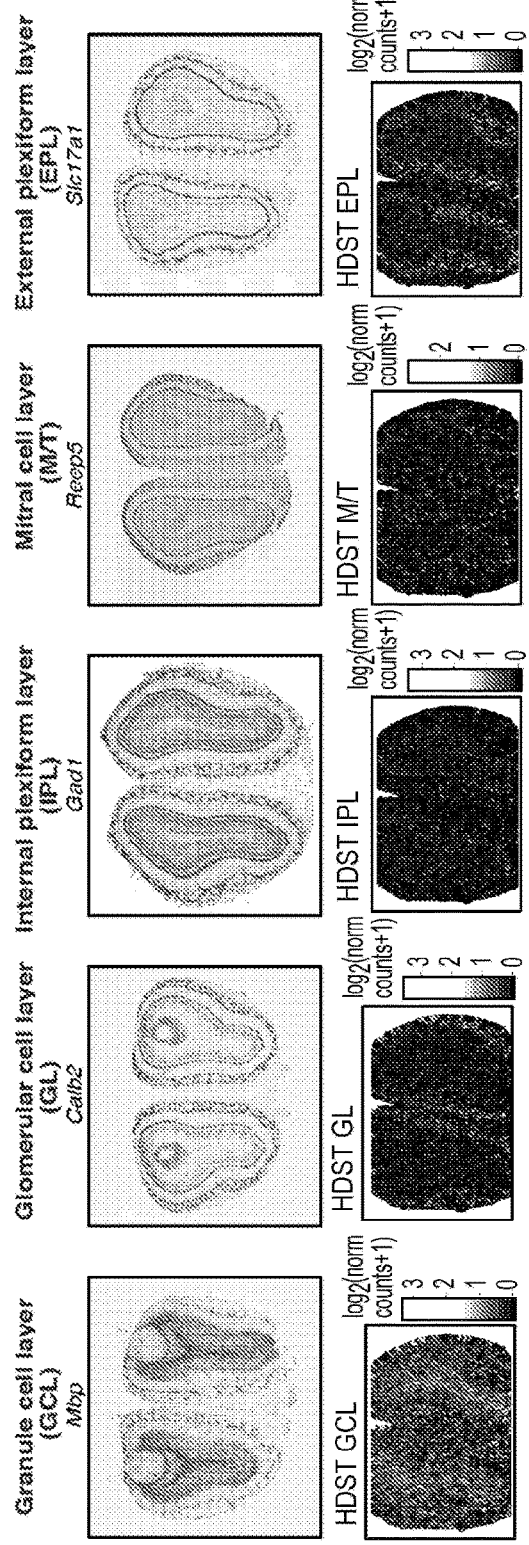
FIG. 8A
FIG. 8B

Insi2vec generalizes across patient samples in melanoma
Challenge: discover general principles despite substantial variation
Train on 12 patient samples; test on 4 samples (entirely unseen)

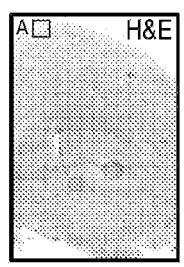 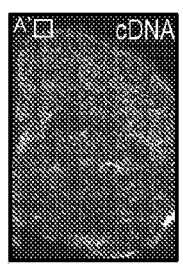 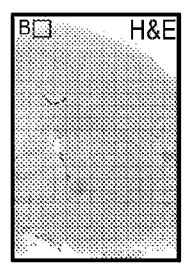 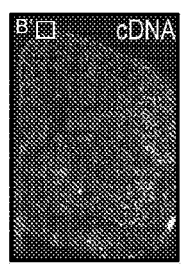
FIG. 19A  FIG. 19A'  FIG. 19B  FIG. 19B'
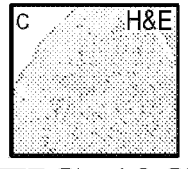 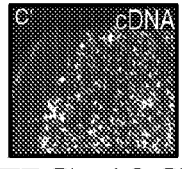 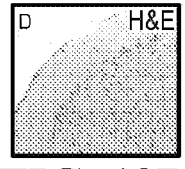 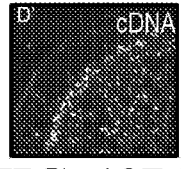
FIG. 19C  FIG. 19C'  FIG. 19D  FIG. 19D'
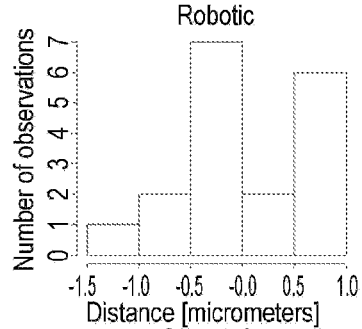 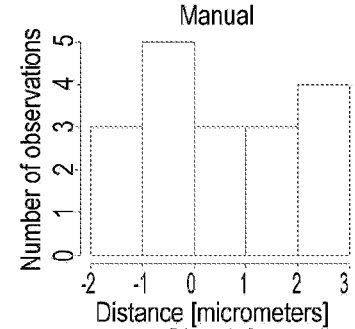
FIG. 19E  FIG. 19F
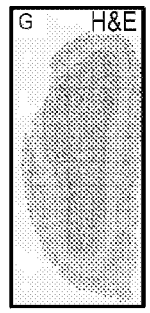 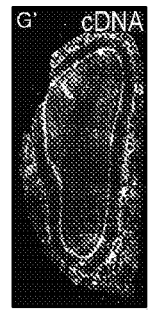  
FIG. 19G  FIG. 19G'  FIG. 19H  FIG. 19H'
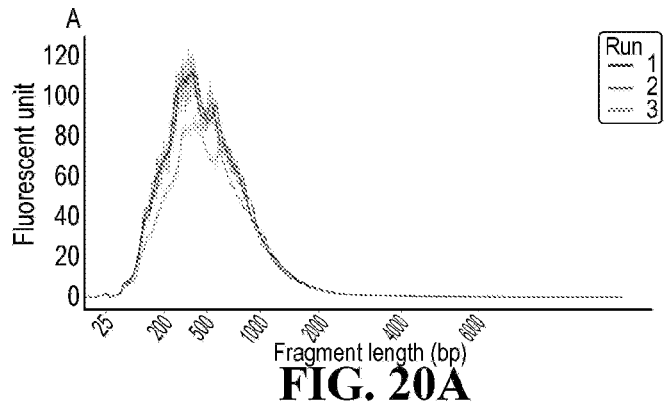
FIG. 20A

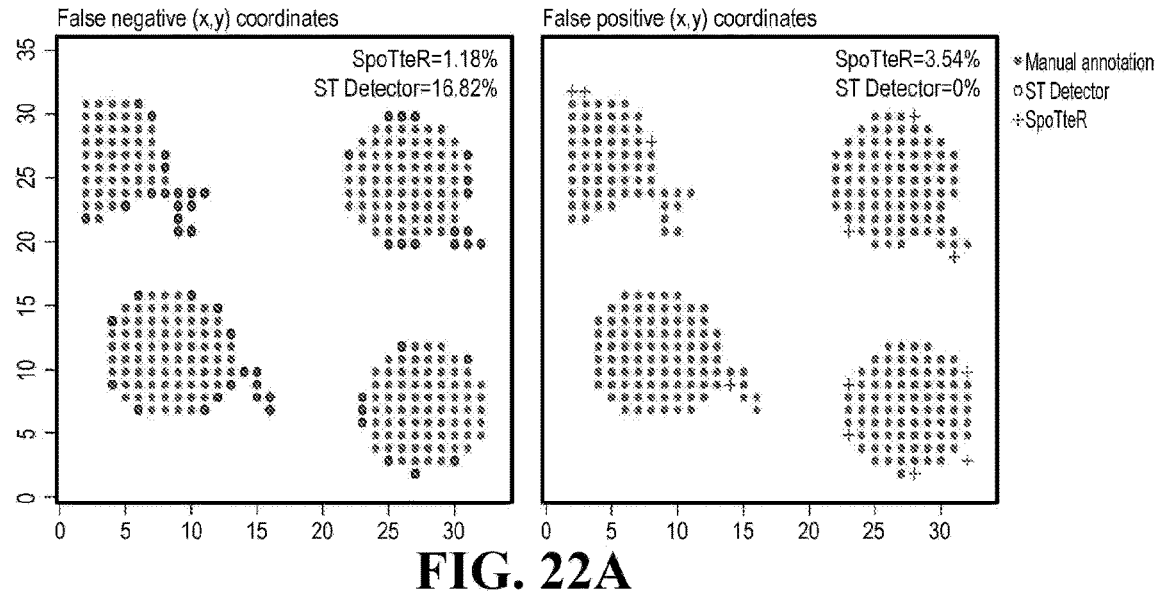
FIG. 22A
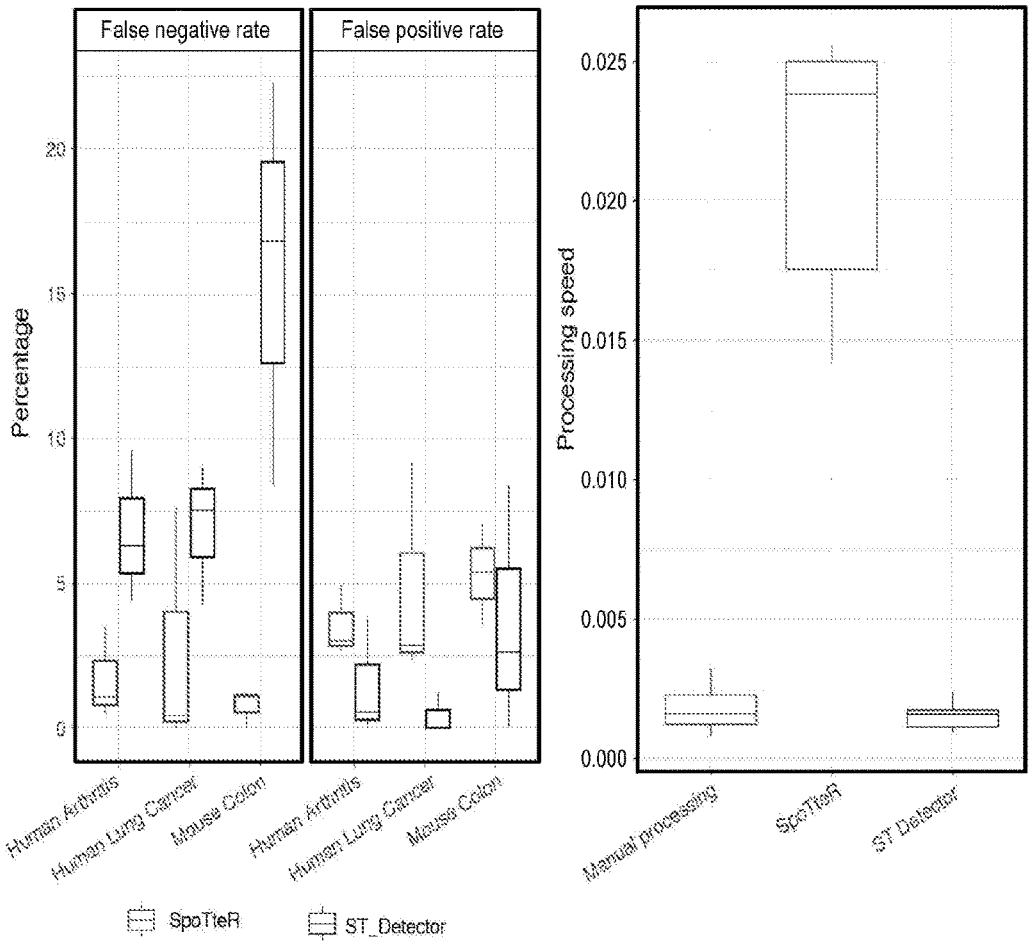
FIG. 22B     FIG. 22C

SEQUENCE LISTING

```
<160> NUMBER OF SEQ ID NOS: 9

<210> SEQ ID NO 1
<211> LENGTH: 12
<212> TYPE: DNA
<213> ORGANISM: Artificial Sequence
<220> FEATURE:
<223> OTHER INFORMATION: Synthetic

<400> SEQUENCE: 1
acttgtttaa gt                                                             12

<210> SEQ ID NO 2
<211> LENGTH: 16
<212> TYPE: DNA
<213> ORGANISM: Artificial Sequence
<220> FEATURE:
<223> OTHER INFORMATION: Synthetic

<400> SEQUENCE: 2
ggcaccgagt cggtgc                                                         16

<210> SEQ ID NO 3
<211> LENGTH: 15
<212> TYPE: PRT
<213> ORGANISM: Artificial Sequence
<220> FEATURE:
<223> OTHER INFORMATION: Synthetic

<400> SEQUENCE: 3

Gly Gly Gly Gly Ser Gly Gly Gly Gly Ser Gly Gly Gly Gly Ser
1               5                   10                  15

<210> SEQ ID NO 4
<211> LENGTH: 30
<212> TYPE: PRT
<213> ORGANISM: Artificial Sequence
<220> FEATURE:
<223> OTHER INFORMATION: Synthetic

<400> SEQUENCE: 4

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser
            20                  25                  30

<210> SEQ ID NO 5
<211> LENGTH: 45
<212> TYPE: PRT
<213> ORGANISM: Artificial Sequence
<220> FEATURE:
<223> OTHER INFORMATION: Synthetic

<400> SEQUENCE: 5

Gly Gly Gly Gly Ser Gly Gly Gly Gly Ser Gly Gly Gly Gly Ser Gly
1               5                   10                  15
```

Gly Gly Gly Ser Gly Gly Gly Ser Gly Gly Gly Ser Gly Gly
            20                  25                  30

Gly Gly Ser Gly Gly Gly Ser Gly Gly Gly Ser
        35                  40                  45

<210> SEQ ID NO 6
<211> LENGTH: 60
<212> TYPE: PRT
<213> ORGANISM: Artificial Sequence
<220> FEATURE:
<223> OTHER INFORMATION: Synthetic

<400> SEQUENCE: 6

Gly Gly Gly Gly Ser Gly Gly Gly Ser Gly Gly Gly Ser Gly
1               5                   10                  15

Gly Gly Ser Gly Gly Gly Ser Gly Gly Gly Ser Gly Gly Gly
            20                  25                  30

Gly Gly Ser Gly Gly Gly Ser Gly Gly Gly Ser Gly Gly Gly
        35                  40                  45

Gly Ser Gly Gly Gly Ser Gly Gly Gly Ser
    50                  55                  60

<210> SEQ ID NO 7
<211> LENGTH: 54
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (47)..(54)
<223> OTHER INFORMATION: n is a, c, g, or t

<400> SEQUENCE: 7
gactcgtaat acgactcact atagggacac gacgctcttc cgatctnnnn nnnn          54

<210> SEQ ID NO 8
<211> LENGTH: 34
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(1)
<223> OTHER INFORMATION: Adenylation-5'
<220> FEATURE:
<221> NAME/KEY: misc_feature
<222> LOCATION: (34)..(34)
<223> OTHER INFORMATION: ddc-3'

<400> SEQUENCE: 8
agatcggaag agcacacgtc tgaactccag tcac          34

<210> SEQ ID NO 9
<211> LENGTH: 31
<212> TYPE: DNA
<213> ORGANISM: Artificial Sequence
<220> FEATURE:
<223> OTHER INFORMATION: Synthetic

<400> SEQUENCE: 9
gtgactggag ttcagacgtg tgctcttccg a          31

IN-SITU SPATIAL TRANSCRIPTOMICS

CROSS-REFERENCE TO RELATED APPLICATIONS

This application is the U.S. National Stage Application under 35 U.S.C. § 371 of Patent Cooperation Treaty Application No.: PCT/US2020/015481, filed on Jan. 28, 2020, which claims the benefit of U.S. Provisional Application No. 62/797,831 filed Jan. 28, 2019, and U.S. Provisional Application No. 62/811,528 filed Feb. 27, 2019. The entire contents of the above-identified applications are hereby fully incorporated herein by reference.

REFERENCE TO AN ELECTRONIC SEQUENCE LISTING

The contents of the electronic sequence listing ("BROD-4020WP_ST25.txt"; Size is 3,171 bytes and it was created on Jan. 22, 2020) is herein incorporated by reference in its entirety.

TECHNICAL FIELD

The subject matter disclosed herein is generally directed to systems and method of in-situ spatial transcriptomics and tissue profiling.

BACKGROUND

The function of different cell types in the brain results from a combination of their unique molecular profiles and how these govern their reactions to stimuli from the both immediate and distant neighborhoods as well as their respective developmental trajectories. Single-cell transcriptomics assesses the cellular complexity of tissue regions by capturing their molecular profiles. However, single cells are assembled in an complex structural architecture and there is thus need for correlating single-cell expression to morphological entities. Here, Applicants present an improvement to spatial high-throughput RNA-sequencing termed high-density spatial transcriptomics. Spatially barcoded reverse transcription oligonucleotides are coupled to beads that are then ordered in a random but decodable fashion into individual wells. Histological tissue sections can then be RNA-sequenced at 2 µm resolution with over a million barcodes per experiment. High-density spatial transcriptomics thus provides 2D transcriptome profiling for spatial cell typing and differential expression profiling identifying tissue dynamics.

Cells are organized in many hierarchical layers, starting from their local environments in tissues. To enhance our understanding of such complex structures, Applicants need to focus on making massive, parallel and molecular measurements. Key among these is the measurement of the transcriptome, which mediates between the gene-cell regulatory circuitry and the phenotypic characteristics governed by lineage and architecture in a high-throughput fashion.

Today, one can make use of various approaches that make transcriptome measurements at an ever increasing single-cell resolution. These technologies allow analysis of thousands of dissociated individual cells and assign them into diverse cell types and circuits. The connections between transcripts, circuits, and cells are made based on inferences of genotypes and phenotypes and projected onto two-dimensional space. Although these techniques operate at very high throughput, they potentially risk introducing cell manipulation biases that lead to an altered molecular state.

The transcriptome alone, however, does not provide a full picture of cellular identity. The identity of each cell is also governed by its spatiotemporal position and internal population dynamics as a consequence of the signals it receives from its environment. However, cell classification cannot solely be determined by morphology) and a variety of tools are needed in order to validate cell states and their respective properties, many of them focusing on increased resolution or throughput).

Spatial transcriptomics (ST) technology combines spatial and transcriptomic techniques ST is based on depositing spatially barcoded poly(d)T oligonucleotides for capturing mRNA into 100 µm features on a glass slide. However, at 100 µm. analysis was based on more generalized large morphological features, with 20% of the tissue dynamics captured in the 100 µm features. There remains a need for more detailed understanding of complex tissues, as understanding of the underlying molecular consequences of patterns over large spatial areas in complex tissues such as the central nervous system (CNS) remains limited.

Citation or identification of any document in this application is not an admission that such document is available as prior art to the present invention.

SUMMARY

In certain example embodiments, methods of spatiotemporal processing of a sample of a plurality of cells is provided comprising the steps of depositing a plurality of spatial barcodes on a solid substrate, the spatial barcodes each defining an x,y position on the solid substrate and further comprising a capture molecule; depositing the sample of the plurality of cells on the surface of the solid substrate; and capturing material from one or more cells of the plurality of cells with the capture molecule of the spatial barcode, thereby linking the capture material from the one or more cells with the spatial barcode.

In embodiments, the spatial barcode is provided in a droplet. The droplet can comprise a plurality of spatial barcodes, and optionally further comprise CRISPR-Cas systems The spatial barcode can comprise a bead in some embodiments, which can include color-coded beads and conductivity-coded beads. In one aspect, the conductivity-coded bead is deposited on the solid substrate, the solid substrate comprising pre-etched wells.

In some embodiments, the bead can comprise a plurality of spatial barcodes, which in some embodiments comprise oligonucleotides.

Methods of depositing the spatial barcodes can comprise inkjet, contact printing or fluorescence activated cell sorting (FACS) technologies. In certain embodiments, the depositing is random or ordered.

The step of depositing the spatial barcode comprises the binding of the spatial barcode to the solid substrate in certain embodiments. The binding of the spatial barcode to the solid substrate can be covalent or non-covalent bonding. In embodiments, the solid substrate comprises a surface with available active groups that facilitate the bonding of the spatial barcode to the solid substrate surface.

In embodiments wherein the spatial barcode comprises an oligonucleotide sequence, methods can include building the spatial barcode on the solid substrate, or on a bead.

The method of claim 15, wherein the building the spatial barcode comprises bridge polymerase chain reaction (PCR) or ligation and extension PCR. Methods can comprise building the spatial barcode comprising distributing oligonucleotide sequences on the solid substrate, adding padlock probes, and amplifying and decoding the oligonucleotides on the surface.

In embodiments, the capture molecule comprises target molecule specific sequence, a Tn5 sequence, a 16S sequence, a poly(d)T sequence, a random hexamer sequence, a trypsin molecule, an antibody, a Protein Epitope Signature Tag (PrEST) sequence, or a combination thereof. Preferred embodiments comprise a combination of capture molecules, and in certain embodiments, target-specific molecules such as single nucleotide polymorphisms (SNPs), particular genes or mutations of interest.

The oligonucleotide sequence can further comprise one or more of a unique molecular identifier (UMI), an adapter sequence, a guide sequence. and a primer sequence.

The methods disclosed herein can further comprise the step of decoding the spatial barcode, the decoding comprising sequentially hybridization, in situ sequencing, laser scanning, DNA microscopy. Methods can also comprise sequencing the captured material and/or releasing the captured material. In embodiments, the spatial barcode comprises a cleavable linker. In embodiments, the cleavable linker is a restriction site, and releasing the captured material comprises utilizing a restriction enzyme specific to the restriction site, and cleaving the captured molecule. The linker in particular embodiments is enzymatically, thermally or chemically cleavable.

In certain example embodiments, the spatial barcode and the captured material are oligonucleotides, and the releasing comprises synthesizing a complementary strand to the spatial barcode and captured oligonucleotide using a polymerase, and releasing the complementary strand or the spatial barcode and captured material oligonucleotide.

In some embodiments, the plurality of cells is a tissue sample. In one preferred embodiment, the tissue sample is greater than about 0.5 cm in thickness, is a biopsy sample, and/or from a mammal. In particular embodiments, the tissue sample is from the central nervous system.

The solid substrate can in some embodiments comprise a glass slide, a polymer, an imaging fiber, or other conductive surface. In embodiments, the solid substrate comprises an array of microwells. In one embodiment, the solid substrate comprises a plurality of microwells in an array, the microwells each about 2 µm, optionally with a 3 µm distance from center to center of each well. In other embodiments, the solid substrate comprises a plurality of locations spaced about 100 nm.

Methods may also comprise steps of capturing an image of the sample on the solid substrate, further comprising annotating regions of the image of the sample, optionally based on morphology, further comprising correlating the captured material to a position in the sample on the solid substrate or any combination of these steps. In an embodiment, the correlating comprises assigning pixel coordinates to the image and coordinating to the x,y position of the spatial barcode.

Methods can comprise assigning a cell type to cells in the sample. Steps of ablating a single layer of the plurality of cells and performing the step of capturing material from one or more cells of the plurality of cells in a second layer of the cells are also provided.

In certain embodiments, the capture molecule comprises a poly(d)T sequence, and the steps further comprise staining the sample; recording the morphology of the stained sample; permeabilizing the sample; capturing mRNA of the sample with the capture molecule, thereby linking mRNA of the cells of the sample with the spatial barcode; and preparing a library of cDNA molecules from the captured mRNA and the linked spatial barcode. The method can optionally comprise sequencing the library of cDNA molecules, and can comprise correlating the cDNA molecule to a position in the sample on the solid substrate. The method can optionally comprise assigning a cell type to the plurality of cells in the sample, the assigning comprising detecting differential expression of the expressed genes to generate a gene signature and identifying cell type based on the gene signature at positions in the sample.

Embodiments can include staining the plurality of cells, optionally comprising fluorescent or bright field staining.

Methods can further comprise depositing a plurality of CRISPR-Cas systems on the solid substrate, the CRISPR-Cas system comprising CRISPR-Cas protein or one or more nucleic acid sequences encoding the CRISPR-Cas protein and a guide sequence capable of hybridizing with a target sequence. In embodiments, the one or more CRISPR-Cas systems are deposited at each defined x,y position on the solid substrate. The guide sequences may be optionally linked to the spatial barcode.

Embodiments of the methods disclosed herein comprise delivering CRISPR-Cas systems to the sample prior to or subsequent to depositing the sample on the solid substrate.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which:

(FIG. 1A) HDST workflow. Barcoded beads are randomly deposited into single wells and the barcode carries an oligonucleotide sequence encoding a (x,y) position in each individual array present on the silicon wafer. Frozen tissue sections are placed on the array surface and H&E stained. Morphology is recorded at the same time of recording of the relative positions of each bead (x,y) to the tissue section. mRNA is captured on the oligonucleotide capture sequenced and cDNA made. Now, the spatial oligonucleotide sequence is covalently linked to the mRNA information for each cell in the tissue. Standard pair-end sequencing libraries are made, spatial oligonucleotides demultiplexed and the whole tissue section profiled with high-density spatial transcriptomics. (FIG. 1B) HDST H&E image of a main olfactory bulb and HDST (x,y) barcodes annotated into 9 different morphological areas (RMS; E; GCL-I, GCL-E, IPL, M/C; EPL; GL and ONL). (FIG. 1C) Differentially expressed and upregulated gene patterns detected between different morphological layers in HDST; FIG. 1D Labeling of morphological layers. HDST H&E image of a MOB and matching HDST (x,y) barcodes annotated into nine morphological areas. FIG. 1E Layer-specific DE patterns in HDST. Shown is the summed normalized expression of positively enriched signature genes significantly (FDR<0.1, two-sided t-test) associated with each layer as annotated in 1D. 1F, 1G, Nuclei segmentation and binning of HDST as in 1D. FIG. 1F Segmented nuclei (sn-like) and lightly binned (sc-like) spatial barcodes assigned (black) to each of two cell types as in 1D. FIG. 1G Enrichment of sn- and sclike spatial barcodes with assigned cell types (columns) to morphological layers (rows) as in 1D. Color bar represents −log 10 (P value) (one-sided Fisher's exact test, Bonferroni adjusted, P<0.01) and gray tiles are nonsignificant values. OBNBL1, olfactory neuroblasts; OBINH1-3, inhibitory neurons; EPMB and EPEN, astroependymal cells; OEC, olfactory ensheathing cells; VLMC2, vascular cells; SATG2, satellite glia; OBNBL5, GABAergic neuroblasts; OBDOP1, dopaminergic periglomerular neuroblasts; OBNLB2, VGLUT1/2 neuroblasts; SEZ, subependymal zone; ONL, olfactory nerve layer; M/T, mitral layer; IPL internal plexiform layer; GCL-E, GCL-I and GCL-D, granular layers; GL, glomerular layer; EPL, external plexiform layer.

FIG. 2A-2F—High-density spatial transcriptomics (HDST) array performance. (FIG. 2A) Average decoding efficiency and barcode redundancy for all generated slides (n=30) as well as average spatial barcode demultiplexing after sequencing (n=3) (FIG. 2B) Average sequencing depth and library saturation (n=3) (FIG. 2C) Total number of barcodes, genes and UMI counts demultiplexed, mapped and filtered under the tissue boundaries for replicate libraries (n=3). (FIG. 2D) Density plot depicting frequencies of UMI counts per spatial barcode found in each replicate library. (FIG. 2E) Total number of barcodes, genes and UMI counts demultiplexed, mapped and filtered outside the tissue boundaries for replicate libraries (n=3). (FIG. 2F) Heatmap of total counts per spatial barcode for all three replicates.

(FIG. 3A) Correlation of average gene expression between HDST replicates and bulk RNA-seq; (FIG. 3B) Venn diagram showing numbers of shared or present genes for all three HDST replicates and bulk RNA-seq dataset.

(FIG. 4A) Combinatorial approach for assigning cell types to spatial (x,y) barcoded transcriptomes. Top panel represents UMI-filtered transcript counts for cell types present in the Zeisel et al single cell RNA-seq dataset. Right panel represents UMI-filtered transcript counts present for two example barcode in HDST. The spatial cell typing panel represent the testing results for each HDST barcode dataset against each cell type, where n (number of total counts) is shared with the single-cell dataset. Likelihood scores are calculated for each combination and highest score indicates the cell type assignment to the spatial (x,y) barcode dataset. (FIG. 4B) Top: Average normalized likelihood scores for all cell types imputed onto all spatial (x,y) barcoded transcriptomes. with three distinct cell populations assigned to their spatial (x,y) coordinates (OBINH: inhibitory neurons; OBNLB: neuroblasts; OBDOP: dopaminergic neurons; shown in red with grey presenting all (x,y) coordinates). Bottom: Fisher's test showing cell type populations enriched per annotated morphological layer. (FIG. 4C) Average normalized likelihood scores for all cell types in a downsampled and thinned HDST (38×; left) and standard ST dataset (ST; right). (FIG. 4D) Percentages of (x,y) barcodes assigned to different neuronal populations.

(FIG. 5A) Density plots depicting frequencies of observations for normalized cell type likelihoods in binned (5×) and HDST data (FIG. 5B) Histogram of number of different cell types found per bin as compared to HDST. Different bin sizes were used: 38×, 20×, 10×, and 5×.

FIG. 6A-6C—Spatial morphology and differential expression. (FIG. 6A) Morphological annotation of the standard ST dataset into nine layers. (FIG. 6B) Automatic expression histology patterns detected in the standard ST dataset. (FIG. 6C) Overlay of automatic expression histology patterns present in (FIG. 6B) in the HDST dataset.

(FIG. 7A) Downregulated differentially expressed gene between morphological layers in HDST. (FIG. 7B) Scaled gene expression for all differentially expressed genes (columns) per morphological layer (rows).

FIG. 8A-8B—Validation for upregulated HDST genes using the Allen Brain Atlas (ABA) data. (FIG. 8A) Fisher's test showing enrichment in HDST layers compared to corresponding ABA layer data. (FIG. 8B) Top panel: ABA ISH data for top genes per layer. Bottom panel: Heatmaps showing expression of all genes that overlap in expression per layer in both HDST and ABA.

(FIG. 17A) Clustering in-situ data by treating it as a scRNAseq dataset. (FIG. 17B) Expression pattern of the example gene (CD8a) in-situ. (FIG. 17C) Visualization after running the spatio-transcriptomic clustering and visualizing the data rising the learned embeddings. (FIG. 17D) Overlaying the clusters found in non-spatial clustering of FIG. 17A onto the spatio-transcriptomic embeddings of. (FIG. 17E) Spatio-Transcriptomic embedding reveals distinct flavors of CD8T cells in the melanoma tumor in-situ data. (FIG. 17F) cluster 1 from non-spatio-transcriptomic clusters (the CD8 T cell cluster) viewed from the spatio-transcriptomic cluster; Applicants notice three distinct flavors of CD8 T Cells in the form of clusters 2,7, and 8. These new CD8 T cell subsets are defined by their transcriptomes and their neighborhoods in this non-canonical melanoma tumor sample. (FIG. 17G) Individual CD8 T Cell Subsets along with malignant cells (Malignant Cells are Red).

FIG. 18A Labeling of morphological layers. HDST H&E image (left) of a breast cancer section and matching HDST (x,y) barcodes annotated into 13 morphological areas (right, color code). FIG. 18B Layer-specific spatial DE patterns in HDST. Summed normalized expression of positively enriched signature genes significantly (FDR<0.1, two-sided t-test) associated with each layer as in FIG. 18A. FIG. 18C Celltype assignments by single nuclei as in FIG. 18A. Two enlarged regions (black and red squares) with H&E and color-coded segments, Methodology, supporting data and supplementary material are as described in Vickovic, et al., Nature Methods, DOI: 10.1'038/s41592-019-0548-y, specifically incorporated herein in its entirety by reference.

FIG. 19A-19H' includes H&E imaging (FIGS. 19 and 19A')—H&E image of the cortex region on the mouse brain for manually prepared samples. (FIGS. 19B and 19B') H&E image of the cortex region on the mouse brain (adjacent section to (19A) for ST2.5 samples. (FIGS. 19C and 19C')) Fluorescent gene activity footprints corresponding to FIGS. 19A and 19A'. (FIGS. 19D and 19D') Fluorescent gene activity footprints corresponding to (19B) and (19B'). (FIGS. 19E-19F) Histograms of distances between detected H&E cell boundaries and fluorescent prints for manual and ST2.5 preparations. (FIGS. 19G-19G') H&E and fluorescent print for the main olfactory bulb of the adult mouse brain. (FIGS. 19H-19H') H&E and fluorescent print for the MC38-OVA injected cell lines into a preclinical model of colorectal cancer.

FIG. 20A-20C includes characterization of automated processes (FIG. 209A) Mean fragment length distribution with 68% confidence interval of amplified RNA for automated prepared samples ($n_{biological}=3$) from three separate robot runs. (FIG. 20B) qPCR generated Cq values for automated prepared libraries ($n_{biological}=3$) from three separate robot runs. Statistical significance (t-test) is displayed. (FIG. 20C) qPCR generated Cq values for automated prepared libraries in four ($n_{biological}=12$), six ($n_{biological}=18$) and twelve ($n_{biological}=36$) columns in three rows. Statistical significance (t-test) is displayed. Cq values for both 20B and 20C were measured at Fluorescent unit 10,000. $0.05<p<=1$ (ns), $0.001<p<=0.01$ (), $p<=0.0001$ (**).

FIG. 21B SpoTteR performance for three different tissue types.

FIG. 22A-22C—SpoTteR performance. (FIG. 22A) False negative and positive ST barcode (x,y) positions using SpoTteR (blue cross) or ST Detector (black circle) as compared to the manually curated positions (filled red circle) for a mouse colon sample. (FIG. 22B) Total false negative and positive rates per processed tissue type. (FIG. 22C) Processing speed (given as 1/time $s^{-1}$) for three tested processing approaches.

(FIG. 23B) Quantitative concentrations (Cq) values for automated prepared libraries ($n_{biological}=3$, $n_{technical}=3$) using conditions stated on the x axis. Cq values were measured at Fluorescent unit 10000. Statistical significance using T-test is displayed. Conditions: 'STD 1 h': '1× adapter concentrations, 1 hour ligation', 'STD 3 h': '1× adapter concentrations, 3 hours ligation', 'STD+5× adapt 1 h': '5× adapter concentrations, 1 hour ligation', 'STD+5× adapt 3 h': '5× adapter concentrations, 3 hour ligation'. $0.05<p<=1$ (ns), $0.001<p<=0.01$ (), $0.0001<p<=0.001$ (*), $p<=0.0001$ (****).

(FIG. 24B) qPCR generated Cq values for ST2.5 and manual prepared libraries ($n_{biological}=3$). Statistical significance (t-test) is displayed. (FIG. 24C) Correlation of the pseudo-bulk and normalized gene expressions between ST2.5 and manual prepared libraries ($n_{biological}=3$). Denoted is the Pearsons's correlation coefficients between replicates. Grey line represents the linear regression line between the replicates. (FIG. 24D) Proportion of unique molecules (adjusted for number of annotated reads as described in Methods) per annotated region in ST2.5 ($n_{biological}=3$) and manually prepared libraries ($n_{biological}=3$). (FIG. 24E) Correlation of the pseudo-bulk and normalized gene expressions between ST2.5 and ST for 3 annotated regions: Granula Cell Layer Deep (GCL-D), Glomerular Layer (GL) and Olfactory Nerve Layer (ONL). Denoted is the Pearsons's correlation coefficient between the replicates. Grey line represents the linear regression line between replicates. Gene count has been adjusted for sequencing depth (Methods).

(FIG. 25B) Spatial gene expression of expressed DE genes in region GL, GR, IPL, MI and OPL in ST2.5 (i), with corresponding gene expression (ii) and ISH image (iii) from ABA. (FIG. 25C) Spatial gene expression of expressed DE genes with ST2.5 which could not be found in the ST reference (i) in region GL, GR, IPL, MI and OPL, with corresponding gene expression (ii) and ISH image (iii) from ABA. GL (Glomerular Layer), GR (Granule Cell Layer), MI (Mitral Layer), IPL (Internal Plexiform layer) and OPL (External Plexiform Layer).

Figure 1A:
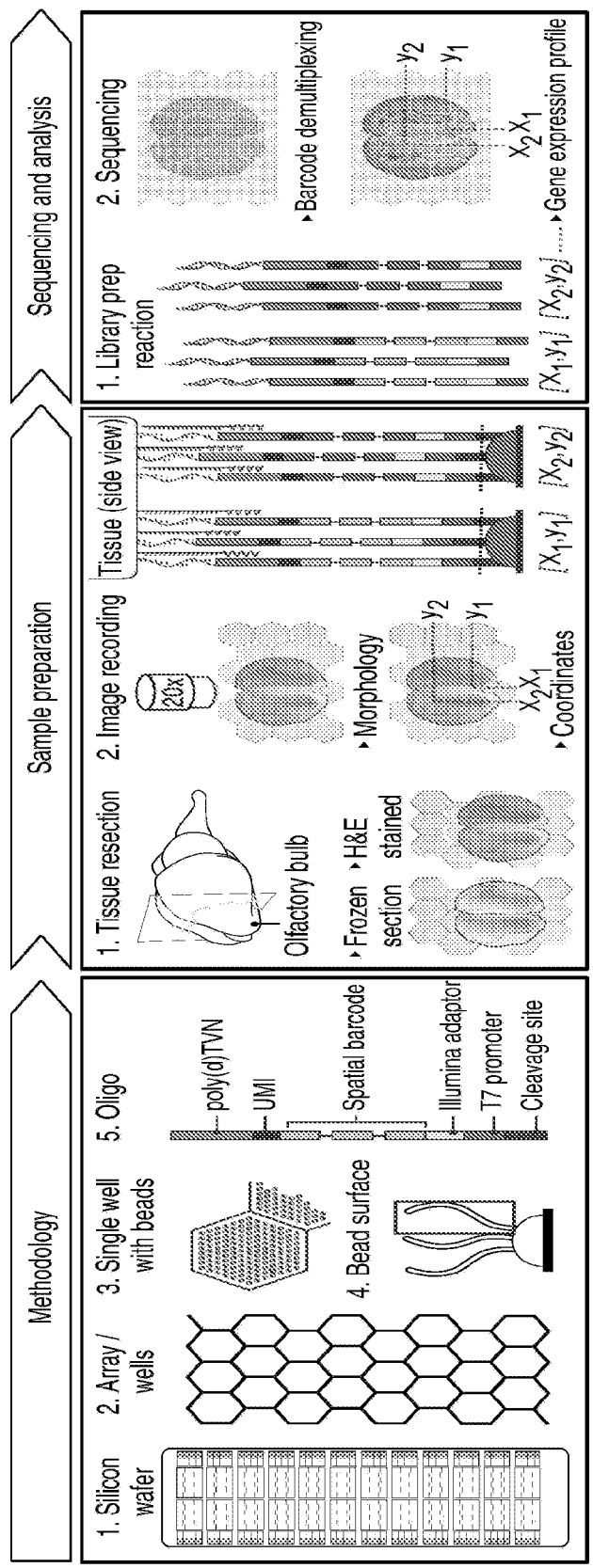
FIG. 1A-1G—High-density spatial transcriptomics (HDST).

The figures herein are for illustrative purposes only and are not necessarily drawn to scale.

DETAILED DESCRIPTION OF THE EXAMPLE EMBODIMENTS

General Definitions

Unless defined otherwise, technical and scientific terms used herein have the same meaning as commonly understood by one of ordinary skill in the art to which this disclosure pertains. Definitions of common terms and techniques in molecular biology may be found in Molecular Cloning: A Laboratory Manual, $2^{nd}$ edition (1989) (Sambrook, Fritsch, and Maniatis); Molecular Cloning: A Laboratory Manual, $4^{th}$ edition (2012) (Green and Sambrook); Current Protocols in Molecular Biology (1987) (F. M. Ausubel et al. eds.); the series Methods in Enzymology (Academic Press, Inc.): PCR 2: A Practical Approach (1995) (M. J. MacPherson, B. D. Hames, and G. R. Taylor eds.): Antibodies, A Laboratory Manual (1988) (Harlow and Lane, eds.): Antibodies A Laboratory Manual, $2^{nd}$ edition 2013 (E. A. Greenfield ed.); Animal Cell Culture (1987) (R. I. Freshney, ed.); Benjamin Lewin, Genes IX, published by Jones and Bartlet, 2008 (ISBN 0763752223); Kendrew et al. (eds.), The Encyclopedia of Molecular Biology, published by Blackwell Science Ltd., 1994 (ISBN 0632021829); Robert A. Meyers (ed.), Molecular Biology and Biotechnology: a Comprehensive Desk Reference, published by VCH Publishers, Inc., 1995 (ISBN 9780471185710); Singleton et al., Dictionary of Microbiology and Molecular Biology 2nd ed., J. Wiley & Sons (New York, N.Y. 1994), March, Advanced Organic Chemistry Reactions, Mechanisms and Structure 4th ed., John Wiley & Sons (New York, N.Y. 1992); and Marten H. Hofker and Jan van Deursen, Transgenic Mouse Methods and Protocols, $2^{nd}$ edition (2011).

As used herein, the singular forms "a", "an", and "the" include both singular and plural referents unless the context clearly dictates otherwise.

The term "optional" or "optionally" means that the subsequent described event, circumstance or substituent may or may not occur, and that the description includes instances where the event or circumstance occurs and instances where it does not.

The recitation of numerical ranges by endpoints includes all numbers and fractions subsumed within the respective ranges, as well as the recited endpoints.

The terms "about" or "approximately" as used herein when referring to a measurable value such as a parameter, an amount, a temporal duration, and the like, are meant to encompass variations of and from the specified value, such as variations of +1-10% or less, +/−5% or less, +/−1% or less, and +1-0.1% or less of and from the specified value, insofar such variations are appropriate to perform in the disclosed invention. It is to be understood that the value to which the modifier "about" or "approximately" refers is itself also specifically, and preferably, disclosed.

As used herein, a "biological sample" may contain whole cells and/or live cells and/or cell debris. The biological sample may contain (or be derived from) a "bodily fluid". The present invention encompasses embodiments wherein the bodily fluid is selected from amniotic fluid, aqueous humour, vitreous humour, bile, blood serum, breast milk, cerebrospinal fluid, cerumen (earwax), chyle, chyme, endolymph, perilymph, exudates, feces, female ejaculate, gastric acid, gastric juice, lymph, mucus (including nasal drainage and phlegm), pericardial fluid, peritoneal fluid, pleural fluid, pus, rheum, saliva, sebum (skin oil), semen, sputum, synovial fluid, sweat, tears, urine, vaginal secretion, vomit and mixtures of one or more thereof. Biological samples include cell cultures, bodily fluids, cell cultures from bodily fluids. Bodily fluids may be obtained from a mammal organism, for example by puncture, or other collecting or sampling procedures.

Diagnosis is commonplace and well-understood in medical practice. By means of further explanation and without limitation the term "diagnosis" generally refers to the process or act of recognizing, deciding on or concluding on a disease or condition in a subject on the basis of symptoms and signs and/or from results of various diagnostic procedures (such as, for example, from knowing the presence, absence and/or quantity of one or more biomarkers characteristic of the diagnosed disease or condition). Identifying a disease state, disease progression, or other abnormal condition, based upon symptoms, signs, and other physiological and anatomical parameters are also encompassed in diagnosis. In certain instances, diagnosis comprises detecting a gene expression profile of a sample, host tissue, cell or cell subpopulation.

The terms "prognosing" or "prognosis" generally refer to an anticipation on the progression of a disease or condition and the prospect (e.g., the probability, duration, and/or extent) of recovery. A good prognosis of the diseases or conditions taught herein may generally encompass anticipation of a satisfactory partial or complete recovery from the diseases or conditions, preferably within an acceptable time period. A good prognosis of such may more commonly encompass anticipation of not further worsening or aggravating of such, preferably within a given time period. A poor prognosis of the diseases or conditions as taught herein may generally encompass anticipation of a substandard recovery and/or unsatisfactorily slow recovery, or to substantially no recovery or even further worsening of such.

The terms "subject," "individual," and "patient" are used interchangeably herein to refer to a vertebrate, preferably a mammal, more preferably a human. Mammals include, but are not limited to, murines, simians, humans, farm animals, sport animals, and pets. Tissues, cells and their progeny of a biological entity obtained in vivo or cultured in vitro are also encompassed.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present invention. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention. For example, in the appended claims, any of the claimed embodiments can be used in any combination.

All publications, published patent documents, and patent applications cited herein are hereby incorporated by reference to the same extent as though each individual publication, published patent document, or patent application was specifically and individually indicated as being incorporated by reference.

Overview

Embodiments disclosed herein provide advancements in spatial transcriptomics (ST) technology, providing for high-density spatial transcriptomics (HDST), in particular in-situ spatial profiling. With techniques that allow for higher resolution and using multiple molecular capture species, cell and/or tissue dynamics can be further interrogated and understood. The disclosed spatial method is a comprehensive tool for massive and combinatorial processing in systems biology. It creates a thorough, collected synopsis of molecules present in a cell (whether eukaryotes or prokaryotic) at maximum spatial and temporal granularity. With this approach, Applicants can simultaneously deconvolve biological processes and validate inter- and intracellular interactions at a targetable protein level. The resulting changes can be coupled to developmental and spatial trajectories with the possibility to tease out immediate and distal environmental impact to cells present in an organ.

Methods of Spatial Transcriptomics

Methods of spatiotemporal processing of a sample of a plurality of cells are provided. In embodiments, the method includes the steps of depositing a plurality of spatial barcodes on a solid substrate, the spatial barcodes further comprising a capture molecule; depositing the sample on the plurality of cells on the surface of the solid substrate; and capturing material from one or more cells of the plurality of cells with the capture molecule of the spatial barcode, thereby linking the capture material from the one or more cells with the spatial barcode.

Depositing Spatial Barcodes

The dispensing or depositing of spatial barcodes on a solid substrate can be performed in a variety of ways, depending on the type of spatial barcode, type of solid substrate, and further processing of capture material. The spatial barcodes are deposited in individual discrete volumes, which may include spots on the solid substrate, droplets, or other defined area.

An "individual discrete volume" is a discrete volume or discrete space, such as a container, receptacle, or other defined volume or space that can be defined by properties that prevent and/or inhibit migration of nucleic acids and reagents necessary to carry out the methods disclosed herein, for example a volume or space defined by physical properties such as walls, for example the walls of a well, tube, or a surface of a droplet, which may be impermeable or semipermeable, or as defined by other means such as chemical, diffusion rate limited, electro-magnetic, or light illumination, or any combination thereof. By "diffusion rate limited" (for example diffusion defined volumes) is meant spaces that are only accessible to certain molecules or reactions because diffusion constraints effectively defining a space or volume as would be the case for two parallel laminar streams where diffusion will limit the migration of a target molecule from one stream to the other. By "chemical" defined volume or space is meant spaces where only certain target molecules can exist because of their chemical or molecular properties, such as size, where for example gel beads may exclude certain species from entering the beads but not others, such as by surface charge, matrix size or other physical property of the bead that can allow selection of species that may enter the interior of the bead. By "electro-magnetically" defined volume or space is meant spaces where the electro-magnetic properties of the target molecules or their supports such as charge or magnetic properties can be used to define certain regions in a space such as capturing magnetic particles within a magnetic field or directly on magnets. By "optically" defined volume is meant any region of space that may be defined by illuminating it with visible, ultraviolet, infrared, or other wavelengths of light such that only target molecules within the defined space or volume may be labeled. One advantage to the used of non-walled, or semipermeable is that some reagents, such as buffers, chemical activators, or other agents maybe passed in our through the discrete volume, while other material, such as target molecules, maybe maintained in the discrete volume or space. Typically, a discrete volume will include a fluid medium, (for example, an aqueous solution, an oil, a buffer, and/or a media capable of supporting cell growth) suitable for labeling of the target molecule with the indexable nucleic acid identifier under conditions that permit labeling. Exemplary discrete volumes or spaces useful in the disclosed methods include droplets (for example, microfluidic droplets and/or emulsion droplets), hydrogel beads or other polymer structures (for example poly-ethylene glycol di-acrylate beads or agarose beads), tissue slides (for example, fixed formalin paraffin embedded tissue slides with particular regions, volumes, or spaces defined by chemical, optical, or physical means), microscope slides with regions defined by depositing reagents in ordered arrays or random patterns, tubes (such as, centrifuge tubes, microcentrifuge tubes, test tubes, cuvettes, conical tubes, and the like), bottles (such as glass bottles, plastic bottles, ceramic bottles, Erlenmeyer flasks, scintillation vials and the like), wells (such as wells in a plate), plates, pipettes, or pipette tips among others. In certain example embodiments, the individual discrete volumes are the wells of a microplate. In certain example embodiments, the microplate is a 96 well, a 384 well, or a 1536 well microplate.

Deposition of barcodes can include use of inkjet technologies or contact printing. Inkjet printing technology deposits small droplets of liquid onto the solid substrate, typically using piezoelectric, thermal acoustic, or continuous flow technologies. (Hughes et al, 2001). Contact printing can also be utilized, relying physical deposition of small volume of liquid from a variety of pin tools, including solid or split pins, onto the solid substrate. In particular embodiments, the spatial barcodes are provided in droplets, as discussed elsewhere herein, and deposition can include use of inkjet or fluorescence activated cell sorting (FACS) technologies. Once assembled the droplet, in some embodiments, can be reversed, and the water phase comprising multiple copies of the same oligonucleotide attached to the surface via covalent or non-covalent binding enables control of size of the spots on the solid substrate. Depositing can be performed randomly or in an ordered fashion. In particular embodiments, depositing the spatial barcode comprises the binding of the spatial barcode to the solid substrate, and may be performed by building the spatial barcode on the solid surface utilizing deposition technologies. Preferred sizes of deposition are less than about 5 µm, 4 µm, 3 µm, 2 µm, 1 µm, 900 nm, 800 nm, 700 nm, 600 nm, 500 nm, 400 nm, 300 nm, 200 nm or about 100 nm, 50 nm, or less. The smaller the spots on the solid substrate allows gathering of a more complete map of the sample.

Spatial Barcode

Methods and systems disclosed herein utilize a plurality of spatial barcodes. Each spatial barcode acts as a two-dimensional coordinate identifier, providing x,y coordinates for a location on a solid substrate. In certain example embodiments, the spatial barcode is provided in a droplet. The spatial barcode, in some embodiments, may be included on a bead. The spatial barcode can comprise an oligonucleotide, which, in some embodiments, is appended or associated with a bead. In particular embodiments, a plurality of spatial barcodes is linked or appended on the bead or in a droplet.

Oligonucleotide Barcode

An oligonucleotide spatial barcode can be a short sequence of nucleotides (for example, DNA or RNA) that is used as an identifier for the location on the solid substrate of an associated molecule, such as a target molecule and/or target nucleic acid, or as an identifier of the source of an associated molecule, such as a cell-of-origin. A barcode may also refer to any unique, non-naturally occurring, nucleic acid sequence that may be used to identify the originating source of a nucleic acid fragment. Although it is not necessary to understand the mechanism of an invention, it is believed that the barcode sequence provides a high-quality individual read of a barcode associated with a position on the solid substrate corresponding to a capture material from the sample, such as a protein, or cDNA such that multiple species can be sequenced together.

Barcoding may be performed based on any of the compositions or methods disclosed in patent publication WO 2014047561 A1, Compositions and methods for labeling of agents, incorporated herein in its entirety *(See Example 1-8 for discussion of multiple approaches). Additional approaches for barcode synthesis disclosed in PCT/US2018057173 are incorporated herein by reference, in particular [0145]-[0195]. In certain embodiments, barcoding uses an error correcting scheme (T. K. Moon, Error Correction Coding: Mathematical Methods and Algorithms (Wiley, New York, ed. 1, 2005)). In certain example embodiments, capture molecules can be resolved based on the barcode associated with each spatial location that can be correlated to a location within the sample on the solid substrate. In particular embodiments, the method comprises building the spatial barcode on the solid substrate, in some instances building the spatial barcode comprises bridge PCR or solid extension.

In some embodiments, building the spatial barcode on the surface includes the use of padlock probes. A method of building the spatial barcode on the surface comprises distributing oligonucleotide sequences on the solid substrate, adding padlock probes, and amplifying and decoding the oligonucleotides on the surface. In embodiments, DNA oligonucleotides can be randomly distributed on the solid substrate, for example a polymer surface with available —COOH and/or —OH groups. Preferred embodiments distribute the oligonucleotides to allow about 1 µm of space between each of the distributed oligonucleotides when coupled. Padlock probes are added to the simultaneously amplify and decode the DNA oligonucleotides on the surface into rolling circle amplified products. In particular embodiments, the rolling circle amplified products are about 0.5 to about 1 µm.

Another embodiment of building oligonucleotide sequence on the solid substrate includes building and decoding the probe using one reaction with DNA microscopy. Spatial encoding is controlled by diffusion speed, and advantageously allows the steps of probe building and decoding to occur together in one reaction.

Another embodiment allows the use of Affymetrix arrays that can be transferred to a gel as a solid substrate using the 5' ends of the array, the gel array can then be used as the solid substrate comprising the spatial barcodes. Capture molecules can then be added to the oligonucleotide sequences.

In preferred embodiments, sequencing is performed using unique molecular identifiers (UMI). The term "unique molecular identifiers" (UMI) as used herein refers to a sequencing linker or a subtype of nucleic acid barcode used in a method that uses molecular tags to detect and quantify unique amplified products. A UMI is used to distinguish effects through a single clone from multiple clones. The term "clone" as used herein may refer to a single mRNA or target nucleic acid to be sequenced. The UMI may also be used to determine the number of transcripts that gave rise to an amplified product, or in the case of target barcodes as described herein, the number of binding events. In preferred embodiments, the amplification is by PCR or multiple displacement amplification (MDA). A UMI may be unique for each spatial barcode.

In certain embodiments, an UMI with a random sequence of between 4 and 20 base pairs is added to a template, which is amplified and sequenced. In preferred embodiments, the UMI is added to the 5' end of the template. Sequencing allows for high resolution reads, enabling accurate detection of true variants. As used herein, a "true variant" will be present in every amplified product originating from the original clone as identified by aligning all products with a UMI. Each clone amplified will have a different random UMI that will indicate that the amplified product originated from that clone. Background caused by the fidelity of the amplification process can be eliminated because true variants will be present in all amplified products and background representing random error will only be present in single amplification products (See e.g., Islam S. et al., 2014. Nature Methods No: 11, 163-166). Not being bound by a theory, the UMI's are designed such that assignment to the original can take place despite up to 4-7 errors during amplification or sequencing. Not being bound by a theory, an UMI may be used to discriminate between true barcode sequences.

Unique molecular identifiers can be used, for example, to normalize samples for variable amplification efficiency. For example, in various embodiments, featuring a solid or semisolid support (for example a hydrogel bead), to which nucleic acid barcodes (for example a plurality of barcodes sharing the same sequence) are attached, each of the barcodes may be further coupled to a unique molecular identifier, such that every barcode on the particular solid or semisolid support receives a distinct unique molecule identifier. A unique molecular identifier can then be, for example, transferred to a target molecule with the associated barcode, such that the target molecule receives not only a nucleic acid barcode, but also an identifier unique among the identifiers originating from that solid or semisolid support.

A UMI can have a length of at least, for example, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 60, 70, 80, 90, or 100 nucleotides, and can be in single- or double-stranded form. Target molecule and/or target nucleic acids can be labeled with multiple nucleic acid barcodes in combinatorial fashion, such as a nucleic acid barcode concatemer. Typically, a nucleic acid barcode is used to identify a target molecule and/or target nucleic acid as being from a particular discrete volume, having a particular physical property (for example, affinity, length, sequence, etc.), or having been subject to certain treatment conditions. Target molecule and/or target nucleic acid can be associated with multiple nucleic acid barcodes to provide information about all of these features (and more). Each member of a given population of UMIs, on the other hand, is typically associated with (for example, covalently bound to or a component of the same molecule as) individual members of a particular set of identical, specific (for example, discreet volume-, physical property-, or treatment condition-specific) nucleic acid barcodes. Thus, for example, each member of a set of spatial nucleic acid barcodes, or other nucleic acid identifier or connector oligonucleotide, having identical or matched barcode sequences, may be associated with (for example, covalently bound to or a component of the same molecule as) a distinct or different UMI.

As disclosed herein, unique nucleic acid identifiers are used to label the target molecules and/or target nucleic acids, for example spatial barcodes and the like. The nucleic acid identifiers, nucleic acid barcodes, can include a short sequence of nucleotides that can be used as an identifier for an associated molecule, location, or condition. In certain embodiments, the nucleic acid identifier further includes one or more unique molecular identifiers and/or barcode receiving adapters. A nucleic acid identifier can have a length of about, for example, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 60, 70, 80, 90, or 100 base pairs (bp) or nucleotides (nt). In certain embodiments, a nucleic acid identifier can be constructed in combinatorial fashion by combining randomly selected indices (for example, about 1, 2, 3, 4, 5, 6, 7, 8, 9, or 10 indexes). Each such index is a short sequence of nucleotides (for example, DNA, RNA, or a combination thereof) having a distinct sequence. An index can have a length of about, for example, 4, 5, 6, 7, 8, 9, 10, 11, 12, 13, 14, 15, 16, 17, 18, 19, 20, 21, 22, 23, 24, or 25 bp or nt. Nucleic acid identifiers can be generated, for example, by split-pool synthesis methods, such as those described, for example, in International Patent Publication Nos. WO 2014/047556 and WO 2014/143158, each of which is incorporated by reference herein in its entirety.

One or more nucleic acid identifiers (for example a nucleic acid barcode) can be attached, or "tagged," to a target molecule. This attachment can be direct (for example, covalent or noncovalent binding of the nucleic acid identifier to the target molecule) or indirect (for example, via an additional molecule). Such indirect attachments may, for example, include a barcode bound to a specific-binding agent that recognizes a target molecule. In certain embodiments, a barcode is attached to protein G and the target molecule is an antibody or antibody fragment. Attachment of a barcode to target molecules (for example, proteins and other biomolecules) can be performed using standard methods well known in the art. For example, barcodes can be linked via cysteine residues (for example, C-terminal cysteine residues). In other examples, barcodes can be chemically introduced into polypeptides (for example, antibodies) via a variety of functional groups on the polypeptide using appropriate group-specific reagents (see for example www.drmr.com/abcon). In certain embodiments, barcode tagging can occur via a barcode receiving adapter associate with (for example, attached to) a target molecule, as described herein.

Target molecules can be optionally labeled with multiple barcodes in combinatorial fashion (for example, using multiple barcodes bound to one or more specific binding agents that specifically recognizing the target molecule), thus greatly expanding the number of unique identifiers possible within a particular barcode pool. In certain embodiments, barcodes are added to a growing barcode concatemer attached to a target molecule, for example, one at a time. In other embodiments, multiple barcodes are assembled prior to attachment to a target molecule. Compositions and methods for concatemerization of multiple barcodes are described, for example, in International Patent Publication No. WO 2014/047561, which is incorporated herein by reference in its entirety.

In some embodiments, a nucleic acid identifier (for example, a nucleic acid barcode) may be attached to sequences that allow for amplification and sequencing (for example, SBS3 and P5 elements for Illumina sequencing). In certain embodiments, a nucleic acid barcode can further include a hybridization site for a primer (for example, a single-stranded DNA primer) attached to the end of the barcode. For example, an spatial barcode may be a nucleic acid including a barcode and a hybridization site for a specific primer. In particular embodiments, a set of spatial barcodes includes a unique primer specific barcode made, for example, using a randomized oligo type NNNNNNNNNNNN.

A nucleic acid identifier can further include a unique molecular identifier and/or additional barcodes specific to, for example, a common support to which one or more of the nucleic acid identifiers are attached. Thus, a pool of target molecules can be added, for example, to a discrete volume containing multiple solid or semisolid supports (for example, beads) representing distinct treatment conditions (and/or, for example, one or more additional solid or semisolid support can be added to the discreet volume sequentially after introduction of the target molecule pool), such that the precise combination of conditions to which a given target molecule was exposed can be subsequently determined by sequencing the unique molecular identifiers associated with it.

Labeled target molecules and/or target nucleic acids associated spatial nucleic acid barcodes (optionally in combination with other nucleic acid barcodes as described herein) can be amplified by methods known in the art, such as polymerase chain reaction (PCR). For example, the nucleic acid barcode can contain universal primer recognition sequences that can be bound by a PCR primer for PCR amplification and subsequent high-throughput sequencing. In certain embodiments, the nucleic acid barcode includes or is linked to sequencing adapters (for example, universal primer recognition sequences) such that the barcode and sequencing adapter elements are both coupled to the target molecule. In particular examples, the sequence of the origin specific barcode is amplified, for example using PCR. In some embodiments, an spatial barcode further comprises a sequencing adaptor. In some embodiments, an spatial barcode further comprises universal priming sites. A nucleic acid barcode (or a concatemer thereof), a target nucleic acid molecule (for example, a DNA or RNA molecule), a nucleic acid encoding a target peptide or polypeptide, and/or a nucleic acid encoding a specific binding agent may be optionally sequenced by any method known in the art, for example, methods of high-throughput sequencing, also known as next generation sequencing or deep sequencing. A nucleic acid target molecule labeled with a barcode (for example, an spatial barcode) can be sequenced with the barcode to produce a single read and/or contig containing the sequence, or portions thereof, of both the target molecule and the barcode. Exemplary next generation sequencing technologies include, for example, Illumina sequencing, Ion Torrent sequencing, 454 sequencing, SOLiD sequencing, and nanopore sequencing amongst others. In some embodiments, the sequence of labeled target molecules is determined by non-sequencing-based methods. For example, variable length probes or primers can be used to distinguish barcodes (for example, spatial barcodes) labeling distinct target molecules by, for example, the length of the barcodes, the length of target nucleic acids, or the length of nucleic acids encoding target polypeptides. In other instances, barcodes can include sequences identifying, for example, the type of molecule for a particular target molecule (for example, polypeptide, nucleic acid, small molecule, or lipid). For example, in a pool of labeled target molecules containing multiple types of target molecules, polypeptide target molecules can receive one identifying sequence, while target nucleic acid molecules can receive a different identifying sequence. Such identifying sequences can be used to selectively amplify barcodes labeling particular types of target molecules, for example, by using PCR primers specific to identifying sequences specific to particular types of target molecules. For example, barcodes labeling polypeptide target molecules can be selectively amplified from a pool, thereby retrieving only the barcodes from the polypeptide subset of the target molecule pool.

A nucleic acid barcode can be sequenced, for example, after cleavage, to determine the presence, quantity, or other feature of the target molecule. In certain embodiments, a nucleic acid barcode can be further attached to a further nucleic acid barcode. For example, a nucleic acid barcode can be cleaved from a specific-binding agent after the specific-binding agent binds to a target molecule or a tag (for example, an encoded polypeptide identifier element cleaved from a target molecule), and then the nucleic acid barcode can be ligated to an spatial barcode. The resultant nucleic acid barcode concatemer can be pooled with other such concatemers and sequenced. The sequencing reads can be used to identify which target molecules were originally present in which discrete volumes.

Barcodes Reversibly Coupled to Solid Substrate

In some embodiments, the spatial barcodes can be reversibly coupled to a solid or semisolid substrate. In some embodiments, the spatial barcodes further comprise a nucleic acid capture sequence that specifically binds to the target nucleic acids and/or a specific binding agent that specifically binds to the target molecules. In specific embodiments, the spatial barcodes include two or more populations of spatial barcodes, wherein a first population comprises the nucleic acid capture sequence and a second population comprises the specific binding agent that specifically binds to the target molecules. In some examples, the first population of spatial barcodes further comprises a target nucleic acid barcode, wherein the target nucleic acid barcode identifies the population as one that labels nucleic acids. In some examples, the second population of spatial barcodes further comprises a target molecule barcode, wherein the target molecule barcode identifies the population as one that labels target molecules.

Barcode with Cleavage Sites

A nucleic acid barcode may be cleavable from a specific binding agent, for example, after the specific binding agent has bound to a target molecule. In some embodiments, the spatial barcode further comprises one or more cleavage sites. Linkers can be as described, for example, in PCT/US18/57173 at [0093]-[0102]. In embodiments, the linker is thermally, chemically or enzymatically cleavable linker. In some examples, at least one cleavage site is oriented such that cleavage at that site releases the spatial barcode from a substrate, such as a bead, for example a hydrogel bead, to which it is coupled. In some examples, at least one cleavage site is oriented such that the cleavage at the site releases the spatial barcode from the target molecule specific binding agent. In some examples, a cleavage site is an enzymatic cleavage site, such an endonuclease site present in a specific nucleic acid sequence. In other embodiments, a cleavage site is a peptide cleavage site, such that a particular enzyme can cleave the amino acid sequence. In still other embodiments, a cleavage site is a site of chemical cleavage. In a particular embodiment, the cleavable linker comprises a d(U) linker.

Barcode Adapters

In some embodiments, the target molecule is attached to an spatial barcode receiving adapter, such as a nucleic acid. In some examples, the spatial barcode receiving adapter comprises an overhang and the spatial barcode comprises a sequence capable of hybridizing to the overhang. A barcode receiving adapter is a molecule configured to accept or receive a nucleic acid barcode, such as an spatial nucleic acid barcode. For example, a barcode receiving adapter can include a single-stranded nucleic acid sequence (for example, an overhang) capable of hybridizing to a given barcode (for example, an spatial barcode), for example, via a sequence complementary to a portion or the entirety of the nucleic acid barcode. In certain embodiments, this portion of the barcode is a standard sequence held constant between individual barcodes. The hybridization couples the barcode receiving adapter to the barcode. In some embodiments, the barcode receiving adapter may be associated with (for example, attached to) a target molecule. As such, the barcode receiving adapter may serve as the means through which an spatial barcode is attached to a target molecule. A barcode receiving adapter can be attached to a target molecule according to methods known in the art. For example, a barcode receiving adapter can be attached to a polypeptide target molecule at a cysteine residue (for example, a C-terminal cysteine residue). A barcode receiving adapter can be used to identify a particular condition related to one or more target molecules, such as a cell of origin or a discreet volume of origin. For example, a target molecule can be a cell surface protein expressed by a cell, which receives a cell-specific barcode receiving adapter. The barcode receiving adapter can be conjugated to one or more barcodes as the cell is exposed to one or more conditions, such that the original cell of origin for the target molecule, as well as each condition to which the cell was exposed, can be subsequently determined by identifying the sequence of the barcode receiving adapter/barcode concatemer.

Sequencing Adapters

As used herein, sequence adapters or sequencing adapters or adapters include primers that may include additional sequences involved in for example, but not limited to, flowcell binding, cluster generation, library generation, sequencing primers, sequences for Seq-Well, and/or custom read sequencing primers. In certain embodiments, the sequencing adapters are tailored to the end0use, for example, when a flowcell or other non-bead-based technology is used, additional sequencing adapters can be utilized for library generation.

Universal Primer Recognition Sequences

The present invention may encompass incorporation of SMART sequences into the library. Switching mechanism at 5' end of RNA template (SMART) is a technology that allows the efficient incorporation of known sequences at both ends of cDNA during first strand synthesis, without adaptor ligation. The presence of these known sequences is crucial for a number of downstream applications including amplification, RACE, and library construction. While a wide variety of technologies can be employed to take advantage of these known sequences, the simplicity and efficiency of the single-step SMART process permits unparalleled sensitivity and ensures that full-length cDNA is generated and amplified. (see, e.g., Zhu et al., 2001, Biotechniques. 30 (4): 892-7.

A pooled set of nucleic acids that are tagged refer to a plurality of nucleic acid molecules that results from incorporating an identifiable sequence tag into a pool of sample-tagged nucleic acids, by any of various methods. In some embodiments, the tag serves instead as a minimal sequence adapter for adding nucleic acids onto sample-tagged nucleic acids, rendering the pool compatible with a particular DNA sequencing platform or amplification strategy.

The barcodes herein may comprise one or more detectable tags. In some examples, a detectable tag may comprise a detectable oligonucleotide tag that can be detected by sequencing of its nucleotide sequence and/or by detecting non-nucleic acid detectable moieties to which it may be attached.

The oligonucleotide tags may be randomly selected from a diverse plurality of oligonucleotide tags. In some instances, an oligonucleotide tag may be present once in a plurality or it may be present multiple times in a plurality. In the latter instance, the plurality of tags may be comprised of a number of subsets each comprising a plurality of identical tags. In some important embodiments, these subsets are physically separate from each other. Physical separation may be achieved by providing the subsets in separate wells of a multiwell plate or separate droplets from an emulsion. It is the random selection and thus combination of oligonucleotide tags that results in a unique label. Accordingly, the number of distinct (i.e., different) oligonucleotide tags required to uniquely label a plurality of agents can be far less than the number of agents being labeled. This is particularly advantageous when the number of agents is large (e.g., when the agents are members of a library).

The oligonucleotide tags may be detectable by virtue of their nucleotide sequence, or by virtue of a non-nucleic acid detectable moiety that is attached to the oligonucleotide such as but not limited to a fluorophore, or by virtue of a combination of their nucleotide sequence and the non-nucleic acid detectable moiety.

In some embodiments, a detectable oligonucleotide tag comprises one or more non-oligonucleotide detectable moieties. Examples of detectable moieties include fluorophores, microparticles including quantum dots (Empodocles, et al., Nature 399:126-130, 1999), gold nanoparticles (Reichert et al., Anal. Chem. 72:6025-6029, 2000), microbeads (Lacoste et al., Proc. Natl. Acad. Sci. USA 97(17):9461-9466, 2000), biotin, DNP (dinitrophenyl), fucose, digoxigenin, haptens, and other detectable moieties known to those skilled in the art.

Thus, detectable oligonucleotide tags may be, but are not limited to, oligonucleotides comprising unique nucleotide sequences, oligonucleotides comprising detectable moieties, and oligonucleotides comprising both unique nucleotide sequences and detectable moieties.

In some cases, the detectable tag comprises a labeling substance, which is detectable by spectroscopic, photochemical, biochemical, immunochemical, electrical, optical or chemical means. Such tags include biotin for staining with labeled streptavidin conjugate, magnetic beads (e.g., Dynabeads®), fluorescent dyes (e.g., fluorescein, texas red, rhodamine, green fluorescent protein, and the like), radiolabels (e.g., 3H, 125I, 35S, 14C, or 32P), enzymes (e.g., horse radish peroxidase, alkaline phosphatase and others commonly used in an ELISA), and calorimetric labels such as colloidal gold or colored glass or plastic (e.g., polystyrene, polypropylene, latex, etc.) beads. Detectable tags may be detected by many methods. For example, radiolabels may be detected using photographic film or scintillation counters, and fluorescent markers may be detected using a photodetector to detect emitted light. Enzymatic labels are typically detected by providing the enzyme with a substrate and detecting, the reaction product produced by the action of the enzyme on the substrate, and calorimetric labels are detected by simply visualizing the colored label.

A mixture comprises a plurality of microbeads adorned with combinations of the following elements: bead-specific oligonucleotide barcodes created by the discussed methods; additional oligonucleotide barcode sequences which vary among the oligonucleotides on an individual bead and can therefore be used to differentiate or help identify those individual oligonucleotide molecules; additional oligonucleotide sequences that create substrates for downstream molecular-biological reactions, such as oligo-dT (for reverse transcription of mature mRNAs), specific sequences (for capturing specific portions of the transcriptome, or priming for DNA polymerases and similar enzymes), or random sequences (for priming throughout the transcriptome or genome). In an embodiment, the individual oligonucleotide molecules on the surface of any individual microbead contain all three of these elements, and the third element includes both oligo-dT and a primer sequence.

Examples of the labeling substance which may be employed include labeling substances known to those skilled in the art, such as fluorescent dyes, enzymes, coenzymes, chemiluminescent substances, and radioactive substances. Specific examples include radioisotopes (e.g., $^{32}P$, $^{14}C$, $^{125}I$, $^{3}H$, and $^{131}I$) fluorescein, rhodamine, dansyl chloride, umbelliferone, luciferase, peroxidase, alkaline phosphatase, β-galactosidase, β-glucosidase, horseradish peroxidase, glucoamylase, lysozyme, saccharide oxidase, microperoxidase, biotin, and ruthenium. In the case where biotin is employed as a labeling substance, preferably, after addition of a biotin-labeled antibody, streptavidin bound to an enzyme (e.g., peroxidase) is further added. Advantageously, the label is a fluorescent label. Examples of fluorescent labels include, but are not limited to, Atto dyes, 4-acetamido-4'-isothiocyanatostilbene-2,2'disulfonic acid; acridine and derivatives: acridine, acridine isothiocyanate; 5-(2'-aminoethyl)aminonaphthalene-1-sulfonic acid (EDANS); 4-amino-N-[3-vinyl sulfonyl)phenyl]naphthalimide-3,5 disulfonate; N-(4-anilino-1-naphthyl)maleimide; anthranilamide; BODIPY; Brilliant Yellow; coumarin and derivatives; coumarin, 7-amino-4-methylcoumarin (AMC, Coumarin 120), 7-amino-4-trifluoromethylcouluarin (Coumaran 151); cyanine dyes; cyanosine; 4',6-diaminidino-2-phenylindole (DAPI); 5'5"-dibromopyrogallol-sulfonaphthalein (Bromopyrogallol Red); 7-diethylamino-3-(4'-isothiocyanatophenyl)-4-methylcoumarin; diethylenetriamine pentaacetate; 4,4'-diisothiocyanatodihydro-stilbene-2,2'-disulfonic acid; 4,4'-diisothiocyanatostilbene-2,2'-disulfonic acid; 5-[dimethylamino]naphthalene-1-sulfonyl chloride (DNS, dansylchloride); 4-dimethylaminophenylazophenyl-4'-isothiocyanate (DABITC); eosin and derivatives; eosin, eosin isothiocyanate, erythrosin and derivatives; erythrosin B, erythrosin, isothiocyanate; ethidium; fluorescein and derivatives; 5-carboxyfluorescein (FAM), 5-(4,6-dichlorotriazin-2-yl)aminofluorescein (DTAF), 2',7'-dimethoxy-4'5'-dichloro-6-carboxyfluorescein, fluorescein, fluorescein isothiocyanate, QFITC, (XRITC); fluorescamine; IR144; IR1446; Malachite Green isothiocyanate; 4-methylumbelliferoneortho cresolphthalein; nitrotyrosine; pararosaniline; Phenol Red; B-phycoerythrin; o-phthaldialdehyde; pyrene and derivatives: pyrene, pyrene butyrate, succinimidyl 1-pyrene; butyrate quantum dots; Reactive Red 4 (Cibacron™ Brilliant Red 3B-A) rhodamine and derivatives: 6-carboxy-X-rhodamine (ROX), 6-carboxyrhodamine (R6G), lissamine rhodamine B sulfonyl chloride rhodamine (Rhod), rhodamine B, rhodamine 123, rhodamine X isothiocyanate, sulforhodamine B, sulforhodamine 101, sulfonyl chloride derivative of sulforhodamine 101 (Texas Red); N,N,N',N' tetramethyl-6-carboxyrhodamine (TAN/IRA); tetramethyl rhodamine; tetramethyl rhodamine isothiocyanate (TRITC); riboflavin; rosolic acid; terbium chelate derivatives; Cy3; Cy5; Cy5.5; Cy7; IRD 700; IRD 800; La Jolta Blue; phthalo cyanine; and naphthalo cyanine. A fluorescent label may be a fluorescent protein, such as blue fluorescent protein, cyan fluorescent protein, green fluorescent protein, red fluorescent protein, yellow fluorescent protein or any photoconvertible protein. Colorimetric labeling, bioluminescent labeling and/or chemiluminescent labeling may further accomplish labeling. Labeling further may include energy transfer between molecules in the hybridization complex by perturbation analysis, quenching, or electron transport between donor and acceptor molecules, the latter of which may be facilitated by double stranded match hybridization complexes. The fluorescent label may be a perylene or a terrylen. In the alternative, the fluorescent label may be a fluorescent bar code. Advantageously, the label may be light sensitive, wherein the label is light-activated and/or light cleaves the one or more linkers to release the molecular cargo. The light-activated molecular cargo may be a major light-harvesting complex (LHCII). In another embodiment, the fluorescent label may induce free radical formation. In some embodiments, the detectable moieties may be quantum dots.

Barcode with Capture Moiety

In some embodiments, an spatial barcode further includes a capture moiety, covalently or non-covalently linked. Thus, in some embodiments the spatial barcode, and anything bound or attached thereto, that include a capture moiety are captured with a specific binding agent that specifically binds the capture moiety. In some embodiments, the capture moiety is adsorbed or otherwise captured on a surface. In specific embodiments, a targeting probe is labeled with biotin, for instance by incorporation of biotin-16-UTP during in vitro transcription, allowing later capture by streptavidin. Other means for labeling, capturing, and detecting an spatial barcode include incorporation of aminoallyl-labeled nucleotides; incorporation of sulfhydryl-labeled nucleotide; incorporation of allyl- or azide-containing nucleotide; and many other methods described in Bioconjugate Techniques ($2^{nd}$ Ed), Greg T. Hermanson, Elsevier (2008), which is specifically incorporated herein by reference. In some embodiments, the targeting probes are covalently coupled to a solid support or other capture device prior to contacting the sample, using methods such as incorporation of aminoallyl-labeled nucleotides followed by 1-Ethyl-3-(3-dimethylaminopropyl)carbodiimide (EDC) coupling to a carboxy-activated solid support, or other methods described in Bioconjugate Techniques. In some embodiments, the specific binding agent has been immobilized for example on a solid support, thereby isolating the spatial barcode.

Other Barcoding Embodiments

DNA barcoding is also a taxonomic method that uses a short genetic marker in an organism's DNA to identify it as belonging to a particular species. It differs from molecular phylogeny in that the main goal is not to determine classification but to identify an unknown sample in terms of a known classification. Kress et al., "Use of DNA barcodes to identify flowering plants" Proc. Natl. Acad. Sci. U.S.A. 102(23):8369-8374 (2005). Barcodes are sometimes used in an effort to identify unknown species or assess whether species should be combined or separated. Koch H., "Combining morphology and DNA barcoding resolves the taxonomy of Western Malagasy Liotrigona Moure, 1961" African Invertebrates 51(2): 413-421 (2010); and Seberg et al., "How many loci does it take to DNA barcode a *crocus*?" PLoS One 4(2):e4598 (2009). Barcoding has been used, for example, for identifying plant leaves even when flowers or fruit are not available, identifying the diet of an animal based on stomach contents or feces, and/or identifying products in commerce (for example, herbal supplements or wood). Soininen et al., "Analysing diet of small herbivores: the efficiency of DNA barcoding coupled with high-throughput pyrosequencing for deciphering the composition of complex plant mixtures" Frontiers in Zoology 6:16 (2009).

It has been suggested that a desirable locus for DNA barcoding should be standardized so that large databases of sequences for that locus can be developed. Most of the taxa of interest have loci that are sequencable without species-specific PCR primers. CBOL Plant Working Group, "A DNA barcode for land plants" PNAS 106(31):12794-12797 (2009). Further, these putative barcode loci are believed short enough to be easily sequenced with current technology. Kress et al., "DNA barcodes: Genes, genomics, and bioinformatics" PNAS 105(8):2761-2762 (2008). Consequently, these loci would provide a large variation between species in combination with a relatively small amount of variation within a species. Lahaye et al., "DNA barcoding the floras of biodiversity hotspots" Proc Natl Acad Sci USA 105(8): 2923-2928 (2008).

DNA barcoding is based on a relatively simple concept. For example, most eukaryote cells contain mitochondria, and mitochondrial DNA (mtDNA) has a relatively fast mutation rate, which results in significant variation in mtDNA sequences between species and, in principle, a comparatively small variance within species. A 648-bp region of the mitochondrial cytochrome c oxidase subunit 1 (CO1) gene was proposed as a potential 'barcode'. As of 2009, databases of CO1 sequences included at least 620,000 specimens from over 58,000 species of animals, larger than databases available for any other gene. Ausubel, J., "A botanical macroscope" Proceedings of the National Academy of Sciences 106(31):12569 (2009).

Software for DNA barcoding requires integration of a field information management system (FIMS), laboratory information management system (LIMS), sequence analysis tools, workflow tracking to connect field data and laboratory data, database submission tools and pipeline automation for scaling up to eco-system scale projects. Geneious Pro can be used for the sequence analysis components, and the two plugins made freely available through the Moorea Biocode Project, the Biocode LIMS and Genbank Submission plugins handle integration with the FIMS, the LIMS, workflow tracking and database submission.

Additionally, other barcoding designs and tools have been described (see e.g., Birrell et al., (2001) Proc. Natl Acad. Sci. USA 98, 12608-12613; Giaever, et al., (2002) Nature 418, 387-391; Winzeler et al., (1999) Science 285, 901-906; and Xu et al., (2009) Proc Natl Acad Sci USA. February 17; 106(7):2289-94).

Unique Molecular Identifiers are short (usually 4-10 bp) random barcodes added to transcripts during reverse-transcription. They enable sequencing reads to be assigned to individual transcript molecules and thus the removal of amplification noise and biases from RNA-seq data. Since the number of unique barcodes (4N, N—length of UMI) is much smaller than the total number of molecules per cell (~106), each barcode will typically be assigned to multiple transcripts. Hence, to identify unique molecules both barcode and mapping location (transcript) must be used. UMI-sequencing typically consists of paired-end reads where one read from each pair captures the cell and UMI barcodes while the other read consists of exonic sequence from the transcript. UMI-sequencing typically consists of paired-end reads where one read from each pair captures the cell and UMI barcodes while the other read consists of exonic sequence from the transcript.

In some embodiments, the nucleic acids of the library are flanked by switching mechanism at 5' end of RNA templates (SMART). SMART is a technology that allows the efficient incorporation of known sequences at both ends of cDNA during first strand synthesis, without adaptor ligation. The presence of these known sequences is crucial for a number of downstream applications including amplification, RACE, and library construction. While a wide variety of technologies can be employed to take advantage of these known sequences, the simplicity and efficiency of the single-step SMART process permits unparalleled sensitivity and ensures that full-length cDNA is generated and amplified. (see, e.g., Zhu et al., 2001, Biotechniques. 30 (4): 892-7.

After processing the reads from a UMI experiment, the following conventions are often used: 1. The UMI is added to the read name of the other paired read. 2. Reads are sorted into separate files by barcode. For extremely large, shallow datasets, a barcode may be added to the read name as well to reduce the number of files. A barcode indicates the cell from which mRNA is captured (e.g., Drop-Seq or Seq-Well).

Split-Pool Barcoding

In some embodiments, the nucleic acids molecules, e.g., the fragmented genomic DNA and the cDNA, may be barcoded by a split-pool method. In some embodiments, the split-pool method may be performed on a sample comprising nuclei containing the fragmented genomic DNA and the cDNA herein. In such cases, the fragmented genomic DNA and the cDNA remain in nuclei after generation. The nuclei may remain intact during the split-pool process. In certain examples, the nuclei are isolated from cells. For example, the cells may be lysed and the nuclei are released, but remain intact and contain the fragmented genomic DNA and the cDNA. In certain examples, the nuclei remain in the cells, which are made permeable so the nucleic acids in the cells (e.g., in the nuclei) can access reaction reagents and the fragmented DNA and the cDNA can be generated inside cells.

In general, the split-pool method may comprise: splitting a sample comprising nuclei into discrete volumes in partitions, each partition containing a unique first barcode; ligating the first barcode to nucleic acids in each partition; pooling the discrete partitions to a first pooled sample. The process may be repeated. For example, the split-pool method may further comprise splitting the first pooled sample into discrete partitions, each partition containing a unique second barcode; ligating the second barcode to nucleic acids in each partition; and pooling the discrete partitions to make a second pooled sample. The splitting and pooling steps may be repeated for at least 1, at least 2, at least 3, at least 4, at least 5, at least 6, at least 7, at least 8, at least 9, at least 10, at least 15, at least 20, at least 30, at least 40, at least 50, at least 60, at least 70, at least 80, at least 90, at least 100, at least 200, or at least 500 times.

After split-pool steps, each nucleic acid molecule may comprise one or a combination of barcodes. Since when split, nucleic acid molecules in a nuclei or cell are split together, nucleic acid molecules from or derived from the same cell may receive the same barcode or barcode combination. Such barcode or barcode combination may comprise a unique barcode sequence, which may be used as an identifier of cell origin of the nucleic acid molecules.

In some embodiments, nucleic acids in the split-pool process may comprise ligation handles. The ligation handle may comprise a restriction site for producing an overhang complementary with a first index sequence overhang, and wherein the method further comprises digestion with a restriction enzyme. The ligation handle may comprise a nucleotide sequence complementary with a ligation primer sequence and wherein the overhang complementary with a first index sequence overhang is produced by hybridization of the ligation primer to the ligation handle. The ligation handles may be generated before the split-pool process. For example, the ligation handles may be generated during the fragmentation, tagmentation, and/or RT-PCR process. Alternatively or additionally, the ligation handles may be generated during the split-pool process.

In particular embodiments, the spatial barcodes comprise beads. The beads may be made of any substance, exemplary beads include conductivity coded beads, color-coded beads, or beads to which the spatial barcode is appended. In some embodiments, the bead by virtue of its characteristics, such as unique combination of colors or conductivity properties, is the spatial barcode. In other instances, the spatial barcode is an oligonucleotide appended or attached to the bead.

In particular embodiments, the spatial barcode is chemically linked to the bead. In some preferred embodiments, a plurality of spatial barcodes are attached to the bead. In some embodiments, the spatial barcodes are linked to a spacer that is permanently or reversibly attached to the bead. In particular embodiments, a cleavable linker can be used between the spacer and the bead, between the barcode and a spacer, and/or at junctions of the spatial barcode and additional moieties appended thereto. In an embodiment, the cleavable linkage can be utilized to allow for the release of the molecules. As described in Example 3, cleaving of the spatially position barcodes can allow release into the tissue, with addition of polymer, betaine, and/or $MgCl_2$ to increase sensitivity. Parallel capture of mRNA molecules on to the released barcode primers otherwise present on the array surface. Accordingly, a restriction site close to the 5' end of the capture probes comprising the spatial barcode is preferred.

The beads may be comprised of a polymer. Examples of suitable polymers include a hydroxylated methacrylic polymer, a hydroxylated poly(methyl methacrylate), a polystyrene polymer, a polypropylene polymer, a polyethylene polymer agarose, or cellulose. The beads may be functionalized to permit covalent attachment of the agent and/or label. Such functionalization on the support may comprise reactive groups that permit covalent attachment to a label, spatial barcode or other moiety.

In some embodiments, commercially available beads may be utilized, as described herein. Commercial beads by 10x, Becton Dickinson, Illumina, 454, or other prepared beads can be deposited in a random fashion with each bead containing multiple copies of a spatial barcode oligonucleotide sequence. The barcoded oligonucleotide beads can be constructed such that each bead has a unique spatial barcode sequence, but the bead comprises the multiple copies of oligonucleotides all contain an identical spatial barcode sequence.

Solid Substrate

The spatial barcodes are deposited on a solid substrate. The solid substrate can comprise a gel, polymer, imaging fiber or any other conductive surface, or glass slide in some instances. In one preferred embodiment, the solid substrate is a glass slide. The solid substrate can in some instances can be used for cell and tissue culturing while simultaneously allowing for analysis and evaluation of the methods disclosed herein.

A number of substrates and configurations may be used. The devices may be capable of defining multiple individual discrete volumes within the device. As used herein an "individual discrete volume" refers to a discrete space, such as a container, receptacle, or other defined volume or space that can be defined by properties that prevent and/or inhibit migration of target molecules, for example a volume or space defined by physical properties such as walls, for example the walls of a well, tube, or a surface of a droplet, which may be impermeable or semipermeable, or as defined by other means such as chemical, diffusion rate limited, electro-magnetic, or light illumination, or any combination thereof that can contain a a sample within a defined space. Individual discrete volumes may be identified by molecular tags, such as the spatial barcodes as described herein. By "diffusion rate limited" (for example diffusion defined volumes) is meant spaces that are only accessible to certain molecules or reactions because diffusion constraints effectively defining a space or volume as would be the case for two parallel laminar streams where diffusion will limit the migration of a target molecule from one stream to the other. By "chemical" defined volume or space is meant spaces where only certain target molecules can exist because of their chemical or molecular properties, such as size, where for example gel beads may exclude certain species from entering the beads but not others, such as by surface charge, matrix size or other physical property of the bead that can allow selection of species that may enter the interior of the bead. By "electro-magnetically" defined volume or space is meant spaces where the electro-magnetic properties of the target molecules or their supports such as charge or magnetic properties can be used to define certain regions in a space such as capturing magnetic particles within a magnetic field or directly on magnets. By "optically" defined volume is meant any region of space that may be defined by illuminating it with visible, ultraviolet, infrared, or other wavelengths of light such that only target molecules within the defined space or volume may be labeled. One advantage to the use of non-walled, or semipermeable discrete volumes is that some reagents, such as buffers, chemical activators, or other agents may be passed through the discrete volume, while other materials, such as target molecules, may be maintained in the discrete volume or space. Typically, a discrete volume will include a fluid medium, (for example, an aqueous solution, an oil, a buffer, and/or a media capable of supporting cell growth) suitable for labeling of the target molecule with the indexable nucleic acid identifier under conditions that permit labeling. Exemplary discrete volumes or spaces useful in the disclosed methods include droplets (for example, microfluidic droplets and/or emulsion droplets), hydrogel beads or other polymer structures (for example poly-ethylene glycol di-acrylate beads or agarose beads), tissue slides (for example, fixed formalin paraffin embedded tissue slides with particular regions, volumes, or spaces defined by chemical, optical, or physical means), microscope slides with regions defined by depositing reagents in ordered arrays or random patterns, tubes (such as, centrifuge tubes, microcentrifuge tubes, test tubes, cuvettes, conical tubes, and the like), bottles (such as glass bottles, plastic bottles, ceramic bottles, Erlenmeyer flasks, scintillation vials and the like), wells (such as wells in a plate), plates, pipettes, or pipette tips among others. In certain embodiments, the compartment is an aqueous droplet in a water-in-oil emulsion or an oil in water emulsion. In specific embodiments, any of the applications, methods, or systems described herein requiring exact or uniform volumes may employ the use of an acoustic liquid dispenser.

In certain example embodiments, the device comprises a flexible material substrate on which a number of spots may be defined, and can comprise a gel. Within each defined spot, reagents of the system described herein are applied to the individual spots. Each spot may contain the same reagents except for a different capture molecule, or guide RNA or set of guide RNAs in instances where CRISPR systems are utilized, or where applicable, a different detection aptamer to screen for multiple targets at once. The guide molecule may be linked to the spatial barcodes described herein. Thus, the systems and devices herein may be able to screen multiple regions of a sample such as a tissue sample, for the presence of the same target, or a limited number of targets, or for the presence of multiple different targets in the sample.

Droplets

The spatial barcodes can be loaded into droplets. In a preferred embodiment, the oligonucleotide spatial barcodes can be produced in a droplet PCR approach without the use of beads, as described in Redin, et al. Efficient whole genome haplotyping and high-throughput single molecule phasing with barcode-linked reads (2018) doi:10.1101/356121. Droplet formation can be achieved utilizing commercially available devices for droplet generation. One preferred method of droplet generation can be achieved by emulsion droplets formed by simple shaking. Redin, et al. Efficient whole genome haplotyping and high-throughput single molecule phasing with barcode-linked reads (2018) doi:10.1101/356121; Redin et al. Nucl. Acid Res. 45:13 (2017 doi: 10.1093/nar/gkx436, at 'Emulsion Reactions', incorporated herein by reference. Advantageously, the droplet formation approach allows droplet production with use of non-proprietary systems.

Methods for producing droplets of a uniform volume at a regular frequency are well known in the art. One method is to generate droplets using hydrodynamic focusing of a dispersed phase fluid and immiscible carrier fluid, such as disclosed in U.S. Publication No. US 2005/0172476 and International Publication No. WO 2004/002627. It is desirable for one of the species introduced at the confluence to be a pre-made library of droplets where the library contains a plurality of reaction conditions, e.g., a library may contain plurality of different compounds at a range of concentrations encapsulated as separate library elements for screening their effect on cells or enzymes, alternatively a library could be composed of a plurality of different primer pairs encapsulated as different library elements for targeted amplification of a collection of loci, alternatively a library could contain a plurality of different antibody species encapsulated as different library elements to perform a plurality of binding assays. The introduction of a library of reaction conditions onto a substrate is achieved by pushing a premade collection of library droplets out of a vial with a drive fluid. The drive fluid is a continuous fluid. The drive fluid may comprise the same substance as the carrier fluid (e.g., a fluorocarbon oil). For example, if a library consists of ten pico-liter droplets is driven into an inlet channel on a microfluidic substrate with a drive fluid at a rate of 10,000 pico-liters per second, then nominally the frequency at which the droplets are expected to enter the confluence point is 1000 per second. However, in practice droplets pack with oil between them that slowly drains. Over time the carrier fluid drains from the library droplets and the number density of the droplets (number/mL) increases. Hence, a simple fixed rate of infusion for the drive fluid does not provide a uniform rate of introduction of the droplets into the microfluidic channel in the substrate. Moreover, library-to-library variations in the mean library droplet volume result in a shift in the frequency of droplet introduction at the confluence point. Thus, the lack of uniformity of droplets that results from sample variation and oil drainage provides another problem to be solved. For example, if the nominal droplet volume is expected to be 10 pico-liters in the library, but varies from 9 to 11 pico-liters from library-to-library then a 10,000 pico-liter/second infusion rate will nominally produce a range in frequencies from 900 to 1,100 droplet per second. In short, sample to sample variation in the composition of dispersed phase for droplets made on chip, a tendency for the number density of library droplets to increase over time and library-to-library variations in mean droplet volume severely limit the extent to which frequencies of droplets may be reliably matched at a confluence by simply using fixed infusion rates. In addition, these limitations also have an impact on the extent to which volumes may be reproducibly combined. Combined with typical variations in pump flow rate precision and variations in channel dimensions, systems are severely limited without a means to compensate on a run-to-run basis. The foregoing facts not only illustrate a problem to be solved, but also demonstrate a need for a method of instantaneous regulation of microfluidic control over microdroplets within a microfluidic channel. Combinations of surfactant(s) and oils must be developed to facilitate generation, storage, and manipulation of droplets to maintain the unique chemical/biochemical/biological environment within each droplet of a diverse library. Therefore, the surfactant and oil combination must (1) stabilize droplets against uncontrolled coalescence during the drop forming process and subsequent collection and storage, (2) minimize transport of any droplet contents to the oil phase and/or between droplets, and (3) maintain chemical and biological inertness with contents of each droplet (e.g., no adsorption or reaction of encapsulated contents at the oil-water interface, and no adverse effects on biological or chemical constituents in the droplets). In addition to the requirements on the droplet library function and stability, the surfactant-in-oil solution must be coupled with the fluid physics and materials associated with the platform. Specifically, the oil solution must not swell, dissolve, or degrade the materials used to construct the microfluidic chip, and the physical properties of the oil (e.g., viscosity, boiling point, etc.) must be suited for the flow and operating conditions of the platform. Droplets formed in oil without surfactant are not stable to permit coalescence, so surfactants must be dissolved in the oil that is used as the continuous phase for the emulsion library. Surfactant molecules are amphiphilic-part of the molecule is oil soluble, and part of the molecule is water soluble. When a water-oil interface is formed at the nozzle of a microfluidic chip for example in the inlet module described herein, surfactant molecules that are dissolved in the oil phase adsorb to the interface. The hydrophilic portion of the molecule resides inside the droplet and the fluorophilic portion of the molecule decorates the exterior of the droplet. The surface tension of a droplet is reduced when the interface is populated with surfactant, so the stability of an emulsion is improved. In addition to stabilizing the droplets against coalescence, the surfactant should be inert to the contents of each droplet and the surfactant should not promote transport of encapsulated components to the oil or other droplets. A droplet library may be made up of a number of library elements that are pooled together in a single collection (see, e.g., US Patent Publication No. 2010002241). Libraries may vary in complexity from a single library element to 1015 library elements or more. Each library element may be one or more given components at a fixed concentration. The element may be, but is not limited to, cells, organelles, virus, bacteria, yeast, beads, amino acids, proteins, polypeptides, nucleic acids, polynucleotides or small molecule chemical compounds. The element may contain an identifier such as a label. The terms "droplet library" or "droplet libraries" are also referred to herein as an "emulsion library" or "emulsion libraries." These terms are used interchangeably throughout the specification. A cell library element may include, but is not limited to, hybridomas, B-cells, primary cells, cultured cell lines, cancer cells, stem cells, cells obtained from tissue, or any other cell type. Cellular library elements are prepared by encapsulating a number of cells from one to hundreds of thousands in individual droplets. The number of cells encapsulated is usually given by Poisson statistics from the number density of cells and volume of the droplet. However, in some cases the number deviates from Poisson statistics as described in Edd et al., "Controlled encapsulation of single-cells into monodisperse picolitre drops." Lab Chip, 8(8): 1262-1264, 2008. The discrete nature of cells allows for libraries to be prepared in mass with a plurality of cellular variants all present in a single starting media and then that media is broken up into individual droplet capsules that contain at most one cell. These individual droplets capsules are then combined or pooled to form a library consisting of unique library elements. Cell division subsequent to, or in some embodiments following, encapsulation produces a clonal library element. A bead based library element may contain one or more beads, of a given type and may also contain other reagents, such as antibodies, enzymes or other proteins. In the case where all library elements contain different types of beads, but the same surrounding media, the library elements may all be prepared from a single starting fluid or have a variety of starting fluids. In the case of cellular libraries prepared in mass from a collection of variants, such as genomically modified, yeast or bacteria cells, the library elements will be prepared from a variety of starting fluids. Often it is desirable to have exactly one cell per droplet with only a few droplets containing more than one cell when starting with a plurality of cells or yeast or bacteria, engineered to produce variants on a protein. In some cases, variations from Poisson statistics may be achieved to provide an enhanced loading of droplets such that there are more droplets with exactly one cell per droplet and few exceptions of empty droplets or droplets containing more than one cell. Examples of droplet libraries are collections of droplets that have different contents, ranging from beads, cells, small molecules, DNA, primers, antibodies. Smaller droplets may be in the order of femtoliter (fL) volume drops, which are especially contemplated with the droplet dispensors. The volume may range from about 5 to about 600 fL. The larger droplets range in size from roughly 0.5 micron to 500 micron in diameter, which corresponds to about 1 pico liter to 1 nano liter. However, droplets may be as small as 5 microns and as large as 500 microns. Preferably, the droplets are at less than 100 microns, about 1 micron to about 100 microns in diameter. The most preferred size is about 20 to 40 microns in diameter (10 to 100 picoliters). The preferred properties examined of droplet libraries include osmotic pressure balance, uniform size, and size ranges. The droplets within the emulsion libraries of the present invention may be contained within an immiscible oil which may comprise at least one fluorosurfactant. In some embodiments, the fluorosurfactant within the immiscible fluorocarbon oil may be a block copolymer consisting of one or more perfluorinated polyether (PFPE) blocks and one or more polyethylene glycol (PEG) blocks. In other embodiments, the fluorosurfactant is a triblock copolymer consisting of a PEG center block covalently bound to two PFPE blocks by amide linking groups. The presence of the fluorosurfactant (similar to uniform size of the droplets in the library) is critical to maintain the stability and integrity of the droplets and is also essential for the subsequent use of the droplets within the library for the various biological and chemical assays described herein. Fluids (e.g., aqueous fluids, immiscible oils, etc.) and other surfactants that may be utilized in the droplet libraries of the present invention are described in greater detail herein. The present invention can accordingly involve an emulsion library which may comprise a plurality of aqueous droplets within an immiscible oil (e.g., fluorocarbon oil) which may comprise at least one fluorosurfactant, wherein each droplet is uniform in size and may comprise the same aqueous fluid and may comprise a different library element. The present invention also provides a method for forming the emulsion library which may comprise providing a single aqueous fluid which may comprise different library elements, encapsulating each library element into an aqueous droplet within an immiscible fluorocarbon oil which may comprise at least one fluorosurfactant, wherein each droplet is uniform in size and may comprise the same aqueous fluid and may comprise a different library element, and pooling the aqueous droplets within an immiscible fluorocarbon oil which may comprise at least one fluorosurfactant, thereby forming an emulsion library. For example, in one type of emulsion library, all different types of elements (e.g., cells or beads), may be pooled in a single source contained in the same medium. After the initial pooling, the cells or beads are then encapsulated in droplets to generate a library of droplets wherein each droplet with a different type of bead or cell is a different library element. The dilution of the initial solution enables the encapsulation process. In some embodiments, the droplets formed will either contain a single cell or bead or will not contain anything, i.e., be empty. In other embodiments, the droplets formed will contain multiple copies of a library element. The cells or beads being encapsulated are generally variants on the same type of cell or bead. In another example, the emulsion library may comprise a plurality of aqueous droplets within an immiscible fluorocarbon oil, wherein a single molecule may be encapsulated, such that there is a single molecule contained within a droplet for every 20-60 droplets produced (e.g., 20, 25, 30, 35, 40, 45, 50, 55, 60 droplets, or any integer in between). Single molecules may be encapsulated by diluting the solution containing the molecules to such a low concentration that the encapsulation of single molecules is enabled. Formation of these libraries may rely on limiting dilutions.

The present invention also provides an emulsion library which may comprise at least a first aqueous droplet and at least a second aqueous droplet within an oil, in one embodiment a fluorocarbon oil, which may comprise at least one surfactant, in one embodiment a fluorosurfactant, wherein the at least first and the at least second droplets are uniform in size and comprise a different aqueous fluid and a different library element. The present invention also provides a method for forming the emulsion library which may comprise providing at least a first aqueous fluid which may comprise at least a first library of elements, providing at least a second aqueous fluid which may comprise at least a second library of elements, encapsulating each element of said at least first library into at least a first aqueous droplet within an immiscible fluorocarbon oil which may comprise at least one fluorosurfactant, encapsulating each element of said at least second library into at least a second aqueous droplet within an immiscible fluorocarbon oil which may comprise at least one fluorosurfactant, wherein the at least first and the at least second droplets are uniform in size and may comprise a different aqueous fluid and a different library element, and pooling the at least first aqueous droplet and the at least second aqueous droplet within an immiscible fluorocarbon oil which may comprise at least one fluorosurfactant thereby forming an emulsion library. One of skill in the art will recognize that methods and systems of the invention need not be limited to any particular type of sample, and methods and systems of the invention may be used with any type of organic, inorganic, or biological molecule (see, e.g, US Patent Publication No. 20120122714).

Capture Molecule

Capture molecules include molecules such as ligands, receptors, aptamers, DNA segments, enzymes, antigens, antibodies, tailored for the molecules of interest. In embodiments, the capture molecule comprises a sequence specific for a target molecule of interest, a sequence specific for capture of an SNP, sequence specific for drug resistance or cancer markers, a Tn5 sequence, a 16S sequence, a poly(d)T sequence, a random hexamer sequence, a trypsin molecule, an antibody, a Protein Epitope Signature Tag (PrEST) sequence, or a combination thereof.

In embodiments, the spatial barcodes further comprise a capture molecule or moiety. The spatial barcodes can also comprise one or more of a ligation sequence, a priming sequence, and a unique sequence. In particular embodiments, one or more guide RNAs, or one or more CRISPR systems comprising a guide polynucleotide and a nucleotide sequence encoding a Cas protein or can be appended or linked to the spatial barcodes. Advantageously, the oligonucleotides can be of any desired length, including lengths of 10 to about 400 nucleotides. A ligation sequence is a sequence complementary to a second nucleotide sequence which allows for ligation of the spatial barcode to another entity comprising the second nucleotide sequence, e.g., another detectable oligonucleotide tag or an oligonucleotide adapter. A priming sequence is a sequence complementary to a primer, e.g., an oligonucleotide primer used for an amplification reaction such as but not limited to PCR.

The capture molecule can comprise any other entity capable of binding to the capture sequence, e.g. an antibody or peptide. An index sequence is a sequence comprising a unique nucleotide sequence and/or a detectable moiety as described above. A capture entity can therefore be any molecule capable of attaching and/or binding to a nucleic acid (i.e., for example, a barcode nucleic acid). For example, a capture molecule may be an oligonucleotide attached to a bead, wherein the oligonucleotide is at least partially complementary to another oligonucleotide. A capture probe may comprise a polyethylene glycol linker, an antibody, a polyclonal antibody, a monoclonal antibody, a Fab fragment, a biological receptor complex, an enzyme, a hormone, an antigen, and/or a fragment or portion thereof. The capture probe can further comprise additional adaptors for use in further processing, for example a flow cell sequence for use with flow cell technologies such as those manufactured by Illumina.

Decoding

While in some embodiments, the spatial barcodes are known at the time of deposition, in other instances decoding of the spatial barcode is necessary. As an example, the spatial barcodes of each location can be known at the step of depositing because conductivity-coded beads are specific to pre-etched wells of the substrate, and the wells accept only a bead of a specific charge. In this instance, the pre-etched wells provide an x,y coordinate. In other instances, the spatial barcode may need a step of decoding the barcode deposited. One example of decoding may arise when the spatial barcode comprises an oligonucleotide sequence that requires sequencing.

The step of decoding can comprise sequential hybridization, in-situ sequencing, laser scanning of color-coded, beads, DNA microscopy, camera systems for color-coded beads, and other imaging systems as needed. Decoding may also comprise Voronoi tessellation and sequence similarity. For example, if using FACS, FACS would decode the spatial barcode carried based on the color scheme of the bead, and further use of a camera system can track the location where each bead is deposited on the solid substrate. Sequential hybridization techniques such as Illumina, seqFISH or MERFISH technologies can be utilized for decoding the spatial barcodes.

Depositing the Sample and Capturing Material of Interest

Depositing the sample can, in some embodiments include fixation of the sample to the solid substrate. In embodiments, the sample is tissue, which in embodiments is living. Living tissue can include use of processes as described in Nat Methods. 2014 February; 11(2):190-196 doi: 10.1038/nmeth.2804 to maintain the tissue as living.

In some cases, the cells, organelle, and/or nuclei may be permeabilized to allow access for nucleic acid processing reagents. The permeabilization may be performed in a way to minimally perturb the cells, organelles, and/or nuclei. In embodiments, permeabilization steps, including pre-permeabilization are automated. In some instances, the cells may be permeabilized using a permeabilization agent. Examples of permeabilization agents include NP40, digitonin, tween, streptolysin, exonuclease 1 buffer (NEB) and pepsin, and cationic lipids. In other instances, the cells, organelles, and/or nuclei may be permeabilized using hypotonic shock and/or ultrasonication. In other cases, the nucleic acid processing reagents e.g., enzymes such as insertional enzyme, may be highly charged, which may allow them to permeabilize through the membranes of the cells, organelles, or nuclei. In certain examples, the methods include permeabilizing nuclei. Other embodiments include use of cell penetrating peptides to deliver cargo to the cell and allow capture of material.

Tissue can be reduced in size using methods as discussed, for example in Nature Methods volume 13, pages 859-867 (2016), which provides preservation of intact organ tissue while reducing size by over 50%, incorporated herein by reference.

Capture of material will depend on the type of capture molecule used as well as permeabilization technique. In some embodiments, the capture material is a nucleic acid. In some embodiments, the permeabilization of the tissue allows for release of contents of target molecules of interest that are captured by the capture moiety. In embodiments, the process is as described in Stahl et al. (22), incorporated herein by reference.

Correlating Captured Material to a Position in the Sample on the Solid Substrate Correlating the captured material to a position in the sample on the solid substrate may include decoding the spatial barcode, as described herein. The spatial barcode provides information for the position of the captured material on the solid substrate. Correlating the position in the sample on the solid substrate can also include use of the spatial barcode as the x,y coordinates as well as use of additional information for z coordinate, which indicates location in the volume of the sample on the solid substrate. In embodiments, the z coordinate is identified by staining the sample. In other embodiments, the z coordinate is identified using a CRISPR system comprising different guide molecules. Regardless of the method used to designate the z coordinate, correlation of the z coordinate and the x,y coordinate encoded by the spatial barcode is performed.

In embodiments, the sample is stained and an image is captured of the sample. In embodiments, the morphology of the stained sample is recorded by the image, and further annotating of regions of the stained sample is performed. In embodiments, the image is assigned pixel coordinates that correspond to the centroids of each x,y area of the solid substrate. The pixel coordinates of the image can then be correlated to the x,y coordinates of a location on the solid substrate. The number of pixels assigned to the images can correlate in some instances to the centroids of each microwell on an array, or to the center of each spot or dot on a nanodot array. Accordingly, a higher number of spots spaced more closely together will result in a higher number of pixels assigned to an image, and a higher density analysis of the sample.

Assigning a Cell Type or Subtype

Assigning a cell type to a cell subpopulation in the sample can be based on evaluation of the capture molecules at a particular position on the solid substrate. Cell surface molecules, differential gene expression signatures, and presence or absence of moieties can be utilized in assigning a cell type to a cell in the sample.

Cell type assignments can include correlating gene expression between one or more replicates of measured data and bulk RNA sequencing data. Numbers of shared or present genes can be evaluated between the datasets. Proteome sensing can be performed simultaneously with transcriptome evaluation. The integration of the output from automated imaging of stained tissues or cells with the output of gene-by-barcode expression can provide an output for assigning cell type or subtype.

In embodiments, generating cell type-specific gene signatures includes correlating gene expression levels or protein expression levels to cell type prediction scores, and then considering the most highly correlated genes. In embodiments, assigning a cell type or cell subtype includes the automated processing of imaging, single-cell sequencing, and/or proteome, transcriptome or spatial information to assign cell types and subtypes.

Single Cell Sequencing

The methods herein may further include sequencing one or more nucleic acids processed by the steps herein. For example, after barcoded and isolated, the genomic DNA, cDNA, the barcode sequence(s), and a portion thereof, may be sequenced. One or more steps of in situ sequencing can be automated, as detailed elsewhere herein, including in Example 3.

In some cases, the sequencing may be next generation sequencing. The terms "next-generation sequencing" or "high-throughput sequencing" refer to the so-called parallelized sequencing-by-synthesis or sequencing-by-ligation platforms currently employed by Illumina, Life Technologies, and Roche, etc. Next-generation sequencing methods may also include nanopore sequencing methods or electronic-detection based methods such as Ion Torrent technology commercialized by Life Technologies or single-molecule fluorescence-based method commercialized by Pacific Biosciences. Any method of sequencing known in the art can be used before and after isolation. In certain embodiments, a sequencing library is generated and sequenced.

At least a part of the processed nucleic acids and/or barcodes attached thereto may be sequenced to produce a plurality of sequence reads. The fragments may be sequenced using any convenient method. For example, the fragments may be sequenced using Illumina's reversible terminator method, Roche's pyrosequencing method (454), Life Technologies' sequencing by ligation (the SOLiD platform) or Life Technologies' Ion Torrent platform. Examples of such methods are described in the following references: Margulies et al (Nature 2005 437: 376-80); Ronaghi et al (Analytical Biochemistry 1996 242: 84-9); Shendure et al (Science 2005 309: 1728-32); Imelfort et al (Brief Bioinform. 2009 10:609-18); Fox et al (Methods Mol Biol. 2009; 553:79-108); Appleby et al (Methods Mol Biol. 2009; 513: 19-39) and Morozova et al (Genomics. 2008 92:255-64), which are incorporated by reference for the general descriptions of the methods and the particular steps of the methods, including all starting products, methods for library preparation, reagents, and final products for each of the steps. As would be apparent, forward and reverse sequencing primer sites that are compatible with a selected next generation sequencing platform can be added to the ends of the fragments during the amplification step. In certain embodiments, the fragments may be amplified using PCR primers that hybridize to the tags that have been added to the fragments, where the primer used for PCR have 5' tails that are compatible with a particular sequencing platform. In certain cases, the primers used may contain a molecular barcode (an "index") so that different pools can be pooled together before sequencing, and the sequence reads can be traced to a particular sample using the barcode sequence.

In some cases, the sequencing may be performed at certain "depth." The terms "depth" or "coverage" as used herein refers to the number of times a nucleotide is read during the sequencing process. In regards to single cell RNA sequencing, "depth" or "coverage" as used herein refers to the number of mapped reads per cell. Depth in regards to genome sequencing may be calculated from the length of the original genome (G), the number of reads (N), and the average read length (L) as N×L/G. For example, a hypothetical genome with 2,000 base pairs reconstructed from 8 reads with an average length of 500 nucleotides will have 2× redundancy.

In some cases, the sequencing herein may be low-pass sequencing. The terms "low-pass sequencing" or "shallow sequencing" as used herein refers to a wide range of depths greater than or equal to 0.1× up to 1×. Shallow sequencing may also refer to about 5000 reads per cell (e.g., 1,000 to 10,000 reads per cell).

In some cases, the sequencing herein may deep sequencing or ultra-deep sequencing. The term "deep sequencing" as used herein indicates that the total number of reads is many times larger than the length of the sequence under study. The term "deep" as used herein refers to a wide range of depths greater than 1× up to 100×. Deep sequencing may also refer to 100× coverage as compared to shallow sequencing (e.g., 100,000 to 1,000,000 reads per cell). The term "ultra-deep" as used herein refers to higher coverage (>100-fold), which allows for detection of sequence variants in mixed populations.

Multiple technologies have been described that massively parallelize the generation of single cell RNA seq libraries that can be used in the present disclosure. As used herein, RNA-seq methods refer to high-throughput single-cell RNA-sequencing protocols. RNA-seq includes, but is not limited to, Drop-seq, Seq-Well, InDrop and 1Cell Bio. RNA-seq methods also include, but are not limited to, smart-seq2, TruSeq, CEL-Seq, STRT, ChIRP-Seq, GRO-Seq, CLIP-Seq, Quartz-Seq, or any other similar method known in the art (see, e.g., "Sequencing Methods Review" Illumina® Technology, Sequencing Methods Review available at illumina.com.

In certain embodiments, the invention involves high-throughput single-cell RNA-seq and/or targeted nucleic acid profiling (for example, sequencing, quantitative reverse transcription polymerase chain reaction, and the like) where the RNAs from different cells are tagged individually, allowing a single library to be created while retaining the cell identity of each read. In this regard reference is made to Macosko et al., 2015, "Highly Parallel Genome-wide Expression Profiling of Individual Cells Using Nanoliter Droplets" Cell 161, 1202-1214; International patent application number PCT/US2015/049178, published as WO2016/040476 on Mar. 17, 2016; Klein et al., 2015, "Droplet Barcoding for Single-Cell Transcriptomics Applied to Embryonic Stem Cells" Cell 161, 1187-1201; International patent application number PCT/US2016/027734, published as WO2016168584A1 on Oct. 20, 2016; Zheng, et al., 2016, "Haplotyping germline and cancer genomes with high-throughput linked-read sequencing" Nature Biotechnology 34, 303-311; Zheng, et al., 2017, "Massively parallel digital transcriptional profiling of single cells" Nat. Commun. 8, 14049 doi: 10.1038/ncomms14049; International patent publication number WO2014210353A2; Zilionis, et al., 2017, "Single-cell barcoding and sequencing using droplet microfluidics" Nat Protoc. January; 12(1):44-73; Cao et al., 2017, "Comprehensive single cell transcriptional profiling of a multicellular organism by combinatorial indexing" bioRxiv preprint first posted online Feb. 2, 2017, doi: dx.doi.org/10.1101/104844; Rosenberg et al., 2017, "Scaling single cell transcriptomics through split pool barcoding" bioRxiv preprint first posted online Feb. 2, 2017, doi: dx.doi.org/10.1101/105163; Vitak, et al., "Sequencing thousands of single-cell genomes with combinatorial indexing" Nature Methods, 14(3):302-308, 2017; Cao, et al., Comprehensive single-cell transcriptional profiling of a multicellular organism. Science, 357(6352):661-667, 2017; and Gierahn et al., "Seq-Well: portable, low-cost RNA sequencing of single cells at high throughput" Nature Methods 14, 395-398 (2017), all the contents and disclosure of each of which are herein incorporated by reference in their entirety.

In certain embodiments, the invention involves single nucleus RNA sequencing. In this regard reference is made to Swiech et al., 2014, "In vivo interrogation of gene function in the mammalian brain using CRISPR-Cas9" Nature Biotechnology Vol. 33, pp. 102-106; Habib et al., 2016, "Div-Seq: Single-nucleus RNA-Seq reveals dynamics of rare adult newborn neurons" Science, Vol. 353, Issue 6302, pp. 925-928; Habib et al., 2017, "Massively parallel single-nucleus RNA-seq with DroNc-seq" Nat Methods. 2017 October; 14(10):955-958; and International patent application number PCT/US2016/059239, published as WO2017164936 on Sep. 28, 2017, which are herein incorporated by reference in their entirety.

The term "tagmentation" refers to a step in the Assay for Transposase Accessible Chromatin using sequencing (ATAC-seq) as described. (See, Buenrostro, J. D., Giresi, P. G., Zaba, L. C., Chang, H. Y., Greenleaf, W. J., Transposition of native chromatin for fast and sensitive epigenomic profiling of open chromatin, DNA-binding proteins and nucleosome position. Nature methods 2013; 10 (12): 1213-1218). Specifically, a hyperactive Tn5 transposase loaded in vitro with adapters for high-throughput DNA sequencing, can simultaneously fragment and tag a genome with sequencing adapters. In one embodiment the adapters are compatible with the methods described herein.

In certain embodiments, tagmentation is used to introduce adaptor sequences to genomic DNA in regions of accessible chromatin (e.g., between individual nucleosomes) (see, e.g., US20160208323A1; US20160060691A1; WO2017156336A1; and Cusanovich, D. A., Daza, R., Adey, A., Pliner, H., Christiansen, L., Gunderson, K. L., Steemers, F. J., Trapnell, C. & Shendure, J. Multiplex single-cell profiling of chromatin accessibility by combinatorial cellular indexing. Science. 2015 May 22; 348(6237):910-4. doi: 10.1126/science.aab1601. Epub 2015 May 7). In certain embodiments, tagmentation is applied to bulk samples or to single cells in discrete volumes.

In certain embodiments, the invention involves plate based single cell RNA sequencing (see, e.g., Picelli, S. et al., 2014, "Full-length RNA-seq from single cells using Smart-seq2" Nature protocols 9, 171-181, doi:10.1038/nprot.2014.006).

Drop-sequence methods or Drop-seq are contemplated for the present invention. Cells come in different types, subtypes and activity states, which are classify based on their shape, location, function, or molecular profiles, such as the set of RNAs that they express. RNA profiling is in principle particularly informative, as cells express thousands of different RNAs. Approaches that measure for example the level of every type of RNA have until recently been applied to "homogenized" samples—in which the contents of all the cells are mixed together. Methods to profile the RNA content of tens and hundreds of thousands of individual human cells have been recently developed, including from brain tissues, quickly and inexpensively. To do so, special microfluidic devices have been developed to encapsulate each cell in an individual drop, associate the RNA of each cell with a barcode unique to that cell/drop, measure the expression level of each RNA with sequencing, and then use the cell barcodes to determine which cell each RNA molecule came from. See, e.g., methods of Macosko et al., 2015, Cell 161, 1202-1214 and Klein et al., 2015, Cell 161, 1187-1201 are contemplated for the present invention.

In certain embodiments, the invention involves high-throughput single-cell RNA-seq and/or targeted nucleic acid profiling (for example, sequencing, quantitative reverse transcription polymerase chain reaction, and the like) where the RNAs from different cells are tagged individually, allowing a single library to be created while retaining the cell identity of each read. In this regard reference is made to Macosko et al., 2015, "Highly Parallel Genome-wide Expression Profiling of Individual Cells Using Nanoliter Droplets" Cell 161, 1202-1214; International patent application number PCT/US2015/049178, published as WO2016/040476 on Mar. 17, 2016; Klein et al., 2015, "Droplet Barcoding for Single-Cell Transcriptomics Applied to Embryonic Stem Cells" Cell 161, 1187-1201; International patent application number PCT/US2016/027734, published as WO2016168584A1 on Oct. 20, 2016; Zheng, et al., 2016, "Haplotyping germline and cancer genomes with high-throughput linked-read sequencing" Nature Biotechnology 34, 303-311; Zheng, et al., 2017, "Massively parallel digital transcriptional profiling of single cells" Nat. Commun. 8, 14049 doi: 10.1038/ncomms14049; International patent publication number WO2014210353A2; Zilionis, et al., 2017, "Single-cell barcoding and sequencing using droplet microfluidics" Nat Protoc. January; 12(1):44-73; Cao et al., 2017, "Comprehensive single cell transcriptional profiling of a multicellular organism by combinatorial indexing" bioRxiv preprint first posted online Feb. 2, 2017, doi: dx.doi.org/10.1101/104844; Rosenberg et al., 2017, "Scaling single cell transcriptomics through split pool barcoding" bioRxiv preprint first posted online Feb. 2, 2017, doi: dx.doi.org/10.1101/105163; Vitak, et al., "Sequencing thousands of single-cell genomes with combinatorial indexing" Nature Methods, 14(3):302-308, 2017; Cao, et al., Comprehensive single-cell transcriptional profiling of a multicellular organism. Science, 357(6352):661-667, 2017; and Gierahn et al., "Seq-Well: portable, low-cost RNA sequencing of single cells at high throughput" Nature Methods 14, 395-398 (2017), all the contents and disclosure of each of which are herein incorporated by reference in their entirety.

In certain embodiments, the invention involves single nucleus RNA sequencing. In this regard reference is made to Swiech et al., 2014, "In vivo interrogation of gene function in the mammalian brain using CRISPR-Cas9" Nature Biotechnology Vol. 33, pp. 102-106; Habib et al., 2016, "Div-Seq: Single-nucleus RNA-Seq reveals dynamics of rare adult newborn neurons" Science, Vol. 353, Issue 6302, pp. 925-928; Habib et al., 2017, "Massively parallel single-nucleus RNA-seq with DroNc-seq" Nat Methods. 2017 October; 14(10):955-958; and International patent application number PCT/US2016/059239, published as WO2017164936 on Sep. 28, 2017, which are herein incorporated by reference in their entirety.

Microfluidics involves micro-scale devices that handle small volumes of fluids. Because microfluidics may accurately and reproducibly control and dispense small fluid volumes, in particular volumes less than 1 µl, application of microfluidics provides significant cost-savings. The use of microfluidics technology reduces cycle times, shortens time-to-results, and increases throughput. Furthermore, incorporation of microfluidics technology enhances system integration and automation. Microfluidic reactions are generally conducted in microdroplets or microwells. The ability to conduct reactions in microdroplets depends on being able to merge different sample fluids and different microdroplets. See, e.g., US Patent Publication No. 20120219947. See also international patent application serial no. PCT/US2014/058637 for disclosure regarding a microfluidic laboratory on a chip.

Droplet/microwell microfluidics offers significant advantages for performing high-throughput screens and sensitive assays. Droplets allow sample volumes to be significantly reduced, leading to concomitant reductions in cost. Manipulation and measurement at kilohertz speeds enable up to 108 discrete biological entities (including, but not limited to, individual cells or organelles) to be screened in a single day. Compartmentalization in droplets increases assay sensitivity by increasing the effective concentration of rare species and decreasing the time required to reach detection thresholds. Droplet microfluidics combines these powerful features to enable currently inaccessible high-throughput screening applications, including single-cell and single-molecule assays. See, e.g., Guo et al., Lab Chip, 2012, 12, 2146-2155.

Drop-Sequence methods and apparatus provides a high-throughput single-cell RNA-Seq and/or targeted nucleic acid profiling (for example, sequencing, quantitative reverse transcription polymerase chain reaction, and the like) where the RNAs from different cells are tagged individually, allowing a single library to be created while retaining the cell identity of each read. A combination of molecular barcoding and emulsion-based microfluidics to isolate, lyse, barcode, and prepare nucleic acids from individual cells in high-throughput is used. Microfluidic devices (for example, fabricated in polydimethylsiloxane), sub-nanoliter reverse emulsion droplets. These droplets are used to co-encapsulate nucleic acids with a barcoded capture bead. Each bead, for example, is uniquely barcoded so that each drop and its contents are distinguishable. The nucleic acids may come from any source known in the art, such as for example, those which come from a single cell, a pair of cells, a cellular lysate, or a solution. The cell is lysed as it is encapsulated in the droplet. To load single cells and barcoded beads into these droplets with Poisson statistics, 100,000 to 10 million such beads are needed to barcode 10,000-100,000 cells.

InDrop™, also known as in-drop seq, involves a high-throughput droplet-microfluidic approach for barcoding the RNA from thousands of individual cells for subsequent analysis by next-generation sequencing (see, e.g., Klein et al., Cell 161(5), pp 1187-1201, 21 May 2015). Specifically, in in-drop seq, one may use a high diversity library of barcoded primers to uniquely tag all DNA that originated from the same single cell. Alternatively, one may perform all steps in drop.

Well-based biological analysis or Seq-Well is also contemplated for the present invention. The well-based biological analysis platform, also referred to as Seq-well, facilitates the creation of barcoded single-cell sequencing libraries from thousands of single cells using a device that contains 100,000 40-micron wells. Importantly, single beads can be loaded into each microwell with a low frequency of duplicates due to size exclusion (average bead diameter 35 µm). By using a microwell array, loading efficiency is greatly increased compared to drop-seq, which requires poisson loading of beads to avoid duplication at the expense of increased cell input requirements. Seq-well, however, is capable of capturing nearly 100% of cells applied to the surface of the device.

Seq-well is a methodology which allows attachment of a porous membrane to a container in conditions which are benign to living cells. Combined with arrays of picoliter-scale volume containers made, for example, in PDMS, the platform provides the creation of hundreds of thousands of isolated dialysis chambers which can be used for many different applications. The platform also provides single cell lysis procedures for single cell RNA-seq, whole genome amplification or proteome capture; highly multiplexed single cell nucleic acid preparation (~100× increase over current approaches); highly parallel growth of clonal bacterial populations thus providing synthetic biology applications as well as basic recombinant protein expression; selection of bacterial that have increased secretion of a recombinant product possible product could also be small molecule metabolite which could have considerable utility in chemical industry and biofuels; retention of cells during multiple microengraving events; long term capture of secreted products from single cells; and screening of cellular events. Principles of the present methodology allow for addition and subtraction of materials from the containers, which has not previously been available on the present scale in other modalities.

Seq-Well also enables stable attachment (through multiple established chemistries) of porous membranes to PDMS nanowell devices in conditions that do not affect cells. Based on requirements for downstream assays, amines are functionalized to the PDMS device and oxidized to the membrane with plasma. With regard to general cell culture uses, the PDMS is amine functionalized by air plasma treatment followed by submersion in an aqueous solution of poly (lysine) followed by baking at 80° C. For processes that require robust denaturing conditions, the amine must be covalently linked to the surface. This is accomplished by treating the PDMS with air plasma, followed by submersion in an ethanol solution of amine-silane, followed by baking at 80° C., followed by submersion in 0.2% phenylene diisothiocyanate (PDITC) DMF/pyridine solution, followed by baking, followed by submersion in chitosan or poly (lysine) solution. For functionalization of the membrane for protein capture, membrane can be amine-silanized using vapor deposition and then treated in solution with NHS-biotin or NHS-maleimide to turn the amine groups into the crosslinking species.

After functionalization, the device is loaded with cells (bacterial, mammalian or yeast) in compatible buffers. The cell-laden device is then brought in contact with the functionalized membrane using a clamping device. A plain glass slide is placed on top of the membrane in the clamp to provide force for bringing the two surfaces together. After an hour incubation, as one hour is a preferred time span, the clamp is opened and the glass slide is removed. The device can then be submerged in any aqueous buffer for days without the membrane detaching, enabling repetitive measurements of the cells without any cell loss. The covalently-linked membrane is stable in many harsh buffers including guanidine hydrochloride which can be used to robustly lyse cells. If the pore size of the membrane is small, the products from the lysed cells will be retained in each well. The lysing buffer can be washed out and replaced with a different buffer which allows binding of biomolecules to probes preloaded in the wells. The membrane can then be removed, enabling addition of enzymes to reverse transcribe or amplify nucleic acids captured in the wells after lysis. Importantly, the chemistry enables removal of one membrane and replacement with a membrane with a different pore size to enable integration of multiple activities on the same array.

As discussed, while the platform has been optimized for the generation of individually barcoded single-cell sequencing libraries following confinement of cells and mRNA capture beads (Macosko, et al. Cell. 2015 May 21; 161(5): 1202-1214), it is capable of multiple levels of data acquisition. The platform is compatible with other assays and measurements performed with the same array. For example, profiling of human antibody responses by integrated single-cell analysis is discussed with regard to measuring levels of cell surface proteins (Ogunniyi, A. O., B. A. Thomas, T. J. Politano, N. Varadarajan, E. Landais, P. Poignard, B. D. Walker, D. S. Kwon, and J. C. Love, "Profiling Human Antibody Responses by Integrated Single-Cell Analysis" Vaccine, 32(24), 2866-2873.) The authors demonstrate a complete characterization of the antigen-specific B cells induced during infections or following vaccination, which enables and informs one of skill in the art how interventions shape protective humoral responses. Specifically, this disclosure combines single-cell profiling with on-chip image cytometry, microengraving, and single-cell RT-PCR. Similarly, upon release of barcoded nucleic acids from other applications, such barcoded molecules can be processed and used as libraries in the sequencing methods as disclosed herein.

Use of Signature Genes

As used herein a "signature" may encompass any gene or genes, protein or proteins, or epigenetic element(s) whose expression profile or whose occurrence is associated with a specific cell type, subtype, or cell state of a specific cell type or subtype within a population of cells. For ease of discussion, when discussing gene expression, any of gene or genes, protein or proteins, or epigenetic element(s) may be substituted. As used herein, the terms "signature", "expression profile", or "expression program" may be used interchangeably. It is to be understood that also when referring to proteins (e.g. differentially expressed proteins), such may fall within the definition of "gene" signature. Levels of expression or activity or prevalence may be compared between different cells in order to characterize or identify for instance signatures specific for cell (sub)populations. Increased or decreased expression or activity or prevalence of signature genes may be compared between different cells in order to characterize or identify for instance specific cell (sub)populations. The detection of a signature in single cells may be used to identify and quantitate for instance specific cell (sub)populations. A signature may include a gene or genes, protein or proteins, or epigenetic element(s) whose expression or occurrence is specific to a cell (sub)population, such that expression or occurrence is exclusive to the cell (sub)population. A gene signature as used herein, may thus refer to any set of up- and down-regulated genes that are representative of a cell type or subtype. A gene signature as used herein, may also refer to any set of up- and down-regulated genes between different cells or cell (sub)populations derived from a gene-expression profile. For example, a gene signature may comprise a list of genes differentially expressed in a distinction of interest.

The signature as defined herein (being it a gene signature, protein signature or other genetic or epigenetic signature) can be used to indicate the presence of a cell type, a subtype of the cell type, the state of the microenvironment of a population of cells, a particular cell type population or subpopulation, and/or the overall status of the entire cell (sub)population. Furthermore, the signature may be indicative of cells within a population of cells in vivo. The signature may also be used to suggest for instance particular therapies, or to follow up treatment, or to suggest ways to modulate immune systems. The signatures of the present invention may be discovered by analysis of expression profiles of single-cells within a population of cells from isolated samples (e.g. blood samples), thus allowing the discovery of novel cell subtypes or cell states that were previously invisible or unrecognized. The presence of subtypes or cell states may be determined by subtype specific or cell state specific signatures. The presence of these specific cell (sub)types or cell states may be determined by applying the signature genes to bulk sequencing data in a sample. Not being bound by a theory the signatures of the present invention may be microenvironment specific, such as their expression in a particular spatio-temporal context. Not being bound by a theory, signatures as discussed herein are specific to a particular pathological context. Not being bound by a theory, a combination of cell subtypes having a particular signature may indicate an outcome. Not being bound by a theory, the signatures can be used to deconvolute the network of cells present in a particular pathological condition. Not being bound by a theory the presence of specific cells and cell subtypes are indicative of a particular response to treatment, such as including increased or decreased susceptibility to treatment. The signature may indicate the presence of one particular cell type. In one embodiment, the novel signatures are used to detect multiple cell states or hierarchies that occur in subpopulations of cancer cells that are linked to particular pathological condition (e.g. cancer grade), or linked to a particular outcome or progression of the disease, or linked to a particular response to treatment of the disease.

The signature according to certain embodiments of the present invention may comprise or consist of one or more genes, proteins and/or epigenetic elements, such as for instance 1, 2, 3, 4, 5, 6, 7, 8, 9, 10 or more. In certain embodiments, the signature may comprise or consist of two or more genes, proteins and/or epigenetic elements, such as for instance 2, 3, 4, 5, 6, 7, 8, 9, 10 or more. In certain embodiments, the signature may comprise or consist of three or more genes, proteins and/or epigenetic elements, such as for instance 3, 4, 5, 6, 7, 8, 9, 10 or more. In certain embodiments, the signature may comprise or consist of four or more genes, proteins and/or epigenetic elements, such as for instance 4, 5, 6, 7, 8, 9, 10 or more. In certain embodiments, the signature may comprise or consist of five or more genes, proteins and/or epigenetic elements, such as for instance 5, 6, 7, 8, 9, 10 or more. In certain embodiments, the signature may comprise or consist of six or more genes, proteins and/or epigenetic elements, such as for instance 6, 7, 8, 9, 10 or more. In certain embodiments, the signature may comprise or consist of seven or more genes, proteins and/or epigenetic elements, such as for instance 7, 8, 9, 10 or more. In certain embodiments, the signature may comprise or consist of eight or more genes, proteins and/or epigenetic elements, such as for instance 8, 9, 10 or more. In certain embodiments, the signature may comprise or consist of nine or more genes, proteins and/or epigenetic elements, such as for instance 9, 10 or more. In certain embodiments, the signature may comprise or consist of ten or more genes, proteins and/or epigenetic elements, such as for instance 10, 11, 12, 13, 14, 15, or more. It is to be understood that a signature according to the invention may for instance also include genes or proteins as well as epigenetic elements combined.

In certain embodiments, a signature is characterized as being specific for a particular tissue cell or tissue cell (sub)population or subcellular population if it is upregulated or only present, detected or detectable in that particular tissue cell, cell (sub)population, or subcellular population or alternatively is downregulated or only absent, or undetectable in that particular tissue cell or tissue cell (sub)population or subcellular population. In this context, a signature consists of one or more differentially expressed genes/proteins or differential epigenetic elements when comparing different cells or cell (sub)populations or subcellular populations, including comparing different tumor cells or tumor cell (sub)populations or tumor subcellular populations, as well as comparing tissue cells or tissue cell (sub)populations with other tissue types or tissue cell (sub)populations or subcellular populations, or tumor cells or tumor cell (sub) populations with non-tumor cells or non-tumor cell (sub) populations or non-tumor subcellular populations. It is to be understood that "differentially expressed" genes/proteins include genes/proteins which are up- or down-regulated as well as genes/proteins which are turned on or off. When referring to up- or down-regulation, in certain embodiments, such up- or down-regulation is preferably at least two-fold, such as two-fold, three-fold, four-fold, five-fold, or more, such as for instance at least ten-fold, at least 20-fold, at least 30-fold, at least 40-fold, at least 50-fold, or more. Alternatively, or in addition, differential expression may be determined based on common statistical tests, as is known in the art. In particular embodiments, genes with an expression fold change greater than 1.5 are utilized for analysis.

As discussed herein, differentially expressed genes/proteins, or differential epigenetic elements may be differentially expressed on a single cell level, or may be differentially expressed on a cell population level. Preferably, the differentially expressed genes/proteins or epigenetic elements as discussed herein, such as constituting the gene signatures as discussed herein, when as to the cell population level, refer to genes that are differentially expressed in all or substantially all cells of the population (such as at least 80%, preferably at least 90%, such as at least 95% of the individual cells). This allows one to define a particular subpopulation of tissue cells. As referred to herein, a "subpopulation" of cells preferably refers to a particular subset of cells of a particular cell type which can be distinguished or are uniquely identifiable and set apart from other cells of this cell type. The cell subpopulation may be phenotypically characterized, and is preferably characterized by the signature as discussed herein. A cell (sub)population as referred to herein may constitute of a (sub)population of cells of a particular cell type characterized by a specific cell state. A subcellular population includes one or more of the structures within a cell, subcellular organisms or organelles, including Golgi apparatus, smooth+rough endoplasmic reticulum, nucleus and mitochondria.

When referring to induction, or alternatively suppression of a particular signature, preferable is meant induction or alternatively suppression (or upregulation or downregulation) of at least one gene/protein and/or epigenetic element of the signature, such as for instance at least to, at least three, at least four, at least five, at least six, or all genes/proteins and/or epigenetic elements of the signature.

Signatures may be functionally validated as being uniquely associated with a particular immune responder phenotype. Induction or suppression of a particular signature may consequentially be associated with or causally drive a particular immune responder phenotype.

Various aspects and embodiments of the invention may involve analyzing gene signatures, protein signature, and/or other genetic or epigenetic signature based on single cell analyses (e.g. single cell RNA sequencing) or alternatively based on cell population analyses, as is defined herein elsewhere.

In further aspects, the invention relates to gene signatures, protein signature, and/or other genetic or epigenetic signature of particular tumor cell subpopulations, as defined herein elsewhere. The invention hereto also further relates to particular tumor cell subpopulations, which may be identified based on the methods according to the invention as discussed herein; as well as methods to obtain such cell (sub)populations and screening methods to identify agents capable of inducing or suppressing particular tumor cell (sub)populations.

The invention further relates to various uses of the gene signatures, protein signature, and/or other genetic or epigenetic signature as defined herein, as well as various uses of the tumor cells or tumor cell (sub)populations as defined herein. Particular advantageous uses include methods for identifying agents capable of inducing or suppressing particular tumor cell (sub)populations based on the gene signatures, protein signature, and/or other genetic or epigenetic signature as defined herein. The invention further relates to agents capable of inducing or suppressing particular tumor cell (sub)populations based on the gene signatures, protein signature, and/or other genetic or epigenetic signature as defined herein, as well as their use for modulating, such as inducing or repressing, a particular gene signature, protein signature, and/or other genetic or epigenetic signature. In one embodiment, genes in one population of cells may be activated or suppressed in order to affect the cells of another population. In related aspects, modulating, such as inducing or repressing, a particular a particular gene signature, protein signature, and/or other genetic or epigenetic signature may modify overall tumor composition, such as tumor cell composition, such as tumor cell subpopulation composition or distribution, or functionality.

The signature genes of the present invention can be derived from references identifying gene sets for particular types of tissue or cells. In embodiments, the tissue is from the central nervous system and the Allen Brain Atlas is used as a reference. Data from other published sources can be sued for reference, or from analysis of expression profiles of single-cells within a population of cells from freshly isolated samples of the same type. Overlaying single cell sequencing datasets with the spatial transcriptomics described herein allows for characterization of cell subtypes and their interactions within a three dimensional architecture that was previously poorly understood. The presence of subtypes may be determined by subtype specific signature genes. The presence of these specific cell types may be determined by applying the signature genes to bulk sequencing data in a sample. Not being bound by a theory, a tissue is a conglomeration of many cells that make up a tissue microenvironment, whereby the cells communicate and affect each other in specific ways. As such, specific cell types within this microenvironment may express signature genes specific for this microenvironment. Not being bound by a theory the signature genes of the present invention may be microenvironment specific, such as their expression in a tissue.

In certain examples, the methods can be used in tumors, in which not being bound by a theory, signature genes determined in single cells that originated in a tumor are specific to other tumors. Not being bound by a theory, a combination of cell subtypes in a tumor may indicate an outcome. Not being bound by a theory, the signature genes can be used to deconvolute the network of cells present in a tumor based on comparing them to data from bulk analysis of a tumor sample. Not being bound by a theory the presence of specific cells and cell subtypes may be indicative of tumor growth, invasiveness and resistance to treatment. The signature gene may indicate the presence of one particular cell type. The presence of cell types within a tumor may indicate that the tumor will be resistant to a treatment. In one embodiment, the signature genes of the present invention are applied to bulk sequencing data from a tumor sample obtained from a subject, such that information relating to disease outcome and personalized treatments is determined. In one embodiment, the novel signature genes are used to detect multiple cell states that occur in a subpopulation of tumor cells that are linked to resistance to targeted therapies and progressive tumor growth.

By means of additional guidance, when a cell is said to be positive for or to express or comprise expression of a given marker, such as a given gene or gene product, a skilled person would conclude the presence or evidence of a distinct signal for the marker when carrying out a measurement capable of detecting or quantifying the marker in or on the cell. Suitably, the presence or evidence of the distinct signal for the marker would be concluded based on a comparison of the measurement result obtained for the cell to a result of the same measurement carried out for a negative control (for example, a cell known to not express the marker) and/or a positive control (for example, a cell known to express the marker). Where the measurement method allows for a quantitative assessment of the marker, a positive cell may generate a signal for the marker that is at least 1.5-fold higher than a signal generated for the marker by a negative control cell or than an average signal generated for the marker by a population of negative control cells, e.g., at least 2-fold, at least 4-fold, at least 10-fold, at least 20-fold, at least 30-fold, at least 40-fold, at least 50-fold higher or even higher. Further, a positive cell may generate a signal for the marker that is 3.0 or more standard deviations, e.g., 3.5 or more, 4.0 or more, 4.5 or more, or 5.0 or more standard deviations, higher than an average signal generated for the marker by a population of negative control cells. The upregulation and/or downregulation of gene or gene product, including the amount, may be included as part of the gene signature or expression profile.

A "deviation" of a first value from a second value may generally encompass any direction (e.g., increase: first value>second value; or decrease: first value<second value) and any extent of alteration.

For example, a deviation may encompass a decrease in a first value by, without limitation, at least about 10% (about 0.9-fold or less), or by at least about 20% (about 0.8-fold or less), or by at least about 30% (about 0.7-fold or less), or by at least about 40% (about 0.6-fold or less), or by at least about 50% (about 0.5-fold or less), or by at least about 60% (about 0.4-fold or less), or by at least about 70% (about 0.3-fold or less), or by at least about 80% (about 0.2-fold or less), or by at least about 90% (about 0.1-fold or less), relative to a second value with which a comparison is being made.

For example, a deviation may encompass an increase of a first value by, without limitation, at least about 10% (about 1.1-fold or more), or by at least about 20% (about 1.2-fold or more), or by at least about 30% (about 1.3-fold or more), or by at least about 40% (about 1.4-fold or more), or by at least about 50% (about 1.5-fold or more), or by at least about 60% (about 1.6-fold or more), or by at least about 70% (about 1.7-fold or more), or by at least about 80% (about 1.8-fold or more), or by at least about 90% (about 1.9-fold or more), or by at least about 100% (about 2-fold or more), or by at least about 150% (about 2.5-fold or more), or by at least about 200% (about 3-fold or more), or by at least about 500% (about 6-fold or more), or by at least about 700% (about 8-fold or more), or like, relative to a second value with which a comparison is being made.

Preferably, a deviation may refer to a statistically significant observed alteration. For example, a deviation may refer to an observed alteration which falls outside of error margins of reference values in a given population (as expressed, for example, by standard deviation or standard error, or by a predetermined multiple thereof, e.g., ±1×SD or ±2×SD or ±3×SD, or ±1×SE or ±2×SE or ±3×SE). Deviation may also refer to a value falling outside of a reference range defined by values in a given population (for example, outside of a range which comprises ≥40%, ≥50%, ≥60%, ≥70%, ≥75% or ≥80% or ≥85% or ≥90% or ≥95% or even ≥100% of values in said population).

In a further embodiment, a deviation may be concluded if an observed alteration is beyond a given threshold or cut-off. Such threshold or cut-off may be selected as generally known in the art to provide for a chosen sensitivity and/or specificity of the prediction methods, e.g., sensitivity and/or specificity of at least 50%, or at least 60%, or at least 70%, or at least 80%, or at least 85%, or at least 90%, or at least 95%.

For example, receiver-operating characteristic (ROC) curve analysis can be used to select an optimal cut-off value of the quantity of a given immune cell population, biomarker or gene or gene product signatures, for clinical use of the present diagnostic tests, based on acceptable sensitivity and specificity, or related performance measures which are well-known per se, such as positive predictive value (PPV), negative predictive value (NPV), positive likelihood ratio (LR+), negative likelihood ratio (LR−), Youden index, or similar.

The signature genes utilized in the present invention can be discovered by analysis of expression profiles of single-cells within a population of cells from a similar sample or from previously published studies of the tissue or sample type, thus allowing the in-situ tissue profiling and transcriptomics described herein. The presence of subtypes may be determined by subtype specific signature gene, and the signature genes of the present invention may be microenvironment specific.

In one embodiment, the signature genes are detected by immunofluorescence, immunohistochemistry, fluorescence activated cell sorting (FACS), mass cytometry (CyTOF), drop-seq, RNA-seq, single cell qPCR, MERFISH (multiplex (in-situ) RNA FISH) and/or by in-situ hybridization. Other methods including absorbance assays and colorimetric assays are known in the art and may be used herein.

Sample Types

Appropriate samples for use in the methods disclosed herein include any conventional biological sample obtained from an organism or a part thereof, such as a plant, animal, bacteria, and the like. In particular embodiments, the biological sample is obtained from an animal subject, such as a human subject. A biological sample is any solid or fluid sample obtained from, excreted by or secreted by any living organism, including, without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as an infection with a pathogenic microorganism, such as a pathogenic bacteria or virus). For example, a biological sample can be a biological fluid obtained from, for example, blood, plasma, serum, urine, stool, sputum, mucous, lymph fluid, synovial fluid, bile, ascites, pleural effusion, seroma, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease, such as rheumatoid arthritis, osteoarthritis, gout or septic arthritis), or a swab of skin or mucosal membrane surface.

A sample can also be a sample obtained from any organ or tissue (including a biopsy or autopsy specimen, such as a tumor biopsy) or can include a cell (whether a primary cell or cultured cell) or medium conditioned by any cell, tissue or organ. Exemplary samples include, without limitation, cells, cell lysates, blood smears, cytocentrifuge preparations, cytology smears, bodily fluids (e.g., blood, plasma, serum, saliva, sputum, urine, bronchoalveolar lavage, semen, etc.), tissue biopsies (e.g., tumor biopsies), fine-needle aspirates, and/or tissue sections (e.g., cryostat tissue sections and/or paraffin-embedded tissue sections). In other examples, the sample includes circulating tumor cells (which can be identified by cell surface markers). In particular examples, samples are used directly (e.g., fresh or frozen), or can be manipulated prior to use, for example, by fixation (e.g., using formalin) and/or embedding in wax (such as formalin-fixed paraffin-embedded (FFPE) tissue samples). It will be appreciated that any method of obtaining tissue from a subject can be utilized, and that the selection of the method used will depend upon various factors such as the type of tissue, age of the subject, or procedures available to the practitioner. Standard techniques for acquisition of such samples are available in the art. See, for example Schluger et al., *J. Exp. Med.* 176:1327-33 (1992); Bigby et al., *Am. Rev. Respir. Dis.* 133:515-18 (1986); Kovacs et al., *NEJM* 318:589-93 (1988); and Ognibene et al., *Am. Rev. Respir. Dis.* 129:929-32 (1984).

The tissue sample can advantageously be sourced from any organism e.g. plant, animal, bacterial or fungal. Samples may be a tissue sample, which can optionally be cultured, dead or living tissue. The array of the invention allows the capture of any nucleic acid, e.g. mRNA molecules, which are present in cells that are capable of transcription and/or translation. The arrays and methods of the invention are particularly suitable for isolating and analysing the transcriptome or genome of cells within a sample, wherein spatial resolution of the transcriptomes or genomes is desirable, e.g. where the cells are interconnected or in contact directly with adjacent cells. However, it will be apparent to a person of skill in the art that the methods of the invention may also be useful for the analysis of the transcriptome or genome of different cells or cell types within a sample even if said cells do not interact directly, e.g. a blood sample. In other words, the cells do not need to present in the context of a tissue and can be applied to the array as single cells (e.g. cells isolated from a non-fixed tissue). Such single cells, whilst not necessarily fixed to a certain position in a tissue, are nonetheless applied to a certain position on the array and can be individually identified. Thus, in the context of analyzing cells that do not interact directly, or are not present in a tissue context, the spatial properties of the described methods may be applied to obtaining or retrieving unique or independent transcriptome or genome information from individual cells. Additionally, the simultaneous sensing of proteome and transcriptome can be performed on different cells or cell types within a sample utilizing the methods described herein.

The systems and methods as disclosed herein can be used to characterize tissues or cells from carcinomas or putative carcinomas.

In one aspect, the invention can evaluate, identify or quantify signature genes, gene products, and expression profiles of signature genes, gene networks, and gene products of tissues, tumors and/or component cells. The signature genes, gene products, and expression profiles are useful to identify components of tumors and tissues and states of such components, such as, without limitation, neoplastic cells, malignant cells, stem cells, immune cells, and malignant, microenvironmental, or immunologic states of such component cells.

The cancer may include, without limitation, liquid tumors such as leukemia (e.g., acute leukemia, acute lymphocytic leukemia, acute myelocytic leukemia, acute myeloblastic leukemia, acute promyelocytic leukemia, acute myelomonocytic leukemia, acute monocytic leukemia, acute erythroleukemia, chronic leukemia, chronic myelocytic leukemia, chronic lymphocytic leukemia), polycythemia vera, lymphoma (e.g., Hodgkin's disease, non-Hodgkin's disease), Waldenstrom's macroglobulinemia, heavy chain disease, or multiple myeloma.

The cancer may include, without limitation, solid tumors such as sarcomas and carcinomas. Examples of solid tumors include, but are not limited to fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyosarcoma, squamous cell carcinoma, basal cell carcinoma, adenocarcinoma, sweat gland carcinoma, sebaceous gland carcinoma, papillary carcinoma, papillary adenocarcinomas, cystadenocarcinoma, medullary carcinoma, epithelial carcinoma, bronchogenic carcinoma, hepatoma, colorectal cancer (e.g., colon cancer, rectal cancer), anal cancer, pancreatic cancer (e.g., pancreatic adenocarcinoma, islet cell carcinoma, neuroendocrine tumors), breast cancer (e.g., ductal carcinoma, lobular carcinoma, inflammatory breast cancer, clear cell carcinoma, mucinous carcinoma), ovarian carcinoma (e.g., ovarian epithelial carcinoma or surface epithelial-stromal tumour including serous tumour, endometrioid tumor and mucinous cystadenocarcinoma, sex-cord-stromal tumor), prostate cancer, liver and bile duct carcinoma (e.g., hepatocellular carcinoma, cholangiocarcinoma, hemangioma), choriocarcinoma, seminoma, embryonal carcinoma, kidney cancer (e.g., renal cell carcinoma, clear cell carcinoma, Wilm's tumor, nephroblastoma), cervical cancer, uterine cancer (e.g., endometrial adenocarcinoma, uterine papillary serous carcinoma, uterine clear-cell carcinoma, uterine sarcomas and leiomyosarcomas, mixed mullerian tumors), testicular cancer, germ cell tumor, lung cancer (e.g., lung adenocarcinoma, squamous cell carcinoma, large cell carcinoma, bronchioloalveolar carcinoma, non-small-cell carcinoma, small cell carcinoma, mesothelioma), bladder carcinoma, signet ring cell carcinoma, cancer of the head and neck (e.g., squamous cell carcinomas), esophageal carcinoma (e.g., esophageal adenocarcinoma), tumors of the brain (e.g., glioma, glioblastoma, medullablastoma, astrocytoma, medulloblastoma, craniopharyngioma, ependymoma, pinealoma, hemangioblastoma, acoustic neuroma, oligodenroglioma, schwannoma, meningioma), neuroblastoma, retinoblastoma, neuroendocrine tumor, melanoma, cancer of the stomach (e.g., stomach adenocarcinoma, gastrointestinal stromal tumor), or carcinoids. Lymphoproliferative disorders are also considered to be proliferative diseases.

In other embodiments, a sample may be an environmental sample, such as water, soil, or a surface such as industrial or medical surface. In some embodiments, methods such as disclosed in US patent publication No. 2013/0190196 may be applied for detection of nucleic acid signatures, specifically RNA levels, directly from crude cellular samples with a high degree of sensitivity and specificity. Sequences specific to each pathogen of interest may be identified or selected by comparing the coding sequences from the pathogen of interest to all coding sequences in other organisms by BLAST software.

As described herein, a sample for use with the invention may be a biological or environmental sample, such as a food sample (fresh fruits or vegetables, meats), a beverage sample, a paper surface, a fabric surface, a metal surface, a wood surface, a plastic surface, a soil sample, a freshwater sample, a wastewater sample, a saline water sample, exposure to atmospheric air or other gas sample, or a combination thereof. For example, household/commercial/industrial surfaces made of any materials including, but not limited to, metal, wood, plastic, rubber, or the like, may be swabbed and tested for contaminants. Soil samples may be tested for the presence of pathogenic bacteria or parasites, or other microbes, both for environmental purposes and/or for human, animal, or plant disease testing. Water samples such as freshwater samples, wastewater samples, or saline water samples can be evaluated for cleanliness and safety, and/or potability, to detect the presence of, for example, *Cryptosporidium parvum, Giardia lamblia*, or other microbial contamination. In further embodiments, a biological sample may be obtained from a source including, but not limited to, a tissue sample, saliva, blood, plasma, sera, stool, urine, sputum, mucous, lymph, synovial fluid, cerebrospinal fluid, ascites, pleural effusion, seroma, pus, or swab of skin or a mucosal membrane surface. In some particular embodiments, an environmental sample or biological samples may be crude samples and/or the one or more target molecules may not be purified or amplified from the sample prior to application of the method. Identification of microbes may be useful and/or needed for any number of applications, and thus any type of sample from any source deemed appropriate by one of skill in the art may be used in accordance with the invention.

In some embodiments, checking for food contamination by a virus that can be spread, in restaurants or other food providers; food surfaces; also checking food quality for manufacturers and regulators to determine the purity of meat sources; or identifying air or water contamination with pathogens.

A microbe in accordance with the invention may be a pathogenic microbe or a microbe that results in food or consumable product spoilage. A pathogenic microbe may be pathogenic or otherwise undesirable to humans, animals, or plants. For human or animal purposes, a microbe may cause a disease or result in illness. Animal or veterinary applications of the present invention may identify animals infected with a microbe. For example, the methods and systems of the invention may identify companion or farm animals with pathogens. In certain example embodiments, the virus may be any viral species that causes hemorrhagic fever, or other microbe causing similar symptoms.

In one embodiment, tumor cells are stained for cell subtype specific signature genes. In one embodiment, the cells are fixed. In another embodiment, the cells are formalin fixed and paraffin embedded. Tissue samples may also be fresh, fixed, or frozen. Not being bound by a theory, the presence of the cell subtypes in a tumor indicate outcome and personalized treatments. Not being bound by a theory, the cell subtypes may be quantitated in a section of a tumor and the number of cells indicates an outcome and personalized treatment.

Detection Based on rRNA Sequences

In certain example embodiments, the devices, systems, and methods disclosed herein may be used to distinguish multiple microbial species in a sample. In certain example embodiments, identification may be based on ribosomal RNA sequences, including the 16S, 23S, and 5S subunits. Methods for identifying relevant rRNA sequences are disclosed in U.S. Patent Application Publication No. 2017/0029872. In certain example embodiments, a set of guide RNA may designed to distinguish each species by a variable region that is unique to each species or strain. Guide RNAs may also be designed to target RNA genes that distinguish microbes at the genus, family, order, class, phylum, kingdom levels, or a combination thereof. In certain example embodiments where amplification is used, a set of amplification primers may be designed to flanking constant regions of the ribosomal RNA sequence and a guide RNA designed to distinguish each species by a variable internal region. In certain example embodiments, the primers and guide RNAs may be designed to conserved and variable regions in the 16S subunit respectfully. Other genes or genomic regions that uniquely variable across species or a subset of species such as the RecA gene family, RNA polymerase β subunit, may be used as well. Other suitable phylogenetic markers, and methods for identifying the same, are discussed for example in Wu et al. arXiv:1307.8690 [q-bio.GN].

Sample Staining

In some embodiments, the sample is stained. In a particularly preferred embodiment the stain is hematoxylin and eosin (H&E) stain to prepare the sample for brightfield microscopy. With this method cell nuclei are stained blue and cytoplasm and many extra-cellular components in shades of pink. In histopathology many conditions can be diagnosed by examining an H&E alone. However sometimes additional information is required to provide a full differential diagnosis and this requires further, more specialized staining techniques. These may be "special stains" using dyes or metallic impregnations to define particular structures or microorganisms, or immuno-histochemical methods (IHC) involving the location of diagnostically useful proteins using labelled antibodies. Staining of the sample can allow identification of a molecule on the z axis.

Imaging and image analysis can advantageously be automated. In particular embodiments, a plurality of images can be captured prior to in situ reactions in the plurality of cells or tissue samples on the solid substrate. The plurality of captured images can be stitched together by the automated process described herein, and detailed in Example 3. In particular embodiments, the segmented or stitched imaging can be integrated with information captured from spatial and single cell data. In embodiments, the correlating of a molecule to a position in the sample comprises further integrating the image data captured with the gene-by-barcode expression output Proteome Analysis Proteome sensing may be performed both before and after spatially tagging the transcriptome of a sample. In an aspect, proteome analysis may be performed simultaneously with transcriptome analysis. In embodiments proteome sensing may comprise staining, for imaging according to embodiments detailed elsewhere herein. In exemplary embodiments, direct and secondary antibody fluorescent staining can be utilized to sense proteins in the tissue sample. Embodiments may comprise DNA-barcode antibodies, lipid-barcode antibodies or metal tagging can be utilized. In instances where DNA-barcode antibodies or lipid-barcode antibodies are utilized, the barcodes can be read out by methods known in the art, including in situ PCR, in situ qPCR, in situ sequencing, FISH/smFISH, sequential hybridization. In instances where metal tagging is utilized, metal ions can be read out by imaging mass spectrometry or multiplexed ion beam imaging (MIBI) or MIBI-TOF see, e.g. Keren, et al., Science Advances 9 Oct. 2019: Vol. 5, no. 10, eaax5851; DOI: 10.1126/sciadv.aax5851 (characterizing use of multiplexed ion beam imaging by time of flight instrumentation that uses bright ion sources and orthogonal time-of-flight mass spectrometry to image metal-tagged antibodies at subcellular resolution in clinical tissue section).

Use of CRISPR Systems

In embodiments, CRIPSR systems are utilized for identification of the 'z' coordinate or location within the sample on the solid substrate. In certain embodiments, CRISPR systems can be introduced to an identified x,y coordinate location on a solid substrate, or each location on the solid substrate. CRISPR systems or the guide molecules can be included with the spatial barcode, including appended on the spatial barcode. In one exemplary embodiment, the CRISPR guide sequence is selected to edit the spatial barcode or adjacent of the spatial barcode, or otherwise map to the location on the solid substrate. Alternatively the CRISPR system is designed as described herein to bind but not cleave at particular target molecules specific to a cellular subtype or upregulated to particular subtypes to provide a z axis indicator. In other embodiments, and as described herein the CRISPR systems can be utilized as CRISPR-mediated analog multi-event recording apparatus (CAMERA) systems, described herein, and used to record stimuli as interest and over multiple generations of cells. CRISPR systems can also be used to effect cell-signaling via, for example, cell-signaling pathways in the samples to identify or otherwise further evaluate the sample architecture and cell interactions. CRISPR systems can also be utilized for detection and diagnosis in diseases by aiding in the cell typing and subtyping and tissue profiling according to the methods disclosed herein.

In general, the CRISPR-Cas, CRISPR-Cas9 or CRISPR system may be as used in the foregoing documents, such as WO 2014/093622 (PCT/US2013/074667) and refers collectively to transcripts and other elements involved in the expression of or directing the activity of CRISPR-associated ("Cas") genes, including sequences encoding a Cas gene, in particular a Cas9 gene in the case of CRISPR-Cas9, a tracr (trans-activating CRISPR) sequence (e.g. tracrRNA or an active partial tracrRNA), a tracr-mate sequence (encompassing a "direct repeat" and a tracrRNA-processed partial direct repeat in the context of an endogenous CRISPR system), a guide sequence (also referred to as a "spacer" in the context of an endogenous CRISPR system), or "RNA(s)" as that term is herein used (e.g., RNA(s) to guide Cas9, e.g. CRISPR RNA and transactivating (tracr) RNA or a single guide RNA (sgRNA) (chimeric RNA)) or other sequences and transcripts from a CRISPR locus. In general, a CRISPR system is characterized by elements that promote the formation of a CRISPR complex at the site of a target sequence (also referred to as a protospacer in the context of an endogenous CRISPR system). In the context of formation of a CRISPR complex, "target sequence" refers to a sequence to which a guide sequence is designed to have complementarity, where hybridization between a target sequence and a guide sequence promotes the formation of a CRISPR complex. The section of the guide sequence through which complementarity to the target sequence is important for cleavage activity is referred to herein as the seed sequence. A target sequence may comprise any polynucleotide, such as DNA or RNA polynucleotides. In some embodiments, a target sequence is located in the nucleus or cytoplasm of a cell, and may include nucleic acids in or from mitochondrial, organelles, vesicles, liposomes or particles present within the cell. In some embodiments, especially for non-nuclear uses, NLSs are not preferred. In some embodiments, a CRISPR system comprises one or more nuclear exports signals (NESs). In some embodiments, a CRISPR system comprises one or more NLSs and one or more NESs. In some embodiments, direct repeats may be identified in silico by searching for repetitive motifs that fulfill any or all of the following criteria: 1. found in a 2 Kb window of genomic sequence flanking the type II CRISPR locus; 2. span from 20 to 50 bp; and 3. interspaced by 20 to 50 bp. In some embodiments, 2 of these criteria may be used, for instance 1 and 2, 2 and 3, or 1 and 3. In some embodiments, all 3 criteria may be used.

The methods and tools provided herein are exemplified for Cas9, a type II nuclease that requires a tracrRNA. Orthologs of Cas9 have been identified in different bacterial species as described previously (e.g. WO2014093712). Further type II nucleases with similar properties can be identified using methods described in the art (Shmakov et al. 2015, 60:385-397; Abudayeh et al. 2016, Science, 5; 353(6299)). In particular embodiments, such methods for identifying novel CRISPR effector proteins may comprise the steps of selecting sequences from the database encoding a seed which identifies the presence of a CRISPR Cas locus, identifying loci located within 10 kb of the seed comprising Open Reading Frames (ORFs) in the selected sequences, selecting therefrom loci comprising ORFs of which only a single ORF encodes a novel CRISPR effector having greater than 700 amino acids and no more than 90% homology to a known CRISPR effector. In particular embodiments, the seed is a protein that is common to the CRISPR-Cas system, such as Cas1. In further embodiments, the CRISPR array is used as a seed to identify new effector proteins.

In some embodiments, the Cas9 enzyme is a type V or VI CRISPR system enzyme. In some embodiments, the Cas9 enzyme is a Cas9 enzyme. In some embodiments, the Cas9 enzyme is derived from *Francisella tularensis* 1, *Francisella tularensis* subsp. *novicida*, *Prevotella albensis*, *Lachnospiraceae* bacterium MC2017 1, *Butyrivibrio proteoclasticus*, *Peregrinibacteria* bacterium GW2011_GWA2_33_10, *Parcubacteria* bacterium GW2011_GWC2_44_17, *Smithella* sp. SCADC, *Acidaminococcus* sp. BV3L6, *Lachnospiraceae* bacterium MA2020, *Candidatus methanoplasma termitum*, *Eubacterium eligens*, *Moraxella bovoculi* 237, *Leptospira inadai*, *Lachnospiraceae* bacterium ND2006, *Porphyromonas crevioricanis* 3, *Prevotella disiens*, or *Porphyromonas macacae* Cas9, and may include further alterations or mutations of the Cas9 as defined herein elsewhere, and can be a chimeric Cas9. In some embodiments, the Cas9 enzyme is codon-optimized for expression in a eukaryotic cell. In some embodiments, the CRISPR enzyme directs cleavage of one or two strands at the location of the target sequence. In some embodiments, the first regulatory element is a polymerase III promoter. In some embodiments, the second regulatory element is a polymerase II promoter. In some embodiments, the one or more guide sequence(s) is (are each) at least 16, 17, 18, 19, 20, 25 nucleotides, or between 16-30, or between 16-25, or between 16-20 nucleotides in length. When multiple guide RNAs are used, they are preferably separated by a direct repeat sequence. In an aspect, the invention provides a non-human eukaryotic organism; preferably a multicellular eukaryotic organism, comprising a eukaryotic host cell according to any of the described embodiments. In other aspects, the invention provides a eukaryotic organism; preferably a multicellular eukaryotic organism, comprising a eukaryotic host cell according to any of the described embodiments. The organism in some embodiments of these aspects may be an animal; for example a mammal. Also, the organism may be an arthropod such as an insect. The organism also may be a plant. Further, the organism may be a fungus.

In one aspect, the invention provides a kit comprising one or more of the components described herein. In some embodiments, the kit comprises a vector system and instructions for using the kit. In some embodiments, the vector system comprises (a) a first regulatory element operably linked to a direct repeat sequence and one or more insertion sites for inserting one or more guide sequences up- or downstream (whichever applicable) of the direct repeat sequence, wherein when expressed, the guide sequence directs sequence-specific binding of a Cas9 CRISPR complex to a target sequence in a eukaryotic cell, wherein the Cas9 CRISPR complex comprises a Cas9 enzyme complexed with the guide sequence that is hybridized to the target sequence; and/or (b) a second regulatory element operably linked to an enzyme-coding sequence encoding said Cas9 enzyme comprising a nuclear localization sequence. Where applicable, a tracr sequence may also be provided. In some embodiments, the kit comprises components (a) and (b) located on the same or different vectors of the system. In some embodiments, component (a) further comprises two or more guide sequences operably linked to the first regulatory element, wherein when expressed, each of the two or more guide sequences direct sequence specific binding of a CRISPR complex to a different target sequence in a eukaryotic cell. In some embodiments, the Cas9 enzyme comprises one or more nuclear localization sequences of sufficient strength to drive accumulation of said CRISPR enzyme in a detectable amount in the nucleus of a eukaryotic cell. In some embodiments, the CRISPR enzyme is a type V or VI CRISPR system enzyme. In some embodiments, the CRISPR enzyme is a Cas9 enzyme. In some embodiments, the Cas9 enzyme is derived from *Francisella tularensis* 1, *Francisella tularensis* sub sp. *novicida*, *Prevotella albensis*, *Lachnospiraceae* bacterium MC2017 1, *Butyrivibrio proteoclasticus*, *Peregrinibacteria* bacterium GW2011_GWA2_33_10, *Parcubacteria* bacterium GW2011_GWC2_44_17, *Smithella* sp. SCADC, *Acidaminococcus* sp. BV3L6, *Lachnospiraceae* bacterium MA2020, *Candidatus methanoplasma termitum*, *Eubacterium eligens*, *Moraxella bovoculi* 237, *Leptospira inadai*, *Lachnospiraceae* bacterium ND2006, *Porphyromonas crevioricanis* 3, *Prevotella disiens*, or *Porphyromonas macacae* Cas9 (e.g., modified to have or be associated with at least one DD), and may include further alteration or mutation of the Cas9, and can be a chimeric Cas9. In some embodiments, the DD-CRISPR enzyme is codon-optimized for expression in a eukaryotic cell. In some embodiments, the DD-CRISPR enzyme directs cleavage of one or two strands at the location of the target sequence. In some embodiments, the DD-CRISPR enzyme lacks or substantially DNA strand cleavage activity (e.g., no more than 5% nuclease activity as compared with a wild type enzyme or enzyme not having the mutation or alteration that decreases nuclease activity). In some embodiments, the first regulatory element is a polymerase III promoter. In some embodiments, the second regulatory element is a polymerase II promoter. In some embodiments, the guide sequence is at least 16, 17, 18, 19, 20, 25 nucleotides, or between 16-30, or between 16-25, or between 16-20 nucleotides in length.

CRISPR Guides that May be Used in the Present Invention

As used herein, the term "crRNA" or "guide RNA" or "single guide RNA" or "sgRNA" or "one or more nucleic acid components" of a Type V or Type VI CRISPR-Cas locus effector protein comprises any polynucleotide sequence having sufficient complementarity with a target nucleic acid sequence to hybridize with the target nucleic acid sequence and direct sequence-specific binding of a nucleic acid-targeting complex to the target nucleic acid sequence. In some embodiments, the degree of complementarity, when optimally aligned using a suitable alignment algorithm, is about or more than about 50%, 60%, 75%, 80%, 85%, 90%, 95%, 97.5%, 99%, or more. Optimal alignment may be determined with the use of any suitable algorithm for aligning sequences, non-limiting example of which include the Smith-Waterman algorithm, the Needleman-Wunsch algorithm, algorithms based on the Burrows-Wheeler Transform (e.g., the Burrows Wheeler Aligner), ClustalW, Clustal X, BLAT, Novoalign (Novocraft Technologies; available at www.novocraft.com), ELAND (Illumina, San Diego, CA), SOAP (available at soap.genomics.org.cn), and Maq (available at maq.sourceforge.net). The ability of a guide sequence (within a nucleic acid-targeting guide RNA) to direct sequence-specific binding of a nucleic acid-targeting complex to a target nucleic acid sequence may be assessed by any suitable assay. For example, the components of a nucleic acid-targeting CRISPR system sufficient to form a nucleic acid-targeting complex, including the guide sequence to be tested, may be provided to a host cell having the corresponding target nucleic acid sequence, such as by transfection with vectors encoding the components of the nucleic acid-targeting complex, followed by an assessment of preferential targeting (e.g., cleavage) within the target nucleic acid sequence, such as by Surveyor assay as described herein. Similarly, cleavage of a target nucleic acid sequence may be evaluated in a test tube by providing the target nucleic acid sequence, components of a nucleic acid-targeting complex, including the guide sequence to be tested and a control guide sequence different from the test guide sequence, and comparing binding or rate of cleavage at the target sequence between the test and control guide sequence reactions. Other assays are possible, and will occur to those skilled in the art. A guide sequence, and hence a nucleic acid-targeting guide may be selected to target any target nucleic acid sequence. The target sequence may be DNA. The target sequence may be any RNA sequence. In some embodiments, the target sequence may be a sequence within a RNA molecule selected from the group consisting of messenger RNA (mRNA), pre-mRNA, ribosomal RNA (rRNA), transfer RNA (tRNA), micro-RNA (miRNA), small interfering RNA (siRNA), small nuclear RNA (snRNA), small nucleolar RNA (snoRNA), double stranded RNA (dsRNA), non-coding RNA (ncRNA), long non-coding RNA (lncRNA), and small cytoplasmatic RNA (scRNA). In some preferred embodiments, the target sequence may be a sequence within a RNA molecule selected from the group consisting of mRNA, pre-mRNA, and rRNA. In some preferred embodiments, the target sequence may be a sequence within a RNA molecule selected from the group consisting of ncRNA, and lncRNA. In some more preferred embodiments, the target sequence may be a sequence within an mRNA molecule or a pre-mRNA molecule.

In some embodiments, a nucleic acid-targeting guide is selected to reduce the degree secondary structure within the nucleic acid-targeting guide. In some embodiments, about or less than about 75%, 50%, 40%, 30%, 25%, 20%, 15%, 10%, 5%, 1%, or fewer of the nucleotides of the nucleic acid-targeting guide participate in self-complementary base pairing when optimally folded. Optimal folding may be determined by any suitable polynucleotide folding algorithm. Some programs are based on calculating the minimal Gibbs free energy. An example of one such algorithm is mFold, as described by Zuker and Stiegler (Nucleic Acids Res. 9 (1981), 133-148). Another example folding algorithm is the online webserver RNAfold, developed at Institute for Theoretical Chemistry at the University of Vienna, using the centroid structure prediction algorithm (see e.g., A. R. Gruber et al., 2008, Cell 106(1): 23-24; and PA Carr and GM Church, 2009, Nature Biotechnology 27(12): 1151-62).

In certain embodiments, a guide RNA or crRNA may comprise, consist essentially of, or consist of a direct repeat (DR) sequence and a guide sequence or spacer sequence. In certain embodiments, the guide RNA or crRNA may comprise, consist essentially of, or consist of a direct repeat sequence fused or linked to a guide sequence or spacer sequence. In certain embodiments, the direct repeat sequence may be located upstream (i.e., 5') from the guide sequence or spacer sequence. In other embodiments, the direct repeat sequence may be located downstream (i.e., 3') from the guide sequence or spacer sequence.

In certain embodiments, the crRNA comprises a stem loop, preferably a single stem loop. In certain embodiments, the direct repeat sequence forms a stem loop, preferably a single stem loop.

In certain embodiments, the spacer length of the guide RNA is from 15 to 35 nt. In certain embodiments, the spacer length of the guide RNA is at least 15 nucleotides. In certain embodiments, the spacer length is from 15 to 17 nt, e.g., 15, 16, or 17 nt, from 17 to 20 nt, e.g., 17, 18, 19, or 20 nt, from 20 to 24 nt, e.g., 20, 21, 22, 23, or 24 nt, from 23 to 25 nt, e.g., 23, 24, or 25 nt, from 24 to 27 nt, e.g., 24, 25, 26, or 27 nt, from 27-30 nt, e.g., 27, 28, 29, or 30 nt, from 30-35 nt, e.g., 30, 31, 32, 33, 34, or 35 nt, or 35 nt or longer.

The "tracrRNA" sequence or analogous terms includes any polynucleotide sequence that has sufficient complementarity with a crRNA sequence to hybridize. In some embodiments, the degree of complementarity between the tracrRNA sequence and crRNA sequence along the length of the shorter of the two when optimally aligned is about or more than about 25%, 30%, 40%, 50%, 60%, 70%, 80%, 90%, 95%, 97.5%, 99%, or higher. In some embodiments, the tracr sequence is about or more than about 5, 6, 7, 8, 9, 10, 11, 12, 13, 14, 15, 16, 17, 18, 19, 20, 25, 30, 40, 50, or more nucleotides in length. In some embodiments, the tracr sequence and crRNA sequence are contained within a single transcript, such that hybridization between the two produces a transcript having a secondary structure, such as a hairpin. In an embodiment of the invention, the transcript or transcribed polynucleotide sequence has at least two or more hairpins. In preferred embodiments, the transcript has two, three, four or five hairpins. In a further embodiment of the invention, the transcript has at most five hairpins. In a hairpin structure the portion of the sequence 5' of the final "N" and upstream of the loop corresponds to the tracr mate sequence, and the portion of the sequence 3' of the loop corresponds to the tracr sequence.

In general, degree of complementarity is with reference to the optimal alignment of the sca sequence and tracr sequence, along the length of the shorter of the two sequences. Optimal alignment may be determined by any suitable alignment algorithm, and may further account for secondary structures, such as self-complementarity within either the sca sequence or tracr sequence. In some embodiments, the degree of complementarity between the tracr sequence and sca sequence along the length of the shorter of the two when optimally aligned is about or more than about 25%, 30%, 40%, 50%, 60%, 70%, 80%, 90%, 95%, 97.5%, 99%, or higher.

In embodiments of the invention the terms guide sequence and guide RNA, i.e. RNA capable of guiding Cas to a target genomic locus, are used interchangeably as in foregoing cited documents such as WO 2014/093622 (PCT/US2013/074667). In general, a guide sequence is any polynucleotide sequence having sufficient complementarity with a target polynucleotide sequence to hybridize with the target sequence and direct sequence-specific binding of a CRISPR complex to the target sequence. In some embodiments, the degree of complementarity between a guide sequence and its corresponding target sequence, when optimally aligned using a suitable alignment algorithm, is about or more than about 50%, 60%, 75%, 80%, 85%, 90%, 95%, 97.5%, 99%, or more. Optimal alignment may be determined with the use of any suitable algorithm for aligning sequences, non-limiting example of which include the Smith-Waterman algorithm, the Needleman-Wunsch algorithm, algorithms based on the Burrows-Wheeler Transform (e.g. the Burrows Wheeler Aligner), ClustalW, Clustal X, BLAT, Novoalign (Novocraft Technologies; available at www.novocraft.com), ELAND (Illumina, San Diego, CA), SOAP (available at soap.genomics.org.cn), and Maq (available at maq.source-forge.net). In some embodiments, a guide sequence is about or more than about 5, 10, 11, 12, 13, 14, 15, 16, 17, 18, 19, 20, 21, 22, 23, 24, 25, 26, 27, 28, 29, 30, 35, 40, 45, 50, 75, or more nucleotides in length. In some embodiments, a guide sequence is less than about 75, 50, 45, 40, 35, 30, 25, 20, 15, 12, or fewer nucleotides in length. Preferably the guide sequence is 10 30 nucleotides long. The ability of a guide sequence to direct sequence-specific binding of a CRISPR complex to a target sequence may be assessed by any suitable assay. For example, the components of a CRISPR system sufficient to form a CRISPR complex, including the guide sequence to be tested, may be provided to a host cell having the corresponding target sequence, such as by transfection with vectors encoding the components of the CRISPR sequence, followed by an assessment of preferential cleavage within the target sequence, such as by Surveyor assay as described herein. Similarly, cleavage of a target polynucleotide sequence may be evaluated in a test tube by providing the target sequence, components of a CRISPR complex, including the guide sequence to be tested and a control guide sequence different from the test guide sequence, and comparing binding or rate of cleavage at the target sequence between the test and control guide sequence reactions. Other assays are possible, and will occur to those skilled in the art.

In some embodiments of CRISPR-Cas systems, the degree of complementarity between a guide sequence and its corresponding target sequence can be about or more than about 50%, 60%, 75%, 80%, 85%, 90%, 95%, 97.5%, 99%, or 100%; a guide or RNA or sgRNA can be about or more than about 5, 10, 11, 12, 13, 14, 15, 16, 17, 18, 19, 20, 21, 22, 23, 24, 25, 26, 27, 28, 29, 30, 35, 40, 45, 50, 75, or more nucleotides in length; or guide or RNA or sgRNA can be less than about 75, 50, 45, 40, 35, 30, 25, 20, 15, 12, or fewer nucleotides in length; and advantageously tracr RNA is 30 or 50 nucleotides in length. However, an aspect of the invention is to reduce off-target interactions, e.g., reduce the guide interacting with a target sequence having low complementarity. Indeed, in the examples, it is shown that the invention involves mutations that result in the CRISPR-Cas system being able to distinguish between target and off-target sequences that have greater than 80% to about 95% complementarity, e.g., 83%-84% or 88-89% or 94-95% complementarity (for instance, distinguishing between a target having 18 nucleotides from an off-target of 18 nucleotides having 1, 2 or 3 mismatches). Accordingly, in the context of the present invention the degree of complementarity between a guide sequence and its corresponding target sequence is greater than 94.5% or 95% or 95.5% or 96% or 96.5% or 97% or 97.5% or 98% or 98.5% or 99% or 99.5% or 99.9%, or 100%. Off target is less than 100% or 99.9% or 99.5% or 99% or 99% or 98.5% or 98% or 97.5% or 97% or 96.5% or 96% or 95.5% or 95% or 94.5% or 94% or 93% or 92% or 91% or 90% or 89% or 88% or 87% or 86% or 85% or 84% or 83% or 82% or 81% or 80% complementarity between the sequence and the guide, with it advantageous that off target is 100% or 99.9% or 99.5% or 99% or 99% or 98.5% or 98% or 97.5% or 97% or 96.5% or 96% or 95.5% or 95% or 94.5% complementarity between the sequence and the guide.

In particularly preferred embodiments according to the invention, the guide RNA (capable of guiding Cas to a target locus) may comprise (1) a guide sequence capable of hybridizing to a genomic target locus in the eukaryotic cell; (2) a tracr sequence; and (3) a tracr mate sequence. All (1) to (3) may reside in a single RNA, i.e. an sgRNA (arranged in a 5' to 3' orientation), or the tracr RNA may be a different RNA than the RNA containing the guide and tracr sequence. The tracr hybridizes to the tracr mate sequence and directs the CRISPR/Cas complex to the target sequence. Where the tracr RNA is on a different RNA than the RNA containing the guide and tracr sequence, the length of each RNA may be optimized to be shortened from their respective native lengths, and each may be independently chemically modified to protect from degradation by cellular RNase or otherwise increase stability.

The methods according to the invention as described herein comprehend inducing one or more mutations in a eukaryotic cell (in vitro, i.e. in an isolated eukaryotic cell) as herein discussed comprising delivering to cell a vector as herein discussed. The mutation(s) can include the introduction, deletion, or substitution of one or more nucleotides at each target sequence of cell(s) via the guide(s) RNA(s) or sgRNA(s). The mutations can include the introduction, deletion, or substitution of 1-75 nucleotides at each target sequence of said cell(s) via the guide(s) RNA(s) or sgRNA (s). The mutations can include the introduction, deletion, or substitution of 1, 5, 10, 11, 12, 13, 14, 15, 16, 17, 18, 19, 20, 21, 22, 23, 24, 25, 26, 27, 28, 29, 30, 35, 40, 45, 50, or 75 nucleotides at each target sequence of said cell(s) via the guide(s) RNA(s) or sgRNA(s). The mutations can include the introduction, deletion, or substitution of 5, 10, 11, 12, 13, 14, 15, 16, 17, 18, 19, 20, 21, 22, 23, 24, 25, 26, 27, 28, 29, 30, 35, 40, 45, 50, or 75 nucleotides at each target sequence of said cell(s) via the guide(s) RNA(s) or sgRNA(s). The mutations include the introduction, deletion, or substitution of 10, 11, 12, 13, 14, 15, 16, 17, 18, 19, 20, 21, 22, 23, 24, 25, 26, 27, 28, 29, 30, 35, 40, 45, 50, or 75 nucleotides at each target sequence of said cell(s) via the guide(s) RNA(s) or sgRNA(s). The mutations can include the introduction, deletion, or substitution of 20, 21, 22, 23, 24, 25, 26, 27, 28, 29, 30, 35, 40, 45, 50, or 75 nucleotides at each target sequence of said cell(s) via the guide(s) RNA(s) or sgRNA(s). The mutations can include the introduction, deletion, or substitution of 40, 45, 50, 75, 100, 200, 300, 400 or 500 nucleotides at each target sequence of said cell(s) via the guide(s) RNA(s) or sgRNA(s).

For minimization of toxicity and off-target effect, it may be important to control the concentration of Cas mRNA and guide RNA delivered. Optimal concentrations of Cas mRNA and guide RNA can be determined by testing different concentrations in a cellular or non-human eukaryote animal model and using deep sequencing the analyze the extent of modification at potential off-target genomic loci. Alternatively, to minimize the level of toxicity and off-target effect, Cas nickase mRNA (for example S. pyogenes Cas9 with the D10A mutation) can be delivered with a pair of guide RNAs targeting a site of interest. Guide sequences and strategies to minimize toxicity and off-target effects can be as in WO 2014/093622 (PCT/US2013/074667); or, via mutation as herein.

Typically, in the context of an endogenous CRISPR system, formation of a CRISPR complex (comprising a guide sequence hybridized to a target sequence and complexed with one or more Cas proteins) results in cleavage of one or both strands in or near (e.g. within 1, 2, 3, 4, 5, 6, 7, 8, 9, 10, 20, 50, or more base pairs from) the target sequence. Without wishing to be bound by theory, the tracr sequence, which may comprise or consist of all or a portion of a wild-type tracr sequence (e.g. about or more than about 20, 26, 32, 45, 48, 54, 63, 67, 85, or more nucleotides of a wild-type tracr sequence), may also form part of a CRISPR complex, such as by hybridization along at least a portion of the tracr sequence to all or a portion of a tracr mate sequence that is operably linked to the guide sequence.

Guide Modifications

In certain embodiments, guides of the invention comprise non-naturally occurring nucleic acids and/or non-naturally occurring nucleotides and/or nucleotide analogs, and/or chemically modifications. Non-naturally occurring nucleic acids can include, for example, mixtures of naturally and non-naturally occurring nucleotides. Non-naturally occurring nucleotides and/or nucleotide analogs may be modified at the ribose, phosphate, and/or base moiety. In an embodiment of the invention, a guide nucleic acid comprises ribonucleotides and non-ribonucleotides. In one such embodiment, a guide comprises one or more ribonucleotides and one or more deoxyribonucleotides. In an embodiment of the invention, the guide comprises one or more non-naturally occurring nucleotide or nucleotide analog such as a nucleotide with phosphorothioate linkage, boranophosphate linkage, a locked nucleic acid (LNA) nucleotides comprising a methylene bridge between the 2' and 4' carbons of the ribose ring, peptide nucleic acids (PNA), or bridged nucleic acids (BNA). Other examples of modified nucleotides include 2'-O-methyl analogs, 2'-deoxy analogs, 2-thiouridine analogs, N6-methyladenosine analogs, or 2'-fluoro analogs. Further examples of modified nucleotides include linkage of chemical moieties at the 2' position, including but not limited to peptides, nuclear localization sequence (NLS), peptide nucleic acid (PNA), polyethylene glycol (PEG), triethylene glycol, or tetraethyleneglycol (TEG). Further examples of modified bases include, but are not limited to, 2-aminopurine, 5-bromo-uridine, pseudouridine ($\Psi$), $N^1$-methylpseudouridine (me$^1\Psi$), 5-methoxyuridine (5moU), inosine, 7-methylguanosine. Examples of guide RNA chemical modifications include, without limitation, incorporation of 2'-O-methyl (M), 2'-O-methyl-3'-phosphorothioate (MS), phosphorothioate (PS), S-constrained ethyl (cEt), 2'-O-methyl-3'-thioPACE (MSP), or 2'-O-methyl-3'-phosphonoacetate (MP) at one or more terminal nucleotides. Such chemically modified guides can comprise increased stability and increased activity as compared to unmodified guides, though on-target vs. off-target specificity is not predictable. (See, Hendel, 2015, Nat Biotechnol. 33(9):985-9, doi: 10.1038/nbt.3290, published online 29 Jun. 2015; Ragdarm et al., 0215, *PNAS*, E7110-E7111; Allerson et al., *J. Med. Chem.* 2005, 48:901-904; Bramsen et al., *Front. Genet.*, 2012, 3:154; Deng et al., *PNAS*, 2015, 112:11870-11875; Sharma et al., *MedChemComm.*, 2014, 5:1454-1471; Hendel et al., *Nat. Biotechnol.* (2015) 33(9): 985-989; Li et al., *Nature Biomedical Engineering*, 2017, 1, 0066 DOI: 10.1038/s41551-017-0066; Ryan et al., *Nucleic Acids Res.* (2018) 46(2): 792-803). In some embodiments, the 5' and/or 3' end of a guide RNA is modified by a variety of functional moieties including fluorescent dyes, polyethylene glycol, cholesterol, proteins, or detection tags. (See Kelly et al., 2016, 1 Biotech. 233:74-83). In certain embodiments, a guide comprises ribonucleotides in a region that binds to a target DNA and one or more deoxyribonucletides and/or nucleotide analogs in a region that binds to Cas9, Cpf1, or C2c1. In an embodiment of the invention, deoxyribonucleotides and/or nucleotide analogs are incorporated in engineered guide structures, such as, without limitation, 5' and/or 3' end, stem-loop regions, and the seed region. In certain embodiments, the modification is not in the 5'-handle of the stem-loop regions. Chemical modification in the 5'-handle of the stem-loop region of a guide may abolish its function (see Li, et al., *Nature Biomedical Engineering*, 2017, 1:0066). In certain embodiments, at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, or 75 nucleotides of a guide is chemically modified. In some embodiments, 3-5 nucleotides at either the 3' or the 5' end of a guide is chemically modified. In some embodiments, only minor modifications are introduced in the seed region, such as 2'-F modifications. In some embodiments, 2'-F modification is introduced at the 3' end of a guide. In certain embodiments, three to five nucleotides at the 5' and/or the 3' end of the guide are chemically modified with 2'-O-methyl (M), 2'-O-methyl-3'-phosphorothioate (MS), S-constrained ethyl(cEt), 2'-O-methyl-3'-thioPACE (MSP), or 2'-O-methyl-3'-phosphonoacetate (MP). Such modification can enhance genome editing efficiency (see Hendel et al., *Nat. Biotechnol.* (2015) 33(9): 985-989; Ryan et al., *Nucleic Acids Res.* (2018) 46(2): 792-803). In certain embodiments, all of the phosphodiester bonds of a guide are substituted with phosphorothioates (PS) for enhancing levels of gene disruption. In certain embodiments, more than five nucleotides at the 5' and/or the 3' end of the guide are chemically modified with 2'-O-Me, 2'-F or S-constrained ethyl(cEt). Such chemically modified guide can mediate enhanced levels of gene disruption (see Ragdarm et al., 0215, *PNAS*, E7110-E7111). In an embodiment of the invention, a guide is modified to comprise a chemical moiety at its 3' and/or 5' end. Such moieties include, but are not limited to amine, azide, alkyne, thio, dibenzocyclooctyne (DBCO), Rhodamine, peptides, nuclear localization sequence (NLS), peptide nucleic acid (PNA), polyethylene glycol (PEG), triethylene glycol, or tetraethyleneglycol (TEG). In certain embodiment, the chemical moiety is conjugated to the guide by a linker, such as an alkyl chain. In certain embodiments, the chemical moiety of the modified guide can be used to attach the guide to another molecule, such as DNA, RNA, protein, or nanoparticles. Such chemically modified guide can be used to identify or enrich cells generically edited by a CRISPR system (see Lee et al., *eLife,* 2017, 6:e25312, DOI:10.7554). In some embodiments, 3 nucleotides at each of the 3' and 5' ends are chemically modified. In a specific embodiment, the modifications comprise 2'-O-methyl or phosphorothioate analogs. In a specific embodiment, 12 nucleotides in the tetraloop and 16 nucleotides in the stem-loop region are replaced with 2'-O-methyl analogs. Such chemical modifications improve in vivo editing and stability (see Finn et al., *Cell Reports* (2018), 22: 2227-2235). In some embodiments, more than 60 or 70 nucleotides of the guide are chemically modified. In some embodiments, this modification comprises replacement of nucleotides with 2'-O-methyl or 2'-fluoro nucleotide analogs or phosphorothioate (PS) modification of phosphodiester bonds. In some embodiments, the chemical modification comprises 2'-O-methyl or 2'-fluoro modification of guide nucleotides extending outside of the nuclease protein when the CRISPR complex is formed or PS modification of 20 to 30 or more nucleotides of the 3'-terminus of the guide. In a particular embodiment, the chemical modification further comprises 2'-O-methyl analogs at the 5' end of the guide or 2'-fluoro analogs in the seed and tail regions. Such chemical modifications improve stability to nuclease degradation and maintain or enhance genome-editing activity or efficiency, but modification of all nucleotides may abolish the function of the guide (see Yin et al., *Nat. Biotech.* (2018), 35(12): 1179-1187). Such chemical modifications may be guided by knowledge of the structure of the CRISPR complex, including knowledge of the limited number of nuclease and RNA 2'-OH interactions (see Yin et al., *Nat. Biotech.* (2018), 35(12): 1179-1187). In some embodiments, one or more guide RNA nucleotides may be replaced with DNA nucleotides. In some embodiments, up to 2, 4, 6, 8, 10, or 12 RNA nucleotides of the 5'-end tail/seed guide region are replaced with DNA nucleotides. In certain embodiments, the majority of guide RNA nucleotides at the 3' end are replaced with DNA nucleotides. In particular embodiments, 16 guide RNA nucleotides at the 3' end are replaced with DNA nucleotides. In particular embodiments, 8 guide RNA nucleotides of the 5'-end tail/seed region and 16 RNA nucleotides at the 3' end are replaced with DNA nucleotides. In particular embodiments, guide RNA nucleotides that extend outside of the nuclease protein when the CRISPR complex is formed are replaced with DNA nucleotides. Such replacement of multiple RNA nucleotides with DNA nucleotides leads to decreased off-target activity but similar on-target activity compared to an unmodified guide; however, replacement of all RNA nucleotides at the 3' end may abolish the function of the guide (see Yin et al., *Nat. Chem. Biol.* (2018) 14, 311-316). Such modifications may be guided by knowledge of the structure of the CRISPR complex, including knowledge of the limited number of nuclease and RNA 2'-OH interactions (see Yin et al., *Nat. Chem. Biol.* (2018) 14, 311-316).

In one aspect of the invention, the guide comprises a modified crRNA for Cpf1, having a 5'-handle and a guide segment further comprising a seed region and a 3'-terminus. In some embodiments, the modified guide can be used with a Cpf1 of any one of *Acidaminococcus* sp. BV3L6 Cpf1 (AsCpf1); *Francisella tularensis* subsp. *Novicida* U112 Cpf1 (FnCpf1); L. bacterium MC2017 Cpf1 (Lb3Cpf1); *Butyrivibrio proteoclasticus* Cpf1 (BpCpf1); *Parcubacteria* bacterium GWC2011_GWC2_44_17 Cpf1 (PbCpf1); *Peregrinibacteria* bacterium GW2011_GWA_33_10 Cpf1 (PeCpf1); *Leptospira inadai* Cpf1 (LiCpf1); *Smithella* sp. SC_K08D17 Cpf1 (SsCpf1); L. bacterium MA2020 Cpf1 (Lb2Cpf1); *Porphyromonas crevioricanis* Cpf1 (PcCpf1); *Porphyromonas macacae* Cpf1 (PmCpf1); *Candidatus methanoplasma termitum* Cpf1 (CMtCpf1); *Eubacterium eligens* Cpf1 (EeCpf1); *Moraxella bovoculi* 237 Cpf1 (MbCpf1); *Prevotella disiens* Cpf1 (PdCpf1); or L. bacterium ND2006 Cpf1 (LbCpf1).

In some embodiments, the modification to the guide is a chemical modification, an insertion, a deletion or a split. In some embodiments, the chemical modification includes, but is not limited to, incorporation of 2'-O-methyl (M) analogs, 2'-deoxy analogs, 2-thiouridine analogs, N6-methyladenosine analogs, 2'-fluoro analogs, 2-aminopurine, 5-bromo-uridine, pseudouridine ($\Psi$), $N^1$-methylpseudouridine (me$^1\Psi$), 5-methoxyuridine (5moU), inosine, 7-methylguanosine, 2'-O-methyl-3'-phosphorothioate (MS), S-constrained ethyl(cEt), phosphorothioate (PS), 2'-O-methyl-3'-thioPACE (MSP), or 2'-O-methyl-3'-phosphonoacetate (MP). In some embodiments, the guide comprises one or more of phosphorothioate modifications. In certain embodiments, at least 1, 2, 3, 4, 5, 6, 7, 8, 9, 10, 11, 12, 13, 14, 15, 16, 17, 18, 19, 20, or 25 nucleotides of the guide are chemically modified. In some embodiments, all nucleotides are chemically modified. In certain embodiments, one or more nucleotides in the seed region are chemically modified. In certain embodiments, one or more nucleotides in the 3'-terminus are chemically modified. In certain embodiments, none of the nucleotides in the 5'-handle is chemically modified. In some embodiments, the chemical modification in the seed region is a minor modification, such as incorporation of a 2'-fluoro analog. In a specific embodiment, one nucleotide of the seed region is replaced with a 2'-fluoro analog. In some embodiments, 5 or 10 nucleotides in the 3'-terminus are chemically modified. Such chemical modifications at the 3'-terminus of the Cpf1 CrRNA improve gene cutting efficiency (see Li, et al., *Nature Biomedical Engineering,* 2017, 1:0066). In a specific embodiment, 5 nucleotides in the 3'-terminus are replaced with 2'-fluoro analogues. In a specific embodiment, 10 nucleotides in the 3'-terminus are replaced with 2'-fluoro analogues. In a specific embodiment, 5 nucleotides in the 3'-terminus are replaced with 2'-O-methyl (M) analogs. In some embodiments, 3 nucleotides at each of the 3' and 5' ends are chemically modified. In a specific embodiment, the modifications comprise 2'-O-methyl or phosphorothioate analogs. In a specific embodiment, 12 nucleotides in the tetraloop and 16 nucleotides in the stem-loop region are replaced with 2'-O-methyl analogs. Such chemical modifications improve in vivo editing and stability (see Finn et al., *Cell Reports* (2018), 22: 2227-2235).

In some embodiments, the loop of the 5'-handle of the guide is modified. In some embodiments, the loop of the 5'-handle of the guide is modified to have a deletion, an insertion, a split, or chemical modifications. In certain embodiments, the loop comprises 3, 4, or 5 nucleotides. In certain embodiments, the loop comprises the sequence of UCUU, UUUU, UAUU, or UGUU. In some embodiments, the guide molecule forms a stemloop with a separate non-covalently linked sequence, which can be DNA or RNA.

Synthetically Linked Guide

In one aspect, the guide comprises a tracr sequence and a tracr mate sequence that are chemically linked or conjugated via a non-phosphodiester bond. In one aspect, the guide comprises a tracr sequence and a tracr mate sequence that are chemically linked or conjugated via a non-nucleotide loop. In some embodiments, the tracr and tracr mate sequences are joined via a non-phosphodiester covalent linker. Examples of the covalent linker include but are not limited to a chemical moiety selected from the group consisting of carbamates, ethers, esters, amides, imines, amidines, aminotrizines, hydrozone, disulfides, thioethers, thioesters, phosphorothioates, phosphorodithioates, sulfonamides, sulfonates, fulfones, sulfoxides, ureas, thioureas, hydrazide, oxime, triazole, photolabile linkages, C—C bond forming groups such as Diels-Alder cyclo-addition pairs or ring-closing metathesis pairs, and Michael reaction pairs.

In some embodiments, the tracr and tracr mate sequences are first synthesized using the standard phosphoramidite synthetic protocol (Herdewijn, P., ed., Methods in Molecular Biology Col 288, Oligonucleotide Synthesis: Methods and Applications, Humana Press, New Jersey (2012)). In some embodiments, the tracr or tracr mate sequences can be functionalized to contain an appropriate functional group for ligation using the standard protocol known in the art (Hermanson, G. T., Bioconjugate Techniques, Academic Press (2013)). Examples of functional groups include, but are not limited to, hydroxyl, amine, carboxylic acid, carboxylic acid halide, carboxylic acid active ester, aldehyde, carbonyl, chlorocarbonyl, imidazolylcarbonyl, hydrozide, semicarbazide, thio semicarbazide, thiol, maleimide, haloalkyl, sufonyl, ally, propargyl, diene, alkyne, and azide. Once the tracr and the tracr mate sequences are functionalized, a covalent chemical bond or linkage can be formed between the two oligonucleotides. Examples of chemical bonds include, but are not limited to, those based on carbamates, ethers, esters, amides, imines, amidines, aminotrizines, hydrozone, disulfides, thioethers, thioesters, phosphorothioates, phosphorodithioates, sulfonamides, sulfonates, fulfones, sulfoxides, ureas, thioureas, hydrazide, oxime, triazole, photolabile linkages, C—C bond forming groups such as Diels-Alder cyclo-addition pairs or ring-closing metathesis pairs, and Michael reaction pairs.

In some embodiments, the tracr and tracr mate sequences can be chemically synthesized. In some embodiments, the chemical synthesis uses automated, solid-phase oligonucleotide synthesis machines with 2'-acetoxyethyl orthoester (2'-ACE) (Scaringe et al., J. Am. Chem. Soc. (1998) 120: 11820-11821; Scaringe, Methods Enzymol. (2000) 317: 3-18) or 2'-thionocarbamate (2'-TC) chemistry (Dellinger et al., J. Am. Chem. Soc. (2011) 133: 11540-11546; Hendel et al., Nat. Biotechnol. (2015) 33:985-989).

In some embodiments, the tracr and tracr mate sequences can be covalently linked using various bioconjugation reactions, loops, bridges, and non-nucleotide links via modifications of sugar, internucleotide phosphodiester bonds, purine and pyrimidine residues. Sletten et al., Angew. Chem. Int. Ed. (2009) 48:6974-6998; Manoharan, M. Curr. Opin. Chem. Biol. (2004) 8: 570-9; Behlke et al., Oligonucleotides (2008) 18: 305-19; Watts, et al., Drug. Discov. Today (2008) 13: 842-55; Shukla, et al., ChemMedChem (2010) 5: 328-49.

In some embodiments, the tracr and tracr mate sequences can be covalently linked using click chemistry. In some embodiments, the tracr and tracr mate sequences can be covalently linked using a triazole linker. In some embodiments, the tracr and tracr mate sequences can be covalently linked using Huisgen 1,3-dipolar cycloaddition reaction involving an alkyne and azide to yield a highly stable triazole linker (He et al., ChemBioChem (2015) 17: 1809-1812; WO 2016/186745). In some embodiments, the tracr and tracr mate sequences are covalently linked by ligating a 5'-hexyne tracrRNA and a 3'-azide crRNA. In some embodiments, either or both of the 5'-hexyne tracrRNA and a 3'-azide crRNA can be protected with 2'-acetoxyethl orthoester (2'-ACE) group, which can be subsequently removed using Dharmacon protocol (Scaringe et al., J. Am. Chem. Soc. (1998) 120: 11820-11821; Scaringe, Methods Enzymol. (2000) 317: 3-18).

In some embodiments, the tracr and tracr mate sequences can be covalently linked via a linker (e.g., a non-nucleotide loop) that comprises a moiety such as spacers, attachments, bioconjugates, chromophores, reporter groups, dye labeled RNAs, and non-naturally occurring nucleotide analogues. More specifically, suitable spacers for purposes of this invention include, but are not limited to, polyethers (e.g., polyethylene glycols, polyalcohols, polypropylene glycol or mixtures of ethylene and propylene glycols), polyamines group (e.g., spennine, spermidine and polymeric derivatives thereof), polyesters (e.g., poly(ethyl acrylate)), polyphosphodiesters, alkylenes, and combinations thereof. Suitable attachments include any moiety that can be added to the linker to add additional properties to the linker, such as but not limited to, fluorescent labels. Suitable bioconjugates include, but are not limited to, peptides, glycosides, lipids, cholesterol, phospholipids, diacyl glycerols and dialkyl glycerols, fatty acids, hydrocarbons, enzyme substrates, steroids, biotin, digoxigenin, carbohydrates, polysaccharides. Suitable chromophores, reporter groups, and dye-labeled RNAs include, but are not limited to, fluorescent dyes such as fluorescein and rhodamine, chemiluminescent, electrochemiluminescent, and bioluminescent marker compounds. The design of example linkers conjugating two RNA components are also described in WO 2004/015075.

The linker (e.g., a non-nucleotide loop) can be of any length. In some embodiments, the linker has a length equivalent to about 0-16 nucleotides. In some embodiments, the linker has a length equivalent to about 0-8 nucleotides. In some embodiments, the linker has a length equivalent to about 0-4 nucleotides. In some embodiments, the linker has a length equivalent to about 2 nucleotides. Example linker design is also described in WO2011/008730.

A typical Type II Cas9 sgRNA comprises (in 5' to 3' direction): a guide sequence, a poly U tract, a first complimentary stretch (the "repeat"), a loop (tetraloop), a second complimentary stretch (the "anti-repeat" being complimentary to the repeat), a stem, and further stem loops and stems and a poly A (often poly U in RNA) tail (terminator). In preferred embodiments, certain aspects of guide architecture are retained, certain aspect of guide architecture cam be modified, for example by addition, subtraction, or substitution of features, whereas certain other aspects of guide architecture are maintained. Preferred locations for engineered sgRNA modifications, including but not limited to insertions, deletions, and substitutions include guide termini and regions of the sgRNA that are exposed when complexed with CRISPR protein and/or target, for example the tetraloop and/or loop2.

In certain embodiments, guides of the invention comprise specific binding sites (e.g. aptamers) for adapter proteins, which may comprise one or more functional domains (e.g. via fusion protein). When such a guide forms a CRISPR complex (i.e. CRISPR enzyme binding to guide and target) the adapter proteins bind and, the functional domain associated with the adapter protein is positioned in a spatial orientation which is advantageous for the attributed function to be effective. For example, if the functional domain is a transcription activator (e.g. VP64 or p65), the transcription activator is placed in a spatial orientation which allows it to affect the transcription of the target. Likewise, a transcription repressor will be advantageously positioned to affect the transcription of the target and a nuclease (e.g. Fok1) will be advantageously positioned to cleave or partially cleave the target.

The skilled person will understand that modifications to the guide which allow for binding of the adapter+functional domain but not proper positioning of the adapter+functional domain (e.g. due to steric hindrance within the three-dimensional structure of the CRISPR complex) are modifications which are not intended. The one or more modified guide may be modified at the tetra loop, the stem loop 1, stem loop 2, or stem loop 3, as described herein, preferably at either the tetra loop or stem loop 2, and most preferably at both the tetra loop and stem loop 2.

The repeat:anti repeat duplex will be apparent from the secondary structure of the sgRNA. It may be typically a first complimentary stretch after (in 5' to 3' direction) the poly U tract and before the tetraloop; and a second complimentary stretch after (in 5' to 3' direction) the tetraloop and before the poly A tract. The first complimentary stretch (the "repeat") is complimentary to the second complimentary stretch (the "anti-repeat"). As such, they Watson-Crick base pair to form a duplex of dsRNA when folded back on one another. As such, the anti-repeat sequence is the complimentary sequence of the repeat and in terms to A-U or C-G base pairing, but also in terms of the fact that the anti-repeat is in the reverse orientation due to the tetraloop.

In an embodiment of the invention, modification of guide architecture comprises replacing bases in stemloop 2. For example, in some embodiments, "actt" ("acuu" in RNA) and "aagt" ("aagu" in RNA) bases in stemloop2 are replaced with "cgcc" and "gcgg". In some embodiments, "actt" and "aagt" bases in stemloop2 are replaced with complimentary GC-rich regions of 4 nucleotides. In some embodiments, the complimentary GC-rich regions of 4 nucleotides are "cgcc" and "gcgg" (both in 5' to 3' direction). In some embodiments, the complimentary GC-rich regions of 4 nucleotides are "gcgg" and "cgcc" (both in 5' to 3' direction). Other combination of C and G in the complimentary GC-rich regions of 4 nucleotides will be apparent including CCCC and GGGG.

In one aspect, the stemloop 2, e.g., "ACTTgtttAAGT" (SEQ ID NO: 1) can be replaced by any "XXXXgtt-tYYYY", e.g., where XXXX and YYYY represent any complementary sets of nucleotides that together will base pair to each other to create a stem.

In one aspect, the stem comprises at least about 4 bp comprising complementary X and Y sequences, although stems of more, e.g., 5, 6, 7, 8, 9, 10, 11 or 12 or fewer, e.g., 3, 2, base pairs are also contemplated. Thus, for example X2-12 and Y2-12 (wherein X and Y represent any complementary set of nucleotides) may be contemplated. In one aspect, the stem made of the X and Y nucleotides, together with the "gttt," will form a complete hairpin in the overall secondary structure; and the amount of base pairs can be any amount that forms a complete hairpin. In one aspect, any complementary X:Y basepairing sequence (e.g., as to length) is tolerated, so long as the secondary structure of the entire sgRNA is preserved. In one aspect, the stem can be a form of X:Y basepairing that does not disrupt the secondary structure of the whole sgRNA in that it has a DR:tracr duplex, and 3 stemloops. In one aspect, the "gttt" tetraloop that connects ACTT and AAGT (or any alternative stem made of X:Y basepairs) can be any sequence of the same length (e.g., 4 basepair) or longer that does not interrupt the overall secondary structure of the sgRNA. In one aspect, the stemloop can be something that further lengthens stem-loop2, e.g. can be MS2 aptamer. In one aspect, the stemloop3 "GGCACCGagtCGGTGC" (SEQ ID NO: 2) can likewise take on a "XXXXXXXagtYYYYYYY" form, e.g., wherein X7 and Y7 represent any complementary sets of nucleotides that together will base pair to each other to create a stem. In one aspect, the stem comprises about 7 bp comprising complementary X and Y sequences, although stems of more or fewer basepairs are also contemplated. In one aspect, the stem made of the X and Y nucleotides, together with the "agt", will form a complete hairpin in the overall secondary structure. In one aspect, any complementary X:Y basepairing sequence is tolerated, so long as the secondary structure of the entire sgRNA is preserved. In one aspect, the stem can be a form of X:Y basepairing that doesn't disrupt the secondary structure of the whole sgRNA in that it has a DR:tracr duplex, and 3 stemloops. In one aspect, the "agt" sequence of the stemloop 3 can be extended or be replaced by an aptamer, e.g., a MS2 aptamer or sequence that otherwise generally preserves the architecture of stemloop3. In one aspect for alternative Stemloops 2 and/or 3, each X and Y pair can refer to any basepair. In one aspect, non-Watson Crick basepairing is contemplated, where such pairing otherwise generally preserves the architecture of the stemloop at that position.

In one aspect, the DR:tracrRNA duplex can be replaced with the form: gYYYYag(N)NNNNxxxxNNNN(AAN)uuRRRRu (using standard IUPAC nomenclature for nucleotides), wherein (N) and (AAN) represent part of the bulge in the duplex, and "xxxx" represents a linker sequence. NNNN on the direct repeat can be anything so long as it basepairs with the corresponding NNNN portion of the tracrRNA. In one aspect, the DR:tracrRNA duplex can be connected by a linker of any length (xxxx . . . ), any base composition, as long as it doesn't alter the overall structure.

In one aspect, the sgRNA structural requirement is to have a duplex and 3 stemloops. In most aspects, the actual sequence requirement for many of the particular base requirements are lax, in that the architecture of the DR:tracrRNA duplex should be preserved, but the sequence that creates the architecture, i.e., the stems, loops, bulges, etc., may be altered.

Aptamers

One guide with a first aptamer/RNA-binding protein pair can be linked or fused to an activator, whilst a second guide with a second aptamer/RNA-binding protein pair can be linked or fused to a repressor. The guides are for different targets (loci), so this allows one gene to be activated and one repressed. For example, the following schematic shows such an approach:

Guide 1—MS2 aptamer-------MS2 RNA-binding protein-------VP64 activator; and

Guide 2—PP7 aptamer-------PP7 RNA-binding protein-------SID4x repressor.

The present invention also relates to orthogonal PP7/MS2 gene targeting. In this example, sgRNA targeting different loci are modified with distinct RNA loops in order to recruit MS2-VP64 or PP7-SID4X, which activate and repress their target loci, respectively. PP7 is the RNA-binding coat protein of the bacteriophage *Pseudomonas*. Like MS2, it binds a specific RNA sequence and secondary structure. The PP7 RNA-recognition motif is distinct from that of MS2. Consequently, PP7 and MS2 can be multiplexed to mediate distinct effects at different genomic loci simultaneously. For example, an sgRNA targeting locus A can be modified with MS2 loops, recruiting MS2-VP64 activators, while another sgRNA targeting locus B can be modified with PP7 loops, recruiting PP7-SID4X repressor domains. In the same cell, dCas9 can thus mediate orthogonal, locus-specific modifications. This principle can be extended to incorporate other orthogonal RNA-binding proteins such as Q-beta.

An alternative option for orthogonal repression includes incorporating non-coding RNA loops with transactive repressive function into the guide (either at similar positions to the MS2/PP7 loops integrated into the guide or at the 3' terminus of the guide). For instance, guides were designed with non-coding (but known to be repressive) RNA loops (e.g. using the Alu repressor (in RNA) that interferes with RNA polymerase II in mammalian cells). The Alu RNA sequence was located: in place of the MS2 RNA sequences as used herein (e.g. at tetraloop and/or stem loop 2); and/or at 3' terminus of the guide. This gives possible combinations of MS2, PP7 or Alu at the tetraloop and/or stemloop 2 positions, as well as, optionally, addition of Alu at the 3' end of the guide (with or without a linker).

The use of two different aptamers (distinct RNA) allows an activator-adaptor protein fusion and a repressor-adaptor protein fusion to be used, with different guides, to activate expression of one gene, whilst repressing another. They, along with their different guides can be administered together, or substantially together, in a multiplexed approach. A large number of such modified guides can be used all at the same time, for example 10 or 20 or 30 and so forth, whilst only one (or at least a minimal number) of Cas9s to be delivered, as a comparatively small number of Cas9s can be used with a large number of modified guides. The adaptor protein may be associated (preferably linked or fused to) one or more activators or one or more repressors. For example, the adaptor protein may be associated with a first activator and a second activator. The first and second activators may be the same, but they are preferably different activators. For example, one might be VP64, whilst the other might be p65, although these are just examples and other transcriptional activators are envisaged. Three or more or even four or more activators (or repressors) may be used, but package size may limit the number being higher than 5 different functional domains. Linkers are preferably used, over a direct fusion to the adaptor protein, where two or more functional domains are associated with the adaptor protein. Suitable linkers might include the GlySer linker.

It is also envisaged that the enzyme-guide complex as a whole may be associated with two or more functional domains. For example, there may be two or more functional domains associated with the enzyme, or there may be two or more functional domains associated with the guide (via one or more adaptor proteins), or there may be one or more functional domains associated with the enzyme and one or more functional domains associated with the guide (via one or more adaptor proteins).

The fusion between the adaptor protein and the activator or repressor may include a linker. For example, GlySer linkers GGGS can be used. They can be used in repeats of 3 ((GGGGS)$_3$) or 6, 9 or even 12 (SEQ ID NOs: 3, 4, 5 and 6) or more, to provide suitable lengths, as required. Linkers can be used between the RNA-binding protein and the functional domain (activator or repressor), or between the CRISPR Enzyme (Cas9) and the functional domain (activator or repressor). The linkers the user to engineer appropriate amounts of "mechanical flexibility".

Dead Guides: Guide RNAs Comprising a Dead Guide Sequence May be Used in the Present Invention In one aspect, the invention provides guide sequences which are modified in a manner which allows for formation of the CRISPR complex and successful binding to the target, while at the same time, not allowing for successful nuclease activity (i.e. without nuclease activity/without indel activity). For matters of explanation such modified guide sequences are referred to as "dead guides" or "dead guide sequences". These dead guides or dead guide sequences can be thought of as catalytically inactive or conformationally inactive with regard to nuclease activity. Nuclease activity may be measured using surveyor analysis or deep sequencing as commonly used in the art, preferably surveyor analysis. Similarly, dead guide sequences may not sufficiently engage in productive base pairing with respect to the ability to promote catalytic activity or to distinguish on-target and off-target binding activity. Briefly, the surveyor assay involves purifying and amplifying a CRISPR target site for a gene and forming heteroduplexes with primers amplifying the CRISPR target site. After re-anneal, the products are treated with SURVEYOR nuclease and SURVEYOR enhancer S (Transgenomics) following the manufacturer's recommended protocols, analyzed on gels, and quantified based upon relative band intensities.

Hence, in a related aspect, the invention provides a non-naturally occurring or engineered composition Cas9 CRISPR-Cas system comprising a functional Cas9 as described herein, and guide RNA (gRNA) wherein the gRNA comprises a dead guide sequence whereby the gRNA is capable of hybridizing to a target sequence such that the Cas9 CRISPR-Cas system is directed to a genomic locus of interest in a cell without detectable indel activity resultant from nuclease activity of a non-mutant Cas9 enzyme of the system as detected by a SURVEYOR assay. For shorthand purposes, a gRNA comprising a dead guide sequence whereby the gRNA is capable of hybridizing to a target sequence such that the Cas9 CRISPR-Cas system is directed to a genomic locus of interest in a cell without detectable indel activity resultant from nuclease activity of a non-mutant Cas9 enzyme of the system as detected by a SURVEYOR assay is herein termed a "dead gRNA". It is to be understood that any of the gRNAs according to the invention as described herein elsewhere may be used as dead gRNAs/gRNAs comprising a dead guide sequence as described herein below. Any of the methods, products, compositions and uses as described herein elsewhere is equally applicable with the dead gRNAs/gRNAs comprising a dead guide sequence as further detailed below. By means of further guidance, the following particular aspects and embodiments are provided.

The ability of a dead guide sequence to direct sequence-specific binding of a CRISPR complex to a target sequence may be assessed by any suitable assay. For example, the components of a CRISPR system sufficient to form a CRISPR complex, including the dead guide sequence to be tested, may be provided to a host cell having the corresponding target sequence, such as by transfection with vectors encoding the components of the CRISPR sequence, followed by an assessment of preferential cleavage within the target sequence, such as by Surveyor assay as described herein. Similarly, cleavage of a target polynucleotide sequence may be evaluated in a test tube by providing the target sequence, components of a CRISPR complex, including the dead guide sequence to be tested and a control guide sequence different from the test dead guide sequence, and comparing binding or rate of cleavage at the target sequence between the test and control guide sequence reactions. Other assays are possible, and will occur to those skilled in the art.

A dead guide sequence may be selected to target any target sequence. In some embodiments, the target sequence is a sequence within a genome of a cell.

As explained further herein, several structural parameters allow for a proper framework to arrive at such dead guides. Dead guide sequences are shorter than respective guide sequences which result in active Cas9-specific indel formation. Dead guides are 5%, 10%, 20%, 30%, 40%, 50%, shorter than respective guides directed to the same Cas9 leading to active Cas9-specific indel formation.

As explained below and known in the art, one aspect of gRNA—Cas9 specificity is the direct repeat sequence, which is to be appropriately linked to such guides. In particular, this implies that the direct repeat sequences are designed dependent on the origin of the Cas9. Thus, structural data available for validated dead guide sequences may be used for designing Cas9 specific equivalents. Structural similarity between, e.g., the orthologous nuclease domains RuvC of two or more Cas9 effector proteins may be used to transfer design equivalent dead guides. Thus, the dead guide herein may be appropriately modified in length and sequence to reflect such Cas9 specific equivalents, allowing for formation of the CRISPR complex and successful binding to the target, while at the same time, not allowing for successful nuclease activity.

The use of dead guides in the context herein as well as the state of the art provides a surprising and unexpected platform for network biology and/or systems biology in both in vitro, ex vivo, and in vivo applications, allowing for multiplex gene targeting, and in particular bidirectional multiplex gene targeting. Prior to the use of dead guides, addressing multiple targets, for example for activation, repression and/or silencing of gene activity, has been challenging and in some cases not possible. With the use of dead guides, multiple targets, and thus multiple activities, may be addressed, for example, in the same cell, in the same animal, or in the same patient. Such multiplexing may occur at the same time or staggered for a desired timeframe.

For example, the dead guides now allow for the first time to use gRNA as a means for gene targeting, without the consequence of nuclease activity, while at the same time providing directed means for activation or repression. Guide RNA comprising a dead guide may be modified to further include elements in a manner which allow for activation or repression of gene activity, in particular protein adaptors (e.g. aptamers) as described herein elsewhere allowing for functional placement of gene effectors (e.g. activators or repressors of gene activity). One example is the incorporation of aptamers, as explained herein and in the state of the art. By engineering the gRNA comprising a dead guide to incorporate protein-interacting aptamers (Konermann et al., "Genome-scale transcription activation by an engineered CRISPR-Cas9 complex," doi:10.1038/nature14136, incorporated herein by reference), one may assemble a synthetic transcription activation complex consisting of multiple distinct effector domains. Such may be modeled after natural transcription activation processes. For example, an aptamer, which selectively binds an effector (e.g. an activator or repressor; dimerized MS2 bacteriophage coat proteins as fusion proteins with an activator or repressor), or a protein which itself binds an effector (e.g. activator or repressor) may be appended to a dead gRNA tetraloop and/or a stem-loop 2. In the case of MS2, the fusion protein MS2-VP64 binds to the tetraloop and/or stem-loop 2 and in turn mediates transcriptional up-regulation, for example for Neurog2. Other transcriptional activators are, for example, VP64. P65, HSF1, and MyoD1. By mere example of this concept, replacement of the MS2 stem-loops with PP7-interacting stem-loops may be used to recruit repressive elements.

Thus, one aspect is a gRNA of the invention which comprises a dead guide, wherein the gRNA further comprises modifications which provide for gene activation or repression, as described herein. The dead gRNA may comprise one or more aptamers. The aptamers may be specific to gene effectors, gene activators or gene repressors. Alternatively, the aptamers may be specific to a protein which in turn is specific to and recruits/binds a specific gene effector, gene activator or gene repressor. If there are multiple sites for activator or repressor recruitment, it is preferred that the sites are specific to either activators or repressors. If there are multiple sites for activator or repressor binding, the sites may be specific to the same activators or same repressors. The sites may also be specific to different activators or different repressors. The gene effectors, gene activators, gene repressors may be present in the form of fusion proteins.

In an embodiment, the dead gRNA as described herein or the Cas9 CRISPR-Cas complex as described herein includes a non-naturally occurring or engineered composition comprising two or more adaptor proteins, wherein each protein is associated with one or more functional domains and wherein the adaptor protein binds to the distinct RNA sequence(s) inserted into the at least one loop of the dead gRNA.

Hence, an aspect provides a non-naturally occurring or engineered composition comprising a guide RNA (gRNA) comprising a dead guide sequence capable of hybridizing to a target sequence in a genomic locus of interest in a cell, wherein the dead guide sequence is as defined herein, a Cas9 comprising at least one or more nuclear localization sequences, wherein the Cas9 optionally comprises at least one mutation wherein at least one loop of the dead gRNA is modified by the insertion of distinct RNA sequence(s) that bind to one or more adaptor proteins, and wherein the adaptor protein is associated with one or more functional domains; or, wherein the dead gRNA is modified to have at least one non-coding functional loop, and wherein the composition comprises two or more adaptor proteins, wherein the each protein is associated with one or more functional domains.

In certain embodiments, the adaptor protein is a fusion protein comprising the functional domain, the fusion protein optionally comprising a linker between the adaptor protein and the functional domain, the linker optionally including a GlySer linker.

In certain embodiments, the at least one loop of the dead gRNA is not modified by the insertion of distinct RNA sequence(s) that bind to the two or more adaptor proteins.

In certain embodiments, the one or more functional domains associated with the adaptor protein is a transcriptional activation domain.

In certain embodiments, the one or more functional domains associated with the adaptor protein is a transcriptional activation domain comprising VP64, p65, MyoD1, HSF1, RTA or SETT/9.

In certain embodiments, the one or more functional domains associated with the adaptor protein is a transcriptional repressor domain.

In certain embodiments, the transcriptional repressor domain is a KRAB domain.

In certain embodiments, the transcriptional repressor domain is a NuE domain, NcoR domain, SID domain or a SID4X domain.

In certain embodiments, at least one of the one or more functional domains associated with the adaptor protein have one or more activities comprising methylase activity, demethylase activity, transcription activation activity, transcription repression activity, transcription release factor activity, histone modification activity, DNA integration activity RNA cleavage activity, DNA cleavage activity or nucleic acid binding activity.

In certain embodiments, the DNA cleavage activity is due to a Fok1 nuclease.

In certain embodiments, the dead gRNA is modified so that, after dead gRNA binds the adaptor protein and further binds to the Cas9 and target, the functional domain is in a spatial orientation allowing for the functional domain to function in its attributed function.

In certain embodiments, the at least one loop of the dead gRNA is tetra loop and/or loop2. In certain embodiments, the tetra loop and loop 2 of the dead gRNA are modified by the insertion of the distinct RNA sequence(s).

In certain embodiments, the insertion of distinct RNA sequence(s) that bind to one or more adaptor proteins is an aptamer sequence. In certain embodiments, the aptamer sequence is two or more aptamer sequences specific to the same adaptor protein. In certain embodiments, the aptamer sequence is two or more aptamer sequences specific to different adaptor protein.

In certain embodiments, the adaptor protein comprises MS2, PP7, Qβ, F2, GA, fr, JP501, M12, R17, BZ13, JP34, JP500, KU1, M11, MX1, TW18, VK, SP, FI, ID2, NL95, TW19, AP205, φCb5, φCb8r, φCb12r, φCb23r, 7s, PRR1.

In certain embodiments, the cell is a eukaryotic cell. In certain embodiments, the eukaryotic cell is a mammalian cell, optionally a mouse cell. In certain embodiments, the mammalian cell is a human cell.

In certain embodiments, a first adaptor protein is associated with a p65 domain and a second adaptor protein is associated with a HSF1 domain.

In certain embodiments, the composition comprises a Cas9 CRISPR-Cas complex having at least three functional domains, at least one of which is associated with the Cas9 and at least two of which are associated with dead gRNA.

In certain embodiments, the composition further comprises a second gRNA, wherein the second gRNA is a live gRNA capable of hybridizing to a second target sequence such that a second Cas9 CRISPR-Cas system is directed to a second genomic locus of interest in a cell with detectable indel activity at the second genomic locus resultant from nuclease activity of the Cas9 enzyme of the system.

In certain embodiments, the composition further comprises a plurality of dead gRNAs and/or a plurality of live gRNAs.

One aspect of the invention is to take advantage of the modularity and customizability of the gRNA scaffold to establish a series of gRNA scaffolds with different binding sites (in particular aptamers) for recruiting distinct types of effectors in an orthogonal manner. Again, for matters of example and illustration of the broader concept, replacement of the MS2 stem-loops with PP7-interacting stem-loops may be used to bind/recruit repressive elements, enabling multiplexed bidirectional transcriptional control. Thus, in general, gRNA comprising a dead guide may be employed to provide for multiplex transcriptional control and preferred bidirectional transcriptional control. This transcriptional control is most preferred of genes. For example, one or more gRNA comprising dead guide(s) may be employed in targeting the activation of one or more target genes. At the same time, one or more gRNA comprising dead guide(s) may be employed in targeting the repression of one or more target genes. Such a sequence may be applied in a variety of different combinations, for example the target genes are first repressed and then at an appropriate period other targets are activated, or select genes are repressed at the same time as select genes are activated, followed by further activation and/or repression. As a result, multiple components of one or more biological systems may advantageously be addressed together.

In an aspect, the invention provides nucleic acid molecule (s) encoding dead gRNA or the Cas9 CRISPR-Cas complex or the composition as described herein.

In an aspect, the invention provides a vector system comprising: a nucleic acid molecule encoding dead guide RNA as defined herein. In certain embodiments, the vector system further comprises a nucleic acid molecule(s) encoding Cas9. In certain embodiments, the vector system further comprises a nucleic acid molecule(s) encoding (live) gRNA. In certain embodiments, the nucleic acid molecule or the vector further comprises regulatory element(s) operable in a eukaryotic cell operably linked to the nucleic acid molecule encoding the guide sequence (gRNA) and/or the nucleic acid molecule encoding Cas9 and/or the optional nuclear localization sequence(s).

In another aspect, structural analysis may also be used to study interactions between the dead guide and the active Cas9 nuclease that enable DNA binding, but no DNA cutting. In this way amino acids important for nuclease activity of Cas9 are determined. Modification of such amino acids allows for improved Cas9 enzymes used for gene editing.

A further aspect is combining the use of dead guides as explained herein with other applications of CRISPR, as explained herein as well as known in the art. For example, gRNA comprising dead guide(s) for targeted multiplex gene activation or repression or targeted multiplex bidirectional gene activation/repression may be combined with gRNA comprising guides which maintain nuclease activity, as explained herein. Such gRNA comprising guides which maintain nuclease activity may or may not further include modifications which allow for repression of gene activity (e.g. aptamers). Such gRNA comprising guides which maintain nuclease activity may or may not further include modifications which allow for activation of gene activity (e.g. aptamers). In such a manner, a further means for multiplex gene control is introduced (e.g. multiplex gene targeted activation without nuclease activity/without indel activity may be provided at the same time or in combination with gene targeted repression with nuclease activity).

For example, 1) using one or more gRNA (e.g. 1-50, 1-40, 1-30, 1-20, preferably 1-10, more preferably 1-5) comprising dead guide(s) targeted to one or more genes and further modified with appropriate aptamers for the recruitment of gene activators; 2) may be combined with one or more gRNA (e.g. 1-50, 1-40, 1-30, 1-20, preferably 1-10, more preferably 1-5) comprising dead guide(s) targeted to one or more genes and further modified with appropriate aptamers for the recruitment of gene repressors. 1) and/or 2) may then be combined with 3) one or more gRNA (e.g. 1-50, 1-40, 1-30, 1-20, preferably 1-10, more preferably 1-5) targeted to one or more genes. This combination can then be carried out in turn with 1)+2)+3) with 4) one or more gRNA (e.g. 1-50, 1-40, 1-30, 1-20, preferably 1-10, more preferably 1-5) targeted to one or more genes and further modified with appropriate aptamers for the recruitment of gene activators. This combination can then be carried in turn with 1)+2)+3)+4) with 5) one or more gRNA (e.g. 1-50, 1-40, 1-30, 1-20, preferably 1-10, more preferably 1-5) targeted to one or more genes and further modified with appropriate aptamers for the recruitment of gene repressors. As a result various uses and combinations are included in the invention. For example, combination 1)+2); combination 1)+3); combination 2)+3); combination 1)+2)+3); combination 1)+2)+3)+4); combination 1)+3)+4); combination 2)+3)+4); combination 1)+2)+4); combination 1)+2)+3)+4)+5); combination 1)+3)+4)+5); combination 2)+3)+4)+5); combination 1)+2)+4)+5); combination 1)+2)+3)+5); combination 1)+3)+5); combination 2)+3)+5); combination 1)+2)+5).

In an aspect, the invention provides an algorithm for designing, evaluating, or selecting a dead guide RNA targeting sequence (dead guide sequence) for guiding a Cas9 CRISPR-Cas system to a target gene locus. In particular, it has been determined that dead guide RNA specificity relates to and can be optimized by varying i) GC content and ii) targeting sequence length. In an aspect, the invention provides an algorithm for designing or evaluating a dead guide RNA targeting sequence that minimizes off-target binding or interaction of the dead guide RNA. In an embodiment of the invention, the algorithm for selecting a dead guide RNA targeting sequence for directing a CRISPR system to a gene locus in an organism comprises a) locating one or more CRISPR motifs in the gene locus, analyzing the 20 nt sequence downstream of each CRISPR motif by i) determining the GC content of the sequence; and ii) determining whether there are off-target matches of the 15 downstream nucleotides nearest to the CRISPR motif in the genome of the organism, and c) selecting the 15 nucleotide sequence for use in a dead guide RNA if the GC content of the sequence is 70% or less and no off-target matches are identified. In an embodiment, the sequence is selected for a targeting sequence if the GC content is 60% or less. In certain embodiments, the sequence is selected for a targeting sequence if the GC content is 55% or less, 50% or less, 45% or less, 40% or less, 35% or less or 30% or less. In an embodiment, two or more sequences of the gene locus are analyzed and the sequence having the lowest GC content, or the next lowest GC content, or the next lowest GC content is selected. In an embodiment, the sequence is selected for a targeting sequence if no off-target matches are identified in the genome of the organism. In an embodiment, the targeting sequence is selected if no off-target matches are identified in regulatory sequences of the genome.

In an aspect, the invention provides a method of selecting a dead guide RNA targeting sequence for directing a functionalized CRISPR system to a gene locus in an organism, which comprises: a) locating one or more CRISPR motifs in the gene locus; b) analyzing the 20 nt sequence downstream of each CRISPR motif by: i) determining the GC content of the sequence; and ii) determining whether there are off-target matches of the first 15 nt of the sequence in the genome of the organism; c) selecting the sequence for use in a guide RNA if the GC content of the sequence is 70% or less and no off-target matches are identified. In an embodiment, the sequence is selected if the GC content is 50% or less. In an embodiment, the sequence is selected if the GC content is 40% or less. In an embodiment, the sequence is selected if the GC content is 30% or less. In an embodiment, two or more sequences are analyzed and the sequence having the lowest GC content is selected. In an embodiment, off-target matches are determined in regulatory sequences of the organism. In an embodiment, the gene locus is a regulatory region. An aspect provides a dead guide RNA comprising the targeting sequence selected according to the aforementioned methods.

In an aspect, the invention provides a dead guide RNA for targeting a functionalized CRISPR system to a gene locus in an organism. In an embodiment of the invention, the dead guide RNA comprises a targeting sequence wherein the CG content of the target sequence is 70% or less, and the first 15 nt of the targeting sequence does not match an off-target sequence downstream from a CRISPR motif in the regulatory sequence of another gene locus in the organism. In certain embodiments, the GC content of the targeting sequence 60% or less, 55% or less, 50% or less, 45% or less, 40% or less, 35% or less or 30% or less. In certain embodiments, the GC content of the targeting sequence is from 70% to 60% or from 60% to 50% or from 50% to 40% or from 40% to 30%. In an embodiment, the targeting sequence has the lowest CG content among potential targeting sequences of the locus.

In an embodiment of the invention, the first 15 nt of the dead guide match the target sequence. In another embodiment, first 14 nt of the dead guide match the target sequence. In another embodiment, the first 13 nt of the dead guide match the target sequence. In another embodiment first 12 nt of the dead guide match the target sequence. In another embodiment, first 11 nt of the dead guide match the target sequence. In another embodiment, the first 10 nt of the dead guide match the target sequence. In an embodiment of the invention the first 15 nt of the dead guide does not match an off-target sequence downstream from a CRISPR motif in the regulatory region of another gene locus. In other embodiments, the first 14 nt, or the first 13 nt of the dead guide, or the first 12 nt of the guide, or the first 11 nt of the dead guide, or the first 10 nt of the dead guide, does not match an off-target sequence downstream from a CRISPR motif in the regulatory region of another gene locus. In other embodiments, the first 15 nt, or 14 nt, or 13 nt, or 12 nt, or 11 nt of the dead guide do not match an off-target sequence downstream from a CRISPR motif in the genome.

In certain embodiments, the dead guide RNA includes additional nucleotides at the 3'-end that do not match the target sequence. Thus, a dead guide RNA that includes the first 15 nt, or 14 nt, or 13 nt, or 12 nt, or 11 nt downstream of a CRISPR motif can be extended in length at the 3' end to 12 nt, 13 nt, 14 nt, 15 nt, 16 nt, 17 nt, 18 nt, 19 nt, 20 nt, or longer.

The invention provides a method for directing a Cas9 CRISPR-Cas system, including but not limited to a dead Cas9 (dCas9) or functionalized Cas9 system (which may comprise a functionalized Cas9 or functionalized guide) to a gene locus. In an aspect, the invention provides a method for selecting a dead guide RNA targeting sequence and directing a functionalized CRISPR system to a gene locus in an organism. In an aspect, the invention provides a method for selecting a dead guide RNA targeting sequence and effecting gene regulation of a target gene locus by a functionalized Cas9 CRISPR-Cas system. In certain embodiments, the method is used to effect target gene regulation while minimizing off-target effects. In an aspect, the invention provides a method for selecting two or more dead guide RNA targeting sequences and effecting gene regulation of two or more target gene loci by a functionalized Cas9 CRISPR-Cas system. In certain embodiments, the method is used to effect regulation of two or more target gene loci while minimizing off-target effects.

In an aspect, the invention provides a method of selecting a dead guide RNA targeting sequence for directing a functionalized Cas9 to a gene locus in an organism, which comprises: a) locating one or more CRISPR motifs in the gene locus; b) analyzing the sequence downstream of each CRISPR motif by: i) selecting 10 to 15 nt adjacent to the CRISPR motif, ii) determining the GC content of the sequence; and c) selecting the 10 to 15 nt sequence as a targeting sequence for use in a guide RNA if the GC content of the sequence is 40% or more. In an embodiment, the sequence is selected if the GC content is 50% or more. In an embodiment, the sequence is selected if the GC content is 60% or more. In an embodiment, the sequence is selected if the GC content is 70% or more. In an embodiment, two or more sequences are analyzed and the sequence having the highest GC content is selected. In an embodiment, the method further comprises adding nucleotides to the 3' end of the selected sequence which do not match the sequence downstream of the CRISPR motif. An aspect provides a dead guide RNA comprising the targeting sequence selected according to the aforementioned methods.

In an aspect, the invention provides a dead guide RNA for directing a functionalized CRISPR system to a gene locus in an organism wherein the targeting sequence of the dead guide RNA consists of 10 to 15 nucleotides adjacent to the CRISPR motif of the gene locus, wherein the CG content of the target sequence is 50% or more. In certain embodiments, the dead guide RNA further comprises nucleotides added to the 3' end of the targeting sequence which do not match the sequence downstream of the CRISPR motif of the gene locus.

In an aspect, the invention provides for a single effector to be directed to one or more, or two or more gene loci. In certain embodiments, the effector is associated with a Cas9, and one or more, or two or more selected dead guide RNAs are used to direct the Cas9-associated effector to one or more, or two or more selected target gene loci. In certain embodiments, the effector is associated with one or more, or two or more selected dead guide RNAs, each selected dead guide RNA, when complexed with a Cas9 enzyme, causing its associated effector to localize to the dead guide RNA target. One non-limiting example of such CRISPR systems modulates activity of one or more, or two or more gene loci subject to regulation by the same transcription factor.

In an aspect, the invention provides for two or more effectors to be directed to one or more gene loci. In certain embodiments, two or more dead guide RNAs are employed, each of the two or more effectors being associated with a selected dead guide RNA, with each of the two or more effectors being localized to the selected target of its dead guide RNA. One non-limiting example of such CRISPR systems modulates activity of one or more, or two or more gene loci subject to regulation by different transcription factors. Thus, in one non-limiting embodiment, two or more transcription factors are localized to different regulatory sequences of a single gene. In another non-limiting embodiment, two or more transcription factors are localized to different regulatory sequences of different genes. In certain embodiments, one transcription factor is an activator. In certain embodiments, one transcription factor is an inhibitor. In certain embodiments, one transcription factor is an activator and another transcription factor is an inhibitor. In certain embodiments, gene loci expressing different components of the same regulatory pathway are regulated. In certain embodiments, gene loci expressing components of different regulatory pathways are regulated.

In an aspect, the invention also provides a method and algorithm for designing and selecting dead guide RNAs that are specific for target DNA cleavage or target binding and gene regulation mediated by an active Cas9 CRISPR-Cas system. In certain embodiments, the Cas9 CRISPR-Cas system provides orthogonal gene control using an active Cas9 which cleaves target DNA at one gene locus while at the same time binds to and promotes regulation of another gene locus.

In an aspect, the invention provides an method of selecting a dead guide RNA targeting sequence for directing a functionalized Cas9 to a gene locus in an organism, without cleavage, which comprises a) locating one or more CRISPR motifs in the gene locus; b) analyzing the sequence downstream of each CRISPR motif by i) selecting 10 to 15 nt adjacent to the CRISPR motif, ii) determining the GC content of the sequence, and c) selecting the 10 to 15 nt sequence as a targeting sequence for use in a dead guide RNA if the GC content of the sequence is 30% more, 40% or more. In certain embodiments, the GC content of the targeting sequence is 35% or more, 40% or more, 45% or more, 50% or more, 55% or more, 60% or more, 65% or more, or 70% or more. In certain embodiments, the GC content of the targeting sequence is from 30% to 40% or from 40% to 50% or from 50% to 60% or from 60% to 70%. In an embodiment of the invention, two or more sequences in a gene locus are analyzed and the sequence having the highest GC content is selected.

In an embodiment of the invention, the portion of the targeting sequence in which GC content is evaluated is 10 to 15 contiguous nucleotides of the 15 target nucleotides nearest to the PAM. In an embodiment of the invention, the portion of the guide in which GC content is considered is the 10 to 11 nucleotides or 11 to 12 nucleotides or 12 to 13 nucleotides or 13, or 14, or 15 contiguous nucleotides of the 15 nucleotides nearest to the PAM.

In an aspect, the invention further provides an algorithm for identifying dead guide RNAs which promote CRISPR system gene locus cleavage while avoiding functional activation or inhibition. It is observed that increased GC content in dead guide RNAs of 16 to 20 nucleotides coincides with increased DNA cleavage and reduced functional activation.

It is also demonstrated herein that efficiency of functionalized Cas9 can be increased by addition of nucleotides to the 3' end of a guide RNA which do not match a target sequence downstream of the CRISPR motif. For example, of dead guide RNA 11 to 15 nt in length, shorter guides may be less likely to promote target cleavage, but are also less efficient at promoting CRISPR system binding and functional control. In certain embodiments, addition of nucleotides that don't match the target sequence to the 3' end of the dead guide RNA increase activation efficiency while not increasing undesired target cleavage. In an aspect, the invention also provides a method and algorithm for identifying improved dead guide RNAs that effectively promote CRISPRP system function in DNA binding and gene regulation while not promoting DNA cleavage. Thus, in certain embodiments, the invention provides a dead guide RNA that includes the first 15 nt, or 14 nt, or 13 nt, or 12 nt, or 11 nt downstream of a CRISPR motif and is extended in length at the 3' end by nucleotides that mismatch the target to 12 nt, 13 nt, 14 nt, 15 nt, 16 nt, 17 nt, 18 nt, 19 nt, 20 nt, or longer.

In an aspect, the invention provides a method for effecting selective orthogonal gene control. As will be appreciated from the disclosure herein, dead guide selection according to the invention, taking into account guide length and GC content, provides effective and selective transcription control by a functional Cas9 CRISPR-Cas system, for example to regulate transcription of a gene locus by activation or inhibition and minimize off-target effects. Accordingly, by providing effective regulation of individual target loci, the invention also provides effective orthogonal regulation of two or more target loci.

In certain embodiments, orthogonal gene control is by activation or inhibition of two or more target loci. In certain embodiments, orthogonal gene control is by activation or inhibition of one or more target locus and cleavage of one or more target locus.

In one aspect, the invention provides a cell comprising a non-naturally occurring Cas9 CRISPR-Cas system comprising one or more dead guide RNAs disclosed or made according to a method or algorithm described herein wherein the expression of one or more gene products has been altered. In an embodiment of the invention, the expression in the cell of two or more gene products has been altered. The invention also provides a cell line from such a cell.

In one aspect, the invention provides a multicellular organism comprising one or more cells comprising a non-naturally occurring Cas9 CRISPR-Cas system comprising one or more dead guide RNAs disclosed or made according to a method or algorithm described herein. In one aspect, the invention provides a product from a cell, cell line, or multicellular organism comprising a non-naturally occurring Cas9 CRISPR-Cas system comprising one or more dead guide RNAs disclosed or made according to a method or algorithm described herein.

A further aspect of this invention is the use of gRNA comprising dead guide(s) as described herein, optionally in combination with gRNA comprising guide(s) as described herein or in the state of the art, in combination with systems e.g. cells, transgenic animals, transgenic mice, inducible transgenic animals, inducible transgenic mice) which are engineered for either overexpression of Cas9 or preferably knock in Cas9. As a result a single system (e.g. transgenic animal, cell) can serve as a basis for multiplex gene modifications in systems/network biology. On account of the dead guides, this is now possible in both in vitro, ex vivo, and in vivo.

For example, once the Cas9 is provided for, one or more dead gRNAs may be provided to direct multiplex gene regulation, and preferably multiplex bidirectional gene regulation. The one or more dead gRNAs may be provided in a spatially and temporally appropriate manner if necessary or desired (for example tissue specific induction of Cas9 expression). On account that the transgenic/inducible Cas9 is provided for (e.g. expressed) in the cell, tissue, animal of interest, both gRNAs comprising dead guides or gRNAs comprising guides are equally effective. In the same manner, a further aspect of this invention is the use of gRNA comprising dead guide(s) as described herein, optionally in combination with gRNA comprising guide(s) as described herein or in the state of the art, in combination with systems (e.g. cells, transgenic animals, transgenic mice, inducible transgenic animals, inducible transgenic mice) which are engineered for knockout Cas9 CRISPR-Cas.

As a result, the combination of dead guides as described herein with CRISPR applications described herein and CRISPR applications known in the art results in a highly efficient and accurate means for multiplex screening of systems (e.g. network biology). Such screening allows, for example, identification of specific combinations of gene activities for identifying genes responsible for diseases (e.g. on/off combinations), in particular gene related diseases. A preferred application of such screening is cancer. In the same manner, screening for treatment for such diseases is included in the invention. Cells or animals may be exposed to aberrant conditions resulting in disease or disease like effects. Candidate compositions may be provided and screened for an effect in the desired multiplex environment. For example, a patient's cancer cells may be screened for which gene combinations will cause them to die, and then use this information to establish appropriate therapies.

In one aspect, the invention provides a kit comprising one or more of the components described herein. The kit may include dead guides as described herein with or without guides as described herein.

The structural information provided herein allows for interrogation of dead gRNA interaction with the target DNA and the Cas9 permitting engineering or alteration of dead gRNA structure to optimize functionality of the entire Cas9 CRISPR-Cas system. For example, loops of the dead gRNA may be extended, without colliding with the Cas9 protein by the insertion of adaptor proteins that can bind to RNA. These adaptor proteins can further recruit effector proteins or fusions which comprise one or more functional domains.

In some preferred embodiments, the functional domain is a transcriptional activation domain, preferably VP64. In some embodiments, the functional domain is a transcription repression domain, preferably KRAB. In some embodiments, the transcription repression domain is SID, or concatemers of SID (e.g. SID4X). In some embodiments, the functional domain is an epigenetic modifying domain, such that an epigenetic modifying enzyme is provided. In some embodiments, the functional domain is an activation domain, which may be the P65 activation domain.

An aspect of the invention is that the above elements are comprised in a single composition or comprised in individual compositions. These compositions may advantageously be applied to a host to elicit a functional effect on the genomic level.

In general, the dead gRNA are modified in a manner that provides specific binding sites (e.g. aptamers) for adapter proteins comprising one or more functional domains (e.g. via fusion protein) to bind to. The modified dead gRNA are modified such that once the dead gRNA forms a CRISPR complex (i.e. Cas9 binding to dead gRNA and target) the adapter proteins bind and, the functional domain on the adapter protein is positioned in a spatial orientation which is advantageous for the attributed function to be effective. For example, if the functional domain is a transcription activator (e.g. VP64 or p65), the transcription activator is placed in a spatial orientation which allows it to affect the transcription of the target. Likewise, a transcription repressor will be advantageously positioned to affect the transcription of the target and a nuclease (e.g. Fok1) will be advantageously positioned to cleave or partially cleave the target.

The skilled person will understand that modifications to the dead gRNA which allow for binding of the adapter+ functional domain but not proper positioning of the adapter+ functional domain (e.g. due to steric hindrance within the three dimensional structure of the CRISPR complex) are modifications which are not intended. The one or more modified dead gRNA may be modified at the tetra loop, the stem loop 1, stem loop 2, or stem loop 3, as described herein, preferably at either the tetra loop or stem loop 2, and most preferably at both the tetra loop and stem loop 2.

As explained herein the functional domains may be, for example, one or more domains from the group consisting of methylase activity, demethylase activity, transcription activation activity, transcription repression activity, transcription release factor activity, histone modification activity, RNA cleavage activity, DNA cleavage activity, nucleic acid binding activity, and molecular switches (e.g. light inducible). In some cases it is advantageous that additionally at least one NLS is provided. In some instances, it is advantageous to position the NLS at the N terminus. When more than one functional domain is included, the functional domains may be the same or different.

The dead gRNA may be designed to include multiple binding recognition sites (e.g. aptamers) specific to the same or different adapter protein. The dead gRNA may be designed to bind to the promoter region −1000-+1 nucleic acids upstream of the transcription start site (i.e. TSS), preferably −200 nucleic acids. This positioning improves functional domains which affect gene activation (e.g. transcription activators) or gene inhibition (e.g. transcription repressors). The modified dead gRNA may be one or more modified dead gRNAs targeted to one or more target loci (e.g. at least 1 gRNA, at least 2 gRNA, at least 5 gRNA, at least 10 gRNA, at least 20 gRNA, at least 30 gRNA, at least 50 gRNA) comprised in a composition.

The adaptor protein may be any number of proteins that binds to an aptamer or recognition site introduced into the modified dead gRNA and which allows proper positioning of one or more functional domains, once the dead gRNA has been incorporated into the CRISPR complex, to affect the target with the attributed function. As explained in detail in this application such may be coat proteins, preferably bacteriophage coat proteins. The functional domains associated with such adaptor proteins (e.g. in the form of fusion protein) may include, for example, one or more domains from the group consisting of methylase activity, demethylase activity, transcription activation activity, transcription repression activity, transcription release factor activity, histone modification activity, RNA cleavage activity, DNA cleavage activity, nucleic acid binding activity, and molecular switches (e.g. light inducible). Preferred domains are Fok1, VP64, P65, HSF1, MyoD1. In the event that the functional domain is a transcription activator or transcription repressor it is advantageous that additionally at least an NLS is provided and preferably at the N terminus. When more than one functional domain is included, the functional domains may be the same or different. The adaptor protein may utilize known linkers to attach such functional domains.

Thus, the modified dead gRNA, the (inactivated) Cas9 (with or without functional domains), and the binding protein with one or more functional domains, may each individually be comprised in a composition and administered to a host individually or collectively. Alternatively, these components may be provided in a single composition for administration to a host. Administration to a host may be performed via viral vectors known to the skilled person or described herein for delivery to a host (e.g. lentiviral vector, adenoviral vector, AAV vector). As explained herein, use of different selection markers (e.g. for lentiviral gRNA selection) and concentration of gRNA (e.g. dependent on whether multiple gRNAs are used) may be advantageous for eliciting an improved effect.

On the basis of this concept, several variations are appropriate to elicit a genomic locus event, including DNA cleavage, gene activation, or gene deactivation. Using the provided compositions, the person skilled in the art can advantageously and specifically target single or multiple loci with the same or different functional domains to elicit one or more genomic locus events. The compositions may be applied in a wide variety of methods for screening in libraries in cells and functional modeling in vivo (e.g. gene activation of lincRNA and identification of function; gain-of-function modeling; loss-of-function modeling; the use the compositions of the invention to establish cell lines and transgenic animals for optimization and screening purposes).

The current invention comprehends the use of the compositions of the current invention to establish and utilize conditional or inducible CRISPR transgenic cell/animals, which are not believed prior to the present invention or application. For example, the target cell comprises Cas9 conditionally or inducibly (e.g. in the form of Cre dependent constructs) and/or the adapter protein conditionally or inducibly and, on expression of a vector introduced into the target cell, the vector expresses that which induces or gives rise to the condition of Cas9 expression and/or adaptor expression in the target cell. By applying the teaching and compositions of the current invention with the known method of creating a CRISPR complex, inducible genomic events affected by functional domains are also an aspect of the current invention. One example of this is the creation of a CRISPR knock-in/conditional transgenic animal (e.g. mouse comprising e.g. a Lox-Stop-polyA-Lox(LSL) cassette) and subsequent delivery of one or more compositions providing one or more modified dead gRNA (e.g. −200 nucleotides to TSS of a target gene of interest for gene activation purposes) as described herein (e.g. modified dead gRNA with one or more aptamers recognized by coat proteins, e.g. MS2), one or more adapter proteins as described herein (MS2 binding protein linked to one or more VP64) and means for inducing the conditional animal (e.g. Cre recombinase for rendering Cas9 expression inducible). Alternatively, the adaptor protein may be provided as a conditional or inducible element with a conditional or inducible Cas9 to provide an effective model for screening purposes, which advantageously only requires minimal design and administration of specific dead gRNAs for a broad number of applications.

In another aspect the dead guides are further modified to improve specificity. Protected dead guides may be synthesized, whereby secondary structure is introduced into the 3' end of the dead guide to improve its specificity. A protected guide RNA (pgRNA) comprises a guide sequence capable of hybridizing to a target sequence in a genomic locus of interest in a cell and a protector strand, wherein the protector strand is optionally complementary to the guide sequence and wherein the guide sequence may in part be hybridizable to the protector strand. The pgRNA optionally includes an extension sequence. The thermodynamics of the pgRNA-target DNA hybridization is determined by the number of bases complementary between the guide RNA and target DNA. By employing 'thermodynamic protection', specificity of dead gRNA can be improved by adding a protector sequence. For example, one method adds a complementary protector strand of varying lengths to the 3' end of the guide sequence within the dead gRNA. As a result, the protector strand is bound to at least a portion of the dead gRNA and provides for a protected gRNA (pgRNA). In turn, the dead gRNA references herein may be easily protected using the described embodiments, resulting in pgRNA. The protector strand can be either a separate RNA transcript or strand or a chimeric version joined to the 3' end of the dead gRNA guide sequence.

Tandem Guides and Uses in a Multiplex (Tandem) Targeting Approach

The inventors have shown that CRISPR enzymes as defined herein can employ more than one RNA guide without losing activity. This enables the use of the CRISPR enzymes, systems or complexes as defined herein for targeting multiple DNA targets, genes or gene loci, with a single enzyme, system or complex as defined herein. The guide RNAs may be tandemly arranged, optionally separated by a nucleotide sequence such as a direct repeat as defined herein. The position of the different guide RNAs is the tandem does not influence the activity. It is noted that the terms "CRISPR-Cas system", "CRISP-Cas complex" "CRISPR complex" and "CRISPR system" are used interchangeably. Also the terms "CRISPR enzyme", "Cas enzyme", or "CRISPR-Cas enzyme", can be used interchangeably. In preferred embodiments, said CRISPR enzyme, CRISP-Cas enzyme or Cas enzyme is Cas9, or any one of the modified or mutated variants thereof described herein elsewhere.

In an aspect, the present invention provides a means for delivering the Cas9 enzyme, system or complex for use in multiple targeting as defined herein or the polynucleotides defined herein. Non-limiting examples of such delivery means are e.g. particle(s) delivering component(s) of the complex, vector(s) comprising the polynucleotide(s) discussed herein (e.g., encoding the CRISPR enzyme, providing the nucleotides encoding the CRISPR complex). In some embodiments, the vector may be a plasmid or a viral vector such as AAV, or lentivirus. Transient transfection with plasmids, e.g., into HEK cells may be advantageous, especially given the size limitations of AAV and that while Cas9 fits into AAV, one may reach an upper limit with additional guide RNAs.

Compositions comprising Cas9 enzyme, complex or system comprising multiple guide RNAs, preferably tandemly arranged, or the polynucleotide or vector encoding or comprising said Cas9 enzyme, complex or system comprising multiple guide RNAs, preferably tandemly arranged, for use in the methods of treatment as defined herein elsewhere are also provided. A kit of parts may be provided including such compositions. Use of said composition in the manufacture of a medicament for such methods of treatment are also provided. Use of a Cas9 CRISPR system in screening is also provided by the present invention, e.g., gain of function screens. Cells which are artificially forced to overexpress a gene are be able to down regulate the gene over time (re-establishing equilibrium) e.g. by negative feedback loops. By the time the screen starts the unregulated gene might be reduced again. Using an inducible Cas9 activator allows one to induce transcription right before the screen and therefore minimizes the chance of false negative hits. Accordingly, by use of the instant invention in screening, e.g., gain of function screens, the chance of false negative results may be minimized.

In another aspect, the invention provides an engineered, non-naturally occurring vector system comprising one or more vectors comprising a first regulatory element operably linked to the multiple Cas9 CRISPR system guide RNAs that each specifically target a DNA molecule encoding a gene product and a second regulatory element operably linked coding for a CRISPR protein. Both regulatory elements may be located on the same vector or on different vectors of the system. The multiple guide RNAs target the multiple DNA molecules encoding the multiple gene products in a cell and the CRISPR protein may cleave the multiple DNA molecules encoding the gene products (it may cleave one or both strands or have substantially no nuclease activity), whereby expression of the multiple gene products is altered; and, wherein the CRISPR protein and the multiple guide RNAs do not naturally occur together. In a preferred embodiment the CRISPR protein is Cas9 protein, optionally codon optimized for expression in a eukaryotic cell. In a preferred embodiment the eukaryotic cell is a mammalian cell, a plant cell or a yeast cell and in a more preferred embodiment the mammalian cell is a human cell. In a further embodiment of the invention, the expression of each of the multiple gene products is altered, preferably decreased.

In one aspect, the invention provides a vector system comprising one or more vectors. In some embodiments, the system comprises: (a) a first regulatory element operably linked to a direct repeat sequence and one or more insertion sites for inserting one or more guide sequences up- or downstream (whichever applicable) of the direct repeat sequence, wherein when expressed, the one or more guide sequence(s) direct(s) sequence-specific binding of the CRISPR complex to the one or more target sequence(s) in a eukaryotic cell, wherein the CRISPR complex comprises a Cas9 enzyme complexed with the one or more guide sequence(s) that is hybridized to the one or more target sequence(s); and (b) a second regulatory element operably linked to an enzyme-coding sequence encoding said Cas9 enzyme, preferably comprising at least one nuclear localization sequence and/or at least one NES; wherein components (a) and (b) are located on the same or different vectors of the system. Where applicable, a tracr sequence may also be provided. In some embodiments, component (a) further comprises two or more guide sequences operably linked to the first regulatory element, wherein when expressed, each of the two or more guide sequences direct sequence specific binding of a Cas9 CRISPR complex to a different target sequence in a eukaryotic cell. In some embodiments, the CRISPR complex comprises one or more nuclear localization sequences and/or one or more NES of sufficient strength to drive accumulation of said Cas9 CRISPR complex in a detectable amount in or out of the nucleus of a eukaryotic cell. In some embodiments, the first regulatory element is a polymerase III promoter. In some embodiments, the second regulatory element is a polymerase II promoter. In some embodiments, each of the guide sequences is at least 16, 17, 18, 19, 20, 25 nucleotides, or between 16-30, or between 16-25, or between 16-20 nucleotides in length.

Recombinant expression vectors can comprise the polynucleotides encoding the Cas9 enzyme, system or complex for use in multiple targeting as defined herein in a form suitable for expression of the nucleic acid in a host cell, which means that the recombinant expression vectors include one or more regulatory elements, which may be selected on the basis of the host cells to be used for expression, that is operatively-linked to the nucleic acid sequence to be expressed. Within a recombinant expression vector, "operably linked" is intended to mean that the nucleotide sequence of interest is linked to the regulatory element(s) in a manner that allows for expression of the nucleotide sequence (e.g., in an in vitro transcription/translation system or in a host cell when the vector is introduced into the host cell).

Advantageous vectors include lentiviruses and adeno-associated viruses, and types of such vectors can also be selected for targeting particular types of cells.

In one aspect, the invention provides a method of modifying expression of multiple polynucleotides in a eukaryotic cell. In some embodiments, the method comprises allowing a Cas9 CRISPR complex to bind to multiple polynucleotides such that said binding results in increased or decreased expression of said polynucleotides; wherein the Cas9 CRISPR complex comprises a Cas9 enzyme complexed with multiple guide sequences each specifically hybridized to its own target sequence within said polynucleotide, wherein said guide sequences are linked to a direct repeat sequence. Where applicable, a tracr sequence may also be provided. In some embodiments, the method further comprises delivering one or more vectors to said eukaryotic cells, wherein the one or more vectors drive expression of one or more of: the Cas9 enzyme and the multiple guide sequences linked to the direct repeat sequences. Where applicable, a tracr sequence may also be provided.

In one aspect, the invention provides a recombinant polynucleotide comprising multiple guide RNA sequences up- or downstream (whichever applicable) of a direct repeat sequence, wherein each of the guide sequences when expressed directs sequence-specific binding of a Cas9CRISPR complex to its corresponding target sequence present in a eukaryotic cell. In some embodiments, the target sequence is a viral sequence present in a eukaryotic cell. Where applicable, a tracr sequence may also be provided. In some embodiments, the target sequence is a proto-oncogene or an oncogene.

Aspects of the invention encompass a non-naturally occurring or engineered composition that may comprise a guide RNA (gRNA) comprising a guide sequence capable of hybridizing to a target sequence in a genomic locus of interest in a cell and a Cas9 enzyme as defined herein that may comprise at least one or more nuclear localization sequences.

An aspect of the invention encompasses methods of modifying a genomic locus of interest to change gene expression in a cell by introducing into the cell any of the compositions described herein.

An aspect of the invention is that the above elements are comprised in a single composition or comprised in individual compositions. These compositions may advantageously be applied to a host to elicit a functional effect on the genomic level.

In another embodiment, the Cas9 is delivered into the cell as a protein. In another and particularly preferred embodiment, the Cas9 is delivered into the cell as a protein or as a nucleotide sequence encoding it. Delivery to the cell as a protein may include delivery of a Ribonucleoprotein (RNP) complex, where the protein is complexed with the multiple guides.

Various aspects and embodiments of the invention may involve analyzing gene signatures, protein signature, and/or other genetic or epigenetic signature, in some instances based on single cell analyses (e.g. single cell RNA sequencing), or alternatively based on cell population analyses, as is defined herein elsewhere, and/or in combination with the sample morphology.

Ablating a Single Cell layer of cells

Ablating a single layer of cells contacting the solid substrate can comprise the selective destruction of a single layer of cells that have previously been processed and analyzed by the methods and systems as described herein so that a new layer of cells is exposed for processing and evaluation. In some embodiments, a laser ablation (Gahtan and Baier, 2004; Yang et al., 2004) or gene promoter for a toxin gene can be used to destroy a single layer of cells. In embodiments, enzyme-prodrug combinations can be used in specific cell populations. Although such approaches may be specific to specific cell populations, an advantage of this approach includes spatial and temporal control. (Curado et al., 2008; Davison et al., 2007; Montgomery et al., 2009; Pisharath et al., 2007; Zhao et al., 2009). In some embodiments, a cell-specific promoter can be used that expresses nitroreductase with subsequent exposure to metronidazole can allow targeted cell ablation. Irreversible electroporation (IRE), the irreversible permeabilization of the cell membrane through application of electrical pulses as described in Miller et al doi:10.1177/153303460500400615. Radiofrequency ablation or nanoparticles designed to absorb light for hyperthermic ablation may also be used. Approaches using light, heat, electrical pulses and/or combinations thereof can advantageously be tuned for the substrate and cells to be ablated.

Systems and Kits

In certain aspects, the present disclosure provides systems and kits for spatiotemporal analysis in-situ. The systems and kits may comprise one or more compositions and reagents described herein.

In some examples, the system and kits may comprise sample permeabilization reagents, staining reagents, library preparation reagents, including for example, primers for reverse transcription, devices and/or reagents for performing spatial barcoding, devices and/or reagents for sequencing, sequence reads analysis, or decoding, CRISPR systems, solid substrates optionally with pre-loaded spatial barcodes and/or capture molecules, or any combination thereof.

In addition to reagents and devices, the kits may further include instructions for using the components of the kit to practice the methods. The instructions for practicing the subject methods may be generally recorded on a suitable recording medium. For example, the instructions may be printed on a substrate, such as paper or plastic, etc. As such, the instructions may be present in the kits as a package insert, in the labeling of the container of the kit or components thereof. In other embodiments, the instructions are present as an electronic storage data file present on a suitable computer readable storage medium, e.g., CD-ROM, diskette, etc. In certain embodiments, the instructions are not present in the kit, but means for obtaining the instructions from a remote source, e.g., via the internet, are provided. The kit may further include instructions for use as well as access to automated processing programs for the evaluation and processing of the kit, including imaging and processing of cell and tissue samples.

The invention is further described in the following examples, which do not limit the scope of the invention described in the claims.

EXAMPLES

Example 1—High Density Spatial Transcriptomics

Barcoded beads were produced with a split-and-pool approach. This resulted in sufficient barcode complexity to avoid large redundancies in duplicate spatial (x,y) locations. The array was made in a 1918×765 matrix for a total of 1,467,270 wells spread out into a hexagonal pattern. The well size was estimated at 2 μm with a 3 μm distance from center-to-center of each well. These decoded bead moieties in a patterned arrangement represented a high-density spatial transcriptomics (HDST) array. (FIG. 1A).

A tissue section was placed onto the bead array surface, stained and imaged. The tissue was gently permeabilized and the mRNA molecules captured onto the respective bead capture sequences, then effectively directly in-situ barcoded. This was followed by a reverse transcription reaction and library preparation.

With previously existing ST technology, ~19% of the tissue area is spatially parsed into 100 μm features with a center-to-center distance of 200 μm. Now, in HDST, given the barcode redundancy and decoding efficiency (FIG. 2A), as well as stringent barcode mapping cutoffs (FIG. 2A), Applicants randomly, effectively and spatially profile the same tissue area, now parsed into 2 μm pixels, while keeping the size of the profiled tissue section the same. The HDST bead array thus provides an increase of 2500 times in resolution compared to ST, with maximum packing density between two spatial measurements.

Figure 2F:
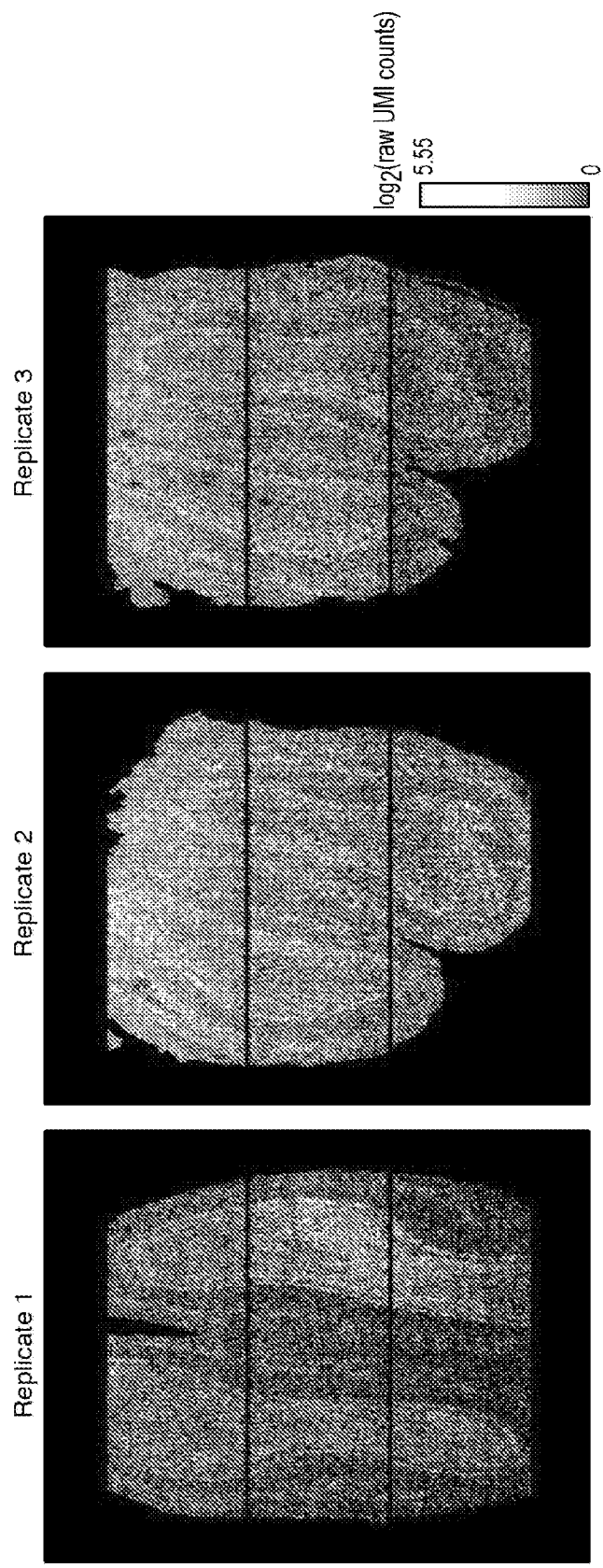

Given sequencing depth and library saturation (FIG. 2B), more than 68.3±5.9% (mean±sd) of all reads generated in the library construction and more than 81.5±1.8% of all genes were located within the detected tissue boundaries (without using any lower cutoffs), with almost 140,000 barcodes generating spatially profiled data per assay (n=3) (FIG. 2C). Although an average number of filtered reads per barcode location was low (FIG. 2D), very limited background was detected outside the tissue boundaries, as compared to a very specific spatial in-situ tissue profile following the detected tissue boundary (FIG. 2E-H).

Figure 3A:
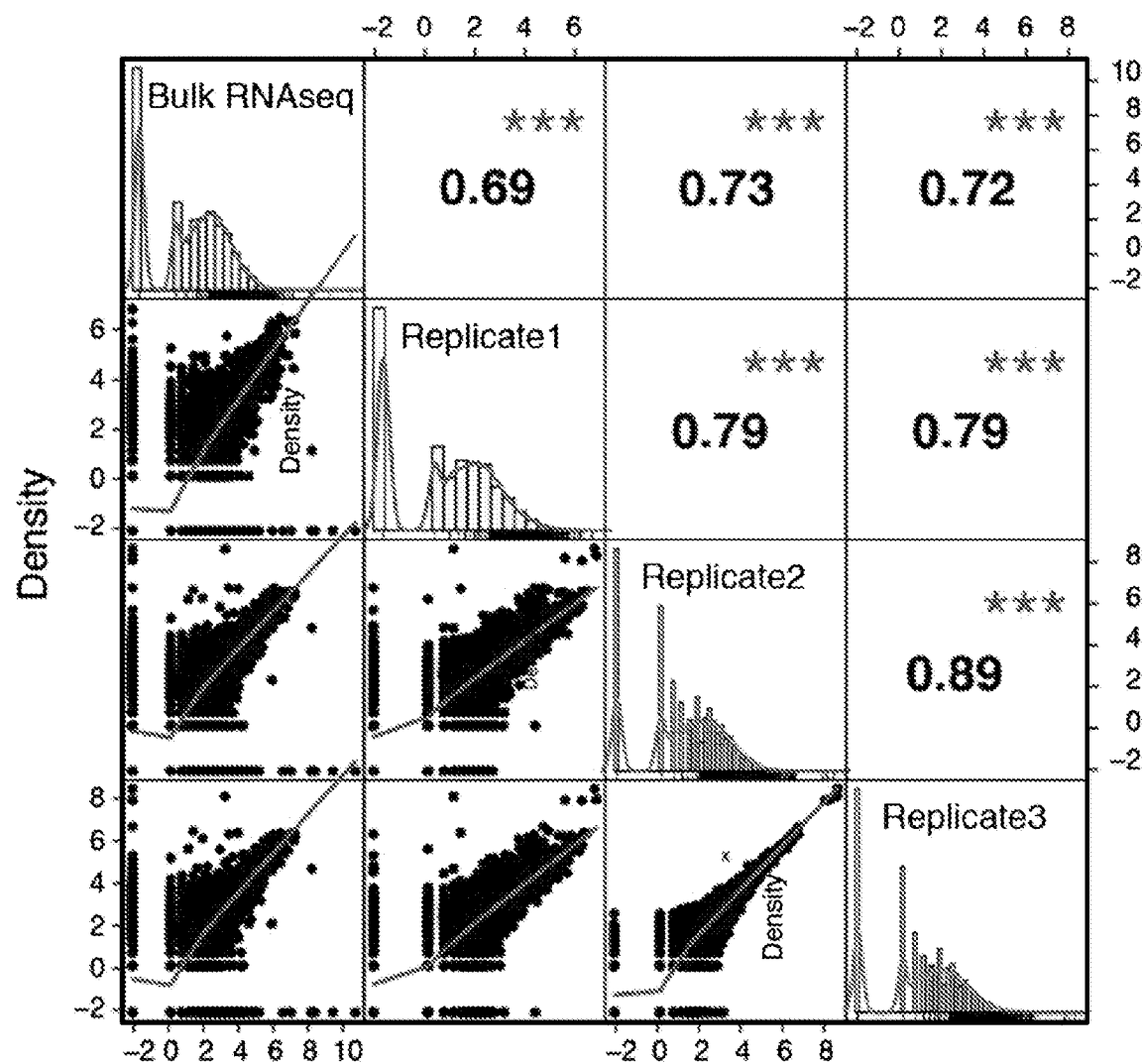
FIG. 3A-3B Summary statistics for comparisons to bulk RNA-seq dataset.
Figure 3B:
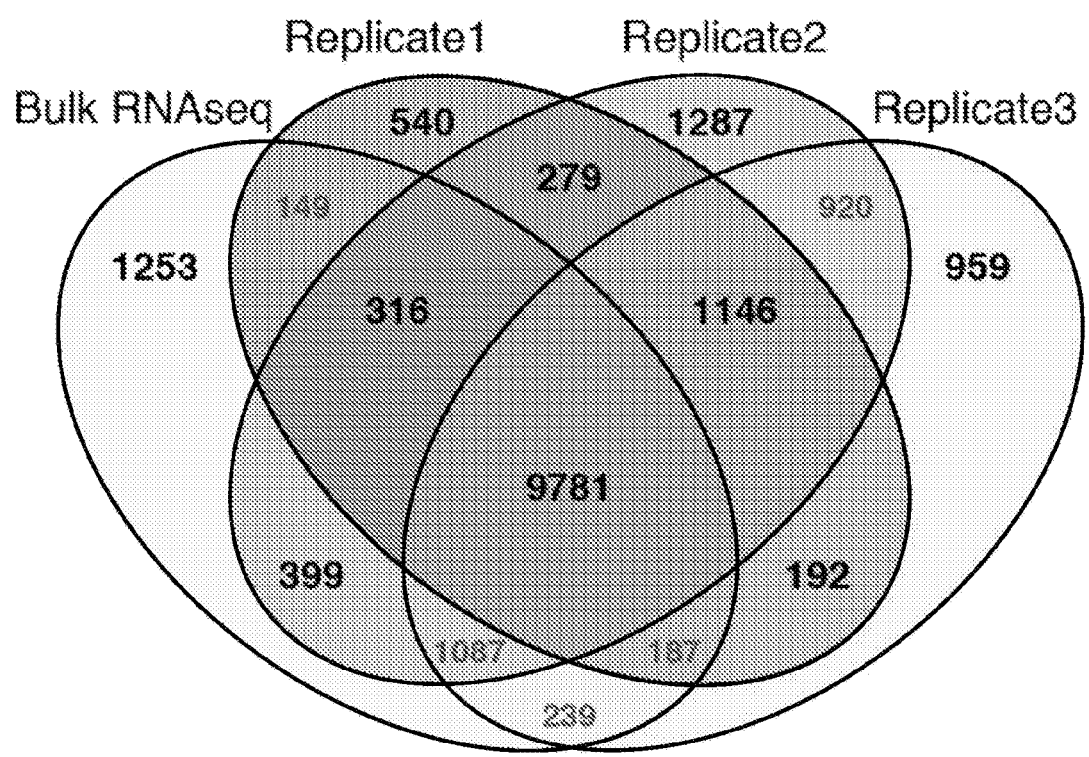

Next, Applicants compared average gene expression signatures from published total RNA-seq datasets from the mouse olfactory bulb to the averaged expression signatures obtained with HDST (FIG. 3A), with each of the replicates giving similar results, both to the bulk ($r^2$=0.69±0.02; mean±sd) and to each other ($r^2$=0.82±0.06; mean±sd). The majority of genes detected in the bulk data were also present in all HDST datasets (FIG. 3B). These results were consistent with previous studies (22) and Applicants proceeded to explore the data further.

Single Cell Typing in HDST

Figure 1B:
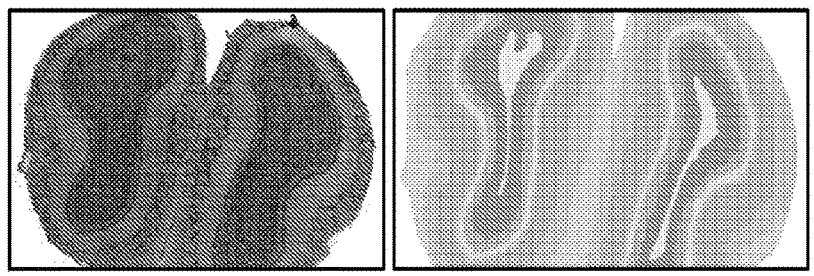
Figure 4A:
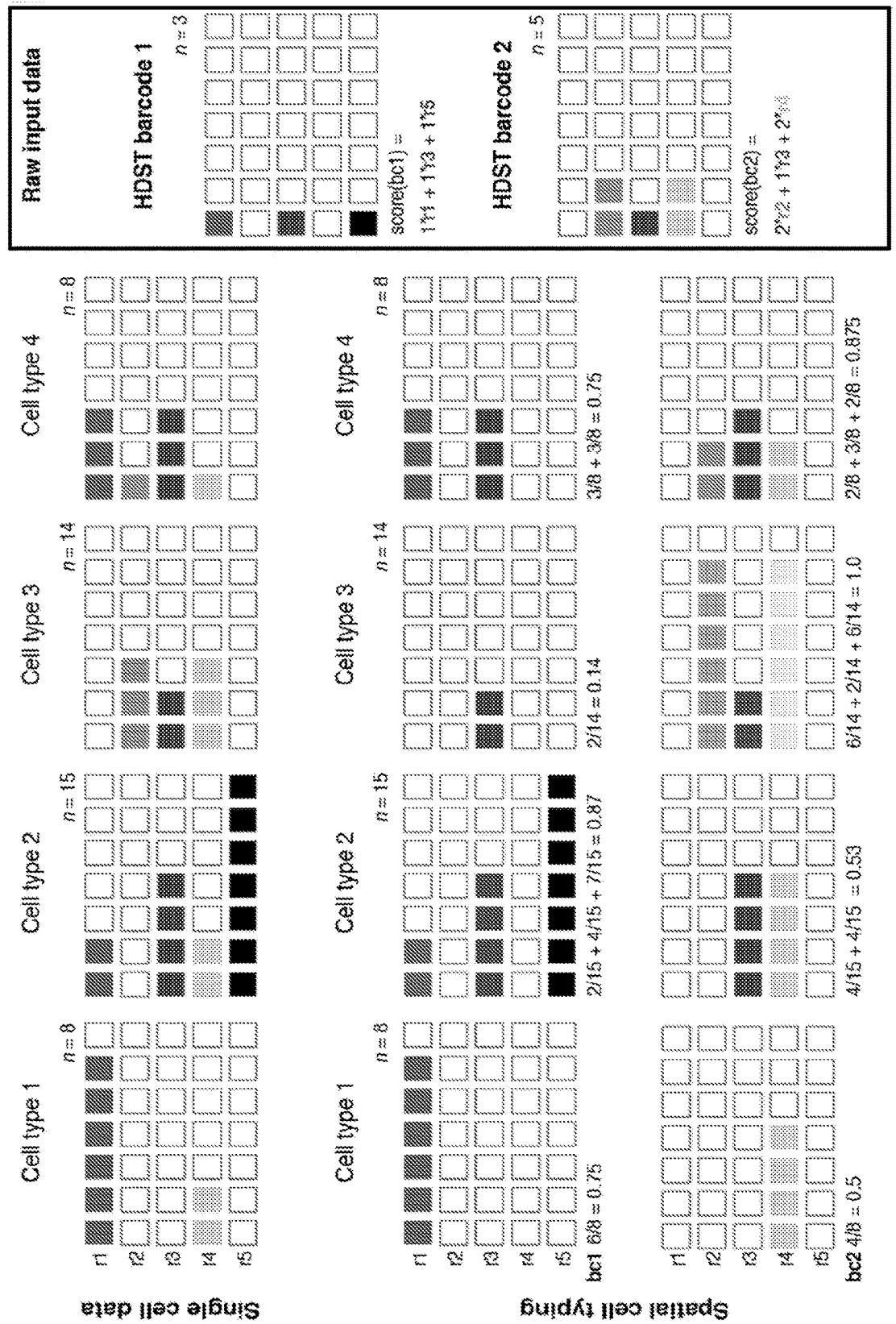
FIG. 4A-4D—Cell typing in high-density spatial transcriptomics (HDST).
Figure 4B:
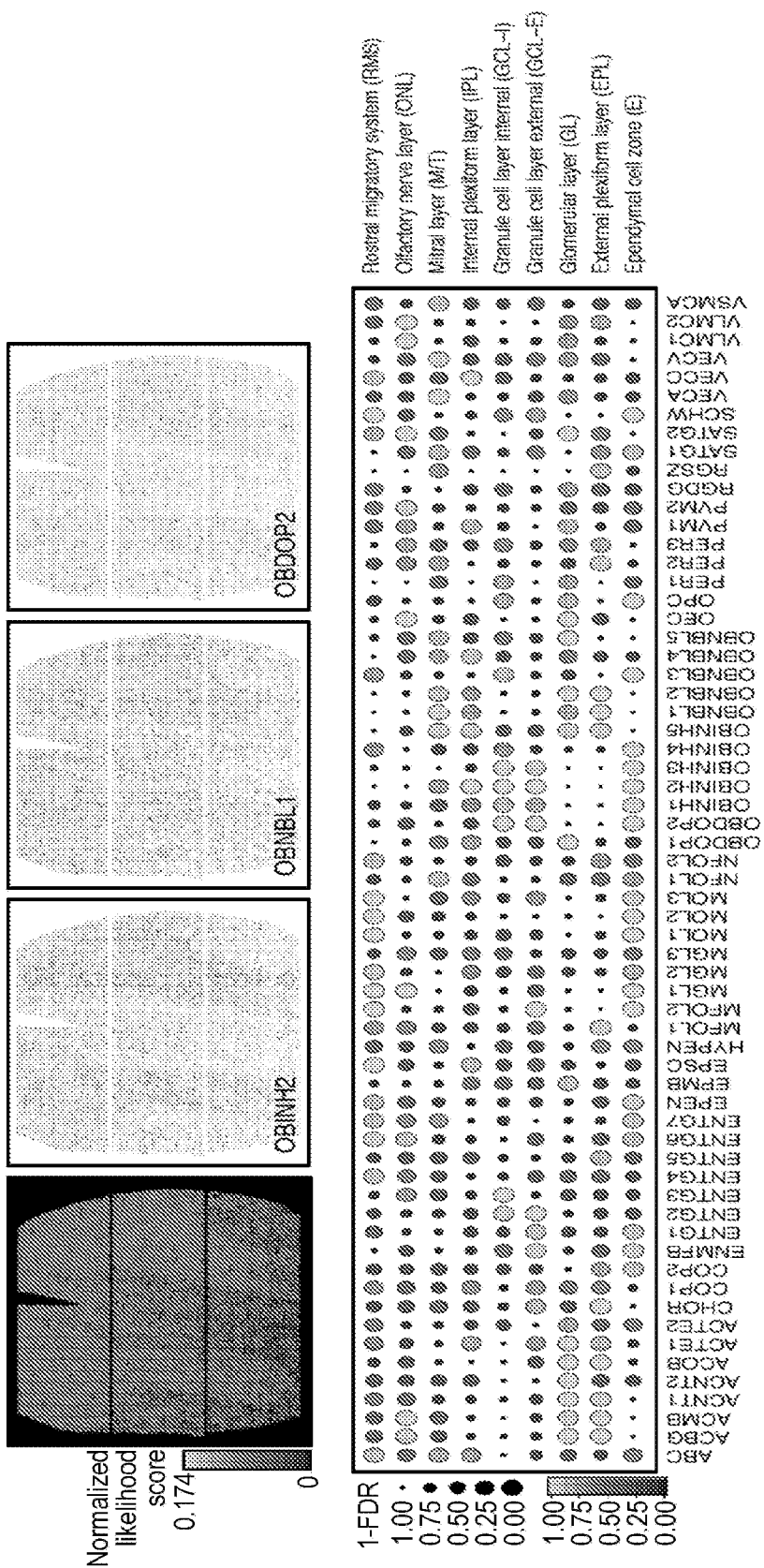
Figure 4C:
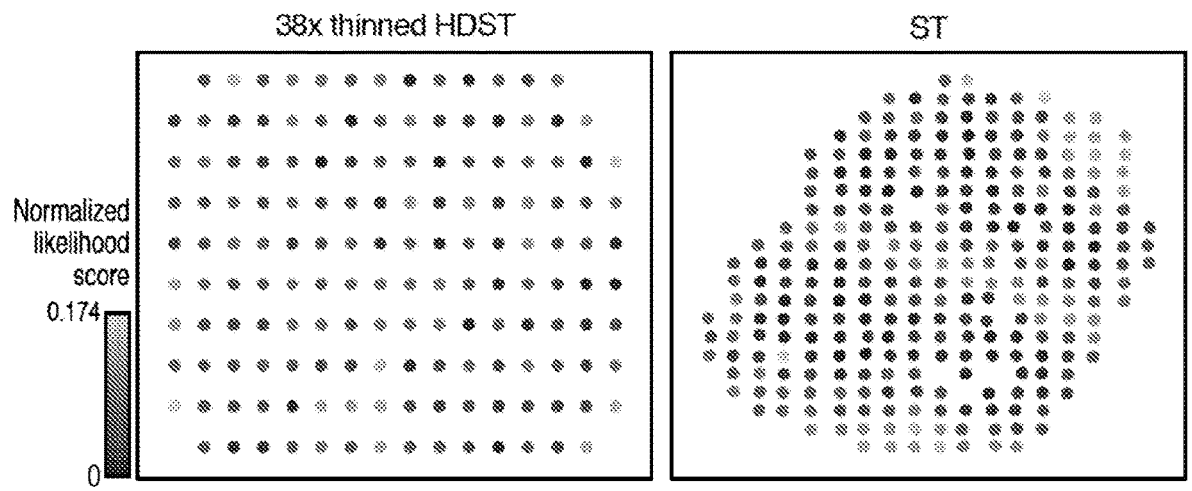

First, Applicants wanted to pair the HDST spatial data to both cell type information and morphological information by imputing publicly available and annotated cell type signatures from two published datasets (25, 26). Cell types were assigned to the spatially barcoded signatures using a combinatorial approach. Briefly, the observed gene count distributions per cell type were assumed using the single cell RNA-seq datasets and then likelihoods for all spatially barcoded genes belonging to each of the detected cell types calculated (FIG. 4A). Applicants observed that 97.4% of all spatially barcoded gene expression profiles could be connected to one cell type with a cell type likelihood score. Then, specific spatial cell type patterns could be observed and compared to morphological data annotated from the H&E stain (FIG. 1B), and cell type enrichment scores calculated for each individual cell layer (FIG. 4B) with some populations exhibiting layer-specific patterns (FIG. 4B). Applicants also downsampled and thinned HDST data in a stepwise manner, with the lowest resolution now mimicking ST data, and used one ST dataset in the cell type assignments (22) (FIG. 4C). As expected, ST cell type scores were lower given convolved cell signatures per spatial measurement in cell-dense areas while higher is cell sparse and layer-specific areas.

Figure 4D:
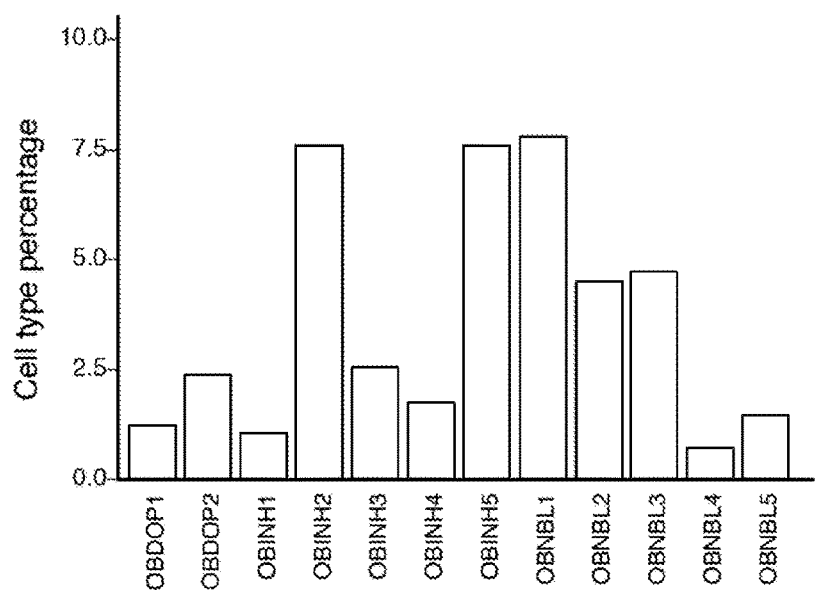

Applicants performed spatial cell typing of all regions sampled in a tissue section over interconnected anatomical regions. At fine-grained level, Applicants explored connectivity between different populations in the main olfactory bulb. With high likelihood scores, Applicants confirmed that a few different neuronal, oligodendrocyte (MOL and myelin-forming mature oligodendrocytes; MFOL), astrocyte (AC and OEC), immune (MGL) and vascular (VLMC, SAT and SCHW) populations were present in the analyzed section, including both GABAergic neuronal populations (OBINH) and dopaminergic neurons (OBDOP), neuroblasts (OBNLB) and olfactory-bulb enriched astrocytes (OEC and ACOB). That the largest class (20.55%) of detected olfactory neurons were GABAeric (FIG. 4D) is in line with previous results (26, 27). Also, individual neuroblast populations were identified in the mitral and external plexiform layers (OBNLB1 and OBNLB2) presenting more differentiated cells and some the ependymal zone (E) and rostral migratory system (RMS) cells (OBNLB3) presenting potentially non-terminally differentiated neuroblasts. These neuroblasts have previously been reported associated with specific layers (26).

Neighborhood Differential Spatial Analysis Between Morphological Layers

Figure 5A:
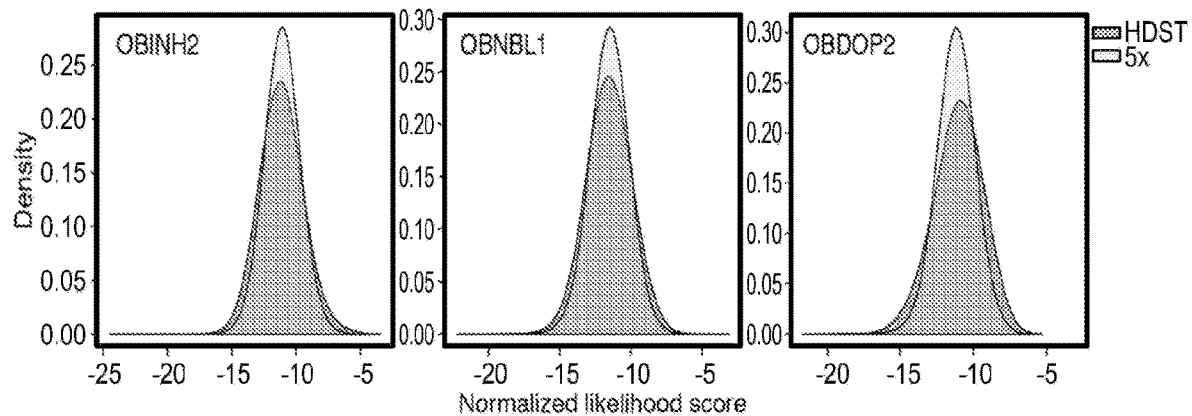
FIG. 5A-5B—Accessing data convolution with binning.
Figure 5B:
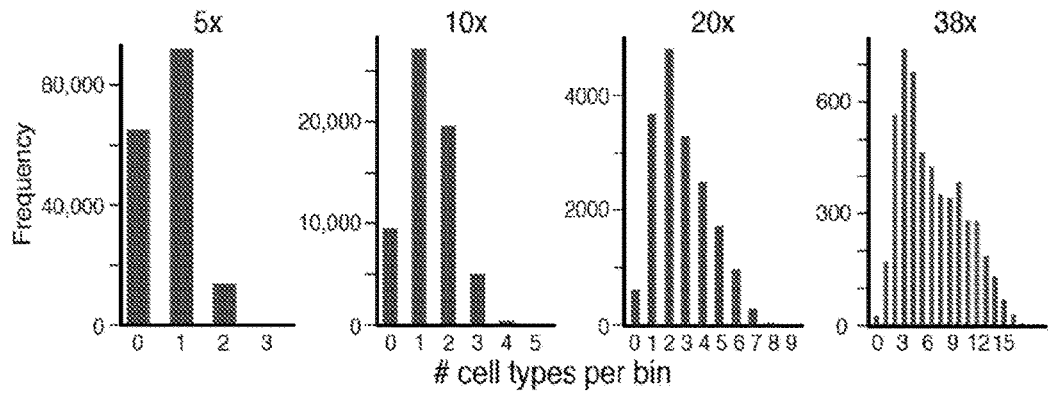

Given the spatial sparsity, increased subcellular resolution and data distribution, Applicants divided the analyzed area into bins and summed the spatial gene expression profiles over the neighboring (x,y) measurements within each bin. This gave on average 3.5±1.9 (mean±sd) (x,y) bead observations with 10.7±9.1 (mean±sd) read counts per bin and resulted in very limited convolution of the spatial transcriptomic data (FIG. 5A-B). This represented binned spatial gene expression.

Figure 1C:
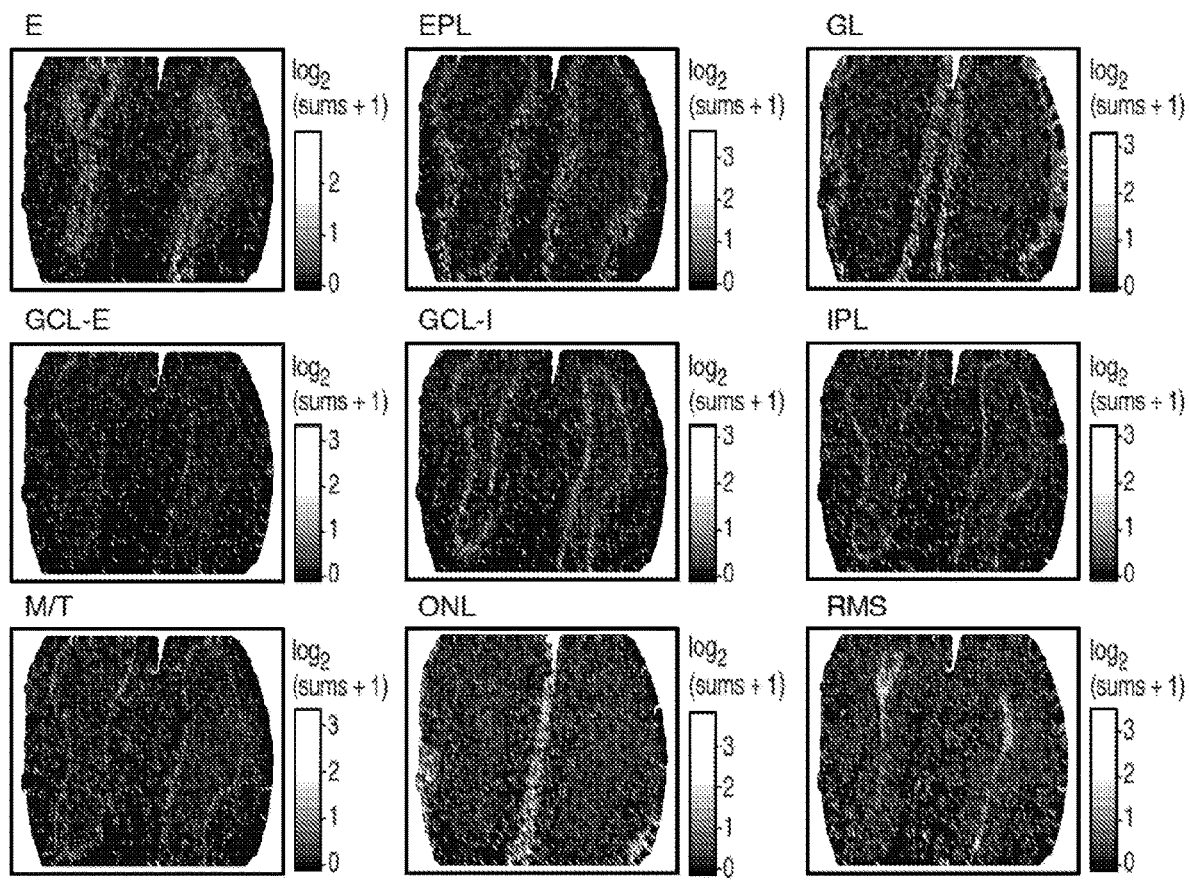
Figure 1D:
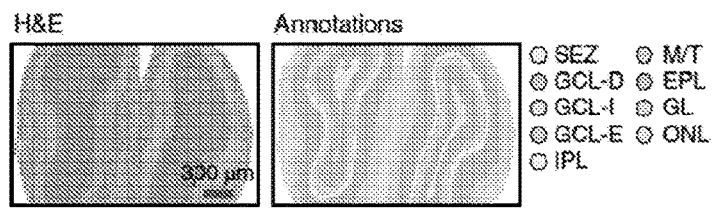
Figure 1E:
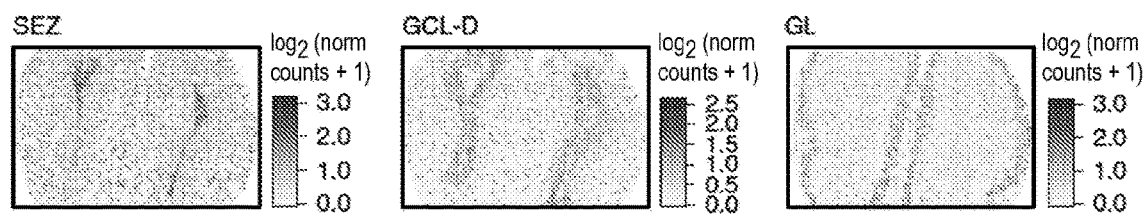
Figure 1F:
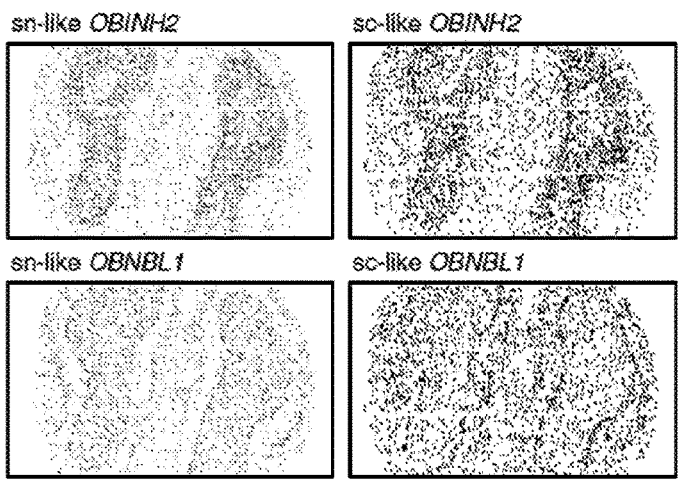
Figure 1G:
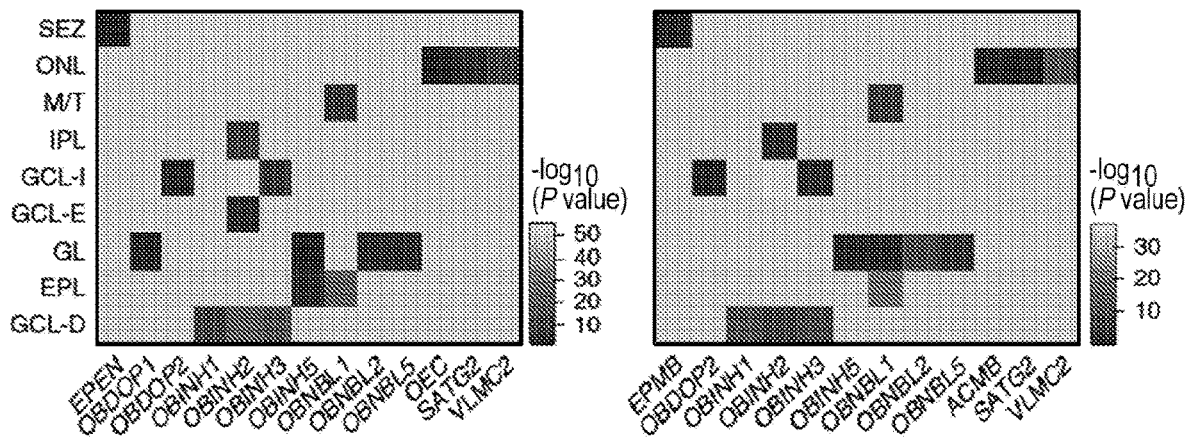
Figure 6A:
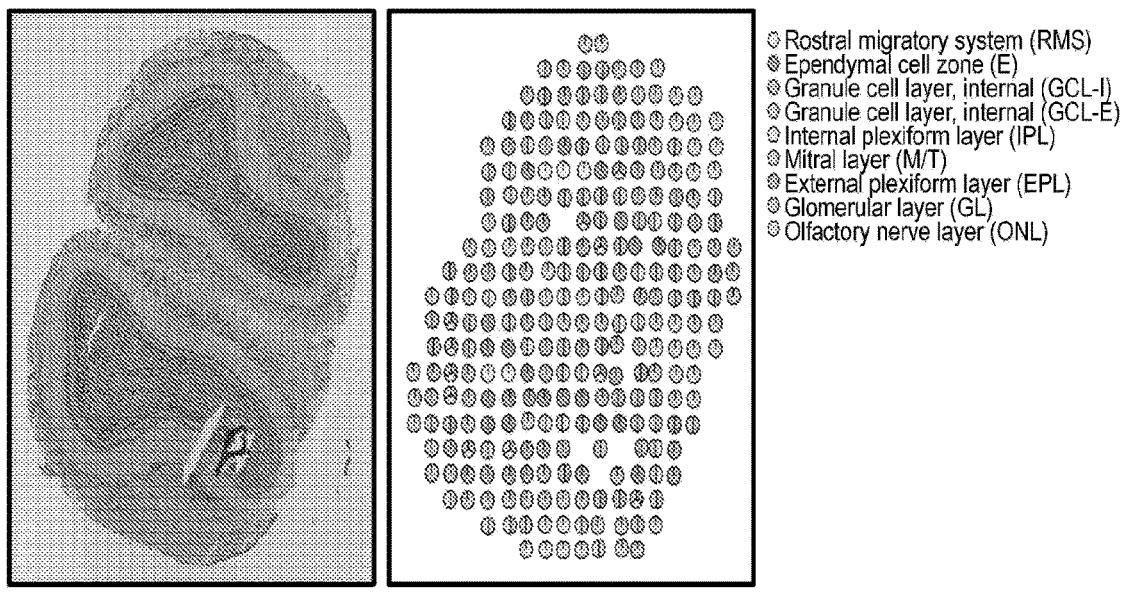
Figure 7A:
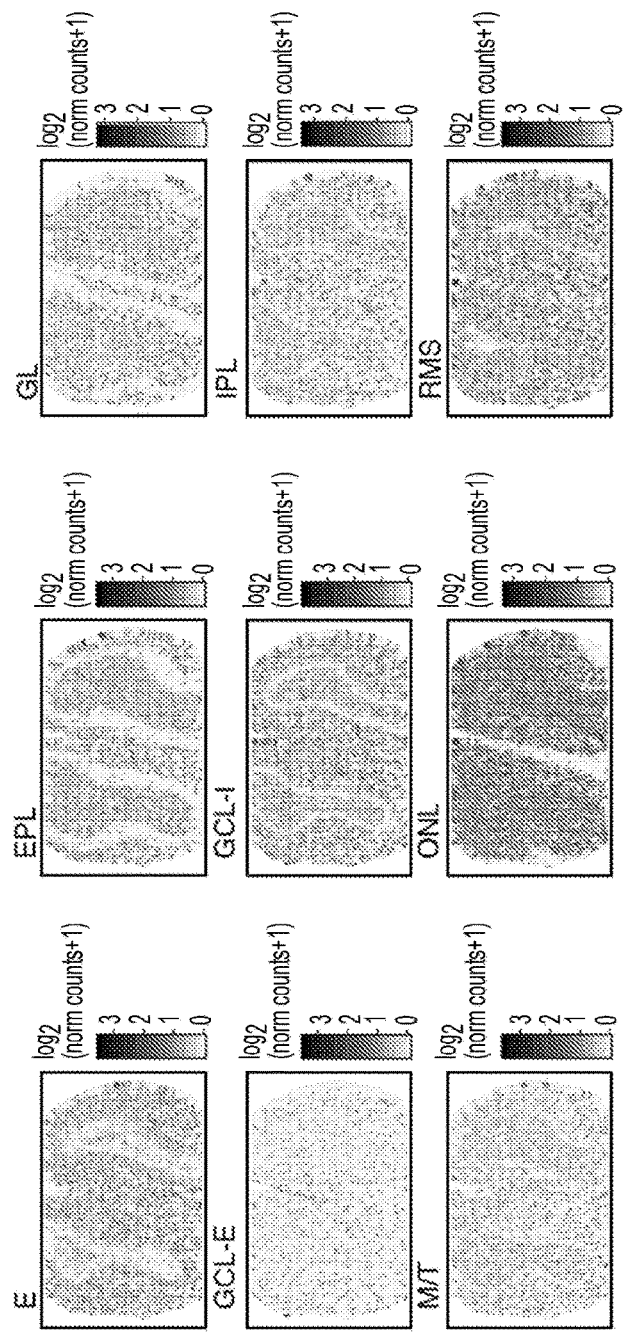
FIG. 7A-7B—Spatially upregulated genes per morphological layer.
Figure 7B:
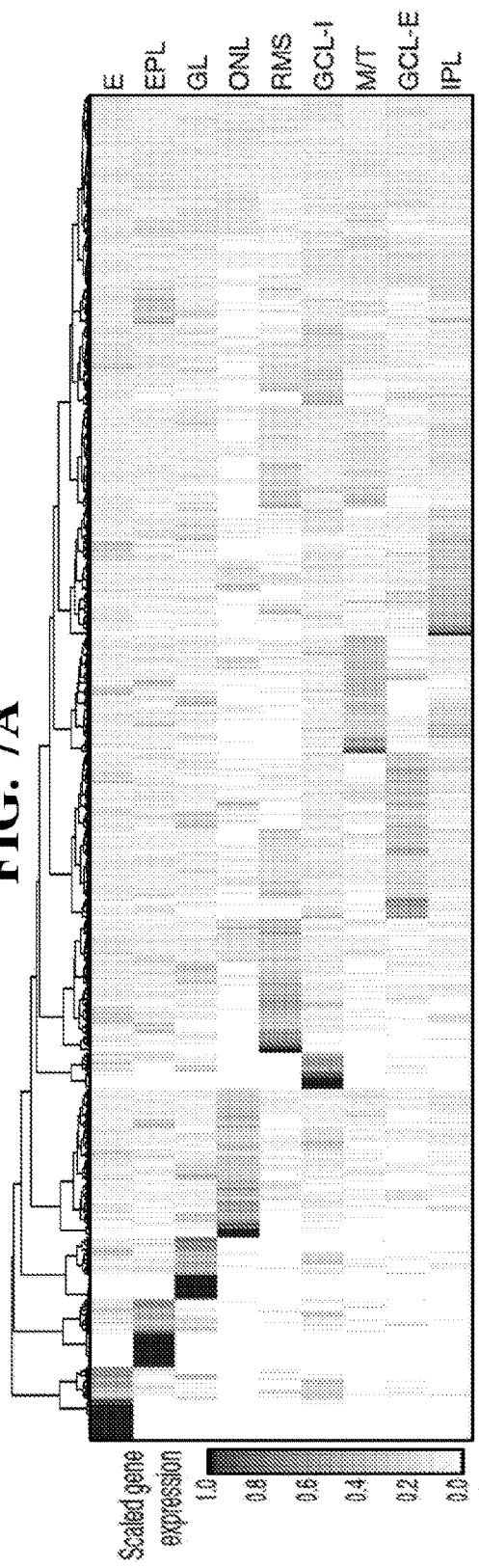
Figure 9:
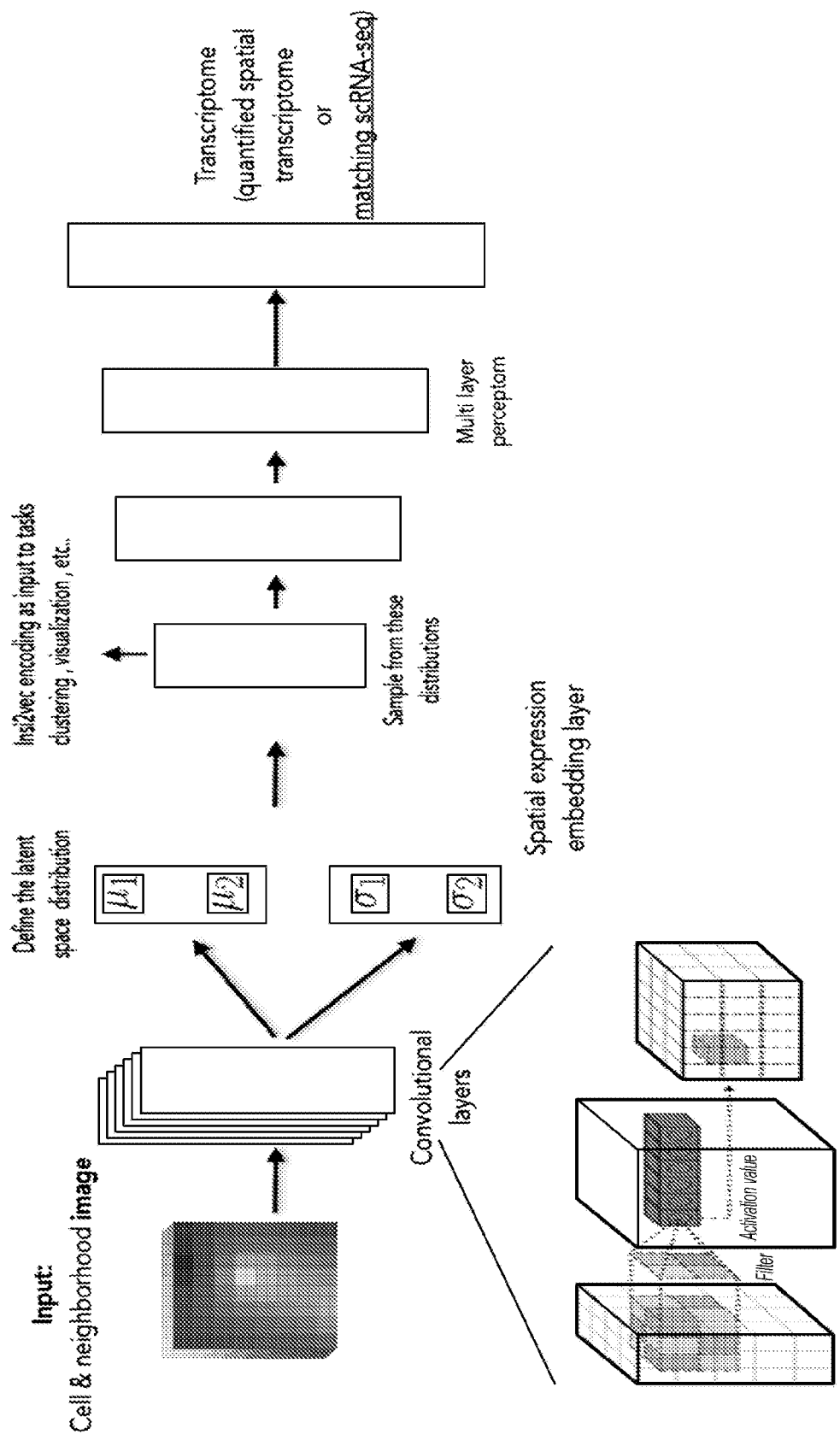
FIG. 9—Schematic overview of new learning method, insi2vec, allows defining a cell by both intrinsic and extrinsic features.
Figure 10:
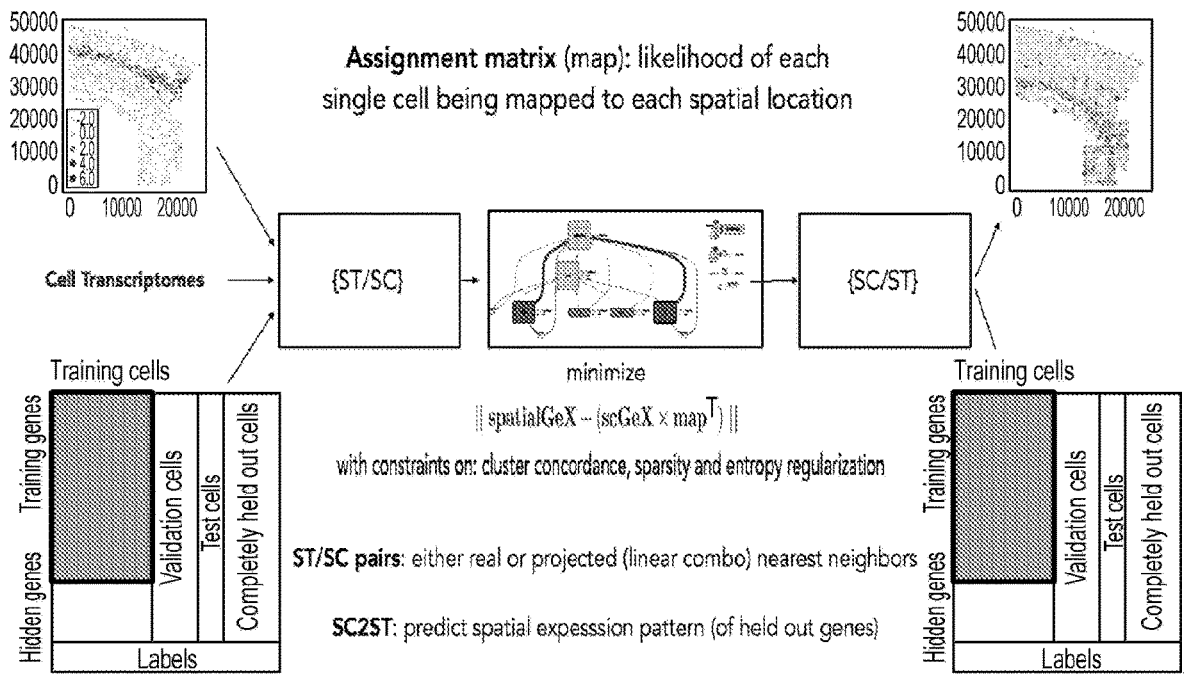
FIG. 10—Schematic of model sc2st that allows extension to full transcriptome, taking single cell profiles from scRNA-seq and use to expand the in situ data.

Automatic spatially variable patterns (28) coupled to convolved morphological areas (FIG. 6A) could be detected in the standard ST approach (FIG. 6B). These gene coexpression signatures could also be reconstituted in HDST data (FIG. 6C). Some of the convolved signatures matched well to greater morphological area while others, as expected, ended up making unspecific gene expression patterns in HDST. Given the great increase in resolution in HDST, Applicants next explored whether one could robustly detect differentially expressed (DE) genes between the different fine morphological layers in a supervised manner. For the binned spatial data, Applicants used a smoothing Gaussian filter, which led to 16.9±11.3 (mean±sd) reads per bin, and then performed a two-sided t-test (FDR<0.1), which resulted in DE signatures specific to morphological layers (FIG. 1C, FIG. 7A-B). Layer-enriched upregulated DE genes (LFC>1.5) that were also detected in the Allen Brain Atlas (ABA) (9) coronal dataset were assigned to the correct ABA layer information (FIG. 8A) and the top genes found in both datasets exhibited very specific layer-based patterns (FIG. 8B).

Conclusions

Molecular states interact based on both their nearby and distant stimuli, making a spatial communication network. Spatially resolved transcriptomics provides a tool to reveal biological insights into these molecular states and neuroanatomical, temporal and morphological structures by providing transcriptomic signatures that are the consequence of complex cellular circuitry coupled to spatial information that is critical for interpreting function.

High-density spatial transcriptomics is a robust high-resolution approach providing in-situ spatial information on cell dynamics. The technology relies on standardized tissue, molecular, bead-array and imaging tasks, making it a resource deployable by the broader scientific community with focused on new biomedical discoveries. HDST uses standard histological stains, providing the means to correlate morphology to gene expression as well as a framework to correlate cell type and state information to the extracellular environment. High-density spatial transcriptomics and its further development will aid the increased understanding of cell type and spatially resolved classifications and connections.

Materials and Methods

Array Design

A split-and-pool approach was used to generate a total of 1,079,642 different bead entities. A primer precursor was linked to the bead surface with a cleavable d(U) linker. After linkage, in order to increase the bead pool size (determined as number of unique beads in the pool) a ligation approach was used. Briefly, 3 sequential ligation steps were performed adding 15 bp, 15 bp and 14 bp of barcode sequences using a bridge oligonucleotide, enabling double-stranded ligation using T4 DNA ligase with the ligation oligonucleotide added in a ratio of 2:1 to the precursor oligo sequence. In the following ligation step, the newly ligated sequence acted as the precursor. In the final ligation step, the last barcode sequence was followed by a 6 bp unique molecular identifier and a stretch of 20 (d)Ts and VN to ensure efficient mRNA capture on the surface. The complete bead pool was used to load a total of 1,467,270 predefined well positions covering a 13.7 mm$^2$ area (5.7 mm×2.4 mm). A total of 24 such areas were made on each slide.

Samples

Adult C57BL/6J mice were euthanized and their mouse olfactory bulb dissected. The samples were then frozen in an isopentane (Sigma-Aldrich) bath kept at −40° C. The samples were then transferred to −80° C. The frozen bulbs were embedded at −20° C. in Tissue-Tek OCT (Sakura) compound. Cryosections were taken at 10 μm thickness and deposited on prechilled slides containing barcoded arrays.

Tissue Staining and Imaging

Tissue sections were first adhered to the surface by keeping the slide at 37° C. for 1 min. Immediately after, a fixation step on the slide surface was performed using 4% neutral buffered formaldehyde (Sigma-Aldrich) in 1× phosphate buffered saline (PBS, pH 7.4) for 10 min at room temperature (RT). The slides were then washed once in PBS to ensure proper formaldehyde removal. The sections were stained using standard hematoxylin and eosin staining described in Stahl et al (22). Imaging system used was a Ti-7 Nikon Eclipse. In short, a NB filter was used in fluorescent mode to expose the samples to a bright field light source and the reflections collected on a color camera. This enabled histological imaging of a dark slide on a standard epifluorescence microscope.

Library Preparation and Sequencing

The following steps were described in detail in Stahl et al (22). In short, tissue sections were gently permeabilized using exonuclease I buffer (NEB) and pepsin. This was followed by in-situ cDNA synthesis overnight at 42° C. using Superscript III (Thermofisher) supplemented with RnaseOUT (Thermofisher). This ensured that the transcript information was transcribed and spatially barcoded into cDNA molecules.

Tissue sections could then be digested using proteinase K (Qiagen) and the barcode information cleaved using a Uracil-Specific Excision Reagent (NEB) targeting the 5d(U) stretch at the 5' end on the barcoded oligonucleotides. The collected material was then processed as according to Jemt et al (29). The finished libraries were sequenced 2×150 bp on a Illumina Nextseq 500 instrument with v2 chemistry.

ST Pipeline Processing

The fastq files were processed using the ST Pipeline v1.5.1 (30). The forward read contained both the barcode sequencing and the bridge sequence used for the sequential ligation steps. The bridge sequences were trimmed and removed prior to any barcode mapping steps. The transcripts were mapped with STAR to the GRCm38 (v8) reference. The annotated reads were counted using the HTseq count tool and then the UMI duplicated sequences collapsed using a hierarchical clustering approach and paired to spatial barcodes demultiplexed using TagGD (31) (kmer 11, mismatches 4, hamming distance method for barcode collapsing). This generated a counts matrix with a Cartesian (x,y) coordinate assigned with gene expression information.

ST Image Processing

In order to match the histological image and the counts matrix generated with the ST Pipeline, Applicant needed to assign image pixel coordinates to the centroids of each bead well. This ensured proper alignment tissue boundaries in the image and could select the barcodes located spatially underneath the tissue boundaries. The same approach was taken to detect the arrays' boundaries and corners, upon which a perfect well matrix can be assumed given standardized production and quality control specifications for each slide (32). Pixel coordinates can now easily be the translated into fixed centroid (x,y) coordinates using the total detected area of the array. The coordinate names then matched the decoder file used in the ST Pipeline processing step.

ST Image Annotation

Images used in the study were annotated using a user interface enabling interactive selection of spatial barcodes and their (x,y) coordinates based on the tissue morphology into 9 distinct regions present in the mouse olfactory bulb i.e. Olfactory Nerve Layer (ONL), Granular Cell Layer External (GCL-E), Granular Cell Layer Internal (GCL-I), Ependymal Later (E), External Plexiform Layer (EPL), Mitral Layer (M/T), Internal Plexiform Layer (IPL), Rostral Migratory System (RMS) and the Granular Cell Layer (GL). The same tool was used to annotate regions in tissue sections produced in the Stahl et al (22) study. In the ST case, more than one tag was assigned per (x,y) spatial spot location in case the spot area spanned more than one layer. The annotation tags could then be exported and used in further analyses.

Data Processing

Raw decoded spatial arrays and corresponding decoder files were shared by Illumina after bead arrays production in the standard format. Barcode decoding (including empty wells) and redundancy percentages based on the Illumina decoding process were calculated. Public total RNA-seq datasets were downloaded from NCBI's SRA project with accession PRJNA316587. The data was mapped to the mm10 reference and UMI filtered using the ST pipeline v1.3.1. Averaged and naively adjusted gene expression signatures (28) corresponding to the "Bulk MOB" data from Stahl et al (22) were compared to those of the three replicates created with the high density approach and normalized the same way. Allen Brain Atlas (ABA) gene lists were downloaded from the API using the ConnectedServices module of the allensdk Python package version 0.16.0. The differential search was performed within the MOB annotation only in a one-layer-vs-all and coronal-only data. The ST data as a counts matrix was downloaded from http://www.spatialtranscriptomicsresearch.org/datasets/doi-10-1126science-aaf2403/.

Single Cell Typing in HDST

Applicants downloaded the pre-processed normalized matrices per cell type from Zeisel et al (26). Specific gene co-expression signatures resulting from their analyses were used as sanity checks in the spatial data processing, as the authors suggested a region each cell type corresponded to. For each of the identified and annotated cell types, the probabilities to capture each of the genes were calculated as gene-wise relative frequencies. For each cell type, provided mean gene-wise expression values were divided by the sum of all mean gene-wise expression values for this cell type, such that per cell type the gene-wise relative frequencies across all genes summed up to 1. To assign the most likely cell type to each spatially barcoded transcriptome, likelihood-scores were calculated for each of the potential cell types by summing the previously calculated cell type specific gene-wise relative frequencies and weighted by the counts for each of the genes captured by the respective spatially barcoded transcriptome.

Finally, the cell type with the highest likelihood score was assigned to the respective (x,y) positon. Normalized likelihood scores were calculated for each barcode by dividing the assigned maximum likelihood score by the sum of its weights.

Binning of Spatial Data

The total area of each HDST array area was divided into bins each covering an area of XxX beads (X={5,10,20,38}), and summed the spatial gene expression profiles within each bin. In order to ensure appropriate bin sizes, Applicants first considered all manufactured wells as a 1918×765 matrix. On average, around 1370 (x,y) wells filled with beads would size up to one ST spot (100 μm; x=38) when taking into account the center-to-center distance between two wells. From there, 4 additional bin sizes were calculated.

First, it was needed to thin the binned data containing 1370 wells per bin and take every second bin into account in both x and y directions. This was to ensure space between two ST spots would be accounted for. Applicants did not take into consideration that this bin actually represents 63% of the transcriptome profiled per ST spot due to the well packing density as space between two wells. Then, Applicants proceeded to make bins with fewer wells per bin in a logarithmic manner until reaching the smallest bin with an average of 3.5±1.9 (mean±sd) wells with beads containing transcriptome information. To access data convoluted as a result of binning, the frequencies of individual cell types detected per bin were calculated as compared to non-binned data in cases where more than one bead was present per bin.

Spatial Differential Expression Analysis

Automatic and spatially variable gene patterns were detected in the ST dataset using SpatialDE (28). The number of expected variable regions was set to n+1 where n represented the number of unique morphological regions annotated in the dataset. A minimal number of 3 variable and co-expressed genes was set to ensure no overclustering was performed on the data. The highest ranked scores for each pattern were compared to the (x,y) coordinates assigned to morphological regions annotated based on manual image analysis as described above.

Binned HDST data was smoothed using a Gaussian kernel with 0.5 standard deviations equally in both x and y directions. The smoothed binned data was then scaled such that the maximum expression value stayed the same. Applicants performed a two-sided t-test (FDR<0.1) to identify DE genes for each HDST morphological region. The maximum top 500 genes identified per morphological layer with a log 2 fold change (LFC) of 1.5 (one vs rest) were identified as differentially expressed and used in further analyses. Smoothed HDST data was normalized to an average UMI count per bin. The spatialDE automatically assigned gene coexpression patterns were plotted in the normalized HDST data for comparison to patterns assigned from HDST data alone.

Validation of Differentially Expressed Genes

To validate layer specific genes identified through differential expression analysis in the HDST data, enrichment analysis was performed using layer specific gene sets from the Allen Brain Atlas as reference. Genes with a layer specific LFC of greater than 1.5 (implying upregulation) and FDR<10% as per differential expression analysis in the HDST data were tested for enrichments in the layer-specific gene sets ("expression fold" change greater than 1.5) from the Allen Brain Atlas. Only genes passing the respective fold-change thresholds in both data-sets (n=221) were included in the analysis. The significance of enrichments was determined using a one-sided Fisher's Exact Test. Images for the top gene present in each layer were downloaded from ABA's High Resolution Image Viewer and stitched using Fiji (33).

Data Availability

The data has been deposited to NCBI's GEO archive.

Example 2—Defining a Cell by Intrinsic and Extrinsic Features

Insi2vec is a new generative variational autoencoder used to define cell subsets by combination of intrinsic and spatial features. Application to neural tissue described here: generalizes across patients, recovers new states and can be used with any spatial method at cellular resolution, including proteins, antibodies RNA.

1) Step 1: use v2 to project single cell data onto the spatial data.
  Input: (i) sc matrix (sc_cells×sc_genes) and (ii) st_matrix (st_cells×st_genes)
  Output: Projected ST matrix (st_cells×sc_genes) (using v2)

Consistency checks included Clustering original st_matrix and then clustering the projected st_matrix; then computing the clustering NMI between the two results. They are quite concordant. For the st_genes, there is >0.95 correlation between projected and real gene expression.)
(for common genes: correlation with just v1 is about 0.6 (pretty high for osmFISH considering the sc data was a completely different project of the same region), correlation with v2 is 0.95+) (obtained similar values of correlation for melanoma for v1/v2 as merfish Use the projected ST matrix to update the input image. Input image now has a #sc_genes (>500 genes) as the #channels, instead of #st_genes as the #channels(<50)

2) Step 2: use variational/deep generative insi2vec on the [x_dim, y_dim, sc_genes] dimensional image to predict the original st_matrix (st_cells×st_genes) as labels to learn the insi2vec embedding and do clustering, etc to discover novel sub populations. (note, Applicants could also use the projected_st_matrix (st_cells×sc_genes) as the labels here if Applicants want; st_matrix (st_cells×st_genes) as the labels because they are true ground truth labels as measured by experiment and not model predictions of v2 (the model predictions of v2 are being incorporated in the input in the form of the expanded image and that's how used to inform the embedding)

Figure 11:
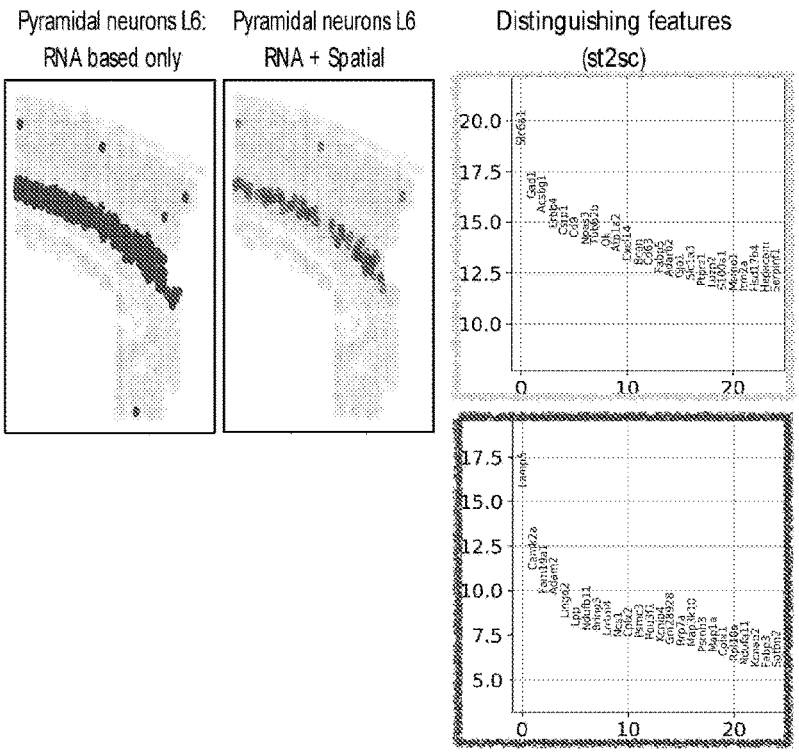
FIG. 11 includes images of Insi2vec application to pyramidal neurons L6 showing identification of subsets that cannot be resolved otherwise.

3) Step 3: Use differential expression tests on the projected_st_matrix (st_cell×sc_genes) to identify the markers/features for the spatio-transcriptomic subpopulations identified by the end2end sc2st variational/generative insi2vec (referred to as insi2vec herein). Results are shown in FIG. 11, with independent validation from Tasic et al, Nature Neuroscience volume 19, pages 335-346 (2016).

Insi2vec allows 1) Inferring from multiple orthogonal modes of measurement captured by in situ methods to combine cell-intrinsic and cell-extrinsic features in our definition of cell-types and (2) Predicting spatial expression patterns of genes. This has allowed Applicants to directly operate on the images and are genuinely spatially-aware (as opposed to just treating cells in in-situ datasets simply as another type of scRNAseq dataset).

Use of osmFISH Data from Somatosensory Cortex to Illustrate Method

Step 1] Input: (a) IMAGES from an in-situ transcriptomic experiment/(b) A corresponding quantified version of the image: A spatial gene expression matrix which is of the form ([x_coordinate, y_coordinate, z_coordinate, gene_1, gene_2, gene_3, gene_4, . . . gene_k]).

Operating directly on the image data allows natural integration of spatial gene expression patterns of surrounding cells and global gene expression patterns like gradients (which are quite important, especially in the context of the brain).

Figure 14A:
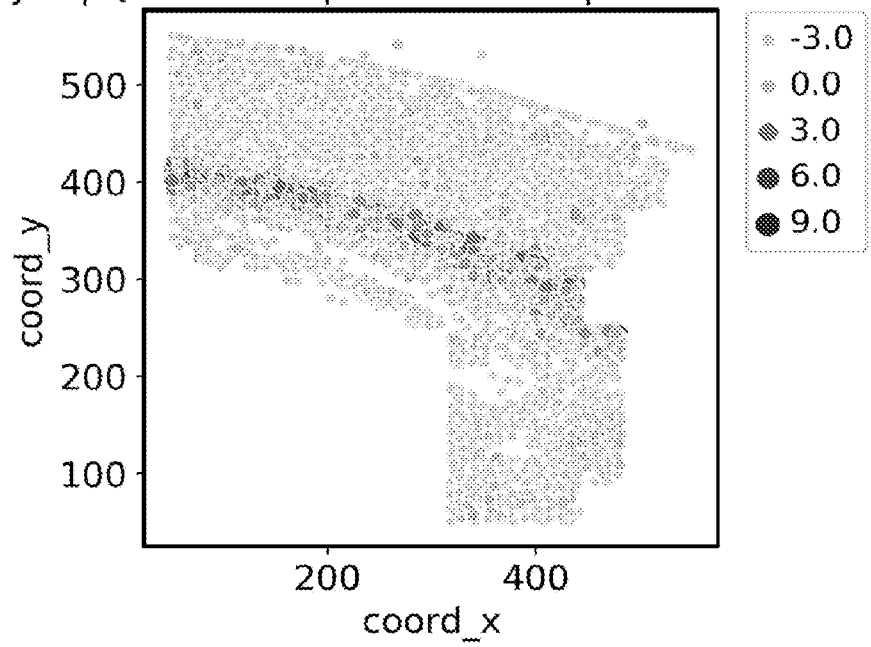
FIG. 14A is an example spatial gex matrix (1b) from osmFISH for a gene (Syt6)
Figure 14B:
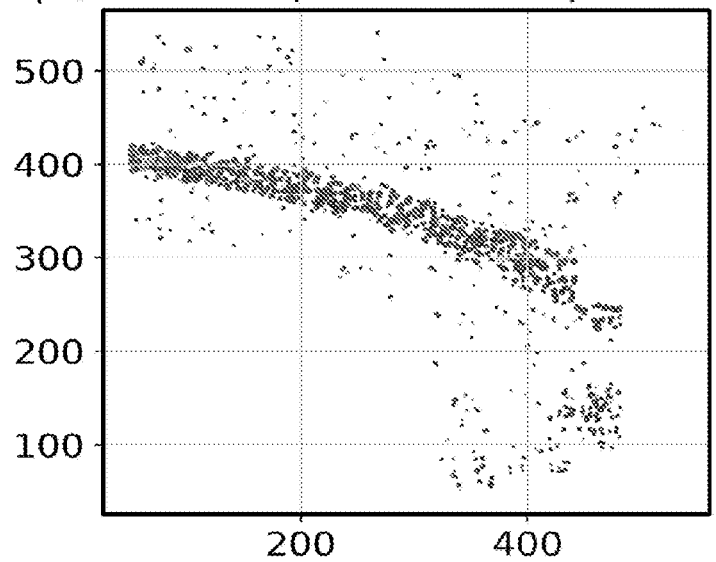
FIG. 14B is a scatterplot of the spatial gene expression for Syt6 in the somatosensory cortex
Figure 14C:
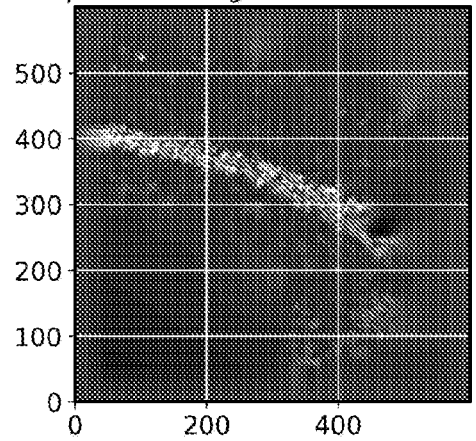
FIG. 14C is a reconstructed image using a linear radial basis function interpolation.

Although ideally one would want both (a) and (b), but since there are often published datasets where raw image data is a bit tricky to acquire (for eg: merFISH); in the development of this method, the assumption is only access to (b) from Step 1; and with only (b), one can reconstruct the actual image (a) using radial basis function interpolation (to recapitulate important global spatial gene expression patterns like gradients, often lost in quantification and not really captured by a myopic view of spatial tx matrices simply as scRNAseq matrices in 'multi modal integration' approaches).

osmFISH data from the somato-sensory cortex is used illustrate each step. FIG. 14A provides an example spatial gex matrix (1b) from osmFISH for a gene (Syt6) and FIG. 14B provides a scatterplot. FIG. 14C is the result of reconstructing the image (to get (a) using a linear radial basis function interpolation. In summary, at the end of step 1, there are both (a) IMAGES from the in-situ transcriptomic experiment and (b) A quantified spatial gene expression matrix corresponding to that image. Additionally, having access to (c—A matching scRNAseq dataset from the corresponding tissue) allows prediction gene expression patterns of new genes (and all other tasks addressed by v1 and v2), discussed further infra.

Step 2] Armed with (a—Image) and (b—quantified spatial gene expression matrix), the spatio-transcriptomic integration of cell intrinsic (eg: transcriptomic) and cell extrinsic (eg: neighbouring cells, global gene expression gradients, neighbourhoods) features for a novel way of defining cell types is conducted.

Previous approaches that did not work include representing each tissue as a graph where each cell would be a node and an edge between cells that were neighbours to apply generalized Encoder-Decoder architectures on these graphs for learning a single vector for each cell that combines spatial and transcriptomic information. Multiple attempts on various datasets were made towards using graph encoding frameworks (most notably using GraphSAGE and FastGCN). Briefly, these attempts did not yield satisfactory results. Although seemingly elegant, the graph representation itself had issues. Without being bound by theory, representing the tissues as a graph where nodes are cells and there are edges between neighbours doesn't adequately capture the global effects of the spatial gene expression patterns and gradients because graph embedding approaches often rely on random walks in the local neighbourhood surrounding a node. There isn't a natural way of adequately representing the effects of continuous nature of local and global structure in embedding methods for individual nodes in graphs satisfactorily for the desired applications Instead, Applicants chose to operate directly on the in-situ method image (1a) (either directly from the data/reconstructed using the rbf interpolation from (1b)) of the location of the cell and a region around it (eg: +−4 pixels in all directions). Operating directly on the image has many advantages, including the fact that Applicants no longer artificially discretize the neighbourhood and allow for spatial gene expression patterns like gradients (local gradients—because they are directly evident in the image itself;

and global gradients because of the rbf interpolation on the whole tissue allows propagation of gradients by interpolation where data is missing) to be incorporated into our definition of cell types.

Now given an image of the cell and its neighbours, Applicants used state-of-the-art convolutional autoencoder architectures from vision literature. These have significant advantages over (i) fully connected autoencoder architectures like scVI, scGen, etc: including the fact that convolutional operations make the network spatially aware and (ii) Graph embedding methods (including graph convolution methods) because of the issues with the graph abstraction described above.

Figure 15:
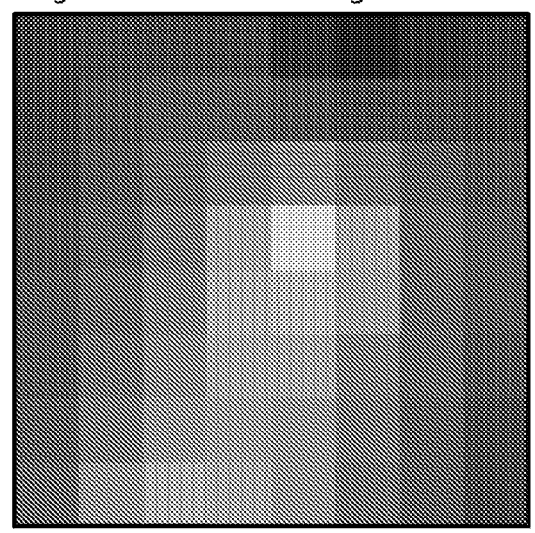
FIG. 15 includes an example image of a cell and its neighbors with the full image having 33 channels.

An example image of a cell and its neighbor in FIG. 15 is a single channel corresponding to the Syt6 gene—the same one from the plot of FIG. 14C. Notice the gradient and also note that the full image has 33 channels.

Then, for the convolutional autoencoder
Input: a 33 dimensional image of a cell in its neighbourhood is our input for each cell.
Output (label): (i) The quantified transcriptome of the cell/(ii) A scRNAseq transcriptome of a matching single cell (using v1/v2).
NN architecture: A convolutional autoencoder (The design choices made for the architecture used here based on experience and a heuristic described below, but other vision analog CNN AE architectures should work here)

For intuition, one can think of this approach as directly trying to learn a model of how the gene expression patterns of the cell and its neighbourhood influences the cell, and allows Applicants to build on and advance interpretability frameworks for understanding tissue behaviour for future applications)

Step 3] Use the spatio-transcriptomic embedding for tasks like clustering/visualization/any other operation that Applicants can define on vectors. The spatio-transcriptomic embedding now incorporates information of the cell and its neighbourhood and thus more and richer information that allows discovery of new biology and substructure.

Figure 16:
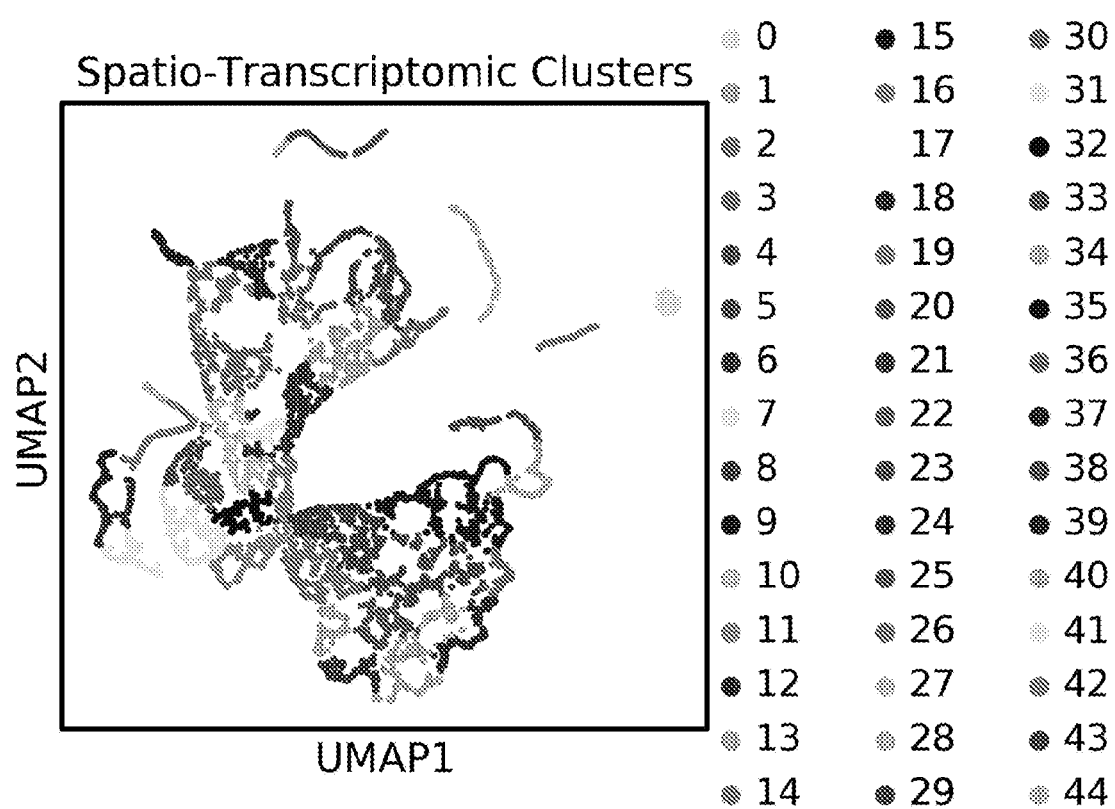
FIG. 16 depicts spatially relevant subsets of cells using traditional clustering approaches using learned spatio-transcriptomic embeddings.
Figure 17A:
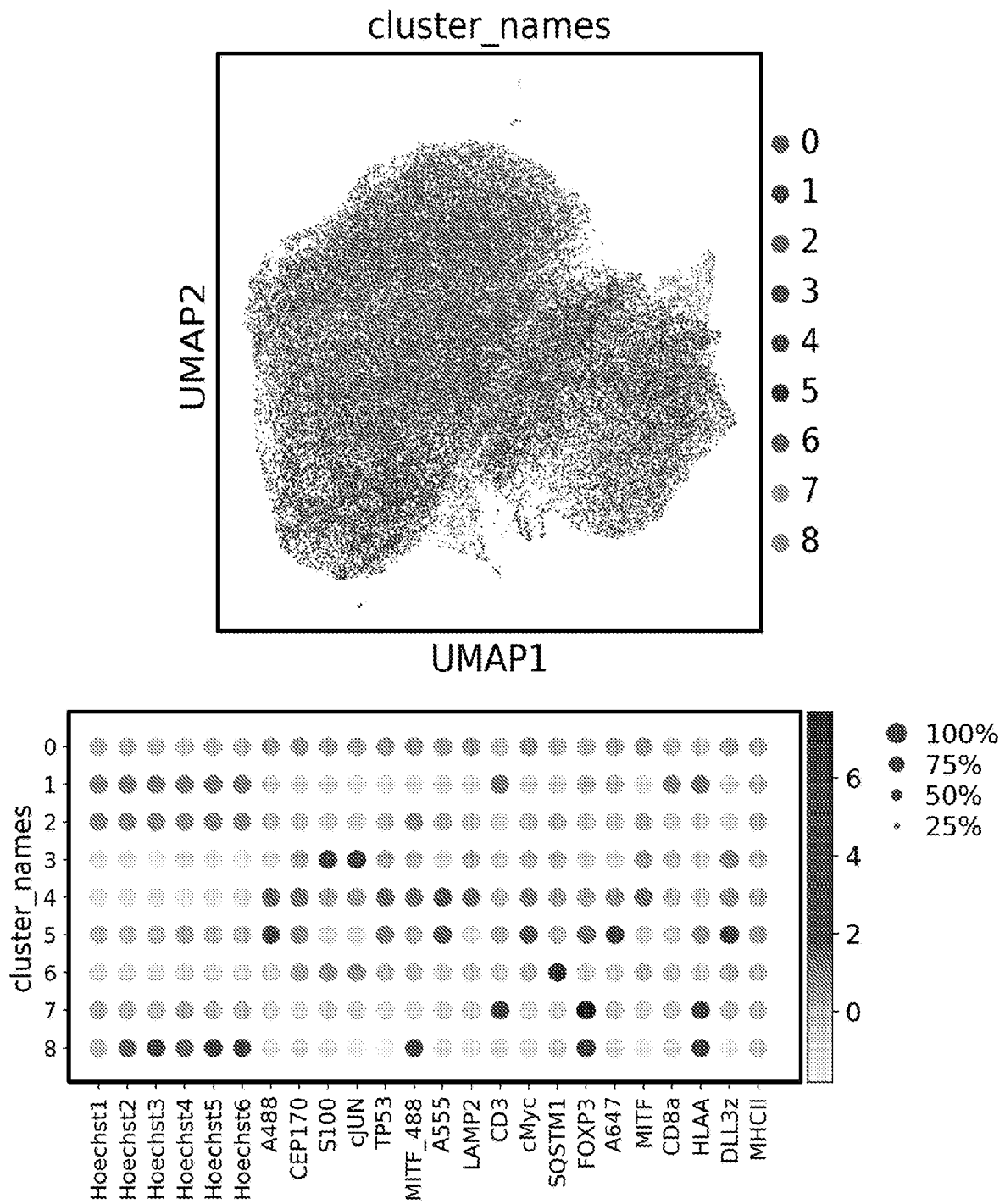
FIG. 17A-17G—Exemplary Melanoma Tumor evaluation using insi2vec.
Figure 17B:
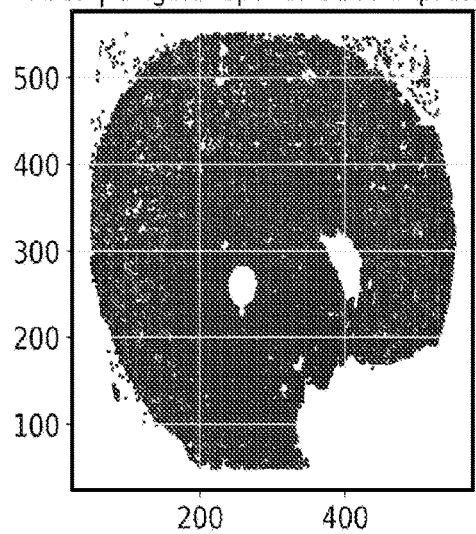
Figure 17B:
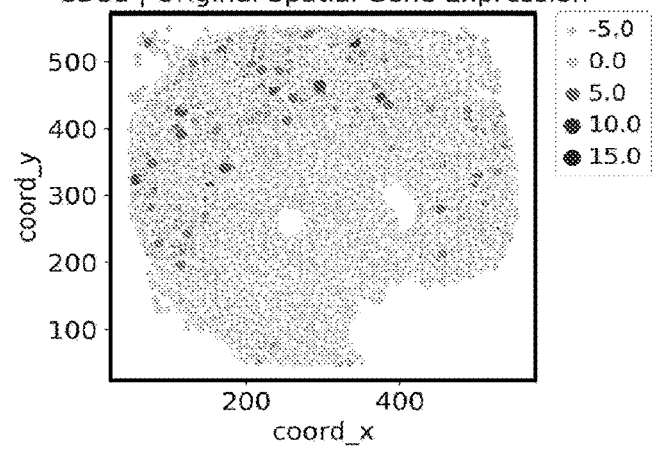
Figure 17B:
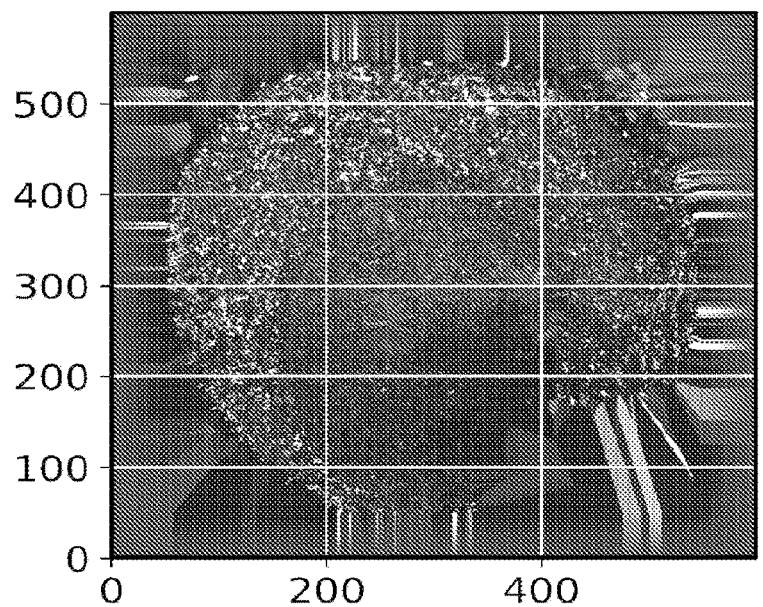
Figure 17C:
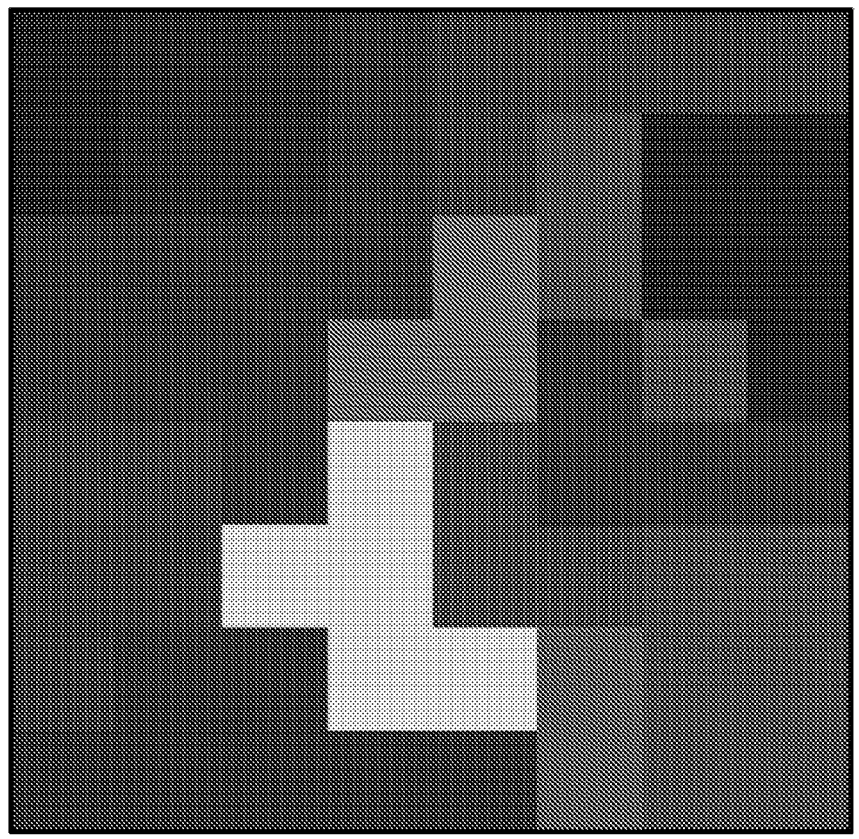
Figure 17D:
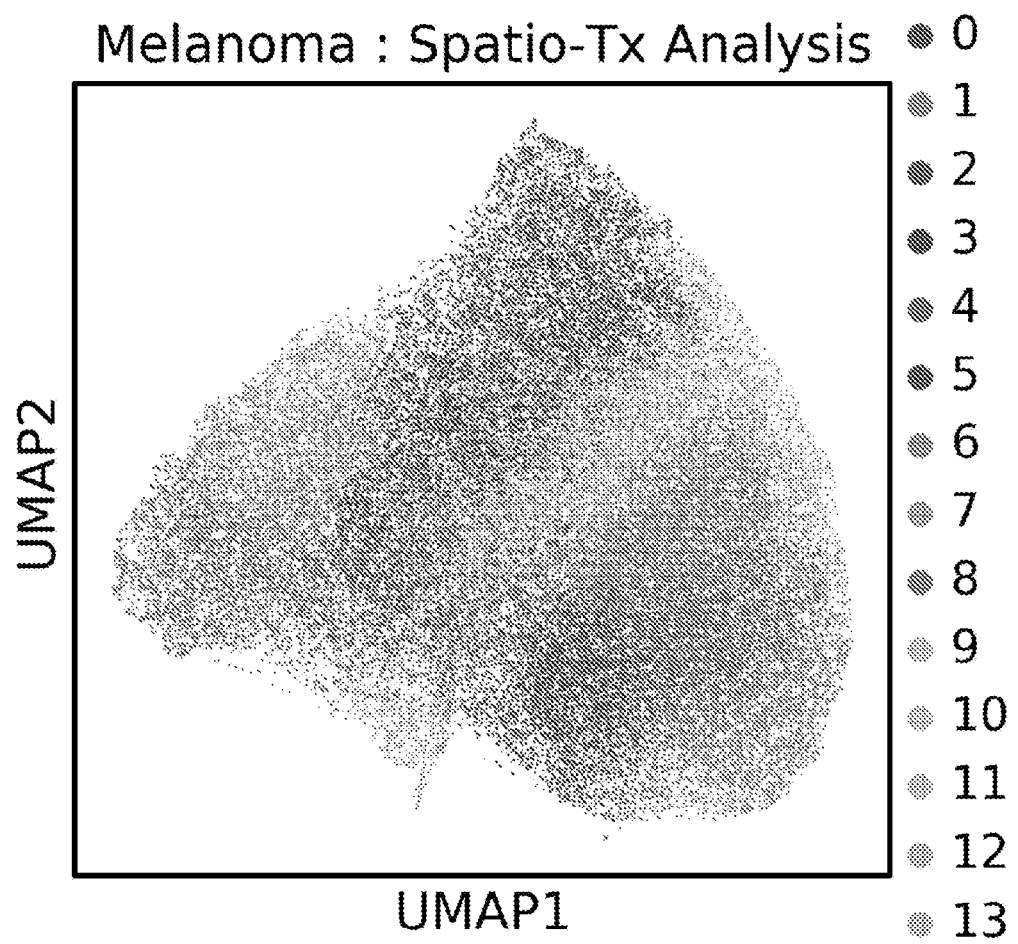
Figure 17E:
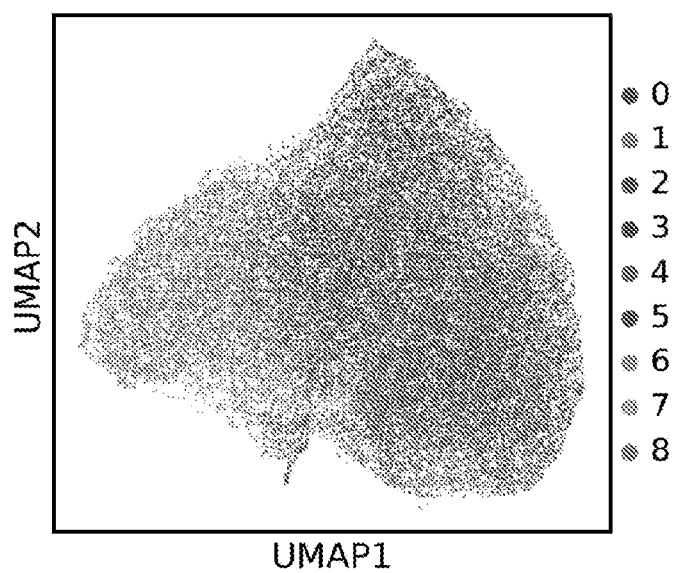
Figure 17F:
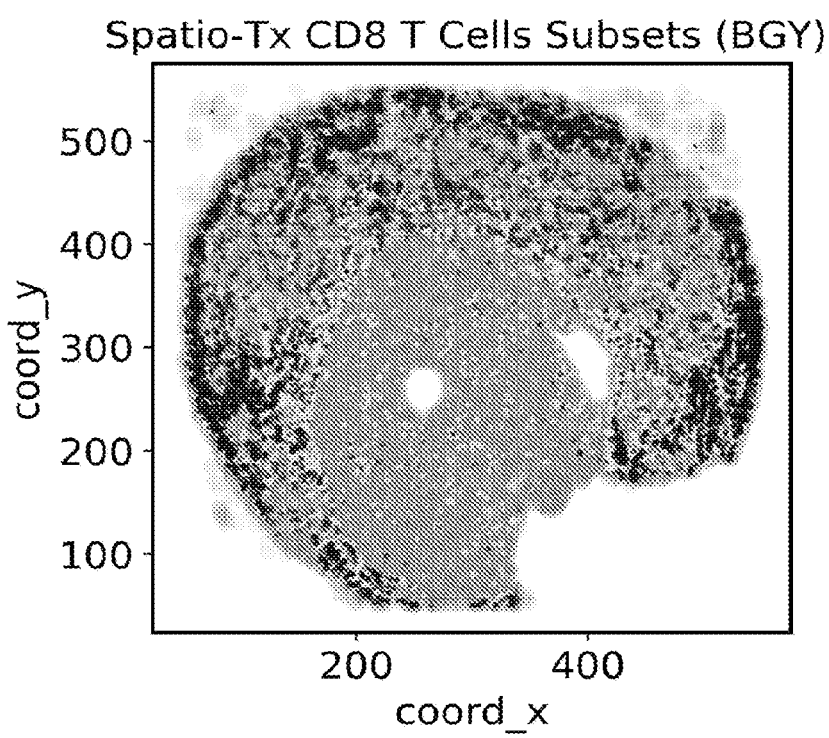
Figure 17G:
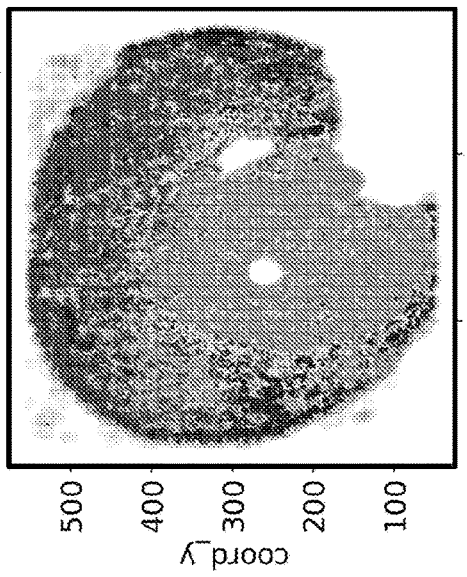
Figure 18B:
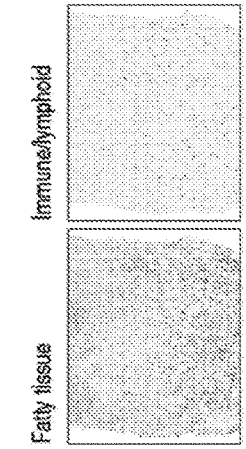
FIG. 18A-18C HDST distinguishes cell types and niches in a breast cancer resection.
Figure 18A:
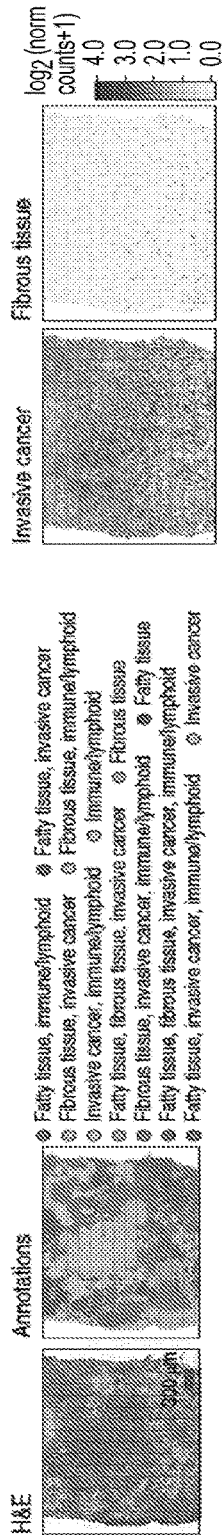
Figure 18C:
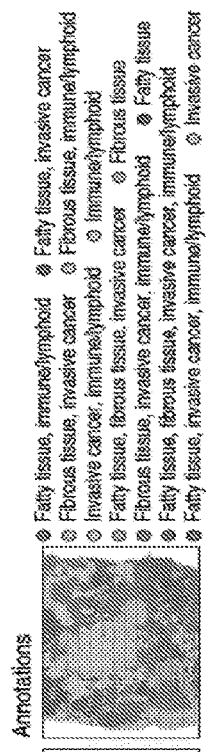
Figure 18C:
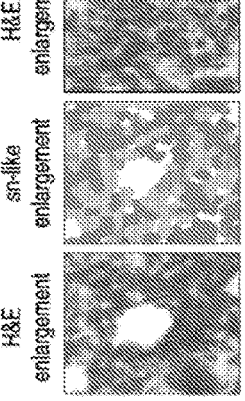

Continuing with the osmFISH illustrative example, now one can use the learned spatio-transcriptomic embeddings to discover new spatially relevant subsets of cells using traditional clustering approaches on this learned vector (FIG. 16).

Reproducing analysis previous osmFISH data, and identifying the pyramidal neuronal population using just the transcriptomic information from osmFISH in accordance with the published result in the original paper, Applicants utilized the umap coordinates from the image through the spatio-transcriptomic embedding of FIG. 16 and replaced the labels with the labels from the osmFISH known data, based solely on the transcriptome and without the spatial information, the layer nomenclature (pyramidal l1,l2 etc) is using the spatial locations.

Spatio-transcriptomic embeddings uncover new spatially defined sub-populations of pyramidal L4 neurons and spatio-transcriptomic embeddings suggests heterogeneity and potentially interacting sub-populations of pyramidal L6 neurons. Using the clustering from the learned spatio-transcriptomic embeddings, Applicants observed two spatially associated cell subsets. (FIG. 11 middle panel of Pyramidal Neurons L6 with RNA plus Spatial overlay).

The analysis can then extend this spatio-transcriptomic framework to the spatial gene expression and other predictions tasks. Of note, osmFISH only had 33 genes and the top marker for the yellow subpopulation (0) wasn't in the osmFISH data but was predicted using insi2vec (Slc6a1)

FIG. 11. These are known subtypes in layer 6 also indicated in Tasic et al and Zeisel et al 2018, with validation from Zeisel et al 2018: (http://mousebrain.org/genes/Lamp5.html, http://mousebrain.org/genes/Slc6a1.html). And the subtypes from layer6 that express these markers allowed Applicants to have the exact location rather than previous work guessing at layer estimates. http://mousebrain.org/celltypes/SCINH1.html (potential candidate for sub class 0), http://mousebrain.org/celltypes/TEGLU3.html (potential candidate for sub class 1).

Figure 12:
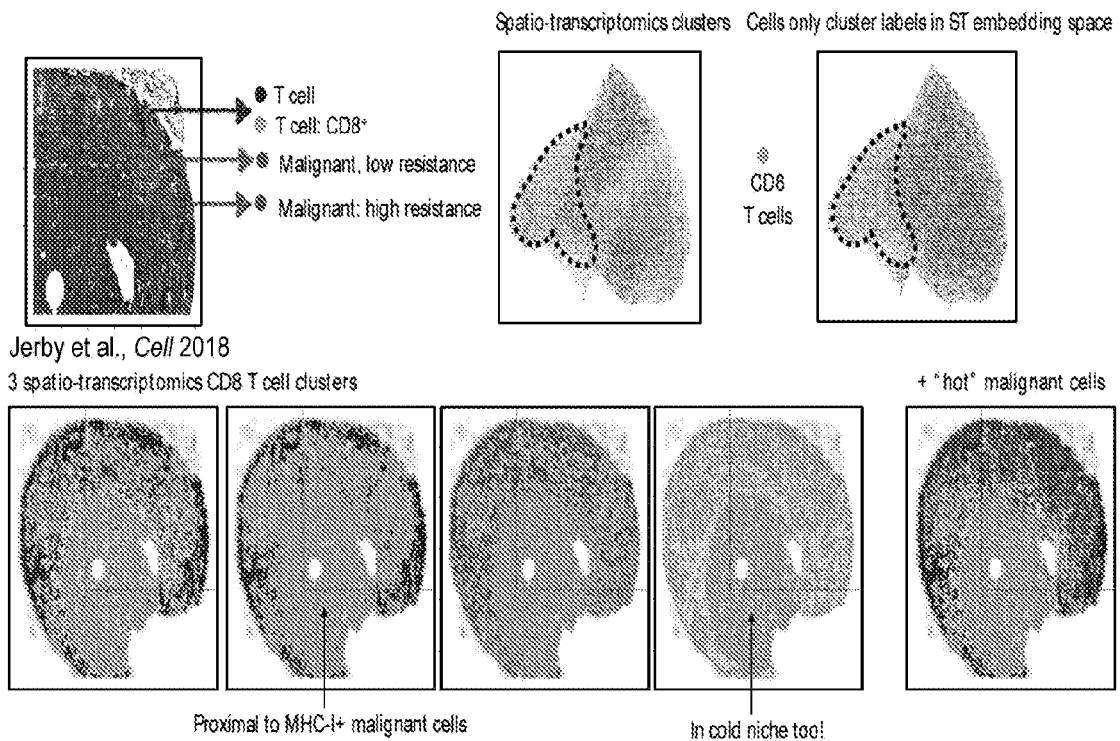
FIG. 12 shows results of application of insi2vec embedding to cluster cells and discovery of distinct subsets of immune and malignant cells by intrinsic and spatial features.
Figure 13:
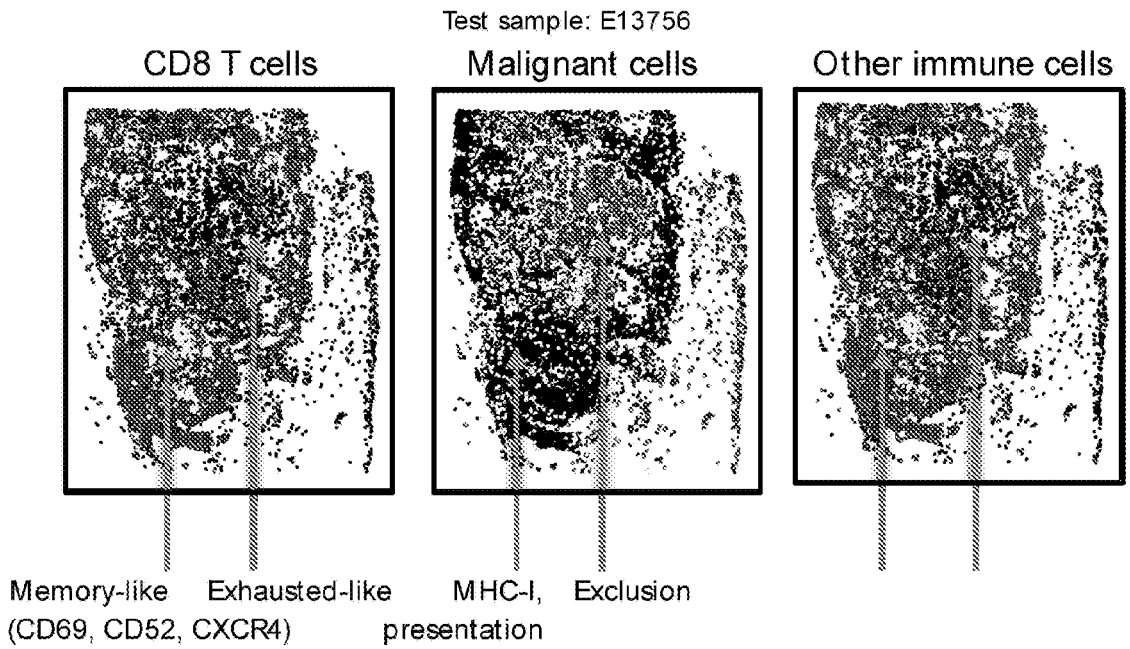
FIG. 13 shows images showing application of insi2vec model generalizes across patients.

As discussed herein, a simple example from osmFISH data on pyramidal neuronsusing only data at the cell level, and painting the resulting "group" generated a single group at layer 6. But insi2vec actually sees two clusters, which cannot be resolved from this data otherwise, but when looing at the features of these clusters, these are known subsets of neurons. FIG. 11. In the melanoma data of FIGS. 12 and 17, the insi2vec embedding was used to cluster the cells. The model allows clustering of cells only based on their intrinsic expression profiles which yields fewer clusters labeled on the same space. (FIG. 17) The CD8 T cells formed 3 clusters by insi2vec. And remarkably, these three clusters made great spatial and molecular sense, especially when shown with another cluster from the malignant cells by insi2vec. One cluster are those T cells directly proximal to MHCI+ malignant cells. A second extreme is the cluster of T cells that make their way into the cold niche, even if very sparsely. (bottom panel, second from right). Critically this model generalizes across patients, like here, where trained the model on 12 patients, and then used it to group the cells in each of four other patients. Even though this is cancer and sample are not canonical, these cell features are repeatable, distinguishing cold from infiltrated cells in both CD8 T cells, malignant cells and also other immune cell content. (FIG. 13). Other applications are envisioned based on current disclosure, including the ability to evaluate differentially expressed genes that many other sc-integration methods are unable to do, see, e.g. liger.

References relevant to Examples 1 and 2 are provided below:
1. E. Lein, L. E. Borm, S. Linnarsson, The promise of spatial transcriptomics for neuroscience in the era of molecular cell typing. *Science*. 358, 64-69 (2017).
2. E. Z. Macosko et al., Highly Parallel Genome-wide Expression Profiling of Individual Cells Using Nanoliter Droplets. *Cell*. 161, 1202-1214 (2015).
3. G. X. Y. Zheng et al., Massively parallel digital transcriptional profiling of single cells. *Nat. Commun.* 8, 14049 (2017).
4. M. Stoeckius et al., Simultaneous epitope and transcriptome measurement in single cells. *Nat. Methods.* 14, 865-868 (2017).
5. R. Satija, J. A. Farrell, D. Gennert, A. F. Schier, A. Regev, Spatial reconstruction of single-cell gene expression data. *Nat. Biotechnol.* 33, 495-502 (2015).
6. K. Achim et al., High-throughput spatial mapping of single-cell RNA-seq data to tissue of origin. *Nat. Biotechnol.* 33, 503-509 (2015).
7. N. Habib et al., Massively parallel single-nucleus RNA-seq with DroNc-seq. *Nat. Methods.* 14, 955-958 (2017).
8. S. C. van den Brink et al., Single-cell sequencing reveals dissociation-induced gene expression in tissue subpopulations. *Nat. Methods.* 14, 935-936 (2017).
9. E. S. Lein et al., Genome-wide atlas of gene expression in the adult mouse brain. *Nature*. 445, 168-176 (2007).
10. I. Tirosh et al., Dissecting the multicellular ecosystem of metastatic melanoma by single-cell RNA-seq. *Science*. 352, 189-196 (2016).
11. E. Lubeck, A. F. Coskun, T. Zhiyentayev, M. Ahmad, L. Cai, Single-cell in-situ RNA profiling by sequential hybridization. *Nat. Methods.* 11, 360-361 (2014).
12. K. H. Chen, A. N. Boettiger, J. R. Moffitt, S. Wang, X. Zhuang, RNA imaging. Spatially resolved, highly multiplexed RNA profiling in single cells. *Science*. 348, aaa6090 (2015).
13. J. R. Moffitt et al., High-throughput single-cell gene-expression profiling with multiplexed error-robust fluorescence in-situ hybridization. *Proc. Natl. Acad. Sci. U.S.A.* 113, 11046-11051 (2016).
14. F. Chen et al., Nanoscale imaging of RNA with expansion microscopy. *Nat. Methods.* 13, 679-684 (2016).
15. Y. Goltsev et al., Deep Profiling of Mouse Splenic Architecture with CODEX Multiplexed Imaging. *Cell*. 174, 968-981.e15 (2018).
16. M. Angelo et al., Multiplexed ion beam imaging of human breast tumors. *Nat. Med.* 20, 436-442 (2014).
17. C. Giesen et al., Highly multiplexed imaging of tumor tissues with subcellular resolution by mass cytometry. *Nat. Methods.* 11, 417-422 (2014).
18. X. Wang et al., Three-dimensional intact-tissue sequencing of single-cell transcriptional states. *Science*. 361 (2018), doi:10.1126/science.aat5691.
19. M. J. Hawrylycz et al., An anatomically comprehensive atlas of the adult human brain transcriptome. *Nature*. 489, 391-399 (2012).
20. S. W. Oh et al., A mesoscale connectome of the mouse brain. *Nature*. 508, 207-214 (2014).
21. J. Livet et al., Transgenic strategies for combinatorial expression of fluorescent proteins in the nervous system. *Nature*. 450, 56-62 (2007).
22. P. L. Stahl et al., Visualization and analysis of gene expression in tissue sections by spatial transcriptomics. *Science*. 353, 78-82 (2016).
23. K. L. Michael, L. C. Taylor, S. L. Schultz, D. R. Walt, Randomly ordered addressable high-density optical sensor arrays. *Anal. Chem.* 70, 1242-1248 (1998).
24. K. L. Gunderson et al., Decoding randomly ordered DNA arrays. *Genome Res.* 14, 870-877 (2004).
25. B. Tepe et al., Single-Cell RNA-Seq of Mouse Olfactory Bulb Reveals Cellular Heterogeneity and Activity-Dependent Molecular Census of Adult-Born Neurons. *Cell Rep.* 25, 2689-2703.e3 (2018).
26. A. Zeisel et al., Molecular Architecture of the Mouse Nervous System. *Cell*. 174, 999-1014.e22 (2018).
27. S. Nagayama, R. Homma, F. Imamura, Neuronal organization of olfactory bulb circuits. *Front. Neural Circuits*. 8, 98 (2014).
28. V. Svensson, S. A. Teichmann, O. Stegle, SpatialDE: identification of spatially variable genes. *Nat. Methods*. 15, 343-346 (2018).
29. A. Jemt et al., An automated approach to prepare tissue-derived spatially barcoded RNA-sequencing libraries. *Sci. Rep.* 6, 37137 (2016).
30. J. F. Navarro, J. Sjostrand, F. Salmén, J. Lundeberg, P. L. Stahl, ST Pipeline: an automated pipeline for spatial mapping of unique transcripts. *Bioinformatics*. 33, 2591-2593 (2017).
31. P. I. Costea, J. Lundeberg, P. Akan, TagGD: fast and accurate software for DNA Tag generation and demultiplexing. *PLoS One.* 8, e57521 (2013).
32. K. Wong, J. F. Navarro, L. Bergenstråhle, P. L. Ståhl, J. Lundeberg, ST Spot Detector: a web-based application for automatic spot and tissue detection for spatial Transcriptomics image datasets. *Bioinformatics.* 34, 1966-1968 (2018).
33. J. Schindelin et al., Fiji: an open-source platform for biological-image analysis. *Nat. Methods.* 9, 676-682 (2012).

Example 3—Automated HDST

ST has shown robust results on a wide variety of tissues[28-31] but the manual multi-step protocol can be demanding. To increase the throughput, robustness, account for histopathology requirements and reduce hands on processing times to an absolute minimum, Applicants have adopted and improved the previously described ST protocol[32] into an easily adjustable microfluidics processing platform. ST generates genome-wide transcriptomic data from spatially defined regions of intact tissues. A fresh frozen tissue section is placed on top of printed positional barcoded cDNA primers on a glass surface[20]. Following tissue staining and microscopic imaging, simultaneously, the permeabilized cells release cellular RNAs and the spatially positioned primers are released directly into the tissue. The material is then converted into cDNA sequencing libraries where the RNA-seq information can be traced back to the barcode positions on the glass slide. Here, Applicants describe an improved and fully automated spatial transcriptomics platform using a commercially available[33,34] liquid handling robotic platform. This allows for processing of 64 tissue sections and up to 96 cDNA sequencing-ready libraries in a total of ~2 days.

Methods

Bravo System Requirements

Bravo Automated Liquid Handling Platform (Agilent Technologies, USA) was equipped with a 96LT pipetting head (G5498B#042, Agilent Technologies, USA) and two Peltier thermal stations (CPAC Ultraflat HT 2-TEC, #7000166A, Agilent Technologies, USA) with PCR adapter having a mounting frame at positions 4 and 6 on the Bravo Deck and connected to an Inheco MTC Controller. On position7, Applicants recommend the MAGNUM FLX™ Enhanced Universal Magnet Plate (#A000400, Alpaqua, USA) to serve for magnetic bead-based clean ups. In addition, a BenchCel NGS Workstation (Front-load rack at 660 mm height) and BenchCel Configuration Labware MiniHub (option #010, Agilent Technologies, USA) were included in the automation platform setup. In case in situ reactions were performed, the PCR adapter was removed from position 6 to be replaced with Aluminum Heat Transfer Plate (#74116-GS-4, V&P Scientific, Inc, USA).

Sample Collection and Cryosectioning

A small piece of freshly collected tissue (~25-50 mg, about 5×5 mm) was placed on a dry and sterile petri dish, which was placed on top of wet ice. The tissue was then very gently moved using a forceps and placed on another dry part of the petri dish to ensure little liquid was present around the tissue. The bottom of a cryomold (5×5 mm, 10×10 mm or 25×20 mm) was filled with pre-chilled (4° C.) OCT (Tissue-Tek; Sakura Finetek, USA) and the tissue transferred with a forceps into the OCT-prefilled mold. The whole volume of the tissue with pre-chilled OCT. The mold was then placed on top of dry ice and allowed the tissue to freeze for max 5 minutes until OCT has turned completely white and hard. The tissue cryomolds were stored at −80° C. until use. For cryosectioning, the ST slide and the tissue molds first reached the temperature of the cryo chamber. The OCT-embedded tissue block was attached onto a chuck with pre-chilled OCT and allow to freeze ~5-10 min. The chuck was placed in the specimen holder and adjusted the position to enable perpendicular sectioning at 10 μm thickness. Sections were gently transferred to a ST array and then the back side of the slide was warmed ~10-15 sec with a finger. ST slides with tissue sections on top could be stored at −80° C. for up to 6 days.

Tissue Fixation and H&E Staining

The ST slide with the tissue section was warmed to 37° C. for 1 minute on a thermal incubator (Eppendorf Thermomixer Option C, Germany). The tissue was then covered with 4% formaldehyde (Sigma-Aldrich, USA) in 1×PBS (Thermo Fisher Scientific, USA) for 10 minutes. The whole slide was then washed in 1×PBS in a vertical orientation to be placed back on a horizontal place for drying. 500 μl isopropanol covered the tissue and ensured drying. The slide was put into a EasyDip Slide Jar Staining System (Weber Scientific) holder and the same system used for H&E staining. Five ~80 ml containers were prepared with Dako Mayers hematoxylin (Agilent, USA), Dako Bluing buffer (Agilent, USA), 5% Eosin Y (Sigma-Aldrich, USA) in 0.45M Tris acetate (Sigma-Aldrich, USA) buffer at pH 6 and two jars with nuclease-free water (Thermo Fisher Scientific, USA). The slide rack was fully immersed in hematoxylin for 6 minutes and then washed by dipping the slide rack in a nuclease-free water jar 5 times following another destaining wash by dipping the slide rack in 800 mL nuclease-free water for 30 times. The slide rack was put into the Dako bluing buffer and incubated for 1 minute. The slide was again washed by dipping the rack 5 times in the second nuclease-free water jar. The slide rack was finally put into the eosin and incubated for 1 minute to be washed by dipping the rack 7 times in the second water jar. The slide was removed from the rack to allow it to dry.

Automated Imaging

Images of stained tissue sections on the ST slides were taken a Metafer Vslide scanning system (MetaSystems, Germany) installed on an Axio Imager Z2 microscope (Carl Zeiss, Germany) using an LED transmitted light source and a CCD camera. All images were taken with the A-P 10×/0.25 Ph1 objective lens. A configuration program was made to enable automatic tissue detection, focusing and scanning on all ST arrays present on a glass slide. In short, tissue detection was based on contrast as compared to normalized background in RGB channels. Upon finding maximum contrast in a 12-step spiral-like search window field of view (FOV) pattern, the automated focal alignment in every second of each FOV (4000×4000 μm) was initiated. The alignment search considered the maximum contrast z-position as in-focus using 5 μm stage intervals (n=19 focal planes). The scanning of the predefined ST array areas was done in a total of 48 FOVs and ~30 sec in 3 channels (RGB). Images were stitched using 60 μm overlap and linear blending between FOVs with the VSlide software (v1.0.0) and then extracted using jpg compression. Multiple ST slides can be processed in the same manner without any user input for a total of 6 min processing time per slide, which included image stitchingST Automation approach The robotic protocols are divided into three main parts. They represent both an adaptation and improvement of the previously described spatial transcriptomics protocols[20,27,32]. The first part processes all in situ reactions on a ST slides: tissue pre-permeabilization, permeabilization, reverse transcription with or without the mRNA:cDNA hybrid cleavage and tissue removal. The collected material is transferred to a standard 96-well PCR microplate (Eppendorf, Germany). All of the following reactions are run in 96-well plates. The second robotic protocol ensured the second strand synthesis reaction, cDNA bead purification, T7 in vitro transcription and a final amplified RNA (aRNA) bead purification are performed. The third and last robotic protocol includes the aRNA adapter ligation, postligation bead purification, second cDNA synthesis and bead purification. The material is then quantified using a standard qPCR protocol and the libraries accordingly indexed for Illumina sequencing. Reference material preparation In order to test reproducibility of the last two parts of the automated ST protocol run in 96-well plates, Applicants prepared reference material as input. 7.5 µg of universal mouse reference RNA (#740100, Agilent Technologies, USA) was fragmented using NEBNext Magnesium RNA fragmentation module (NEB, USA) for 1 minute at 94° C. The sample was purified with a MinElute Cleanup kit (Qiagen, Germany) according to manufacturer's instructions and the RNA concentration and size assessed on a Qubit RNA HS kit (Thermo Fisher Scientific, USA) and Bioanalyzer Pico 6000 kit (Agilent Technologies, USA), respectively. ~2 µg of fragmented RNA was incubated with either 2 µM custom hexamer primer or poly(d)T primer in the presence of 0.5 mM dNTP (Thermo Fisher Scientific, USA) at 65° C. for 5 minutes. The hexamer primer read GACTCGTAATACGACTCAC-TATAGGGACACGACGCTCTTCC-GATCTNNNNNNNNN (T7handle_IlluminaAhandle_hexamer) (SEQ ID NO: 7) and the poly(d)T primer read T7handle_IlluminaAhandle_hexamer_20TVN. First strand reverse transcription was performed with a final concentration of 1× First Strand Buffer, 5 mM DTT, 2 U/µl RNaseOUT and 20 U/µl of Superscript III (all from Thermo Fisher Scientific, USA). The reaction was incubated at 25° C. for 10 min (when using hexamer priming), followed by 50° C. for 1 hr and 70° C. for 15 minutes or 50° C. for 1 hr and 70° C. for 15 minutes for poly(d)T priming. The reaction was purified with AMPure XP beads (Beckman Coulter, USA) at a beads/DNA ratio of 0.8:1. The concentration of the material was measured on a Qubit RNA HS kit (Thermo Fisher Scientific, USA) and diluted in elution buffer (Qiagen, Germany) to 0.25 ng/ul. A release mixture of 0.75 ng first strand cDNA, 1× Second strand buffer (Thermo Fisher Scientific, USA), 0.2 µg/ul BSA and 0.5 mM dNTP (Thermo Fisher Scientific, USA) was prepared.

In Situ Robotic Protocol

Input to this part of the protocol are tissue-stained ST slides. The ST slide is attached ProPlate Multi-Array slide system (GraceBioLabs, USA). Up to four ST slides are fitted into one ProPlate Multi-Array slide system (GraceBioLabs, USA). The ProPlate Multi-Array system is then fixed in position by Aluminum Heat Transfer Plate (VP 74116-GS-4, V&P Scientific, Inc, USA) on the Agilent Bravo deck. The protocol starts with tissue pre-permeabilization (20 min for human colon and 30 min for mouse brain) with addition of 120 µl reagent per well of either 2.5 U/µl liberase (human colon; Sigma-Aldrich, USA) in 1× Hank's Buffered Salt Solution (Thermo Fisher Scientific, USA) with 0.2 µg/ul BSA or exonuclease I buffer (mouse brain; NEB, USA) can be used. For complete removal of the reagents and wash solutions from the subarrays all of the robotic dispensing and aspiration steps takes place in all four corners of the square wells. Pre-permeabilization reagent removal is followed by a 100 µl wash in 0.1× Saline Sodium Citrate (SSC, Sigma-Aldrich, USA). Next, tissue permeabilization takes place with 75 µl 0.1% pepsin (pH 1, Sigma-Aldrich, USA) for 10 min. After a 100 µl 10.1×SSC wash, in situ cDNA synthesis reaction is performed by the addition of 75 µl RT reagents: 50 ng/µl actinomycin D (Sigma-Aldrich, USA), 0.5 mM dNTPs (Thermo Fisher Scientific, USA), 0.19 µg/µl BSA (NEB, USA), 1× First strand buffer, 5 mM DTT, 2 U/µl RNaseOUT, 20 U/µl Superscript III (all from Thermo Fisher Scientific, USA). The reactions are sealed with 70 µl of white mineral oil Drakerol #7 (Penreco, USA). Incubation at 42° C. is performed for a minimum of 6 h, then the reaction mix is removed followed by an 0.1×SSC wash of the slide surface. In case of the highly efficient ST protocol, the in situ cDNA synthesis mix was supplemented with the following: 1 U/µl USER enzyme (NEB, USA), 6% v/v lymphoprep (STEMCELL Technologies, Canada) and 1M betaine (#B0300-1VL, Sigma-Aldrich, USA). In case a Cy3 fluorescent cDNA activity print is needed for tissue optimization, the 75 µl in situ cDNA reaction mix was as follows: 50 ng/µl actinomycin D (Sigma-Aldrich, USA), 0.19 µg/µl BSA (NEB, USA), 1× M-MuLV buffer, 5 mM DTT, 2 U/µl RNaseOUT, 20 U/µl M-MuLV (all from Thermo Fisher Scientific, USA), 2.4 µl dNTP mix (dATP; dGTP and dTTP at 10 mM and dCTP at 2.5 mM) and 1.2 µl Cy3-dCTPs (0.2 mM, Perkin Elmer, USA).

The next part of the protocol encompasses tissue removal and takes place in two separate steps with RLT buffer with β-mercaptoethanol and Proteinase K. Depending on the tissue type a selection of a one-step or two-step protocol can be chosen. The β-mercaptoethanol mixture with RLT buffer is prepared in the reagent plate with 50 ul of mineral oil on top to avoid leakage of β-mercaptoethanol smell. 200 µl of the mixture is added to the wells and incubated at 56° C. for 1 h. Following removal of reaction mix and wash with 0.1×SSC solution, 200 µl of second tissue removal mixture; 2.5 µg/µl Proteinase K in PDK buffer (Qiagen, Germany); was added and the reaction was performed at 56° C. for 1 h. The complete reaction mix is again removed and efficient leftover white oil removal is accomplished with one 10 minute wash of the wells with 2×SSC/0.1% SDS (Sigma-Aldrich, USA) followed by 1 minute wash with 0.2×SSC and finally 0.1×SSC. In case of comparison to standard ST protocol, cleavage of probes from the surface was performed in the next steps and not during in situ cDNA synthesis. The reaction mix consists of: 1.1× Second strand buffer (Thermo Fisher Scientific, USA), 0.088 mM dNTPs and 1 U/µl USER enzyme (NEB, USA). 75 µl of the mix is added and the reactions sealed with 70 µl of the white mineral oil. The incubation is done for 3 h at 37° C. The released material is then transferred to a new 96-well PCR plate (Eppendorf, Germany) by aspirating 70 µl of the released material underneath the oil with a multichannel pipette to avoid any sample loss during transfer. Library preparation (1)

Upon initiating the Agilent Bravo form the user is prompted to select either: 1, 2, 3, 4, 6 or 12 columns of the 96-well plate to run. Two positions on the Bravo deck should have Peltier thermal stations (4-95° C.) in the standard 96-well format. A reagent plate is prepared for the robotic aspiration, transfer and dispensing of reagents as outlined in figures, showing the layout for a 12 columns (96 samples) run. The dead volume of the reagents are ~6-8 ul per well for a 12 column plate of samples and should be accounted for when preparing the reaction plate. First, single-stranded cDNA is made to double-stranded material using 5 ul the reaction mix (2.7 µl First strand buffer, 3.7 U/µl DNA polymerase I and 0.43 U/µl Ribonuclease H (all from Thermo Fisher Scientific, USA) for 2 h at 16° C. Thereafter, the material is blunted by the addition of 5 µl of 3 U/µl T4 DNA polymerase (NEB, USA) for 20 minutes at 16° C. The reaction is stopped by addition of Irxvitrogen UltraPure 0.5M EDTA (pH 8.0, Thermo Fisher Scientific, USA) to a final concentration of 16 µM. The material was purified using Ampure XP (Beckman Coulter, USA) purified at a bead to cDNA ratio of 1:1. Next, 27.8 µl of the T7 reaction mix (46.2 mM rNTPs, 1.5×T7 reaction buffer, 1.54 U/µl SUPERaseIN inhibitor and 2.3 U/µl T7 enzyme; all from Thermo Fisher Scientific, USA) is added and sealed with 40 µl of Vapor-Lock oil (Qiagen, Germany) for an overnight 14 h incubation at 37° C. After incubation, 2.1 µl of nuclease-free water (Thermo Fisher Scientific) is added and the Vapor-Lock is removed. A bead cleanup with RNAclean Ampure XP beads (Beckman Coulter, USA) at a ratio of 1.8:1 of beads:aRNA. The material can be assessed with an Bioanalyzer RNA 6000 Pico kit (Agilent Technologies, USA). 8 µl of the eluted 141 aRNA is transferred into a new 96-well PCR plate (Eppendorf, Germany).

Library Preparation (2)

2.5 µl 3 µM aRNA adapters [rApp]AGATCG-GAAGAGCACACGTCTGAACTCCAGTCAC[ddC] (SEQ ID NO: 8) are added to 8 µl of aRNAs. The reaction is then incubated at 70° C. in a PCR machine for 2 min and immediately chilled on wet ice. The user now again selects the number of columns they wish to run. 4.5 µl T4 RNA ligation mix (1×T4 RNA ligase buffer, 300 U truncated T4 ligase 2 and 60 U murine RNAse inhibitor (all from NEB, USA) is added to the aRNA/adapter solution. The ligation reaction takes place at 25° C. for 1 h. In case of the high-efficiency protocol, the ligation reaction is performed for 3 h with in the presence of 5× aRNA adapters. The ligation is followed by a Ampure XP (Beckam Coulter, USA) bead purification at a ratio of 1.8:1 bead:cDNA and eluted in 141. First, 2 µl of a primer and dNTP mix (1:1 v/v of 20 mM GTGACTGGAGTTCA-GACGTGTGCTCTTCCGA (SEQ ID NO: 9) (20 uM) and 10 mM dNTPs) is added to the ligated samples. In case of the highly-efficient ST protocol, 5× primer amount is added using the same volumes. Then, the samples are sealed with 40 µl Vapor-Lock (Qiagen, Germany) and heated to 65° C. for 5 min. The Vapor-Lock is removed and 8 µl of reverse transcription mix added (0.9× First strand buffer, 4.5 mM DTT, 1.8 U/µl RNaseOUT and 9 U/µl Superscript III; all from Thermo Fisher Scientific, USA), with the addition of 40 µl Vapor-Lock to reseal the reaction. The samples are incubated at 50° C. for 1 h. 10 µl of nuclease-free water is added followed by a final Ampure XP bead purification at 1.7:1 bead:cDNA ratio with elution is 15 µl nuclease-free water.

Quantification, Indexing and Sequencing qPCR library quantification and indexing are performed as described in Salmén et al[32]. The indexed libraries are diluted with 40 µl of nuclease-free water to allow for a final library bead clean up with 0.8:1 ratio Ampure XP beads to PCR products as according to manufacturer's protocol. Final elution is done in 16 µl elution buffer (Qiagen, Germany). The individual libraries are evaluated on a Bioanalyzer HS or DNA 1000 (Agilent Technologies, USA), DNA1000 Tapestation (Agilent Technologies, USA) and DNA HS Qubit assays (Thermo Fisher Scientific, USA), respectively. Dilute the samples to the desired concentration for sequencing (~1.08 pM final for NextSeq sequencing with 10% PhiX). The samples were sequenced 30 nt in the forward read and 55 nt in the reverse read.

Raw Reads Processing and Mapping

Fastq reads were generated with bcl2fastq2. ST Pipeline v.1.3.1 was used to demultiplex the spatial barcodes and collapse duplicate UMI sequences. In short, 5 nt trimmed R2 was used for mapping to the mouse genome (mm10) using STAR[40]. After that, mapped reads were annotated using HTseq-count[41]. To collapse UMIs, the annotated reads needed to first be connected to a spatial barcode using a TagGD[42] demultiplexer (k-mer 6, mismatches 2). Then, UMIs mapping to the same transcript and spatial barcode were collapsed using naive clustering with one mismatch allowed in the mapping process. The output file is a genes-by-barcode matrix that was used in all further processing steps.

Automated Image Processing for Spatial Transcriptomics

For efficient processing, HE images were scaled to approximately 500×500 pixels using the imagemagick mogrify command as follows: mogrify -define jpeg:size=500× 500-resize 8% -quality 100%% HE_image.jpg. In order to reconstruct the positions of all ST spots, visible (i.e. not covered by the tissue section) barcode (x,y) spots were registered through "blob detection" and then refined by keeping only those "blobs" (potential grid points) that were likely to be part of a regular grid. A regular grid was then fitted to the remaining potential grid points, starting an iterative process in which the 0.1% potential grid points that least fit the grid were removed in each iteration and a new grid was fitted until the target number of grid points per row (here 35) and column (here 33) were reached. Finally, those grid points that overlapped the tissue sections were identified by building a mask that represented the tissue area and registering all grid points that were present in this mask. In order to accommodate atypical tissue coloring, bubbles and smears present as imaging artifacts, Applicants introduced a parameter that toggles the color channels used to detect the tissue section. Finally, an intermediate report notifies the user of irregularities in the automatic alignment process and allows for visual inspection. The output .tsv file contains barcode spots (x,y) as centroid pixel coordinates of the detected grid, as well as a TRUE/FALSE value if the barcode spot is detected as under the tissue section area (ie. TRUE).

SpoTter Integration with ST Pipeline and Quality Control (QC) Reporting

The following steps integrate the output from the automated image alignment steps with the output gene-by-barcode expression file as produced by the ST Pipeline v.1.3.1. The barcode (x,y) spots approximated as under the tissue section are used for subsetting the ST Pipeline gene-by-barcode file. Then, the original HE images are down-scaled and cropped using the following imagemagick commands: convert HE_image.jpg -crop width"x"height+xa+ya; where width and height represent the euclidean lengths between (x,y) grid detected barcode spots c(33,35), c(1,35) and c(1,35), respectively. xa and ya are described as the centroid pixel coordinates of the grid point c(33,35). The cropped HE image is then rotated as follows: mogrify -flop -flip HE_image.jpg and this image is used as input to the QC reporting system and for the GUI annotation tool. A final quality control (QC) report is created when running SpoTteR. The report contains the following information:

date and time metadata for QC report creation
    ST pipeline version
    Raw input reads
    Trimming loss
    Unique mapping
    Annotated reads
    UMIs
    Genes
    Library saturation
    HE Tissue Image Heatmap of log 2(raw expression) associated with all 1007 ST barcodes Heatmap of log 2(raw expression) associated with ST barcodes under tissue Violin plots of UMIs outside or within tissue-detected boundaries Mean number of transcripts per feature under tissue Mean number of genes per feature under tissue Number of barcode spots covered Heatmap of log 2(raw expression) associated with top 5 genes in your ST experiment Heatmap of log 2(raw expression) associated with 5 interesting genes in your ST experiment Comparison of SpoTter Vs. ST Spot Detector Vs Manual Alignment As to compare the automated image processing developed here, Applicants needed to acquire an additional image of the ST array area after the experiment was performed and the tissue had been removed from the array surface. Briefly, to be linearly downscaled to 30% of their original size and both images needed to be individually cropped as to represent the same FOVs as collected during the imaging step. Applicants do note that the cropping is needed only if the user did not have the possibility to automatically acquire the same FOVs using the same staring (x,y) positions. For manual alignment, Applicants used Adobe Photoshop for initial pre-processing, same is in the previous step. Both H&E and Cy3 acquired images were downscaled to 30% it's original sizes, rotated 180 degrees and aligned to the same starting (x,y) pixel coordinates. This was followed by cropping both images along the middle of the first and last row and column. The tissue boundaries were detected using the magic wand function (32 px) and the selected subtracted in the Cy3 image. Spots boundaries were again detected using the same magick wand function and the background noise cleaned up using the bucket fill function (250 px) in a grayscale image. This grayscale image was further used in Fiji[43] to detect the centroid coordinates of each ST barcode spot. For Fiji, Applicants made a macro plugin bellow:

```
# read in input and output directories through gui
input = getDirectory("Input directory");
output = getDirectory("Output directory");
suffix = "spots.jpg"; //you only want to apply to spots.jpg images that are grayscale
processFolder(input);
function processFolder(input) {
    list = getFileList(input);
    for (i = 0; i < list.length; i++) {
        if(File.isDirectory(input + list[i])) //if it's a directory, go to subfolder
            processFolder("" + input + list[i]);
        if(endsWith(list[i], suffix)) //if it's a jpg image, process it
            processFile(input, output, list[i]);
                close( ); //close image
        //if it's neither a tiff nor a directory, do nothing
    }
}
function processFile(input, output, file) {
    print("Processing: " + input + file);
    open(input + file); //open image
        setAutoThreshold("Default");
        //run("Threshold...");
        setAutoThreshold("Default");
        //setThreshold(0, 143);
        setOption("BlackBackground", false);
        run("Convert to Mask");
        setThreshold(255, 255);
        run("Set Measurements...", "centroid redirect=None decimal=3");
        run("Analyze Particles...", "size=3000-Infinity show=Overlay display");
        saveAs("results", output + file + "_spots.tsv"); #output tsv file with ST spot centroids
        run("Clear Results");}
``` complementary and Cy3 labeled oligonucleotides (IDT) were diluted in 2×SSC with 0.05% SDS to a final concentration of 1 µM. 50 µl of the diluted solution was added to the array surface and incubated with shaking (50 rpm) for 10 min at RT. This was followed by washing the slide in 4×SCC with 0.1% SDS and 0.2×SSC. The array frame and all ST barcode positions have now efficiently been labeled and could be acquired on the same imaging system as described before but now using a fluorescent light source and a FITC filter.

All input images in the following comparisons were the same approximate input sizes and resolution. Further, all plotting functions during processing have been disabled and only time needed to process the final output file with ST barcode spot under tissue was considered in the comparisons. The ST spot detector tool previously developed[36] uses the H&E and Cy3 images as input. Due to its intrinsic scaling factor and input image size requirements, initial pre-processing of both images was needed ie. images needed Following Fiji processing, (x,y) pixel centroid coordinates were translated to ST barcode spot coordinates (as given during the demultiplexing step in the ST pipeline). Image attributes i.e. image width and height were divided by 32 and 34 respectively making a scaling factor. Then, each centroid pixel coordinate from Fiji processing counting be divided by the scaling factor and rounded to the nearest digit. This (x,y) now was using the same coordinate system and scaling as the ST (x,y) pipeline files. For input to SpoTeR, Applicants only needed the original H&E imaged as acquired by the imaging system and no sGUI-based preprocessing was needed. For speed comparisons, total time need for preprocessing steps was measured first. Preprocessing steps in case of "manual" processing included alignment of the H&E and Cy3 images with Adobe Photoshop 2019 and creation of a ST array spots files. In case of ST Detector pre-processing time, Applicants could only time needed to open the same images in Adobe Photoshop, downscale them to 30% size and crop them the same size without any other image handling processes performed. For SpoTteR, preprocessing included the downscaling step performed with imagemagick. Processing steps were then performed and time measure as described before. Total speed was considered as 1/t [$s^{-1}$] where t represents the sum of time needed for both the pre-processing and processing steps. False positive and negative rates were calculated as percentage of spots present or absent in SpoTteR or ST Detector but not it manually processed ST barcode spot coordinates as compared to all positions detected in either of the datasets.

Estimating Lateral Diffusion

Two consecutive mouse cortex fresh frozen sections were processed. One was processed manually as described earlier[32] while the other was processed using our devised robotic set up. Both the H&E and gene activity Cy3 images were processed in Fiji[43]. Cell boundaries were detected and 10% signal intensity and these were used as breakpoints to estimate Cy3 signal diffusions ie. lateral diffusion. Left and right cell boundaries representing opposite sides of each cells were used in the estimate and a total of 9 cells used each condition, although more cells can be utilized. A pixel to distance conversion ratio was used. If a diffusion distance measure was scored as negative it implied that the Cy3 signal was contained within the detected cell boundaries, and positive if outside those same boundaries. For comparing results between the condition, Applicants used only those values scored positively and significance comparison was performed using a t-test.

Image Annotation

To manually annotate tissue images based on their H&E features, Applicants used a previously adapted graphical and cloud-based user interface[22]. Applicants assigned each ST (x,y) coordinate with one or more regional tags. The region names used were: Olfactory Nerve Layer (ONL), Granular Cell Layer (GCL-E), Granular Cell Layer Internal (GCL-I), Deep Granular Zone (GCL-D), External Plexiform Layer (EPL), Mitral Layer (M/T), Internal Plexiform Layer (IPL), Subependymal Zone (SEZ), Granular Cell Layer (GL), Cortex (CTX) and Auxiliary Olfactory Bulb (AOB). For comparisons between ST2.5 and manually prepared libraries, as well as Splotch, regions were merged as following:

| | |
|---|---|
| Granula Cell Layer Deep (GCL-D) | GR |
| Glomerular Layer (GL) | GL |
| Granule Cell Layer External (GCL-E) | GR |
| Granule Cell Layer Internal (GCL-I) | GR |
| Subependymal Zone (SEZ) | GR |
| Internal Plexiform Layer (IPL) | IPL |
| External Plexiform Layer (EPL) | OPL |
| Mitral Layer (M/T) | MI |
| Olfactory Nerve Layer (ONL) | ONL |

Comparisons Between Gene Expression Profiles

For comparisons between the ST2.5 and manual datasets, all data were first downsampled to the same saturation level (64%) before invoking a ST pipeline mapper, annotator and counter run to receive UMIs per spatial (x,y) barcode as described previously. Depending on the sequencing depth, a gene was counted as expressed if the corresponding transcript was present in >1, >3 and >40 copies (when analyzing samples at raw sequencing depths of 10,000,000; 30,000,000 and 400,000,000 reads, respectively). The total count over all spots per gene and sample were normalized using a naive transformation[44]. Pearsons's correlation coefficient between the average and normalized samples was calculated using Scipy v1.2.0[45].

Saturation Curve Generation

Number of unique molecules were calculated by first subsampling the same proportion of annotated reads from each sample and then run the samples through ST Pipeline v.1.3.1, where unique molecules were calculated as previously described.

Spatial Gene Expression Analysis—Splotch

Statistical analysis of the spatial gene expression data was performed using Splotch two-level hierarchical model (https://github.com/tare/Splotch) as previously described[31]. In short, the model captures gene expression in anatomical regions by taking into account experimental parameters such as, in our case, different enzymatical conditions and concentrations and calculates gene expression for single genes per annotated spot, as well as differential expressed genes per region captured in Bayesian factors (BF) using Bayesian interference with Hamiltonian Monte Carlo. To find genes which were differential expressed in, as an example, the annotated region ONL compared to the other regions, Applicants used Splotch to compute the BF{ONL vs. Other regions}.

Comparison to Allen Brain Atlas Data

To validate our findings, Applicants downloaded ISH gene expression data from five regions; GL (Glomerular Layer), GR (Granule Cell Layer), IPL (Internal Plexiform Layer), MI (Mitral Layer) and OPL (External Plexiform Layer), from the Allen Brain Atlas (ABA). To be able to compare our samples with the ABA reference and since Applicants had annotated our samples in more detail, Applicants merged our regions before Splotch as previously described. Auxiliary Olfactory Bulb (AOB) and Cortex (CTX) were excluded from the Splotch analysis. Applicants filtered for genes with fold change more than a particular cutoff in ABA, compared to genes with positive fold change and log 10(BF) more than an identified parameter in our Splotch data and computed a one-sided Fisher's exact test using Scipy v1.2.0[45], Resulting p values were corrected for multiple testing using Benjamini/Hochberg. One of the top most differential expressed genes in both ST2.5 and ABA were chosen from each region and its gene expression in all samples were visualized. The visualizations were compared to the corresponding in situ hybridization (ISH) and fluorescent images, downloaded from ABA webpage (https://mouse.brain-map.org/). In addition, ST2.5 was compared to ST samples (Stahl et al. 2016). This ST dataset was also analyzed using Splotch with the same settings as used for ST2.5, before visualized and compared to ST2.5. Genes which were not found in ST samples, but found in ABA, were finally visualized.

Code availability: All code has been deposited on GitHub at klarman-cell observatory/staut (https://github.com).

Data and materials availability: The data have been deposited to NCBI's GEO archive GSE. All processed data is available at the Single Cell Portal (https://portals.broadinstitute.org).

Results

Applicants tested the automated platform in two separate occasions: (1) in situ and (2) library preparation reactions. The in situ tissue processing was done using a ProPlate Multi-Array slide system (GraceBioLabs) and a low-cost adapter (Methods). In addition, the in situ tissue processing can be run in "optimization mode" or "library preparation mode". Optimization mode gives the user information on tissue permeabilization effects where a Cy3 fluorescent print of spatial cDNA activity is created and measured[32]. The localized cDNA footprint is compared to the histological H&E pattern and the extent of molecular lateral leakage outside the tissue boundaries measured. Applicants confirmed that using the automated platform allowed for recreation of the spatial fluorescent patterns in four tested tissues: cortex and main olfactory bulb of mouse brain, distal mouse colon and a preclinical model of colorectal cancer (FIG. 19A-19H'). With these results, estimated lateral diffusion was 0.5 um, which confirms weakened lateral diffusion (p<0.01, Mann-Whitney) 3× lower compared to previous experiments[20,32,35].

Figure 20B:
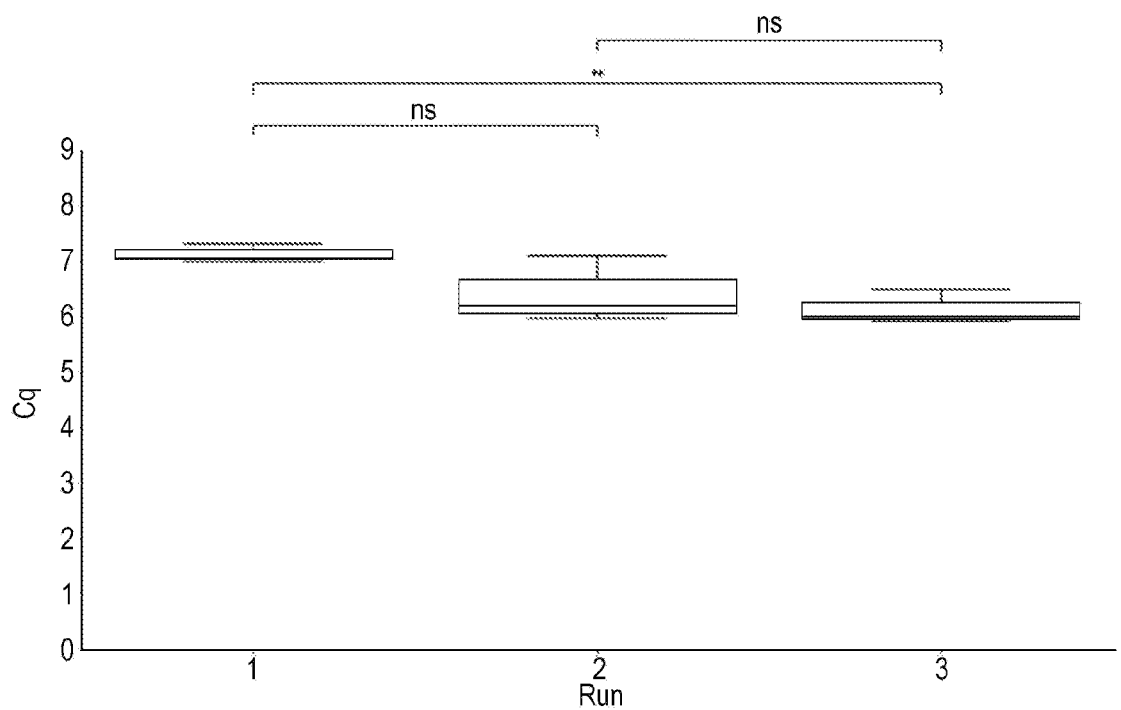
Figure 20C:
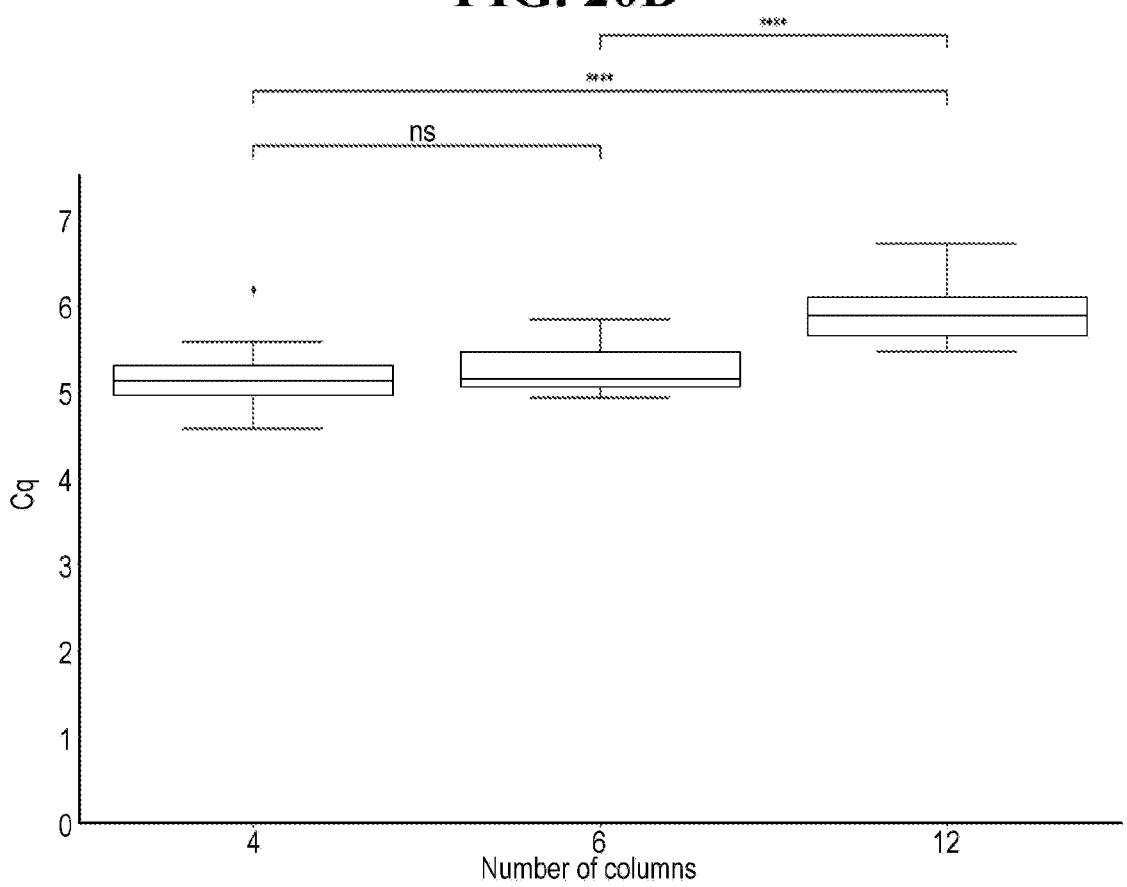

Library preparation mode gives the user 3' spatial RNAseq information. When running the library preparation mode, three main steps are performed: (1) in situ reactions as according to optimized tissue conditions; (2) second strand synthesis and in vitro transcription and (3) adapter ligation with cDNA synthesis. Given positive results in optimization mode, Applicants first sought to evaluate the performance of (2) and (3). These reactions are also scalable by user-input ie. the user can choose to run anywhere between 1 and 96 samples in parallel in 8-step increments with adjusted consumable usage to alleviate costs. Using fragmented reference cDNA material as input (Methods), no significant variation (pvalue>0.05) was shown between 3 separate library preparation runs (FIG. 20A-20B). Additionally, no significant variability was shown within each run or user-defined throughput set up (FIG. 20C).

Figure 21A:
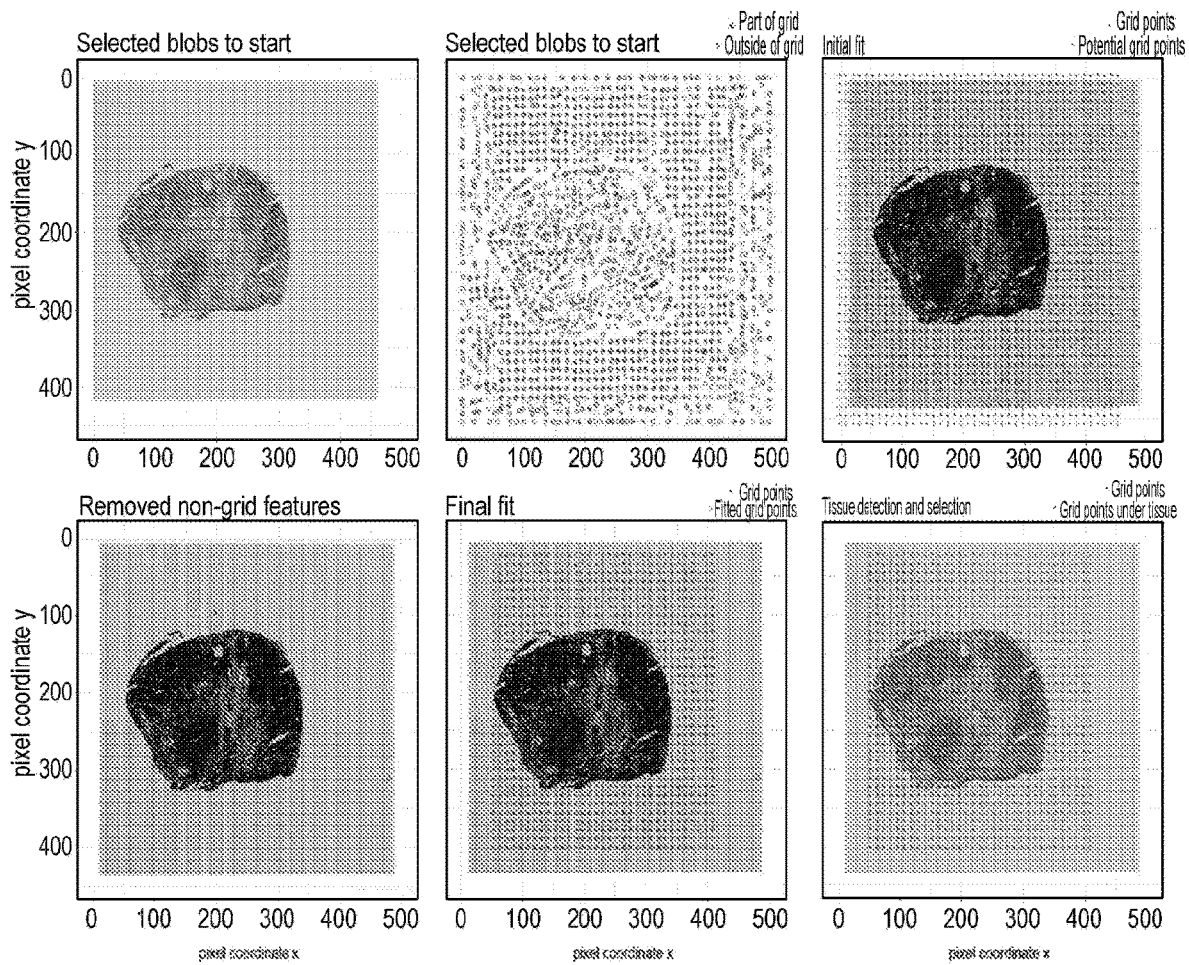
FIG. 21A-21B SpoTter-based array and tissue detection FIG. 21A The RGB tissue H&E stained image is the input file to the approach. First the RGB image is split into 3 color channels and circular features are detected. Those features that potentially fit a grid pattern (33×35 matrix) are used for the initial fit. Then circular features outside the grid are removed and the process of grid fitting repeated until a perfect 33×35 matrix is adjusted and positioned. Then the tissue is detected and grid spots under the tissue easily selected.

Finally, Applicants tested the performance of the fully automated set as compared to that prepared manually. To this end, Applicants also developed a fast and fully automated end-to-end ST image integration method termed SpoTteR. With SpoTteR, images are automatically downscaled to ensure fast processing and barcode spots positions reconstructed using iterative blob detection and grid fitting (Methods, FIG. 21A). The approach accounts for various imaging artifacts present; such as uneven tissue coloration, background slide smear effects and pipetting bubbles. Finally, tissue's coordinates are also registered through a masking process and this automatic alignment approach combined with the sequencing data to make a gene-by-barcode matrix. Further, SpoTteR creates a first quality report system for spatially resolved data.

Figure 21B:
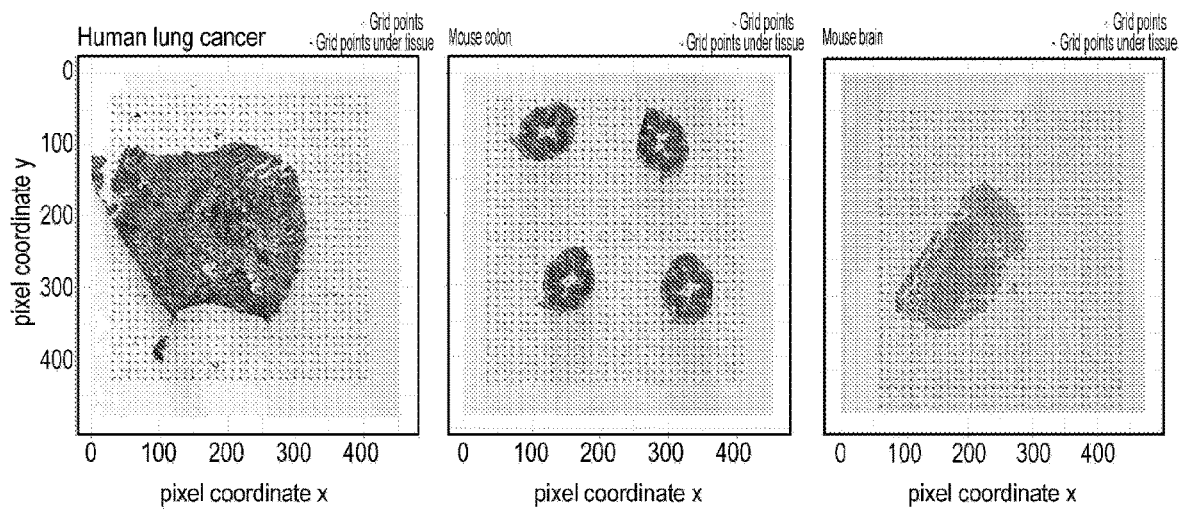

To test SpoTteR's performance, Applicants compared its detection rates and processing speed to manual and semi-automated approaches[36] previously described. The results show that SpoTter is agnostic tissue type and size when detecting and assigning barcodes spots to a predefined grid (FIG. 21b). Compared to the semi-automated approach, no user interaction is needed either during the image pre-processing or ST barcode detection steps making our fully automated approach up to 14× faster while keeping 96.46% false positive and 98.82% false negative accuracy, while the semi-automated approach results in high false negative errors (FIG. 22A-22C). Now, Applicants could easily annotate the H&E images using a GUI so that each ST (x,y) expression spot is assigned with one or more of 11 different morpho-regional tags (Methods).

Figure 23A:
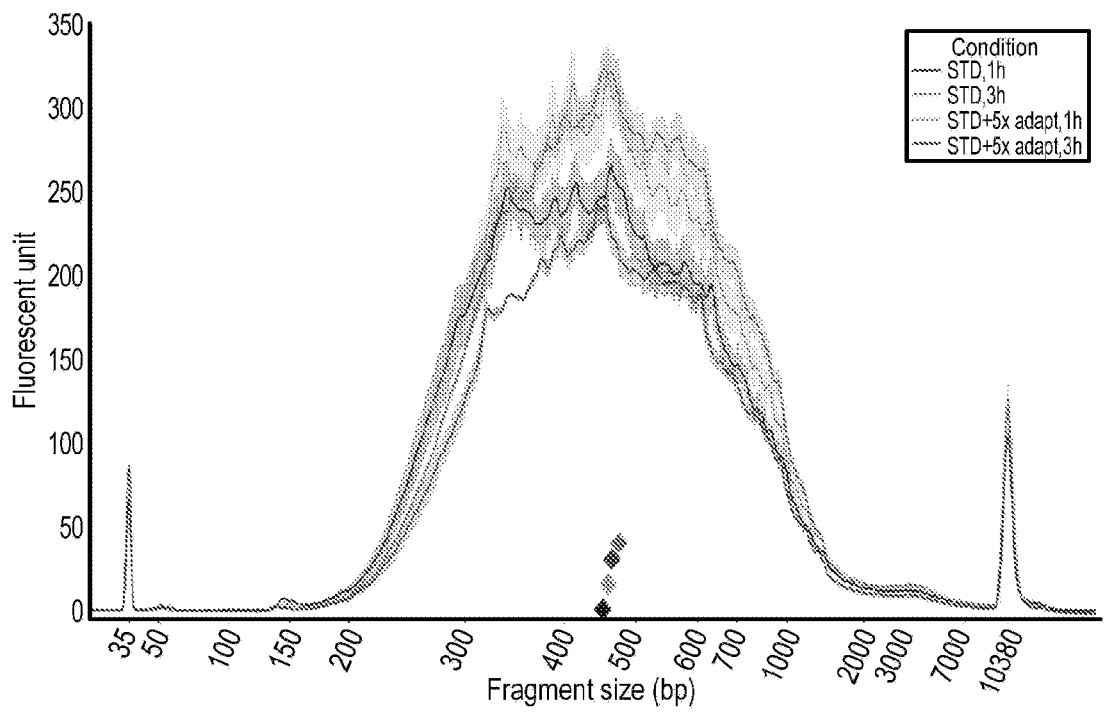
FIG. 23A-23B (FIG. 23A) Mean fragment length distribution of DNA molecules prepared for sequencing with 68% confidence interval for automated prepared libraries ($n_{biological}=3$ for conditions 'STD 1 h', 'STD 3 h', 'STD+5× adapt 3 h' and $n_{biological}=2$ for condition 'STD+5× adapt 1 h') using conditions stated in the legend. Diamonds represent the average fragment lengths.
Figure 23B:
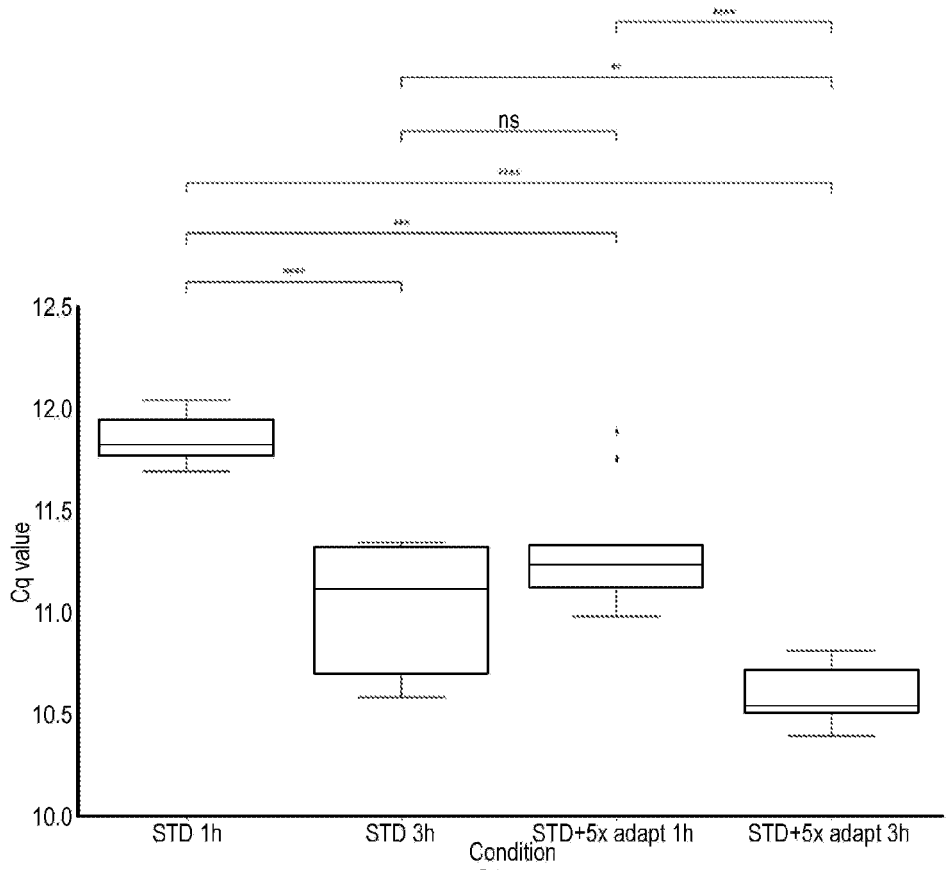
Figure 24A:
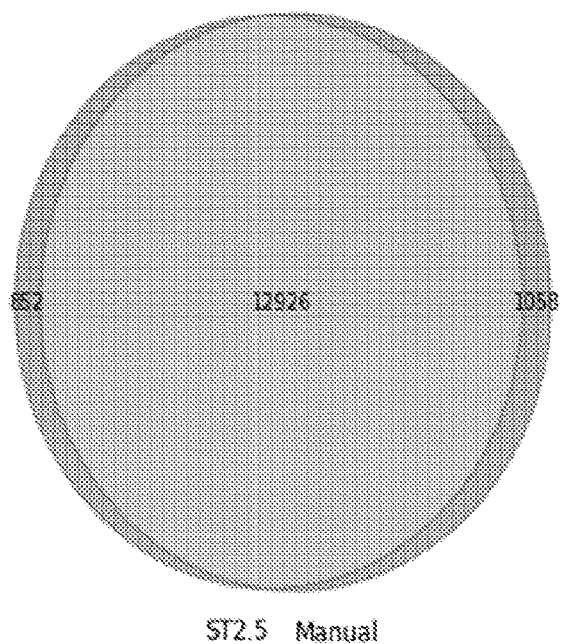
FIG. 24A-24E (FIG. 24A) Number of expressed genes for ST2.5 and manually prepared libraries and their intersection. Gene count has been adjusted for sequencing depth (Methods).
Figure 24B:
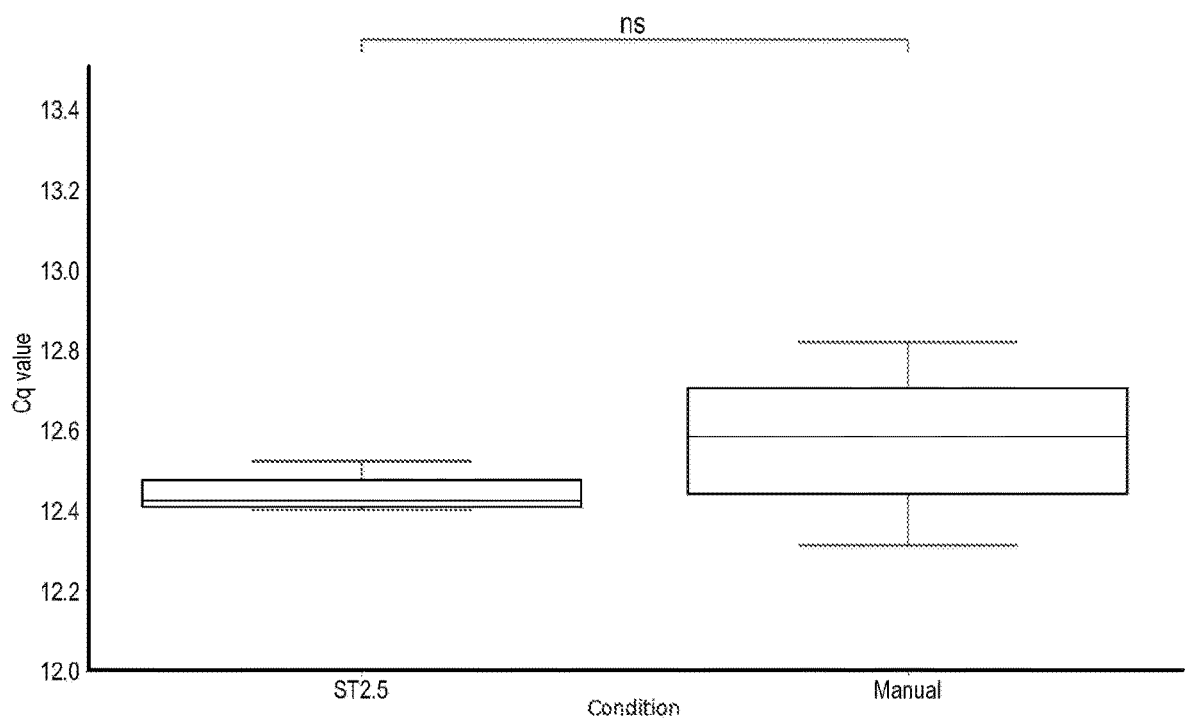
Figure 24C:
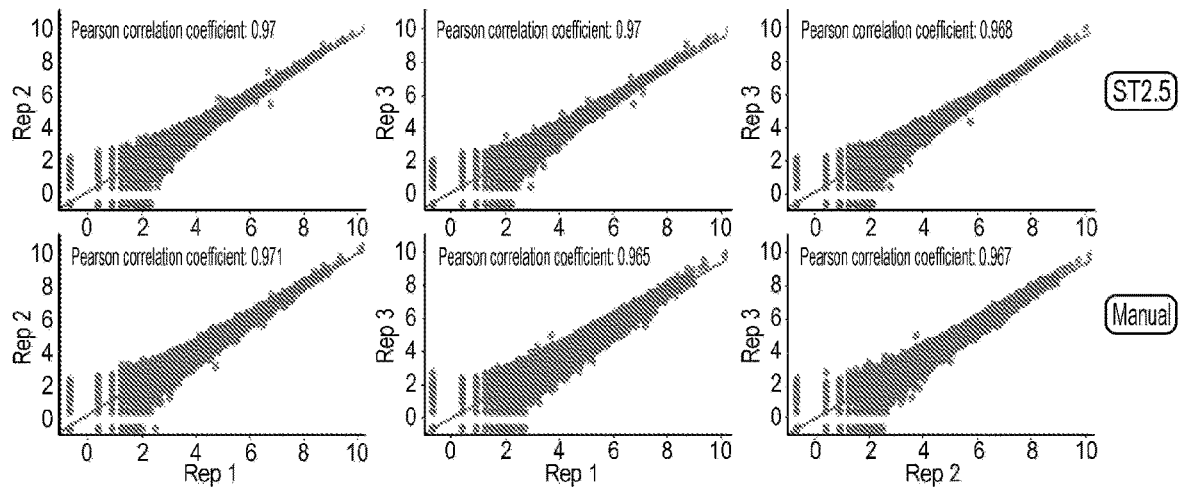
Figure 24D:
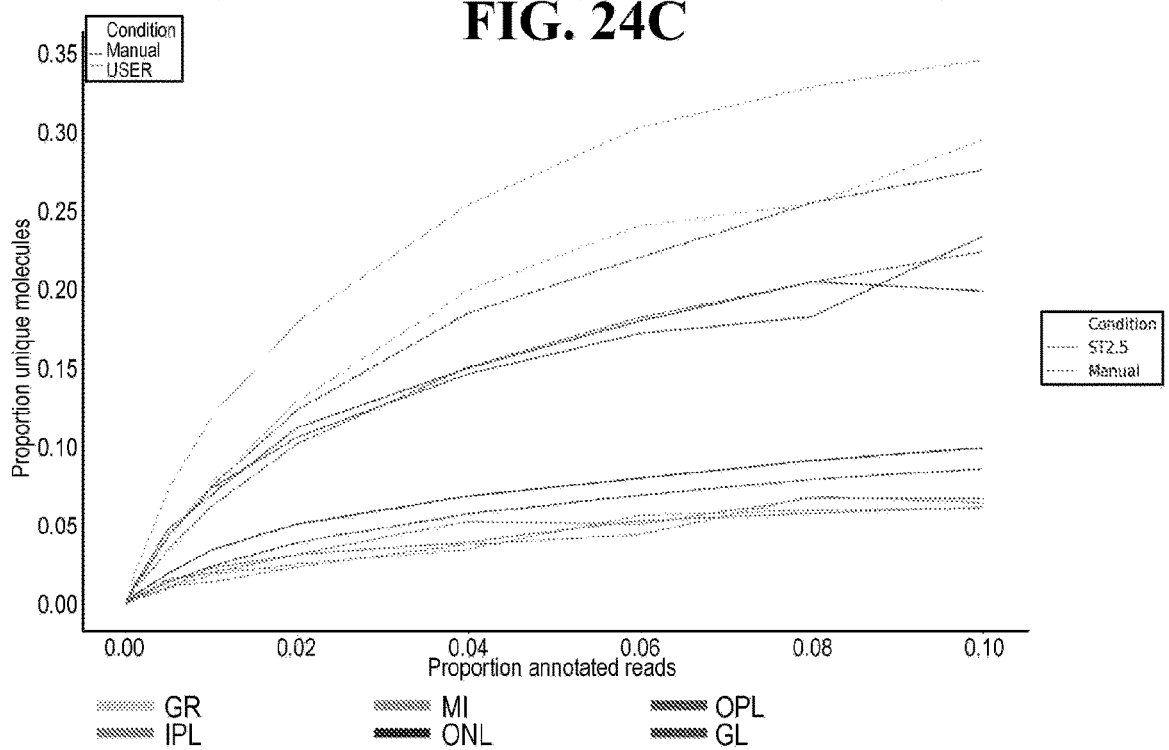
Figure 24E:
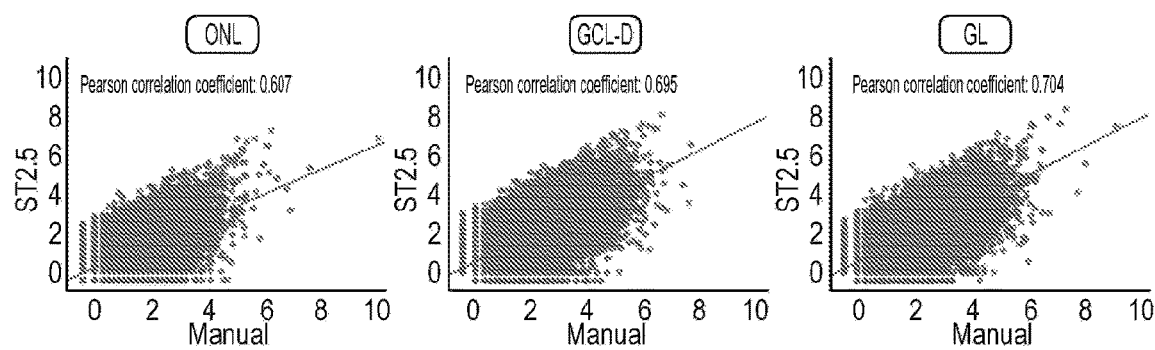
Figure 25A:
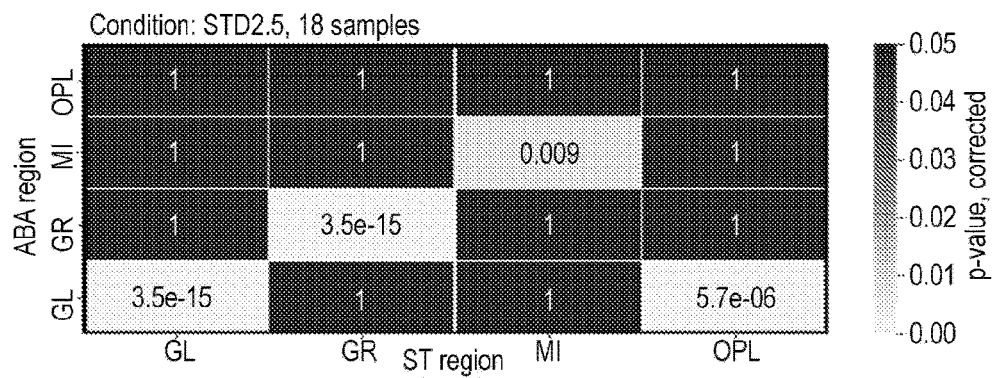
FIG. 25A-25C (FIG. 25A) Shared genes with ABA (Allen Brain Atlas) in all annotated regions: GL, GR, MI and OPL in ST2.5 and manual prepared libraries. Color scale denotes significant p-values (p<0.05, Fisher's exact test, one sided, multiple testing corrected using Benjamini/Hochberg).
Figure 25B:
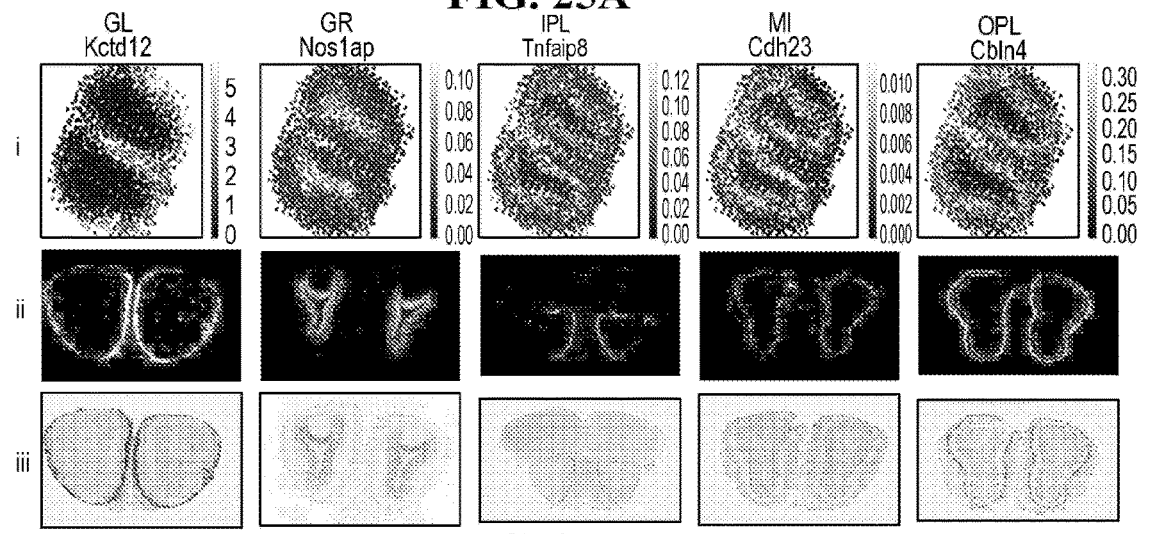
Figure 25C:
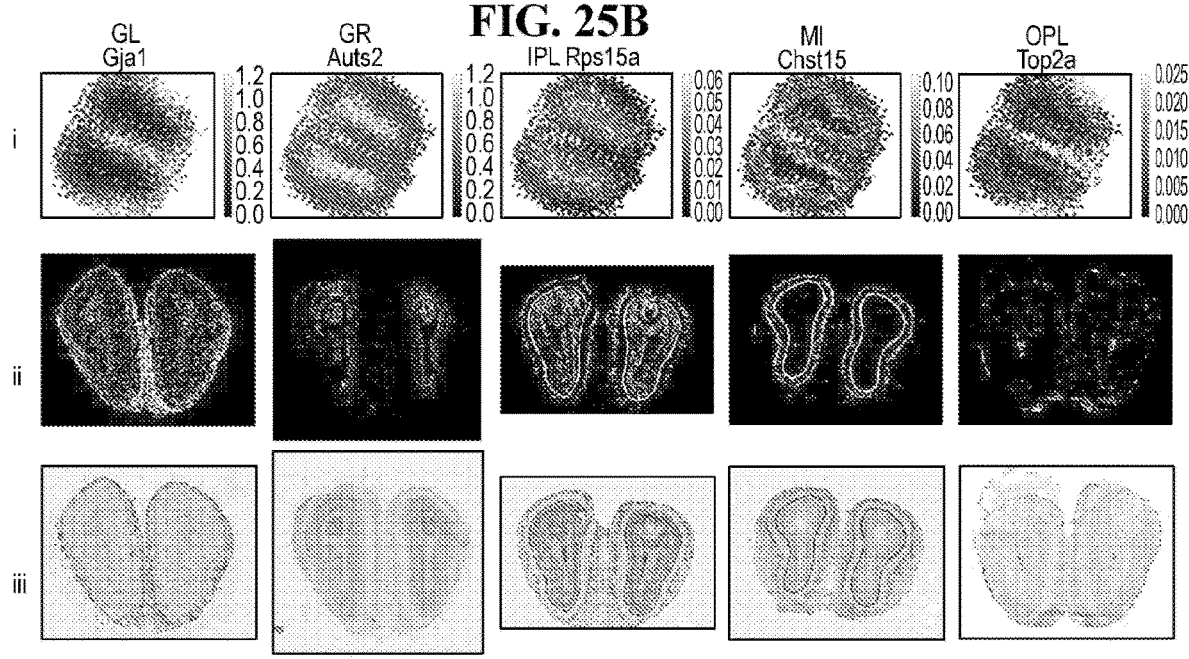

When comparing ST2.5 vs. manual protocol performances, the majority of the genes agreed between the two preparations (FIG. 23A). Further, the two setups have on average similar expression profiles at the same sequencing depth (FIG. 23B) and also gave similar average sensitivity (defined as the total number of unique molecular identifiers; UMIs) for each morphological region (FIG. 23C). These results confirmed excellent reproducibility within and between automated runs while keeping the spatial specificity and sensitivity as compared to the standard manually prepared ST protocol. Next Applicants explored whether sensitivity could be increased ie. number of genes and UMIs detected per ST (x,y) coordinate. Previous reports noted ST sensitivity at 6.9±1.5% to that of single-molecule fluorescent in situ hybridization[20]. Here, Applicants report sensitivity optimizations in three steps. The first major change includes a parallel capture of mRNA molecules onto the releases barcode cDNA primers otherwise present on the ST array surface (Methods). In short, Applicants reasoned that upon mRNA hybridizing to the poly(d)T capture probes on the ST slide surface, that hybrid is stable and can be used as a template for a reverse transcription reaction in solution. To ensure that, the hybrid also needed to be released from the slide surface using a restriction site close to the 5' end of the surface capture probes. Now, a parallel and supplemented cDNA synthesis reaction (Methods) could be performed on the slide's surface and the total processing time was decreased from ~1.5 days to ~6 h. To further increase efficiency, Applicants adjusted the amount of adaptors and reaction time in the subsequent ligation steps during library preparation. Applicants report no difference in library length but a significant increase in library outputs present after either of these two optimizations performed (FIG. 24A-24B). After sequencing, the total number of protein-coding genes increased (FIG. 24C) as compared to the standard protocol. UMI-based sensitivity showed a linear increase in correlation to sequencing depth and protocol (FIG. 24D) marking a significant increase in sensitivity (p-val). Average expression profiles between three profiled sections agreed significantly (FIG. 24E). Compared to previous results, efficiency can be estimated to that of smFISH. Next Applicants asked the question whether one can detect correct spatial gene expression using ST2.5. Splotch[31,37] was used to align our replicate tissue sections per condition and generate posterior estimates of spatial gene expression and evaluate spatial autocorrelation. After running Splotch, Applicants confirmed that region-enriched and upregulated genes (beta>2) were present in the correct spatial regions as compared to expression estimated provided in the Allen Brain Atlas[38] (Methods, FIG. 25A-25B). When comparing spatially variable genes in the ST and ST2.5 approaches, Applicants capture the spatial variation as expected with ST (FIG. 25C) but add new spatial targets using ST2.5.

Throughput and robustness are needed to transition away from current limitations of low replication spatial genomics profiling. Namely, volumetric sampling requires vast number of tissue sections to be processed to make biological discoveries[31,39]. Robotization on widely used platform enables use of appropriate study design and replication while minimizing technical variation. In addition, it enables laboratories with very limited training to adapt new technologies into their sample processing pipelines. ST2.5 is a highly efficient and automated workflow for spatially resolved transcriptomics, easily adaptable to new ST array versions and designs. ST2.5 does not rely on any customized microfabrication, uses commercially widely-available liquid handlers with minimum preparation time per run (~30 min), has an end-to-end image-integrated data analysis pipeline and is readily deployable to the wide scientific community.

References Utilized in Example 3

1. Hawrylycz, M. J. et al. An anatomically comprehensive atlas of the adult human brain transcriptome. *Nature* 489, 391-399 (2012).
2. Oh, S. W. et al. A mesoscale connectome of the mouse brain. *Nature* 508, 207-214 (2014).

3. Livet, J. et al. Transgenic strategies for combinatorial expression of fluorescent proteins in the nervous system. *Nature* 450, 56-62 (2007).
4. Lein, E., Borm, L. E. & Linnarsson, S. The promise of spatial transcriptomics for neuroscience in the era of molecular cell typing. *Science* 358, 64-69 (2017).
5. Zheng, G. X. Y. et al. Massively parallel digital transcriptional profiling of single cells. *Nat. Commun.* 8, 14049 (2017).
6. Macosko, E. Z. et al. Highly Parallel Genome-wide Expression Profiling of Individual Cells Using Nanoliter Droplets. *Cell* 161, 1202-1214 (2015).
7. Klein, A. M. et al. Droplet barcoding for single-cell transcriptomics applied to embryonic stem cells. *Cell* 161, 1187-1201 (2015).
8. Zeisel, A. et al. Molecular Architecture of the Mouse Nervous System. *Cell* 174, 999-1014.e22 (2018).
9. Lake, B. B. et al. Neuronal subtypes and diversity revealed by single-nucleus RNA sequencing of the human brain. *Science* 352, 1586-1590 (2016).
10. van den Brink, S. C. et al. Single-cell sequencing reveals dissociation-induced gene expression in tissue subpopulations. *Nat. Methods* 14, 935-936 (2017).
11. Chen, K. H., Boettiger, A. N., Moffitt, J. R., Wang, S. & Zhuang, X. RNA imaging. Spatially resolved, highly multiplexed RNA profiling in single cells. *Science* 348, aaa6090 (2015).
12. Lubeck, E., Coskun, A. F., Zhiyentayev, T., Ahmad, M. & Cai, L. Single-cell in situ RNA profiling by sequential hybridization. *Nature methods* vol. 11 360-361 (2014).
13. Eng, C.-H. L. et al. Transcriptome-scale super-resolved imaging in tissues by RNA seqFISH. *Nature* 568, 235-239 (2019).
14. Lee, J. H. et al. Highly multiplexed subcellular RNA sequencing in situ. *Science* 343, 1360-1363 (2014).
15. Goltsev, Y. et al. Deep Profiling of Mouse Splenic Architecture with CODEX Multiplexed Imaging. *Cell* 174, 968-981.e15 (2018).
16. Keren, L. et al. A Structured Tumor-Immune Microenvironment in Triple Negative Breast Cancer Revealed by Multiplexed Ion Beam Imaging. *Cell* 174, 1373-1387.e19 (2018).
17. Merritt, C. R. et al. High multiplex, digital spatial profiling of proteins and RNA in fixed tissue using genomic detection methods. doi:10.1101/559021.
18. Codeluppi, S. et al. Spatial organization of the somatosensory cortex revealed by osmFISH. *Nat. Methods* 15, 932-935 (2018).
19. Kühnemund, M. et al. Targeted DNA sequencing and in situ mutation analysis using mobile phone microscopy. *Nat. Commun.* 8, 13913 (2017).
20. Stahl, P. L. et al. Visualization and analysis of gene expression in tissue sections by spatial transcriptomics. *Science* 353, 78-82 (2016).
21. Rodrigues, S. G. et al. Slide-seq: A scalable technology for measuring genome-wide expression at high spatial resolution. *Science* 363, 1463-1467 (2019).
22. Vickovic, S. et al. High-density spatial transcriptomics arrays for in situ tissue profiling. doi:10.1101/563338.
23. Weinstein, J. A., Regev, A. & Zhang, F. DNA Microscopy: Optics-free Spatio-genetic Imaging by a Stand-Alone Chemical Reaction. *Cell* 178, 229-241.e16 (2019).
24. Turakhia, M. P. et al. Rationale and design of a large-scale, app-based study to identify cardiac arrhythmias using a smartwatch: The Apple Heart Study. *Am. Heart J.* 207, 66-75 (2019).
25. Lundin, S., Stranneheim, H., Pettersson, E., Klevebring, D. & Lundeberg, J. Increased throughput by parallelization of library preparation for massive sequencing. *PLoS One* 5, e10029 (2010).
26. Lennon, N. J. et al. A scalable, fully automated process for construction of sequence-ready barcoded libraries for 454. *Genome Biol.* 11, R15 (2010).
27. Jemt, A. et al. An automated approach to prepare tissue-derived spatially barcoded RNA-sequencing libraries. *Sci. Rep.* 6, 37137 (2016).
28. Berglund, E. et al. Spatial maps of prostate cancer transcriptomes reveal an unexplored landscape of heterogeneity. *Nat. Commun.* 9, 2419 (2018).
29. Asp, M. et al. Spatial detection of fetal marker genes expressed at low level in adult human heart tissue. *Sci. Rep.* 7, 12941 (2017).
30. Thrane, K., Eriksson, H., Maaskola, J., Hansson, J. & Lundeberg, J. Spatially Resolved Transcriptomics Enables Dissection of Genetic Heterogeneity in Stage III Cutaneous Malignant Melanoma. *Cancer Res.* 78, 5970-5979 (2018).
31. Maniatis, S. et al. Spatiotemporal dynamics of molecular pathology in amyotrophic lateral sclerosis. *Science* 364, 89-93 (2019).
32. Salmén, F. et al. Barcoded solid-phase RNA capture for Spatial Transcriptomics profiling in mammalian tissue sections. *Nat. Protoc.* 13, 2501-2534 (2018).
33. Fisher, S. et al. A scalable, fully automated process for construction of sequence-ready human exome targeted capture libraries. *Genome Biol.* 12, R1 (2011).
34. Rohland, N. & Reich, D. Cost-effective, high-throughput DNA sequencing libraries for multiplexed target capture. *Genome Res.* 22, 939-946 (2012).
35. Vickovic, S. et al. Massive and parallel expression profiling using microarrayed single-cell sequencing. *Nat. Commun.* 7, 13182 (2016).
36. Wong, K., Navarro, J. F., Bergenstråhle, L., Stahl, P. L. & Lundeberg, J. ST Spot Detector: a web-based application for automatic spot and tissue detection for spatial Transcriptomics image datasets. *Bioinformatics* 34, 1966-1968 (2018).
37. Äijö, T. et al. Splotch: Robust estimation of aligned spatial temporal gene expression data. doi:10.1101/757096.
38. Lein, E. S. et al. Genome-wide atlas of gene expression in the adult mouse brain. *Nature* 445, 168-176 (2007).
39. Ellis, M. M., Ivan, J. S., Tucker, J. M. & Schwartz, M. K. rSPACE: Spatially based power analysis for conservation and ecology. *Methods in Ecology and Evolution* vol. 6 621-625 (2015).
40. Dobin, A. et al. STAR: ultrafast universal RNA-seq aligner. *Bioinformatics* 29, 15-21 (2013).
41. Anders, S., Pyl, P. T. & Huber, W. HTSeq—a Python framework to work with high-throughput sequencing data. *Bioinformatics* 31, 166-169 (2015).
42. Costea, P. I., Lundeberg, J. & Akan, P. TagGD: fast and accurate software for DNA Tag generation and demultiplexing. *PLoS One* 8, e57521 (2013).
43. Schindelin, J. et al. Fiji: an open-source platform for biological-image analysis. *Nat. Methods* 9, 676-682 (2012).
44. Svensson, V., Teichmann, S. A. & Stegle, O. SpatialDE: identification of spatially variable genes. *Nat. Methods* 15, 343-346 (2018).
45. Jones, E., Peterson, P. & Oliphant, T. SciPy: Open Source Scientific Tools for Python. Scipy http://www.scipy.org/ (2001).

Various modifications and variations of the described methods, pharmaceutical compositions, and kits of the invention will be apparent to those skilled in the art without departing from the scope and spirit of the invention. Although the invention has been described in connection with specific embodiments, it will be understood that it is capable of further modifications and that the invention as claimed should not be unduly limited to such specific embodiments. Indeed, various modifications of the described modes for carrying out the invention that are obvious to those skilled in the art are intended to be within the scope of the invention. This application is intended to cover any variations, uses, or adaptations of the invention following, in general, the principles of the invention and including such departures from the present disclosure come within known customary practice within the art to which the invention pertains and may be applied to the essential features herein before set forth.

What is claimed is:

1. A method of spatiotemporal processing of a sample of a plurality of cells comprising:
   a. depositing a plurality of spatial barcodes on a solid substrate, the spatial barcodes each defining an x,y position on the solid substrate and further comprising a capture molecule;
   b. depositing the sample of the plurality of cells on the surface of the solid substrate;
   c. capturing material from one or more cells of the plurality of cells with the capture molecule of the spatial barcode, thereby linking the captured material from the one or more cells with the spatial barcode, optionally wherein the captured material comprises nucleic acids, proteins or any combination thereof; and
   d. correlating the captured material to the x,y positions in the sample on the solid substrate, wherein the x,y positions have a resolution of 5 µm or less.

2. The method of claim 1, further comprising capturing an image of the sample on the solid substrate, and optionally annotating regions of the image of the sample optionally based on morphology.

3. The method of claim 2, wherein correlating further comprises assigning pixel coordinates to the image and coordinating to the x,y position of the spatial barcode.

4. The method of claim 3, further comprising assigning a cell type to cells in the sample.

5. The method of claim 1, further comprising
   d. staining the sample;
   e. recording the morphology of the stained sample;
   f. permeabilizing the sample;
   g. capturing mRNA of the sample with the capture molecule, thereby linking mRNA of the cells of the sample with the spatial barcode;
   h. preparing a library of cDNA molecules from the captured mRNA and the linked spatial barcode; and optionally
   i. ablating a single layer of the plurality of cells and performing the step of capturing material from one or more cells of the plurality of cells in a second layer of the cells.

6. The method of claim 5, wherein one or more of steps d-i are performed on a fully automated spatial transcriptomics platform.

7. The method of claim 5, wherein the step of recording the morphology comprises automated capturing of a plurality of images and image stitching.

8. The method of claim 5, further comprising sequencing the library of cDNA molecules and correlating each of the cDNA molecules to a position in the sample on the solid substrate.

9. The method of claim 8, further comprising assigning a cell type or cell subtype to the plurality of cells in the sample, the assigning comprising detecting differential expression of the cDNA molecules to generate a gene signature and identifying cell type based on the gene signature at positions in the sample.

10. The method of claim 8, further comprising integrating the position of the cDNA molecules with images generated by automated capturing of a plurality of images and image stitching.

11. The method of claim 1, further comprising staining the plurality of cells, wherein staining optionally comprises fluorescent or bright field staining.

12. The method of claim 1, further comprising depositing a plurality of CRISPR-Cas systems on the solid substrate, wherein each of the CRISPR-Cas systems comprises (i) a CRISPR-Cas protein or one or more nucleic acid sequences encoding the CRISPR-Cas protein, and (ii) a guide sequence capable of hybridizing with a target sequence.

13. The method of claim 12, wherein one or more CRISPR-Cas systems are deposited at each defined x,y position on the solid substrate.

14. The method of claim 12, wherein the guide sequence is linked to the spatial barcode.

15. The method of claim 1, further comprising delivering CRISPR-Cas systems to the sample prior to or subsequent to depositing the sample on the solid substrate.

16. The method of claim 1, wherein the spatial barcode is provided in a droplet.

17. The method of claim 16, wherein the droplet comprises a plurality of spatial barcodes.

18. The method of claim 1, wherein the spatial barcode comprises a bead.

19. The method of claim 18, wherein the bead comprises a plurality of spatial barcodes.

20. The method of claim 18, wherein the bead comprises color-coded beads.

21. The method of claim 18, wherein the bead comprises a conductivity-coded bead, optionally wherein the conductivity-coded bead is deposited on the solid substrate, the solid substrate comprising pre-etched wells.

22. The method of claim 1, further comprising the step of decoding the spatial barcode, the decoding comprising sequential hybridization, in-situ sequencing, laser scanning, DNA microscopy, FISH, smFISH, or in situ PCR.

23. The method of claim 1, further comprising sequencing the captured material.

24. The method of claim 1, further comprising releasing the captured material, optionally wherein the spatial barcode comprises a cleavable linker.

25. The method of claim 24, wherein the releasing comprises the release of spatially positioned barcodes into the tissue with the addition of polymer, betaine and/or $MgCl_2$.

26. The method of claim 24, wherein the cleavable linker is a restriction site, and releasing the captured material comprises utilizing a restriction enzyme specific to the restriction site, and cleaving the captured molecule.

27. The method of claim 1, wherein the spatial barcode is an oligonucleotide and the captured material comprises nucleic acids, and the method further comprises synthesizing a complementary strand to the spatial barcode or captured material using a polymerase, and releasing the complementary strand or the spatial barcode and captured material.

28. The method of claim 1, wherein the plurality of cells is a tissue sample, optionally a mammalian tissue sample.

29. A method of spatiotemporal processing of a sample of a plurality of cells comprising:
   a. depositing a plurality of spatial barcodes on a solid substrate, the spatial barcodes each defining an x,y position on the solid substrate and further comprising a capture molecule;
   b. depositing the sample of the plurality of cells on the surface of the solid substrate, wherein the plurality of cells is a tissue sample, optionally a mammalian tissue sample, and wherein the tissue sample is greater than about 0.5 cm in thickness; and
   c. capturing material from one or more cells of the plurality of cells with the capture molecule of the spatial barcode, thereby linking the captured material from the one or more cells with the spatial barcode, optionally wherein the captured material comprises nucleic acids, proteins or any combination thereof.

30. The method of claim 28, wherein the tissue sample is a biopsy sample.

31. The method of claim 28, wherein the tissue sample is from the central nervous system.

32. The method of claim 1, wherein the solid substrate comprises a glass slide, a polymer, or an imaging fiber.

33. The method of claim 1, wherein the solid substrate comprises an array of microwells, the microwells each about 2 um, optionally with a 3 um distance from center to center of each well.

34. The method of claim 1, wherein the depositing comprises inkjet, contact printing or Fluorescent Activated Cell Sorting (FACS).

35. The method of claim 1, wherein the depositing is random or ordered.

36. The method of claim 1, wherein depositing the spatial barcode comprises the binding of the spatial barcode to the solid substrate, optionally wherein the binding of the spatial barcode to the solid substrate is covalent or non-covalent bonding.

37. The method of claim 36, wherein the solid substrate comprises a surface with available active groups that facilitate the bonding of the spatial barcode to the solid substrate surface.

38. The method of claim 1, wherein the spatial barcode comprises an oligonucleotide sequence, optionally wherein the oligonucleotide sequence further comprises one or more of a unique molecular identifier (UMI), an adapter sequence, and a primer sequence.

39. The method of claim 38, further comprising building the spatial barcode on the solid substrate, optionally wherein the building the spatial barcode comprises bridge PCR or solid extension or comprises distributing oligonucleotide sequences on the solid substrate, adding padlock probes, and amplifying and decoding the oligonucleotides on the surface.

40. The method of claim 1, wherein the capture molecule comprises a Tn5 sequence, a 16S sequence, a poly (d) T sequence, a random hexamer sequence, a trypsin molecule, an antibody, a Protein Epitope Signature Tag (PrEST) sequence, or a combination thereof.

* * * * *